US011277893B2

(12) United States Patent
Sinha et al.

(10) Patent No.: US 11,277,893 B2
(45) Date of Patent: Mar. 15, 2022

(54) THERMOSTAT WITH AREA LIGHT SYSTEM AND OCCUPANCY SENSOR

(71) Applicant: Johnson Controls Technology Company, Auburn Hills, MI (US)

(72) Inventors: Sudhi Sinha, Milwaukee, WI (US); Joseph R. Ribbich, Waukesha, WI (US); Michael L. Ribbich, Oconomowoc, WI (US); Charles J. Gaidish, South Milwaukee, WI (US); John P. Cipolla, Inverness, IL (US); Damon B. Smith, Alto, GA (US); John R. Taylor, Jr., Dacula, GA (US); John M. Reiszl, Grayson, GA (US); William P. Alberth, Jr., Prairie Grove, IL (US); Kurt Joseph Mease, West Deptford, NJ (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/717,887

(22) Filed: Dec. 17, 2019

(65) Prior Publication Data

US 2020/0128646 A1 Apr. 23, 2020

Related U.S. Application Data

(63) Continuation-in-part of application No. 16/030,422, filed on Jul. 9, 2018, now Pat. No. 10,546,472, which
(Continued)

(51) Int. Cl.

*G08C 19/22* (2006.01)
*H04Q 9/00* (2006.01)
(Continued)

(52) U.S. Cl.

CPC ............ *H05B 45/12* (2020.01); *H05B 45/20* (2020.01)

(58) Field of Classification Search

CPC .... G08B 21/10; G08B 21/0453; G08B 7/062; G08B 25/005; F24F 11/0012;
(Continued)

(56) References Cited

U.S. PATENT DOCUMENTS

| | | | |
|---|---|---|---|
| 4,084,438 | A | 4/1978 | Lee et al. |
| 4,107,464 | A | 8/1978 | Lynch et al. |

(Continued)

FOREIGN PATENT DOCUMENTS

| | | | |
|---|---|---|---|
| CA | 2466854 | C | 4/2008 |
| CA | 2633200 | C | 1/2011 |

(Continued)

OTHER PUBLICATIONS

U.S. Appl. No. 14/543,354, filed Nov. 17, 2014, Vivint, Inc.
(Continued)

*Primary Examiner* — Tanmay K Shah
(74) *Attorney, Agent, or Firm* — Foley & Lardner LLP

(57) ABSTRACT

A thermostat for a building includes a light emitting diode (LED) system including one or more LEDs configured to emit light to illuminate a floor area beneath the thermostat. The thermostat incorporates an occupancy sensor to sense the approach of a user based on changes in conditions in proximity to the thermostat and detect an ambient light level. The thermostat includes a processing circuit configured to receive data outputs from the occupancy sensor, determine whether the data outputs indicate the approach of a user, cause the one or more LEDs to emit the light towards the floor in response to an indication that a user is approaching the thermostat based on occupancy sensor data correlated with occupancy conditions, and record and store LED acti-
(Continued)

vations and deactivations for later retrieval as historic data. The one or more LEDs may be configured as an illumination module removably attachable to the thermostat.

22 Claims, 73 Drawing Sheets

Related U.S. Application Data is a continuation-in-part of application No. 15/338,215, filed on Oct. 28, 2016, now Pat. No. 10,020,956, and a continuation-in-part of application No. 15/338,221, filed on Oct. 28, 2016, now Pat. No. 10,187,471, and a continuation-in-part of application No. 15/336,789, filed on Oct. 28, 2016, now Pat. No. 10,345,781, said application No. 16/030,422 is a continuation-in-part of application No. 15/397,722, filed on Jan. 3, 2017, now abandoned, which is a continuation-in-part of application No. 15/336,791, filed on Oct. 28, 2016, now Pat. No. 10,162,327, said application No. 16/030,422 is a continuation-in-part of application No. 15/336,792, filed on Oct. 28, 2016, now Pat. No. 10,180,673, application No. 16/717,887, which is a continuation-in-part of application No. 16/246,366, filed on Jan. 11, 2019, now Pat. No. 10,655,881, and a continuation-in-part of application No. 15/338,221, filed on Oct. 28, 2016, now Pat. No. 10,187,471, and a continuation-in-part of application No. 15/397,722, filed on Jan. 3, 2017, now abandoned, and a continuation-in-part of application No. 15/336,791, filed on Oct. 28, 2016, now Pat. No. 10,162,327, said application No. 16/246,366 is a continuation-in-part of application No. 15/336,789, filed on Oct. 28, 2016, now Pat. No. 10,345,781, and a continuation-in-part of application No. 15/336,792, filed on Oct. 28, 2016, now Pat. No. 10,180,673, and a continuation-in-part of application No. 15/336,793, filed on Oct. 28, 2016, now Pat. No. 10,310,477, and a continuation-in-part of application No. 16/030,422, filed on Jul. 9, 2018, now Pat. No. 10,546,472, which is a continuation-in-part of application No. 15/336,789, filed on Oct. 28, 2016, now Pat. No. 10,345,781, and a continuation-in-part of application No. 15/336,792, filed on Oct. 28, 2016, now Pat. No. 10,180,673, and a continuation-in-part of application No. 15/338,215, filed on Oct. 28, 2016, now Pat. No. 10,020,956, and a continuation-in-part of application No. 15/338,221, filed on Oct. 28, 2016, now Pat. No. 10,187,471, and a continuation-in-part of application No. 15/397,722, filed on Jan. 3, 2017, now abandoned.

(60) Provisional application No. 62/247,672, filed on Oct. 28, 2015, provisional application No. 62/274,750, filed on Jan. 4, 2016, provisional application No. 62/275,199, filed on Jan. 5, 2016, provisional application No. 62/275,202, filed on Jan. 5, 2016, provisional application No. 62/275,204, filed on Jan. 5, 2016, provisional application No. 62/275,711, filed on Jan. 6, 2016, provisional application No. 62/783,580, filed on Dec. 21, 2018.

(51) Int. Cl.
*H05B 45/12* (2020.01)
*H05B 45/20* (2020.01)

(58) Field of Classification Search
CPC .. F24F 11/0086; F24F 11/0034; F24F 11/006; F24F 2011/0057; F24F 2011/0035; F24F 2011/0061; F24F 2011/0036; F24F 2011/0091; H05B 37/0218; G05B 19/048; G05B 2219/15117; G05B 2219/2642; G05B 2219/2614; H04W 64/003; A61M 5/1723; A61M 2209/088; G07F 17/0057; G06Q 20/10; G06Q 20/405; G06Q 50/12; G06Q 50/30; H04L 67/12; A61B 5/02055; A61B 5/681; A61B 5/02405; A61B 5/02438; G07G 5/00; G06F 3/167; G06F 3/04883; G06F 17/30528
USPC .................................................... 340/870.07
See application file for complete search history.

(56) References Cited

U.S. PATENT DOCUMENTS

| | | | |
|---|---|---|---|
| 4,942,613 | A | 7/1990 | Lynch |
| 5,052,186 | A | 10/1991 | Dudley et al. |
| 5,062,276 | A | 11/1991 | Dudley |
| 5,797,729 | A | 8/1998 | Rafuse et al. |
| 6,121,885 | A | 9/2000 | Masone et al. |
| 6,164,374 | A | 12/2000 | Rhodes et al. |
| 6,169,937 | B1 | 1/2001 | Peterson |
| 6,193,395 | B1 | 2/2001 | Logan |
| 6,227,961 | B1 | 5/2001 | Moore et al. |
| 6,260,765 | B1 | 7/2001 | Natale et al. |
| 6,314,750 | B1 | 11/2001 | Ishikawa et al. |
| 6,351,693 | B1 | 2/2002 | Monie et al. |
| 6,435,418 | B1 | 8/2002 | Toth et al. |
| 6,487,869 | B1 | 12/2002 | Sulc et al. |
| 6,557,771 | B2 | 5/2003 | Shah |
| 6,641,054 | B2 | 11/2003 | Morey |
| 6,693,514 | B2 | 2/2004 | Perea et al. |
| 6,726,112 | B1 | 4/2004 | Ho |
| 6,726,113 | B2 | 4/2004 | Guo |
| 6,771,172 | B1 | 8/2004 | Robinson et al. |
| 6,789,429 | B2 | 9/2004 | Pinto et al. |
| 6,810,307 | B1 | 10/2004 | Addy |
| 6,824,069 | B2 | 11/2004 | Rosen |
| 6,827,465 | B2 | 12/2004 | Shemitz et al. |
| 6,851,621 | B1 | 2/2005 | Wacker et al. |
| 6,874,691 | B1 | 4/2005 | Hildebrand et al. |
| 6,888,441 | B2 | 5/2005 | Carey |
| 6,995,518 | B2 | 2/2006 | Havlik et al. |
| 7,028,912 | B1 | 4/2006 | Rosen |
| 7,083,109 | B2 | 8/2006 | Pouchak |
| 7,099,748 | B2 | 8/2006 | Rayburn |
| 7,140,551 | B2 | 11/2006 | De Pauw et al. |
| 7,146,253 | B2 | 12/2006 | Hoog et al. |
| 7,152,806 | B1 | 12/2006 | Rosen |
| 7,156,317 | B1 | 1/2007 | Moore |
| 7,156,318 | B1 | 1/2007 | Rosen |
| 7,159,789 | B2 | 1/2007 | Schwendinger et al. |
| 7,159,790 | B2 | 1/2007 | Schwendinger et al. |
| 7,167,079 | B2 | 1/2007 | Smyth et al. |
| 7,188,002 | B2 | 3/2007 | Chapman et al. |
| 7,212,887 | B2 | 5/2007 | Shah et al. |
| 7,225,054 | B2 | 5/2007 | Amundson et al. |
| 7,232,075 | B1 | 6/2007 | Rosen |
| 7,261,243 | B2 | 8/2007 | Butler et al. |
| 7,274,972 | B2 | 9/2007 | Amundson et al. |
| 7,287,709 | B2 | 10/2007 | Proffitt et al. |
| 7,296,426 | B2 | 11/2007 | Butler et al. |
| 7,299,996 | B2 | 11/2007 | Garrett et al. |
| 7,306,165 | B2 | 12/2007 | Shah |
| 7,308,384 | B2 | 12/2007 | Shah et al. |
| 7,317,970 | B2 | 1/2008 | Pienta et al. |
| 7,331,187 | B2 | 2/2008 | Kates |
| 7,343,751 | B2 | 3/2008 | Kates |
| 7,348,925 | B2 | 3/2008 | Noro et al. |
| 7,383,158 | B2 | 6/2008 | Krocker et al. |
| 7,402,780 | B2 | 7/2008 | Mueller et al. |
| 7,434,744 | B2 | 10/2008 | Garozzo et al. |
| 7,442,012 | B2 | 10/2008 | Moens |

(56) References Cited

U.S. PATENT DOCUMENTS

| | | | |
|---|---|---|---|
| 7,451,917 | B2 | 11/2008 | McCall et al. |
| 7,469,550 | B2 | 12/2008 | Chapman et al. |
| 7,475,558 | B2 | 1/2009 | Perry |
| 7,475,828 | B2 | 1/2009 | Bartlett et al. |
| 7,556,207 | B2 | 7/2009 | Mueller et al. |
| 7,565,813 | B2 | 7/2009 | Pouchak |
| 7,575,179 | B2 | 8/2009 | Morrow et al. |
| 7,584,897 | B2 | 9/2009 | Schultz et al. |
| 7,614,567 | B2 | 11/2009 | Chapman et al. |
| 7,624,931 | B2 | 12/2009 | Chapman et al. |
| 7,633,743 | B2 | 12/2009 | Barton et al. |
| 7,636,604 | B2 | 12/2009 | Bergman et al. |
| 7,638,739 | B2 | 12/2009 | Rhodes et al. |
| 7,641,126 | B2 | 1/2010 | Schultz et al. |
| 7,645,158 | B2 | 1/2010 | Mulhouse et al. |
| 7,667,163 | B2 | 2/2010 | Ashworth et al. |
| 7,726,581 | B2 | 6/2010 | Naujok et al. |
| 7,731,096 | B2 | 6/2010 | Lorenz et al. |
| 7,731,098 | B2 | 6/2010 | Butler et al. |
| 7,740,184 | B2 | 6/2010 | Schnell et al. |
| 7,748,225 | B2 | 7/2010 | Butler et al. |
| 7,748,639 | B2 | 7/2010 | Perry |
| 7,748,640 | B2 | 7/2010 | Roher et al. |
| 7,755,220 | B2 | 7/2010 | Sorg et al. |
| 7,765,826 | B2 | 8/2010 | Nichols |
| 7,774,102 | B2 | 8/2010 | Butler et al. |
| 7,775,452 | B2 | 8/2010 | Shah et al. |
| 7,784,291 | B2 | 8/2010 | Butler et al. |
| 7,784,704 | B2 | 8/2010 | Harter |
| 7,802,618 | B2 | 9/2010 | Simon et al. |
| 7,832,221 | B2 | 11/2010 | Wijaya et al. |
| 7,832,652 | B2 | 11/2010 | Barton et al. |
| 7,845,576 | B2 | 12/2010 | Siddaramanna et al. |
| 7,861,941 | B2 | 1/2011 | Schultz et al. |
| 7,867,646 | B2 | 1/2011 | Rhodes |
| 7,908,116 | B2 | 3/2011 | Steinberg et al. |
| 7,908,117 | B2 | 3/2011 | Steinberg et al. |
| 7,918,406 | B2 | 4/2011 | Rosen |
| 7,938,336 | B2 | 5/2011 | Rhodes et al. |
| 7,941,294 | B2 | 5/2011 | Shahi et al. |
| 7,954,726 | B2 | 6/2011 | Siddaramanna et al. |
| 7,963,454 | B2 | 6/2011 | Sullivan et al. |
| 7,979,164 | B2 | 7/2011 | Garozzo et al. |
| 7,992,794 | B2 | 8/2011 | Leen et al. |
| 8,010,237 | B2 | 8/2011 | Cheung et al. |
| 8,032,254 | B2 | 10/2011 | Amundson et al. |
| 8,078,326 | B2 | 12/2011 | Harrod et al. |
| 8,082,065 | B2 | 12/2011 | Imes et al. |
| 8,083,154 | B2 | 12/2011 | Schultz et al. |
| 8,089,032 | B2 | 1/2012 | Beland et al. |
| 8,091,794 | B2 | 1/2012 | Siddaramanna et al. |
| 8,099,195 | B2 | 1/2012 | Imes et al. |
| 8,108,076 | B2 | 1/2012 | Imes et al. |
| 8,131,506 | B2 | 3/2012 | Steinberg et al. |
| 8,141,791 | B2 | 3/2012 | Rosen |
| 8,167,216 | B2 | 5/2012 | Schultz et al. |
| 8,180,492 | B2 | 5/2012 | Steinberg |
| 8,182,106 | B2 | 5/2012 | Shin et al. |
| 8,190,296 | B2 | 5/2012 | Alhilo |
| 8,195,313 | B1 | 6/2012 | Fadell et al. |
| 8,196,185 | B2 | 6/2012 | Geadelmann et al. |
| 8,209,059 | B2 | 6/2012 | Stockton |
| 8,239,066 | B2 | 8/2012 | Jennings et al. |
| 8,275,918 | B2 | 9/2012 | Bourbeau et al. |
| 8,276,829 | B2 | 10/2012 | Stoner et al. |
| 8,280,536 | B1 | 10/2012 | Fadell et al. |
| 8,289,182 | B2 | 10/2012 | Vogel et al. |
| 8,289,226 | B2 | 10/2012 | Takach et al. |
| 8,299,919 | B2 | 10/2012 | Dayton et al. |
| 8,321,058 | B2 | 11/2012 | Zhou et al. |
| 8,346,396 | B2 | 1/2013 | Amundson et al. |
| 8,387,891 | B1 | 3/2013 | Simon et al. |
| 8,393,550 | B2 | 3/2013 | Simon et al. |
| 8,412,488 | B2 | 4/2013 | Steinberg et al. |
| 8,416,084 | B2 | 4/2013 | Beltmann et al. |
| 8,419,236 | B2 | 4/2013 | Fisher et al. |
| 8,429,566 | B2 | 4/2013 | Koushik et al. |
| 8,456,293 | B1 | 6/2013 | Trundle et al. |
| 8,473,109 | B1 | 6/2013 | Imes et al. |
| 8,476,964 | B1 | 7/2013 | Atri |
| 8,489,243 | B2 | 7/2013 | Fadell et al. |
| 8,504,180 | B2 | 8/2013 | Imes et al. |
| 8,510,255 | B2 | 8/2013 | Fadell et al. |
| 8,511,576 | B2 | 8/2013 | Warren et al. |
| 8,511,577 | B2 | 8/2013 | Warren et al. |
| 8,517,088 | B2 | 8/2013 | Moore et al. |
| 8,523,083 | B2 | 9/2013 | Warren et al. |
| 8,523,084 | B2 | 9/2013 | Siddaramanna et al. |
| 8,527,096 | B2 | 9/2013 | Pavlak et al. |
| 8,532,827 | B2 | 9/2013 | Stefanski et al. |
| 8,544,285 | B2 | 10/2013 | Stefanski et al. |
| 8,549,658 | B2 | 10/2013 | Kolavennu et al. |
| 8,550,368 | B2 | 10/2013 | Butler et al. |
| 8,554,374 | B2 | 10/2013 | Lunacek et al. |
| 8,555,662 | B2 | 10/2013 | Peterson et al. |
| 8,558,179 | B2 | 10/2013 | Filson et al. |
| 8,560,127 | B2 | 10/2013 | Leen et al. |
| 8,560,128 | B2 | 10/2013 | Ruff et al. |
| 8,571,518 | B2 | 10/2013 | Imes et al. |
| 8,596,550 | B2 | 12/2013 | Steinberg et al. |
| 8,600,564 | B2 | 12/2013 | Imes et al. |
| 8,606,409 | B2 | 12/2013 | Amundson et al. |
| 8,613,792 | B2 | 12/2013 | Ragland et al. |
| 8,620,841 | B1 | 12/2013 | Filson et al. |
| 8,622,314 | B2 | 1/2014 | Fisher et al. |
| 8,626,344 | B2 | 1/2014 | Imes et al. |
| 8,630,741 | B1 | 1/2014 | Matsuoka et al. |
| 8,630,742 | B1 | 1/2014 | Stefanski et al. |
| 8,644,009 | B2 | 2/2014 | Rylski et al. |
| 8,659,302 | B1 | 2/2014 | Warren et al. |
| 8,671,702 | B1 | 3/2014 | Shotey et al. |
| 8,674,816 | B2 | 3/2014 | Trundle et al. |
| 8,689,572 | B2 | 4/2014 | Evans et al. |
| 8,695,887 | B2 | 4/2014 | Helt et al. |
| 8,706,270 | B2 | 4/2014 | Fadell et al. |
| 8,708,242 | B2 | 4/2014 | Conner et al. |
| 8,712,590 | B2 | 4/2014 | Steinberg |
| 8,718,826 | B2 | 5/2014 | Ramachandran et al. |
| 8,726,680 | B2 | 5/2014 | Schenk et al. |
| 8,727,611 | B2 | 5/2014 | Huppi et al. |
| 8,738,327 | B2 | 5/2014 | Steinberg et al. |
| 8,746,583 | B2 | 6/2014 | Simon et al. |
| 8,752,771 | B2 | 6/2014 | Warren et al. |
| 8,754,780 | B2 | 6/2014 | Petite et al. |
| 8,766,194 | B2 | 7/2014 | Filson et al. |
| 8,770,490 | B2 | 7/2014 | Drew |
| 8,770,491 | B2 | 7/2014 | Warren et al. |
| 8,788,103 | B2 | 7/2014 | Warren et al. |
| 8,802,981 | B2 | 8/2014 | Wallaert et al. |
| 8,830,267 | B2 | 9/2014 | Brackney |
| 8,838,282 | B1 | 9/2014 | Ratliff et al. |
| 8,843,239 | B2 | 9/2014 | Mighdoll et al. |
| 8,850,348 | B2 | 9/2014 | Fadell et al. |
| 8,855,830 | B2 | 10/2014 | Imes et al. |
| 8,868,219 | B2 | 10/2014 | Fadell et al. |
| 8,870,086 | B2 | 10/2014 | Tessier et al. |
| 8,870,087 | B2 | 10/2014 | Pienta et al. |
| 8,880,047 | B2 | 11/2014 | Konicek et al. |
| 8,893,032 | B2 | 11/2014 | Bruck et al. |
| 8,893,555 | B2 | 11/2014 | Bourbeau et al. |
| 8,903,552 | B2 | 12/2014 | Amundson et al. |
| 8,918,219 | B2 | 12/2014 | Sloo et al. |
| 8,942,853 | B2 | 1/2015 | Stefanski et al. |
| 8,944,338 | B2 | 2/2015 | Warren et al. |
| 8,950,686 | B2 | 2/2015 | Matsuoka et al. |
| 8,950,687 | B2 | 2/2015 | Bergman et al. |
| 8,961,005 | B2 | 2/2015 | Huppi et al. |
| 8,978,994 | B2 | 3/2015 | Moore et al. |
| 8,998,102 | B2 | 4/2015 | Fadell et al. |
| 9,014,686 | B2 | 4/2015 | Ramachandran et al. |
| 9,014,860 | B2 | 4/2015 | Moore et al. |
| 9,020,647 | B2 | 4/2015 | Johnson et al. |
| 9,026,232 | B2 | 5/2015 | Fadell et al. |
| 9,033,255 | B2 | 5/2015 | Tessier et al. |

(56) References Cited

U.S. PATENT DOCUMENTS

RE45,574 E 6/2015 Harter
9,074,784 B2 7/2015 Sullivan et al.
9,075,419 B2 7/2015 Sloo et al.
9,077,055 B2 7/2015 Yau
9,080,782 B1 7/2015 Sheikh
9,081,393 B2 7/2015 Lunacek et al.
9,086,703 B2 7/2015 Warren et al.
9,088,306 B1 7/2015 Ramachandran et al.
9,092,039 B2 7/2015 Fadell et al.
9,098,279 B2 8/2015 Mucignat et al.
9,113,156 B2 8/2015 Sugiyama et al.
9,116,529 B2 8/2015 Warren et al.
9,121,623 B2 9/2015 Filson et al.
9,122,283 B2 9/2015 Rylski et al.
9,125,049 B2 9/2015 Huang et al.
9,127,853 B2 9/2015 Filson et al.
9,131,904 B2 9/2015 Qualey et al.
9,134,710 B2 9/2015 Cheung et al.
9,134,715 B2 9/2015 Geadelmann et al.
9,146,041 B2 9/2015 Novotny et al.
9,151,510 B2 10/2015 Leen
9,154,001 B2 10/2015 Dharwada et al.
9,157,764 B2 10/2015 Shetty et al.
9,164,524 B2 10/2015 Imes et al.
9,175,868 B2 11/2015 Fadell et al.
9,175,871 B2 11/2015 Gourlay et al.
9,182,141 B2 11/2015 Sullivan et al.
9,189,751 B2 11/2015 Matsuoka et al.
9,191,277 B2 11/2015 Rezvani et al.
9,191,909 B2 11/2015 Rezvani et al.
9,194,597 B2 11/2015 Steinberg et al.
9,194,598 B2 11/2015 Fadell et al.
9,194,600 B2 11/2015 Kates
9,207,817 B2 12/2015 Tu
9,213,342 B2 12/2015 Drake et al.
9,215,281 B2 12/2015 Iggulden et al.
9,222,693 B2 12/2015 Gourlay et al.
9,223,323 B2 12/2015 Matas et al.
9,234,669 B2 1/2016 Filson et al.
9,244,445 B2 1/2016 Finch et al.
9,244,470 B2 1/2016 Steinberg
9,261,287 B2 2/2016 Warren et al.
9,268,344 B2 2/2016 Warren et al.
9,279,595 B2 3/2016 Mighdoll et al.
9,282,590 B2 3/2016 Donlan
9,285,134 B2 3/2016 Bray et al.
9,285,802 B2 3/2016 Arensmeier
9,286,781 B2 3/2016 Filson et al.
9,291,359 B2 3/2016 Fadell et al.
9,292,022 B2 3/2016 Ramachandran et al.
9,298,196 B2 3/2016 Matsuoka et al.
9,298,197 B2 3/2016 Matsuoka et al.
9,304,366 B2 4/2016 Kubo
D763,707 S 8/2016 Sinha et al.
9,453,340 B2 9/2016 Van Herpen et al.
9,618,185 B2 4/2017 Ricci et al.
D790,369 S 6/2017 Sinha et al.
9,951,968 B2 4/2018 Novotny et al.
10,001,790 B2 6/2018 Oh et al.
10,119,712 B2 11/2018 Grosshart et al.
2001/0015281 A1 8/2001 Schiedegger et al.
2003/0034897 A1 2/2003 Shamoon et al.
2003/0034898 A1 2/2003 Shamoon et al.
2003/0079387 A1 5/2003 Derose
2003/0136853 A1 7/2003 Morey
2003/0177012 A1 9/2003 Drennan
2004/0074978 A1 4/2004 Rosen
2004/0125940 A1 7/2004 Turcan et al.
2004/0249479 A1 12/2004 Shorrock
2004/0262410 A1 12/2004 Hull
2005/0012633 A1* 1/2005 Yoon .................. F21V 33/0076
340/693.5
2005/0040943 A1 2/2005 Winick
2005/0083168 A1 4/2005 Breitenbach
2005/0119794 A1 6/2005 Amundson et al.
2005/0156049 A1 7/2005 Van Ostrand et al.
2005/0194456 A1 9/2005 Tessier et al.
2005/0195757 A1 9/2005 Kidder et al.
2005/0219860 A1 10/2005 Schexnaider
2005/0270151 A1 12/2005 Winick
2005/0270735 A1 12/2005 Chen
2006/0038025 A1 2/2006 Lee
2006/0113398 A1 6/2006 Ashworth
2006/0192022 A1 8/2006 Barton et al.
2006/0226970 A1 10/2006 Saga et al.
2006/0260334 A1 11/2006 Carey et al.
2007/0013532 A1 1/2007 Ehlers
2007/0045431 A1 3/2007 Chapman et al.
2007/0050732 A1 3/2007 Chapman et al.
2007/0057079 A1 3/2007 Stark et al.
2007/0114295 A1 5/2007 Jenkins
2007/0121334 A1 5/2007 Bourdin et al.
2007/0138496 A1 6/2007 Zhao et al.
2007/0198099 A9 8/2007 Shah
2007/0228182 A1 10/2007 Wagner et al.
2007/0228183 A1 10/2007 Kennedy et al.
2007/0241203 A1 10/2007 Wagner et al.
2008/0048046 A1 2/2008 Wagner et al.
2008/0054084 A1 3/2008 Olson
2008/0099568 A1 5/2008 Nicodem et al.
2008/0120446 A1 5/2008 Butler et al.
2008/0161978 A1 7/2008 Shah
2008/0216495 A1 9/2008 Kates
2008/0223051 A1 9/2008 Kates
2008/0227430 A1 9/2008 Polk
2008/0280637 A1 11/2008 Shaffer et al.
2008/0289347 A1 11/2008 Kadle et al.
2008/0290183 A1 11/2008 Laberge et al.
2008/0294274 A1 11/2008 Laberge et al.
2008/0295030 A1 11/2008 Laberge et al.
2009/0140065 A1 6/2009 Juntunen et al.
2009/0143880 A1 6/2009 Amundson et al.
2009/0143918 A1 6/2009 Amundson et al.
2009/0144015 A1 6/2009 Bedard
2009/0251422 A1 10/2009 Wu et al.
2009/0276096 A1 11/2009 Proffitt et al.
2010/0070092 A1 3/2010 Winter et al.
2010/0084482 A1 4/2010 Kennedy et al.
2010/0131884 A1 5/2010 Shah
2010/0163633 A1 7/2010 Barrett et al.
2010/0163635 A1 7/2010 Ye
2010/0171889 A1 7/2010 Pantel et al.
2010/0182743 A1 7/2010 Roher
2010/0190479 A1 7/2010 Scott et al.
2010/0204834 A1 8/2010 Comerford et al.
2010/0212198 A1 8/2010 Matsunaga et al.
2010/0212879 A1 8/2010 Schnell et al.
2010/0250707 A1 9/2010 Dalley et al.
2010/0327766 A1 12/2010 Recker et al.
2011/0006887 A1 1/2011 Shaull et al.
2011/0067851 A1 3/2011 Terlson et al.
2011/0088416 A1 4/2011 Koethler
2011/0132991 A1 6/2011 Moody et al.
2011/0133655 A1 6/2011 Recker et al.
2011/0181412 A1 7/2011 Alexander et al.
2011/0225859 A1 9/2011 Safavi
2011/0254450 A1 10/2011 Bergholz et al.
2011/0264279 A1 10/2011 Poth
2012/0001837 A1 1/2012 Yamayoshi
2012/0001873 A1 1/2012 Wu et al.
2012/0007555 A1 1/2012 Bukow
2012/0007804 A1 1/2012 Morrison et al.
2012/0048955 A1 3/2012 Lin et al.
2012/0061480 A1 3/2012 Deligiannis et al.
2012/0093141 A1 4/2012 Imes et al.
2012/0095601 A1 4/2012 Abraham et al.
2012/0101637 A1 4/2012 Imes et al.
2012/0126020 A1 5/2012 Filson et al.
2012/0126021 A1 5/2012 Warren et al.
2012/0131504 A1 5/2012 Fadell et al.
2012/0165993 A1 6/2012 Whitehouse
2012/0179727 A1 7/2012 Esser
2012/0181010 A1 7/2012 Schultz et al.
2012/0191257 A1 7/2012 Corcoran et al.

(56) References Cited

U.S. PATENT DOCUMENTS

2012/0193437 A1 8/2012 Henry et al.
2012/0229521 A1 9/2012 Hales et al.
2012/0230661 A1 9/2012 Alhilo
2012/0239207 A1 9/2012 Fadell et al.
2012/0252430 A1 10/2012 Imes et al.
2012/0259470 A1 10/2012 Nijhawan et al.
2012/0298763 A1 11/2012 Young
2012/0303165 A1 11/2012 Qu et al.
2012/0303828 A1 11/2012 Young et al.
2012/0310418 A1 12/2012 Harrod et al.
2012/0315848 A1 12/2012 Smith et al.
2013/0002447 A1 1/2013 Vogel et al.
2013/0054758 A1 2/2013 Imes et al.
2013/0057381 A1 3/2013 Kandhasamy
2013/0087628 A1 4/2013 Nelson et al.
2013/0090767 A1 4/2013 Bruck et al.
2013/0099008 A1 4/2013 Aljabari et al.
2013/0099009 A1 4/2013 Filson et al.
2013/0123991 A1 5/2013 Richmond
2013/0138250 A1 5/2013 Mowery et al.
2013/0144443 A1 6/2013 Casson et al.
2013/0151016 A1 6/2013 Bias et al.
2013/0151018 A1 6/2013 Bias et al.
2013/0158721 A1 6/2013 Somasundaram et al.
2013/0163300 A1 6/2013 Zhao et al.
2013/0180700 A1 7/2013 Aycock
2013/0190932 A1 7/2013 Schuman
2013/0190940 A1 7/2013 Sloop et al.
2013/0204408 A1 8/2013 Thiruvengada et al.
2013/0204441 A1 8/2013 Sloo et al.
2013/0204442 A1 8/2013 Modi et al.
2013/0211600 A1 8/2013 Dean-Hendricks et al.
2013/0215058 A1 8/2013 Brazell et al.
2013/0221117 A1 8/2013 Warren et al.
2013/0228633 A1 9/2013 Toth et al.
2013/0234840 A1 9/2013 Trundle et al.
2013/0238142 A1 9/2013 Nichols et al.
2013/0245838 A1 9/2013 Zywicki et al.
2013/0261803 A1 10/2013 Kolavennu
2013/0261807 A1 10/2013 Zywicki et al.
2013/0268129 A1 10/2013 Fadell et al.
2013/0271670 A1 10/2013 Sakata et al.
2013/0292481 A1 11/2013 Filson et al.
2013/0297078 A1 11/2013 Kolavennu
2013/0318217 A1 11/2013 Imes et al.
2013/0318444 A1 11/2013 Imes et al.
2013/0325190 A1 12/2013 Imes et al.
2013/0338837 A1 12/2013 Hublou et al.
2013/0338839 A1 12/2013 Rogers et al.
2013/0340993 A1 12/2013 Siddaramanna et al.
2013/0345882 A1 12/2013 Dushane et al.
2014/0000861 A1 1/2014 Barrett et al.
2014/0002461 A1 1/2014 Wang
2014/0031989 A1 1/2014 Bergman et al.
2014/0034284 A1 2/2014 Butler et al.
2014/0039692 A1 2/2014 Leen et al.
2014/0041846 A1 2/2014 Leen et al.
2014/0048608 A1 2/2014 Frank
2014/0052300 A1 2/2014 Matsuoka et al.
2014/0058806 A1 2/2014 Guenette et al.
2014/0070919 A1 3/2014 Jackson et al.
2014/0081466 A1 3/2014 Huapeng et al.
2014/0112331 A1 4/2014 Rosen
2014/0114706 A1 4/2014 Blakely
2014/0117103 A1 5/2014 Rossi et al.
2014/0118285 A1 5/2014 Poplawski
2014/0129034 A1 5/2014 Stefanski et al.
2014/0149270 A1 5/2014 Lombard et al.
2014/0151456 A1 6/2014 McCurnin et al.
2014/0152631 A1 6/2014 Moore et al.
2014/0156087 A1 6/2014 Amundson
2014/0158338 A1 6/2014 Kates
2014/0165612 A1 6/2014 Qu et al.
2014/0175181 A1 6/2014 Warren et al.
2014/0188288 A1 7/2014 Fisher et al.
2014/0191848 A1 7/2014 Imes et al.
2014/0207291 A1 7/2014 Golden et al.
2014/0207292 A1 7/2014 Ramagem et al.
2014/0214212 A1 7/2014 Leen et al.
2014/0216078 A1 8/2014 Ladd
2014/0217185 A1 8/2014 Bicknell
2014/0217186 A1 8/2014 Kramer et al.
2014/0228983 A1 8/2014 Groskreutz et al.
2014/0231530 A1 8/2014 Warren et al.
2014/0244047 A1 8/2014 Oh et al.
2014/0250399 A1 9/2014 Gaherwar
2014/0262196 A1 9/2014 Frank et al.
2014/0262484 A1 9/2014 Khoury et al.
2014/0263679 A1 9/2014 Conner et al.
2014/0267008 A1 9/2014 Jain et al.
2014/0277762 A1 9/2014 Drew
2014/0277769 A1 9/2014 Matsuoka et al.
2014/0277770 A1 9/2014 Aljabari et al.
2014/0299670 A1 10/2014 Ramachandran et al.
2014/0309792 A1 10/2014 Drew
2014/0312129 A1 10/2014 Zikes et al.
2014/0312131 A1 10/2014 Tousignant et al.
2014/0312694 A1 10/2014 Tu et al.
2014/0316585 A1 10/2014 Boesveld et al.
2014/0316586 A1 10/2014 Boesveld et al.
2014/0316587 A1 10/2014 Imes et al.
2014/0317029 A1 10/2014 Matsuoka et al.
2014/0319231 A1 10/2014 Matsuoka et al.
2014/0319236 A1 10/2014 Novotny et al.
2014/0320282 A1 10/2014 Zhang
2014/0321011 A1 10/2014 Bisson et al.
2014/0324232 A1 10/2014 Modi et al.
2014/0330435 A1 11/2014 Stoner et al.
2014/0346239 A1 11/2014 Fadell et al.
2014/0358295 A1 12/2014 Warren et al.
2014/0367475 A1 12/2014 Fadell et al.
2014/0376530 A1 12/2014 Erickson et al.
2015/0001361 A1 1/2015 Gagne et al.
2015/0002165 A1 1/2015 Juntunen et al.
2015/0016443 A1 1/2015 Erickson et al.
2015/0025693 A1 1/2015 Wu et al.
2015/0039137 A1 2/2015 Perry et al.
2015/0041551 A1 2/2015 Tessier et al.
2015/0043615 A1 2/2015 Steinberg et al.
2015/0053779 A1 2/2015 Adamek et al.
2015/0053780 A1 2/2015 Nelson et al.
2015/0053781 A1 2/2015 Nelson et al.
2015/0058779 A1 2/2015 Bruck et al.
2015/0061859 A1 3/2015 Matsuoka et al.
2015/0066215 A1 3/2015 Buduri
2015/0066216 A1 3/2015 Ramachandran
2015/0066220 A1 3/2015 Sloo et al.
2015/0081106 A1 3/2015 Buduri
2015/0081109 A1 3/2015 Fadell et al.
2015/0081568 A1 3/2015 Land, III
2015/0088272 A1 3/2015 Drew
2015/0088318 A1 3/2015 Amundson et al.
2015/0096876 A1* 4/2015 Mittleman ............. G08B 17/00
200/341
2015/0100166 A1 4/2015 Baynes et al.
2015/0100167 A1 4/2015 Sloo et al.
2015/0115045 A1 4/2015 Tu et al.
2015/0115046 A1 4/2015 Warren et al.
2015/0124853 A1 5/2015 Huppi et al.
2015/0127176 A1 5/2015 Bergman et al.
2015/0140994 A1 5/2015 Partheesh et al.
2015/0142180 A1 5/2015 Matsuoka et al.
2015/0144706 A1 5/2015 Robideau et al.
2015/0145653 A1 5/2015 Katingari et al.
2015/0148963 A1 5/2015 Klein et al.
2015/0153057 A1 6/2015 Matsuoka et al.
2015/0153060 A1 6/2015 Stefanski et al.
2015/0156631 A1 6/2015 Ramachandran
2015/0159893 A1 6/2015 Daubman et al.
2015/0159899 A1 6/2015 Bergman et al.
2015/0159902 A1 6/2015 Quam et al.
2015/0159903 A1 6/2015 Marak et al.
2015/0159904 A1 6/2015 Barton
2015/0160691 A1 6/2015 Kadah et al.

(56) References Cited

U.S. PATENT DOCUMENTS

| | | | |
|---|---|---|---|
| 2015/0163945 | A1 | 6/2015 | Barton et al. |
| 2015/0167995 | A1 | 6/2015 | Fadell et al. |
| 2015/0168002 | A1 | 6/2015 | Plitkins et al. |
| 2015/0168003 | A1 | 6/2015 | Stefanski et al. |
| 2015/0168933 | A1 | 6/2015 | Klein et al. |
| 2015/0176854 | A1 | 6/2015 | Butler et al. |
| 2015/0176855 | A1 | 6/2015 | Geadelmann et al. |
| 2015/0198346 | A1 | 7/2015 | Vedpathak |
| 2015/0198347 | A1 | 7/2015 | Tessier et al. |
| 2015/0204558 | A1 | 7/2015 | Sartain et al. |
| 2015/0204561 | A1 | 7/2015 | Sadwick et al. |
| 2015/0204563 | A1 | 7/2015 | Imes et al. |
| 2015/0204564 | A1 | 7/2015 | Shah |
| 2015/0204565 | A1 | 7/2015 | Amundson et al. |
| 2015/0204569 | A1 | 7/2015 | Lorenz et al. |
| 2015/0204570 | A1 | 7/2015 | Adamik et al. |
| 2015/0205310 | A1 | 7/2015 | Amundson et al. |
| 2015/0219357 | A1 | 8/2015 | Stefanski et al. |
| 2015/0233594 | A1 | 8/2015 | Abe et al. |
| 2015/0233595 | A1 | 8/2015 | Fadell et al. |
| 2015/0233596 | A1 | 8/2015 | Warren et al. |
| 2015/0234369 | A1 | 8/2015 | Wen et al. |
| 2015/0241078 | A1 | 8/2015 | Matsuoka et al. |
| 2015/0245189 | A1 | 8/2015 | Nalluri et al. |
| 2015/0248118 | A1 | 9/2015 | Li et al. |
| 2015/0249605 | A1 | 9/2015 | Erickson et al. |
| 2015/0260424 | A1 | 9/2015 | Fadell et al. |
| 2015/0267935 | A1 | 9/2015 | Devenish et al. |
| 2015/0268652 | A1 | 9/2015 | Lunacek et al. |
| 2015/0276237 | A1 | 10/2015 | Daniels et al. |
| 2015/0276238 | A1 | 10/2015 | Matsuoka et al. |
| 2015/0276239 | A1 | 10/2015 | Fadell et al. |
| 2015/0276254 | A1 | 10/2015 | Nemcek et al. |
| 2015/0276266 | A1 | 10/2015 | Warren et al. |
| 2015/0277463 | A1 | 10/2015 | Hazzard et al. |
| 2015/0277492 | A1 | 10/2015 | Chau et al. |
| 2015/0280935 | A1 | 10/2015 | Poplawski et al. |
| 2015/0287310 | A1 | 10/2015 | Deiiuliis et al. |
| 2015/0292764 | A1 | 10/2015 | Land et al. |
| 2015/0292765 | A1 | 10/2015 | Matsuoka et al. |
| 2015/0293541 | A1 | 10/2015 | Fadell et al. |
| 2015/0300672 | A1 | 10/2015 | Fadell et al. |
| 2015/0312696 | A1 | 10/2015 | Ribbich et al. |
| 2015/0316285 | A1 | 11/2015 | Clifton et al. |
| 2015/0316286 | A1 | 11/2015 | Roher |
| 2015/0316902 | A1 | 11/2015 | Wenzel et al. |
| 2015/0323212 | A1 | 11/2015 | Warren et al. |
| 2015/0327010 | A1 | 11/2015 | Gottschalk et al. |
| 2015/0327084 | A1 | 11/2015 | Ramachandran et al. |
| 2015/0327375 | A1 | 11/2015 | Bick et al. |
| 2015/0330654 | A1 | 11/2015 | Matsuoka |
| 2015/0330658 | A1 | 11/2015 | Filson et al. |
| 2015/0330660 | A1 | 11/2015 | Filson et al. |
| 2015/0332150 | A1 | 11/2015 | Thompson |
| 2015/0338117 | A1 | 11/2015 | Henneberger et al. |
| 2015/0345818 | A1 | 12/2015 | Oh et al. |
| 2015/0348554 | A1 | 12/2015 | Orr et al. |
| 2015/0354844 | A1 | 12/2015 | Kates |
| 2015/0354846 | A1 | 12/2015 | Hales et al. |
| 2015/0355371 | A1 | 12/2015 | Ableitner et al. |
| 2015/0362208 | A1 | 12/2015 | Novotny et al. |
| 2015/0362926 | A1 | 12/2015 | Yarde et al. |
| 2015/0362927 | A1 | 12/2015 | Giorgi |
| 2015/0364135 | A1 | 12/2015 | Kolavennu et al. |
| 2015/0370270 | A1 | 12/2015 | Pan et al. |
| 2015/0370272 | A1 | 12/2015 | Reddy et al. |
| 2015/0370615 | A1 | 12/2015 | Pi-Sunyer |
| 2015/0370621 | A1 | 12/2015 | Karp et al. |
| 2015/0372832 | A1 | 12/2015 | Kortz et al. |
| 2015/0372834 | A1 | 12/2015 | Karp et al. |
| 2015/0372999 | A1 | 12/2015 | Pi-Sunyer |
| 2016/0006274 | A1 | 1/2016 | Tu et al. |
| 2016/0006577 | A1 | 1/2016 | Logan |
| 2016/0010880 | A1 | 1/2016 | Bravard et al. |
| 2016/0018122 | A1 | 1/2016 | Frank et al. |
| 2016/0018127 | A1 | 1/2016 | Gourlay et al. |
| 2016/0020590 | A1 | 1/2016 | Roosli et al. |
| 2016/0026194 | A1 | 1/2016 | Mucignat et al. |
| 2016/0036227 | A1 | 2/2016 | Schultz et al. |
| 2016/0040903 | A1 | 2/2016 | Emmons et al. |
| 2016/0047569 | A1 | 2/2016 | Fadell et al. |
| 2016/0054022 | A1 | 2/2016 | Matas et al. |
| 2016/0054792 | A1 | 2/2016 | Poupyrev |
| 2016/0054988 | A1 | 2/2016 | Desire |
| 2016/0061471 | A1 | 3/2016 | Eicher et al. |
| 2016/0061474 | A1 | 3/2016 | Cheung et al. |
| 2016/0069582 | A1 | 3/2016 | Buduri |
| 2016/0069583 | A1 | 3/2016 | Fadell et al. |
| 2016/0077532 | A1 | 3/2016 | Lagerstedt et al. |
| 2016/0088041 | A1 | 3/2016 | Nichols |
| 2016/0107820 | A1 | 4/2016 | Macvittie et al. |
| 2016/0171289 | A1 | 6/2016 | Lee et al. |
| 2016/0327298 | A1 | 11/2016 | Sinha et al. |
| 2016/0327299 | A1 | 11/2016 | Ribbich et al. |
| 2016/0327300 | A1 | 11/2016 | Ribbich et al. |
| 2016/0327301 | A1 | 11/2016 | Ribbich et al. |
| 2016/0327302 | A1 | 11/2016 | Ribbich et al. |
| 2016/0327921 | A1 | 11/2016 | Ribbich et al. |
| 2016/0365885 | A1* | 12/2016 | Honjo ...................... H04B 1/38 |
| 2016/0377306 | A1 | 12/2016 | Drees et al. |
| 2017/0074536 | A1 | 3/2017 | Bentz et al. |
| 2017/0074537 | A1 | 3/2017 | Bentz et al. |
| 2017/0074539 | A1 | 3/2017 | Bentz et al. |
| 2017/0074541 | A1 | 3/2017 | Bentz et al. |
| 2017/0075510 | A1 | 3/2017 | Bentz et al. |
| 2017/0075568 | A1 | 3/2017 | Bentz et al. |
| 2017/0076263 | A1 | 3/2017 | Bentz et al. |
| 2017/0102162 | A1 | 4/2017 | Drees et al. |
| 2017/0102433 | A1 | 4/2017 | Wenzel et al. |
| 2017/0102434 | A1 | 4/2017 | Wenzel et al. |
| 2017/0102675 | A1 | 4/2017 | Drees |
| 2017/0103483 | A1 | 4/2017 | Drees et al. |
| 2017/0104332 | A1 | 4/2017 | Wenzel et al. |
| 2017/0104336 | A1 | 4/2017 | Elbsat et al. |
| 2017/0104337 | A1 | 4/2017 | Drees |
| 2017/0104342 | A1 | 4/2017 | Elbsat et al. |
| 2017/0104343 | A1 | 4/2017 | Elbsat et al. |
| 2017/0104344 | A1 | 4/2017 | Wenzel et al. |
| 2017/0104345 | A1 | 4/2017 | Wenzel et al. |
| 2017/0104346 | A1 | 4/2017 | Wenzel et al. |
| 2017/0104449 | A1 | 4/2017 | Drees |
| 2017/0122613 | A1 | 5/2017 | Sinha et al. |
| 2017/0122617 | A1 | 5/2017 | Sinha et al. |
| 2017/0123391 | A1 | 5/2017 | Sinha et al. |
| 2017/0124838 | A1 | 5/2017 | Sinha et al. |
| 2017/0124842 | A1 | 5/2017 | Sinha et al. |
| 2017/0131825 | A1 | 5/2017 | Moore et al. |
| 2017/0295058 | A1 | 10/2017 | Gottschalk et al. |
| 2017/0357607 | A1 | 12/2017 | Cayemberg et al. |

FOREIGN PATENT DOCUMENTS

| | | | |
|---|---|---|---|
| CA | 2633121 | C | 8/2011 |
| CA | 2818356 | | 5/2012 |
| CA | 2818696 | A1 | 5/2012 |
| CA | 2853041 | | 4/2013 |
| CA | 2853081 | A1 | 4/2013 |
| CA | 2812567 | | 5/2014 |
| CA | 2886531 | A1 | 9/2015 |
| CA | 2894359 | A1 | 12/2015 |
| CN | 1784701 | A | 6/2006 |
| CN | 101695126 | A | 4/2010 |
| CN | 102088474 | A | 6/2011 |
| CN | 102739478 | A | 10/2012 |
| CN | 102763436 | A | 10/2012 |
| CN | 103312583 | A | 9/2013 |
| CN | 103536399 | A | 1/2014 |
| CN | 104036699 | A | 9/2014 |
| CN | 104510460 | A | 4/2015 |
| CN | 104656530 | A | 5/2015 |
| CN | 204394473 | U | 6/2015 |
| CN | 204410794 | U | 6/2015 |
| CN | 104767802 | A | 7/2015 |
| CN | 204883329 | U | 12/2015 |

(56) References Cited

FOREIGN PATENT DOCUMENTS

| | | | |
|---|---|---|---|
| DE | 10 2004 005 962 | A1 | 8/2005 |
| EP | 2 283 279 | A2 | 2/2011 |
| EP | 2 738 478 | A2 | 6/2014 |
| EP | 2 897 018 | A1 | 7/2015 |
| EP | 2 988 188 | A2 | 2/2016 |
| GB | 2 519 441 | A | 4/2015 |
| WO | WO-00/22491 | A1 | 4/2000 |
| WO | WO-2006/041599 | A9 | 7/2006 |
| WO | WO-2009/006133 | A1 | 1/2009 |
| WO | WO-2009/036764 | A3 | 3/2009 |
| WO | WO-2009/058127 | A1 | 5/2009 |
| WO | WO-2010/059143 | A1 | 5/2010 |
| WO | WO-201 0/078459 | A1 | 7/2010 |
| WO | WO-2010/088663 | A1 | 8/2010 |
| WO | WO-2012/042232 | A3 | 4/2012 |
| WO | WO-2012/068436 | A1 | 5/2012 |
| WO | WO-2012/068437 | A3 | 5/2012 |
| WO | WO-2012/068459 | A3 | 5/2012 |
| WO | WO-2012/068495 | A1 | 5/2012 |
| WO | WO-2012/068503 | A1 | 5/2012 |
| WO | WO-2012/068507 | A3 | 5/2012 |
| WO | WO-2012/068517 | A1 | 5/2012 |
| WO | WO-2012/068526 | A1 | 5/2012 |
| WO | WO-2012/142477 | A3 | 10/2012 |
| WO | WO-2013/033469 | A1 | 3/2013 |
| WO | WO-2013/052389 | A1 | 4/2013 |
| WO | WO-2013/052901 | A3 | 4/2013 |
| WO | WO-2013/052905 | A1 | 4/2013 |
| WO | WO-2013/058932 | | 4/2013 |
| WO | WO-2013/058933 | A1 | 4/2013 |
| WO | WO-2013/058934 | | 4/2013 |
| WO | WO-2013/058968 | A1 | 4/2013 |
| WO | WO-2013/058969 | A1 | 4/2013 |
| WO | WO-2013/059684 | A1 | 4/2013 |
| WO | WO-2013/153480 | A3 | 10/2013 |
| WO | WO-2014/047501 | A1 | 3/2014 |
| WO | WO-2014/051632 | A1 | 4/2014 |
| WO | WO-2014/051635 | A1 | 4/2014 |
| WO | WO-2014/055059 | A1 | 4/2014 |
| WO | WO-2014/152301 | A2 | 9/2014 |
| WO | WO-2014/152301 | A3 | 9/2014 |
| WO | WO-2015/012449 | A1 | 1/2015 |
| WO | WO-2015/039178 | A1 | 3/2015 |
| WO | WO-2015/054272 | A2 | 4/2015 |
| WO | WO-2015/057698 | A1 | 4/2015 |
| WO | WO-2015/099721 | A1 | 7/2015 |
| WO | WO-2015/127499 | A1 | 9/2015 |
| WO | WO-2015/127566 | A1 | 9/2015 |
| WO | WO-2015/134755 | A3 | 9/2015 |
| WO | WO-2015/195772 | A1 | 12/2015 |
| WO | WO-2016/038374 | A1 | 3/2016 |

OTHER PUBLICATIONS

U.S. Appl. No. 15/143,373, filed Apr. 29, 2016, Johnson Controls Technology Company.
U.S. Appl. No. 15/143,134, filed May 4, 2016, Johnson Controls Technology Company.
U.S. Appl. No. 15/146,202, filed May 4, 2016, Johnson Controls Technology Company.
U.S. Appl. No. 15/146,649, filed May 4, 2016, Johnson Controls Technology Company.
U.S. Appl. No. 15/146,749, filed May 4, 2016, Johnson Controls Technology Company.
U.S. Appl. No. 15/146,763, filed May 4, 2016, Johnson Controls Technology Company.
U.S. Appl. No. 15/179,894, filed Jun. 10, 2016, Johnson Controls Technology Company.
U.S. Appl. No. 15/207,431, filed Jul. 11, 2016, Johnson Controls Technology Company.
U.S. Appl. No. 15/247,777, filed Aug. 25, 2016, Johnson Controls Technology Company.
U.S. Appl. No. 15/247,784, filed Aug. 25, 2016, Johnson Controls Technology Company.
U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls Technology Company.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, filed Aug. 25, 2016, Johnson Controls Technology Company.
U.S. Appl. No. 15/247,881, filed Aug. 25, 2016, Johnson Controls Technology Company.
U.S. Appl. No. 15/247,883, filed Aug. 25, 2016, Johnson Controls Technology Company.
U.S. Appl. No. 15/247,885, filed Aug. 25, 2016, Johnson Controls Technology Company.
U.S. Appl. No. 15/247,886, filed Aug. 25, 2016, Johnson Controls Technology Company.
U.S. Appl. No. 15/260,293, filed Sep. 8, 2016, Johnson Controls Technology Company.
U.S. Appl. No. 15/260,295, filed Sep. 8, 2016, Johnson Controls Technology Company.
U.S. Appl. No. 15/260,297, filed Sep. 8, 2016, Johnson Controls Technology Company.
U.S. Appl. No. 15/260,299, filed Sep. 8, 2016, Johnson Controls Technology Company.
U.S. Appl. No. 15/260,301, filed Sep. 8, 2016, Johnson Controls Technology Company.
U.S. Appl. No. 15/336,789, filed Oct. 28, 2016, Johnson Controls Technology Company.
U.S. Appl. No. 15/336,791, filed Oct. 28, 2016, Johnson Controls Technology Company.
U.S. Appl. No. 15/336,792, filed Oct. 28, 2016, Johnson Controls Technology Company.
U.S. Appl. No. 15/336,793, filed Oct. 28, 2016, Johnson Controls Technology Company.
U.S. Appl. No. 15/338,215, filed Oct. 28, 2016, Johnson Controls Technology Company.
U.S. Appl. No. 15/338,221, filed Oct. 28, 2016, Johnson Controls Technology Company.
U.S. Appl. No. 15/397,722, filed Jan. 3, 2017, Johnson Controls Technology Company.
U.S. Appl. No. 29/525,907, filed May 4, 2015, Johnson Controls Technology Company.
U.S. Appl. No. 29/548,334, filed Dec. 11, 2015, Johnson Controls Technology Company.
U.S. Appl. No. 29/563,447, filed May 4, 2016, Johnson Controls Technology Company.
U.S. Appl. No. 29/576,515, filed Sep. 2, 2016, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Program.
U.S. Appl. No. 62/239,245, filed Oct. 8, 2015, Johnson Controls Technology Program.
U.S. Appl. No. 62/239,246, filed Oct. 8, 2015, Johnson Controls Technology Program.
U.S. Appl. No. 62/239,249, filed Oct. 8, 2015, Johnson Controls Technology Program.

(56) References Cited

OTHER PUBLICATIONS

International Search Report and Written Opinion for Application No. PCT/US2016/030291, dated Sep. 7, 2016, 11 pages.
International Search Report and Written Opinion for Application No. PCT/US2016/030827, dated Sep. 7, 2016, 13 pages.
International Search Report and Written Opinion for Application No. PCT/US2016/030829, dated Sep. 7, 2016, 15 pages.
International Search Report and Written Opinion for Application No. PCT/US2016/030835, dated Sep. 7, 2016, 13 pages.
International Search Report and Written Opinion for Application No. PCT/US2016/030836, dated Sep. 7, 2016, 11 pages.
International Search Report and Written Opinion for Application No. PCT/US2016/030837, dated Sep. 7, 2016, 13 pages.
International Search Report and Written Opinion for Application No. PCT/US2016/051176, dated Feb. 16, 2017, 20 pages.
International Search Report and Written Opinion for Application No. PCT/US2017/012218, dated Mar. 31, 2017, 14 pages.
International Search Report and Written Opinion for Application No. PCT/US2017/012221, dated Mar. 31, 2017, 13 pages.
International Search Report and Written Opinion for Application No. PCT/US2017/030890, dated Jun. 21, 2017, 13 pages.
International Search Report and Written Opinion for Application PCT/US2017/012217, dated Mar. 31, 2017, 14 pages.
Office Action on CN 201780005745.9, dated Dec. 4, 2019, 24 pages with English translation.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
Written Opinion for Singapore Application No. 11201708996V, dated Dec. 27, 2017, 6 pages.
Written Opinion for Singapore Application No. 11201708997W, dated Jan. 10, 2018, 9 pages.
Written Opinion for Singapore Application No. 11201709002Y, dated Feb. 7, 2018, 5 pages.
Johnson Controls Technology Company's Complaint for Patent Infringement. Case 1:20-cv-03692-LMM. United States District Court for the Northern District of Georgia, filed Sep. 9, 2020. 23 pages.
Office Action on CN 201780005745.9, dated Aug. 25, 2020, 8 pages with English language translation.
Exhibit 10—Defendants' Invalidity Contentions for U.S. Pat. No. 9,824,549, 12 pages.
First Office Action on CN 202010698781.1, dated Mar. 12, 2021, 14 pages.
Office Action on CN 201780005745.9, dated Mar. 2, 2021, 6 pages.

* cited by examiner

1412

| | Preferred Setpoint (1420) | Music (1422) | Lighting (1424) | Shades/ Blinds (1426) |
|---|---|---|---|---|
| Occupant A (1414) | 78 F | No Music | No Permission | Use Natural Light |
| Occupant B (1416) | 75 F | Radio Station AM 1130 | Dim | No Permission |
| Occupant C (1418) | No Permission | No Permission | Full Brightness | No Permission |

FIG. 14B

THERMOSTAT WITH AREA LIGHT SYSTEM AND OCCUPANCY SENSOR

CROSS-REFERENCE TO RELATED PATENT APPLICATIONS

This application is a continuation-in-part of U.S. patent application Ser. No. 16/030,422, filed Jul. 9, 2018, which is a continuation-in-part of U.S. patent application Ser. No. 15/338,215, filed Oct. 28, 2016, now U.S. Pat. No. 10,020, 956, granted Jul. 10, 2018. U.S. patent application Ser. No. 16/030,422 is also a continuation-in-part of U.S. patent application Ser. No. 15/338,221 filed Oct. 28, 2016, now U.S. Pat. No. 10,187,471, granted Jan. 22, 2019. U.S. patent application Ser. No. 16/030,422 is also a continuation-in-part of U.S. patent application Ser. No. 15/336,789, filed Oct. 28, 2016, now U.S. Pat. No. 10,345,781, granted Jul. 9, 2019, which claims the benefit of and priority to U.S. Provisional Patent Application No. 62/247,672, filed Oct. 28, 2015, U.S. Provisional Application No. 62/274,750, filed Jan. 4, 2016, U.S. Provisional Application No. 62/275,199, filed Jan. 5, 2016, U.S. Provisional Application No. 62/275, 202, filed Jan. 5, 2016, U.S. Provisional Application No. 62/275,204, filed Jan. 5, 2016, and U.S. Provisional Application No. 62/275,711, filed Jan. 6, 2016. U.S. patent application Ser. No. 16/030,422 is also a continuation-in-part of U.S. patent application Ser. No. 15/397,722, filed Jan. 3, 2017, which is a continuation-in-part of U.S. patent application Ser. No. 15/336,791, filed Oct. 28, 2016, now U.S. Pat. No. 10,162,327, granted Dec. 25, 2018, which claims the benefit of and priority to U.S. Provisional Patent Application No. 62/247,672, filed Oct. 28, 2015, U.S. Provisional Application No. 62/274,750, filed Jan. 4, 2016, U.S. Provisional Application No. 62/275,199, filed Jan. 5, 2016, U.S. Provisional Application No. 62/275,202, filed Jan. 5, 2016, U.S. Provisional Application No. 62/275,204, filed Jan. 5, 2016, and U.S. Provisional Application No. 62/275, 711, filed Jan. 6, 2016. U.S. patent application Ser. No. 16/030,422 is also a continuation-in-part of U.S. patent application Ser. No. 15/336,792, filed Oct. 28, 2016, now U.S. Pat. No. 10,180,673, granted Jan. 15, 2019, which claims the benefit of and priority to U.S. Provisional Patent Application No. 62/247,672, filed Oct. 28, 2015, U.S. Provisional Application No. 62/274,750, filed Jan. 4, 2016, U.S. Provisional Application No. 62/275,199, filed Jan. 5, 2016, U.S. Provisional Application No. 62/275,202, filed Jan. 5, 2016, U.S. Provisional Application No. 62/275,204, filed Jan. 5, 2016, and U.S. Provisional Application No. 62/275, 711, filed Jan. 6, 2016. This application is also a continuation-in-part of U.S. patent application Ser. No. 16/246,366, filed Jan. 11, 2019, which claims the benefit of and priority to U.S. Provisional Application No. 62/783,580, filed Dec. 21, 2018. U.S. patent application Ser. No. 16/246,366 is also a continuation-in-part of U.S. patent application Ser. No. 15/338,221, filed Oct. 28, 2016, now U.S. Pat. No. 10,187, 471, granted Jan. 22, 2019. U.S. patent application Ser. No. 16/246,366 is also a continuation-in-part of U.S. patent application Ser. No. 15/397,722, filed Jan. 3, 2017, which claims the benefit of and priority to U.S. Provisional Application No. 62/274,750, filed Jan. 4, 2016, U.S. Provisional Application No. 62/275,199, filed Jan. 5, 2016, U.S. Provisional Application No. 62/275,202, filed Jan. 5, 2016, U.S. Provisional Application No. 62/275,204, filed Jan. 5, 2016, and U.S. Provisional Application No. 62/275,711, filed Jan. 6, 2016. U.S. patent application Ser. No. 15/397,722 is also a continuation-in-part of U.S. patent application Ser. No. 15/336,791, filed Oct. 28, 2016, now U.S. Pat. No. 10,162, 327, granted Dec. 25, 2018, which claims the benefit of and priority to U.S. Provisional Patent Application No. 62/247, 672, filed Oct. 28, 2015, U.S. Provisional Application No. 62/274,750, filed Jan. 4, 2016, U.S. Provisional Application No. 62/275,199, filed Jan. 5, 2016, U.S. Provisional Application No. 62/275,202, filed Jan. 5, 2016, U.S. Provisional Application No. 62/275,204, filed Jan. 5, 2016, and U.S. Provisional Application No. 62/275,711, filed Jan. 6, 2016. U.S. patent application Ser. No. 16/246,366 is also a continuation-in-part of U.S. patent application Ser. No. 15/336, 789, filed Oct. 28, 2016, now U.S. Pat. No. 10,345,781, granted Jul. 9, 2019, which claims the benefit of and priority to U.S. Provisional Patent Application No. 62/247,672, filed Oct. 28, 2015, U.S. Provisional Application No. 62/274,750, filed Jan. 4, 2016, U.S. Provisional Application No. 62/275, 199, filed Jan. 5, 2016, U.S. Provisional Application No. 62/275,202, filed Jan. 5, 2016, U.S. Provisional Application No. 62/275,204, filed Jan. 5, 2016, and U.S. Provisional Application No. 62/275,711, filed Jan. 6, 2016. U.S. patent application Ser. No. 16/246,366 is also a continuation-in-part of U.S. patent application Ser. No. 15/336,792, filed Oct. 28, 2016, now U.S. Pat. No. 10,180,673, granted Jan. 15, 2019, which claims the benefit of and priority to U.S. Provisional Patent Application No. 62/247,672, filed Oct. 28, 2015, U.S. Provisional Application No. 62/274,750, filed Jan. 4, 2016, U.S. Provisional Application No. 62/275,199, filed Jan. 5, 2016, U.S. Provisional Application No. 62/275, 202, filed Jan. 5, 2016, U.S. Provisional Application No. 62/275,204, filed Jan. 5, 2016, and U.S. Provisional Application No. 62/275,711, filed Jan. 6, 2016. U.S. patent application Ser. No. 16/246,366 is also a continuation-in-part of U.S. patent application Ser. No. 15/336,793, filed Oct. 28, 2016, now U.S. Pat. No. 10,310,477, granted Jun. 4, 2019, which claims the benefit of and priority to U.S. Provisional Patent Application No. 62/247,672, filed Oct. 28, 2015, U.S. Provisional Application No. 62/274,750, filed Jan. 4, 2016, U.S. Provisional Application No. 62/275,199, filed Jan. 5, 2016, U.S. Provisional Application No. 62/275, 202, filed Jan. 5, 2016, U.S. Provisional Application No. 62/275,204, filed Jan. 5, 2016, and U.S. Provisional Application No. 62/275,711, filed Jan. 6, 2016. U.S. patent application Ser. No. 16/246,366 is also a continuation-in-part of U.S. patent application Ser. No. 16/030,422, filed Jul. 9, 2018, which is a continuation-in-part of U.S. patent application Ser. No. 15/336,789, filed Oct. 28, 2016, now U.S. Pat. No. 10,345,781, granted Jul. 9, 2019, U.S. patent application Ser. No. 15/336,792, filed Oct. 28, 2016, now U.S. Pat. No. 10,180,673, granted Jan. 15, 2019, U.S. patent application Ser. No. 15/338,215, filed Oct. 28, 2016, now U.S. Pat. No. 10,020,956, granted Jul. 10, 2018, U.S. patent application Ser. No. 15/338,221, filed Oct. 28, 2016, now U.S. Pat. No. 10,187,471, granted Jan. 22, 2019, and U.S. patent application Ser. No. 15/397,722, filed Jan. 3, 2017. The disclosures of each of these applications are hereby incorporated by reference in their entirety.

BACKGROUND

The present invention relates generally to thermostats and more particularly to the improved control of a building or space's heating, ventilating, and air conditioning (HVAC) system through the use of a multi-function thermostat.

A thermostat is, in general, a component of an HVAC control system. Traditional thermostats sense the temperature of a system and control components of the HVAC in order to maintain a setpoint. A thermostat may be designed to control a heating or cooling system or an air conditioner.

Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes a display for presenting information to a user and one or more user interface elements for receiving input from a user. To control the temperature of a building or space, a user adjusts the setpoint via the thermostat's user interface.

SUMMARY

One implementation of the present disclosure is a thermostat for a building. The thermostat includes a halo light emitting diode (LED) system including one or more LEDs configured to emit light and a halo diffuser structured around at least a portion of an outer edge of the thermostat. The halo diffuser is configured to diffuse the emitted light of the one or more LEDs around at least the portion of the outer edge of the thermostat. The thermostat includes a processing circuit configured to receive one or more data streams, determine whether the one or more data streams indicate a building emergency condition, and operate the one or more LEDs of the halo LED system to indicate the building emergency condition to a user.

In some embodiments, the processing circuit is configured to determine a thermostat condition that requires user input and operate the one or more LEDs of the halo LED system to indicate the thermostat condition to the user.

In some embodiments, the halo LED system further includes one or more waveguides, each of the one or more waveguides is associated with one of the one or more LEDs of the halo LED system. In some embodiments, each of the one or more waveguides is configured to transmit the light emitted from one of the one or more LEDs to the halo diffuser. In some embodiments, each of the one or more waveguides is coupled to the halo diffuser at a first end of the one or more waveguides and is proximate one of the one or more LEDs at a second end of the one or more waveguides.

In some embodiments, the thermostat includes an enclosure including a front portion and a back portion. In some embodiments, the halo diffuser is coupled to the front portion and the back portion and is located between the front portion and the back portion.

In some embodiments, the processing circuit is configured to operate the one or more LEDs of the halo LED system to indicate the emergency condition to the user by operating the one or more LEDs in a pattern to indicate one or more emergency response directions to the user prompting the user to perform a user response to the emergency condition.

In some embodiments, operating the one or more LEDs in the pattern to indicate the one or more emergency response directions comprises activating the one or more LEDs sequentially to indicate an emergency navigation direction.

In some embodiments, the thermostat includes a display screen. In some embodiments, the processing circuit is configured to operate the display screen to display one or more emergency response directions in response to a determination that the one or more data streams indicate the emergency condition.

In some embodiments, the one or more data streams include a building data stream generated by a building management system and a weather data stream generated by a weather server. In some embodiments, the thermostat includes a communication interface configured to receive the building data stream from the building management system via a network and the weather data stream from the weather server via the network. In some embodiments, the processing circuit is configured to cause the display screen to display non-emergency information based on the building data stream, determine whether the weather data stream indicates an emergency weather condition, and override the display of the non-emergency information by causing the display screen to indicate the one or more emergency response directions in response to a determination that the weather data stream indicates the emergency weather condition.

In some embodiments, the one or more emergency response directions include a building map and one or more evacuation directions, wherein the one or more evacuation directions include at least one of one or more directions to a building exit or one or more directions to an emergency shelter in the building. In some embodiments, causing the display screen to display the one or more emergency response directions includes causing the display screen to display the building map and the one or more evacuation directions.

In some embodiments, the one or more emergency response directions include an arrow indicating a route through the building for the user to follow. In some embodiments, causing the display screen to display the one or more emergency response directions includes causing the display screen to display the arrow.

In some embodiments, the arrow includes a first portion and an arrow border surrounding the first portion. In some embodiments, the first portion is a first color and the arrow border is a second color different than the first color.

Another implementation of the present disclosure is a display device for a building. The display device includes a halo light emitting diode (LED) system including one or more LEDs configured to emit light, a halo diffuser structured around at least a portion of an outer edge of the thermostat, wherein the halo diffuser is configured to diffuse the emitted light of the one or more LEDs around at least the portion of the outer edge of the thermostat, and one or more waveguides, wherein each of the one or more waveguides is configured to transmit light from one of the one or more LEDs to the halo diffuser. The display device includes a processing circuit configured to operate the one or more LEDs of the halo LED system to indicate a building emergency condition to a user.

In some embodiments, the processing circuit is configured to receive one or more data streams, determine whether the one or more data streams indicate the building emergency condition, and operate the one or more LEDs of the halo LED system to indicate the building emergency condition to the user.

In some embodiments, the processing circuit is configured to determine a display device condition that requires user input and operate the one or more LEDs of the halo LED system to indicate the display device condition to the user.

In some embodiments, each of the one or more waveguides are coupled to the halo diffuser at a first end of the one or more waveguides and is proximate to one of the one or more LEDs at a second end of the one or more waveguides.

In some embodiments, the display device includes an enclosure including a front portion and a back portion. In some embodiments, the halo diffuser is coupled to the front portion and the back portion and is located between the front portion and the back portion.

In some embodiments, the processing circuit is configured to operate the one or more LEDs of the halo LED system to indicate the emergency condition to the user by operating the one or more LEDs in a pattern to indicate one or more emergency response directions to the user prompting the user to perform a user response to the emergency condition.

In some embodiments, operating the one or more LEDs in the pattern to indicate the one or more emergency response directions comprises activating the one or more LEDs sequentially to indicate an emergency navigation direction.

Another implementation of the present disclosure is a controller for a building. The controller includes a halo light system including one or more lighting components configured to emit light and a halo diffuser structured around at least a portion of an outer edge of the controller, wherein the halo diffuser is configured to diffuse the emitted light of the one or more lighting components around at least the portion of the outer edge of the controller. The controller includes a display device configured to display information to a user. The controller includes a processing circuit configured to receive one or more data streams, determine whether at least one of the one or more data streams indicate a building emergency condition, operate the one or more lighting components of the halo light system to indicate the building emergency condition to the user, and operate the display device to display the building emergency condition to the user.

In some embodiments, a halo LED system further comprises one or more waveguides, wherein each of the one or more waveguides is associated with one of one or more LEDs of the halo LED system, wherein each of the one or more waveguides is configured to transmit light from one of the one or more LEDs to the halo diffuser, wherein each of the one or more waveguides is coupled to the halo diffuser at a first end of the one or more waveguides and is proximate to one of the one or more LEDs at a second end of the one or more waveguides.

Another implementation of the present disclosure is a thermostat for a building with an area light system and an occupancy sensor. The thermostat includes one or more LEDs configured to emit light in a direction toward a floor area beneath the thermostat. The thermostat is configured with a processing circuit configured to cause the one or more LEDs to emit the light towards the floor in response to an indication using data from an occupancy sensor that a user has approached the thermostat.

In some embodiments, the processing circuit of the occupancy sensor of the thermostat for a building with an area light system comprises one of more of a processor module, a memory module, an LED module, an occupancy sensor module, an occupancy sensor, an input interface, and output interface.

In some embodiments, the thermostat for a building with an area light system and occupancy sensor further comprises an area light system including a halo light system including one or more lighting components configured to emit light in an area in proximity to the thermostat and in a direction toward a floor area beneath the thermostat and a halo diffuser structured around at least a portion of an outer edge of the thermostat, wherein the halo diffuser is configured to diffuse the emitted light of the one or more lighting components around at least the portion of the outer edge of the thermostat

BRIEF DESCRIPTION OF THE DRAWINGS

FIG. 14B is a table of occupant permissions and preferences for the control device of FIG. 7, according to an exemplary embodiment.

DETAILED DESCRIPTION

Overview

Referring generally to the FIGURES, a user control device is shown, according to various exemplary embodiments. The thermostat described herein may be used in any HVAC system, room, environment, or system within which it is desired to control and/or observe environmental conditions (e.g., temperature, humidity, etc.). In traditional HVAC systems, a thermostat may be adjusted by a user to control the temperature of a system.

The user control device is intended to provide the user with an ability to function as a connected smart hub. The thermostat provides a desirable user interface for other environmental controls because of its known fixed location within a space. The user control device is intended to be more personal, more efficient, and more aware than traditional thermostats.

The user control device collects data about a space and the occupants of the space with various sensors (e.g., temperature sensors, humidity sensors, acoustic sensors, optical sensors, gas and other chemical sensors, biometric sensors, motion sensors, etc.) and user inputs. The user control device may utilize data collected from a single room, multiple rooms, an entire building, or multiple buildings. The data may be analyzed locally by the user control device or may be uploaded to a remote computing system and/or the cloud for further analysis and processing.

Building Management System and HVAC System

Figure 1:
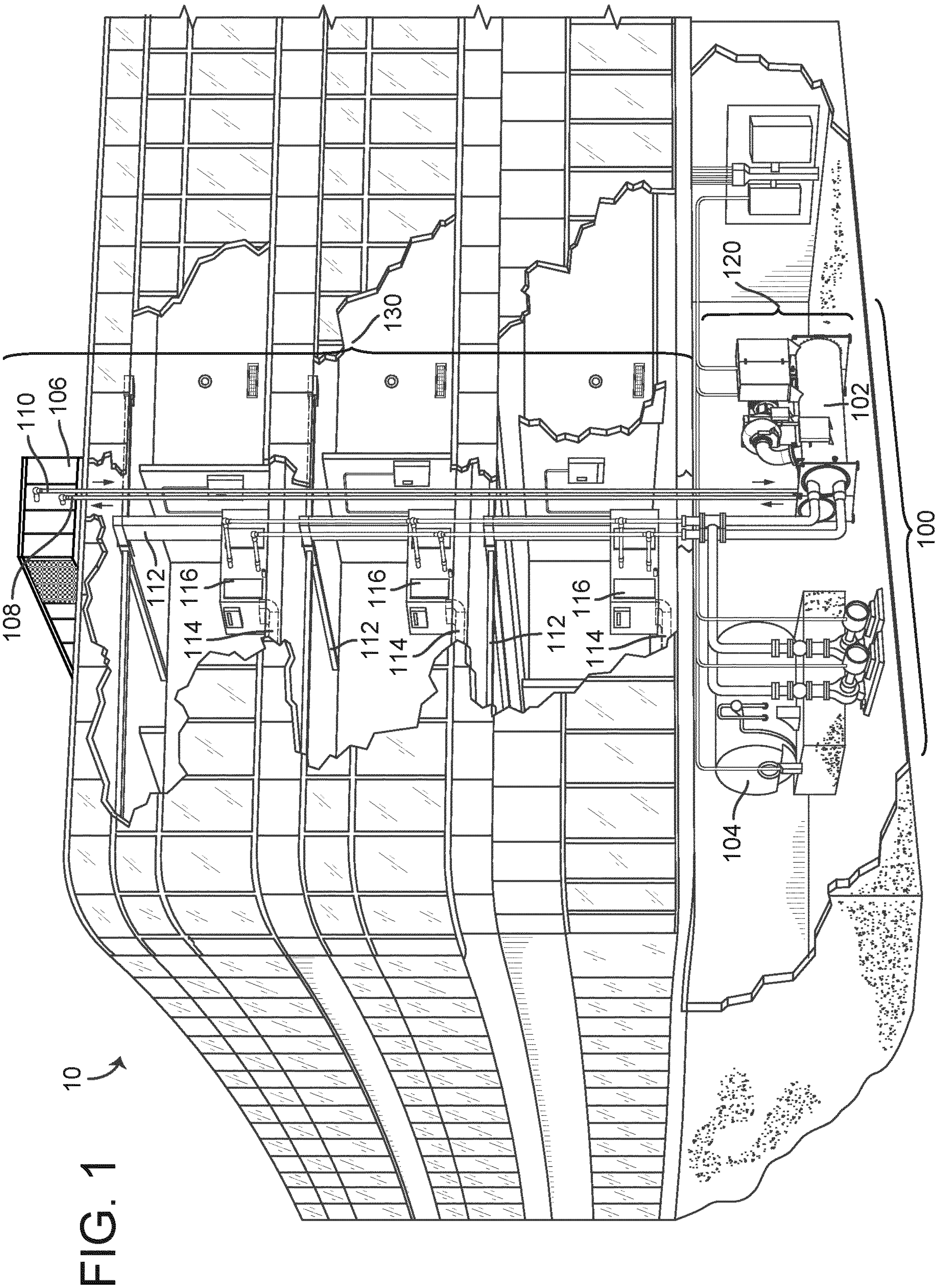
FIG. 1 is a drawing of a building equipped with a HVAC system, according to an exemplary embodiment.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
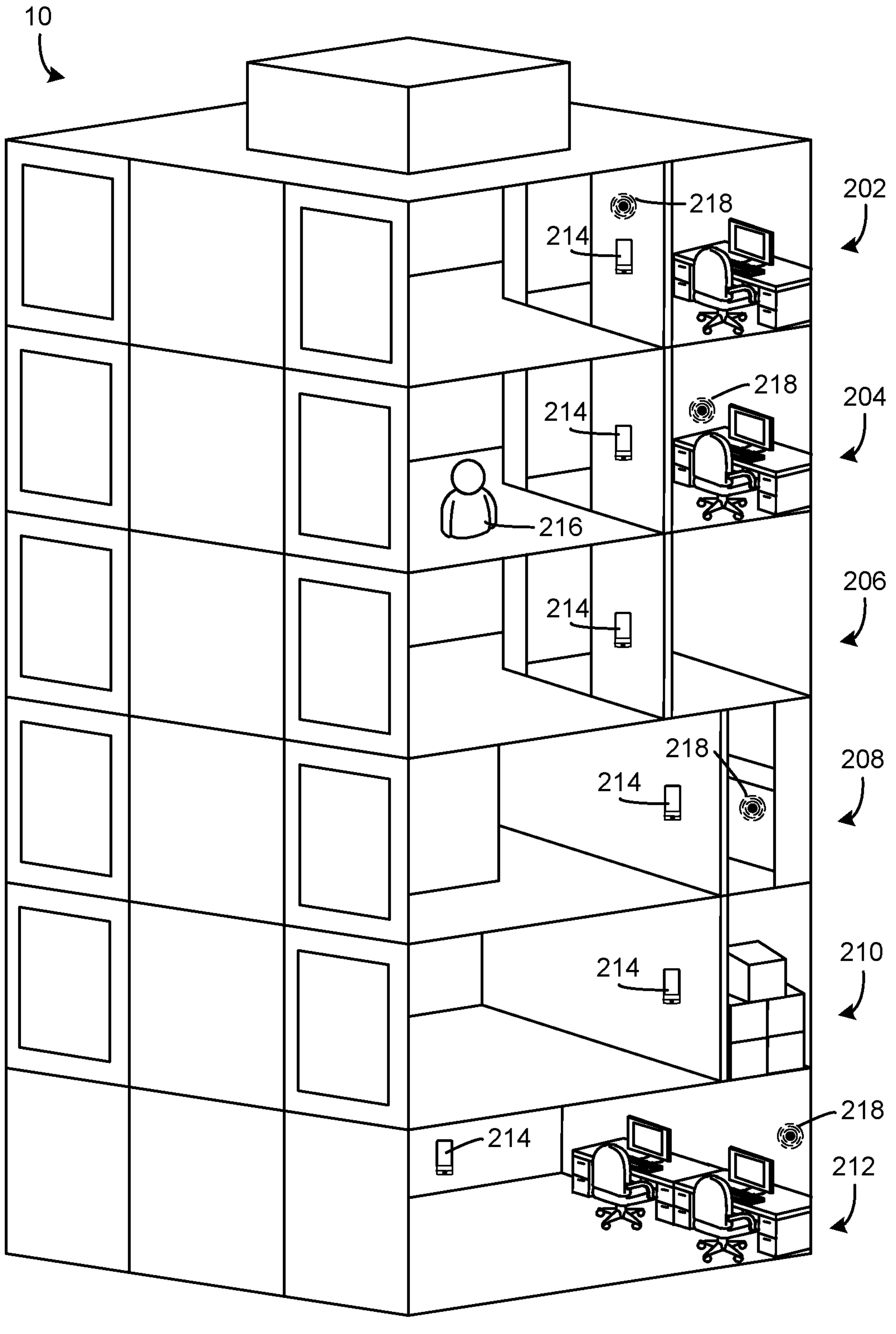
FIG. 2 is a drawing of multiple zones and floors of the building of FIG. 1 equipped with control devices, according to an exemplary embodiment.

Referring now to FIG. 2, building 10 is shown in greater detail, according to an exemplary embodiment. Building 10 may have multiple zones. In FIG. 2, building 10 has zones, 202, 204, 206, 208, 210, and 212. In building 10, the zones each correspond to a separate floor. In various embodiments, the zones of building 10 may be rooms, sections of a floor, multiple floors, etc. Each zone may have a corresponding control device 214. In some embodiments, control device 214 is at least one of a thermostat, a sensor, a controller, a display device, a concierge device, a medical monitor device, etc. Control device 214 may take input from users. The input may be an environmental setpoint, a concierge question, a payment, etc. In some embodiments, control device 214 can cause music and/or building announcements to be played in one or more of zones 202-212, cause the temperature and/or humidity to be regulated in one or more of zones 202-212, and/or any other control action.

In some embodiments, control device 214 can monitor the health of an occupant 216 of building 10. In some embodiments, control device 214 monitors heat signatures, heartrates, and any other information that can be collected from cameras, medical devices, and/or any other health related sensor. In some embodiments, building 10 has wireless transmitters 218 in each or some of zones 202-212. The wireless transmitters 218 may be routers, coordinators, and/or any other device broadcasting radio waves. In some embodiments, wireless transmitters 218 form a Wi-Fi network, a Zigbee network, a Bluetooth network, and/or any other kind of network.

In some embodiments, occupant 216 has a mobile device that can communicate with wireless transmitters 218. Control device 214 may use the signal strengths between the mobile device of occupant 216 and the wireless transmitters 218 to determine in which zone the occupant is. In some embodiments, control device 214 causes temperature setpoints, music and/or other control actions to follow occupant 216 as the occupant 216 moves from one zone to another zone (i.e., from one floor to another floor).

In some embodiments, control devices 214 are connected to a building management system, a weather server, and/or a building emergency sensor(s). In some embodiments, control devices 214 may receive emergency notifications from the building management system, the weather server, and/or the building emergency sensor(s). Based on the nature of the emergency, control devices 214 may give directions to an occupant of the building. In some embodiments, the direction may be to respond to an emergency (e.g., call the police, hide and turn the lights off, etc.) In various embodiments, the directions given to the occupant (e.g., occupant 216) may be navigation directions. For example, zone 212 may be a safe zone with no windows an individual (e.g., occupant 216). If control devices 214 determines that there are high winds around building 10, the control device 214 may direct occupants of zones 202-210 to zone 212 if zone 212 has no windows.

Figure 3:
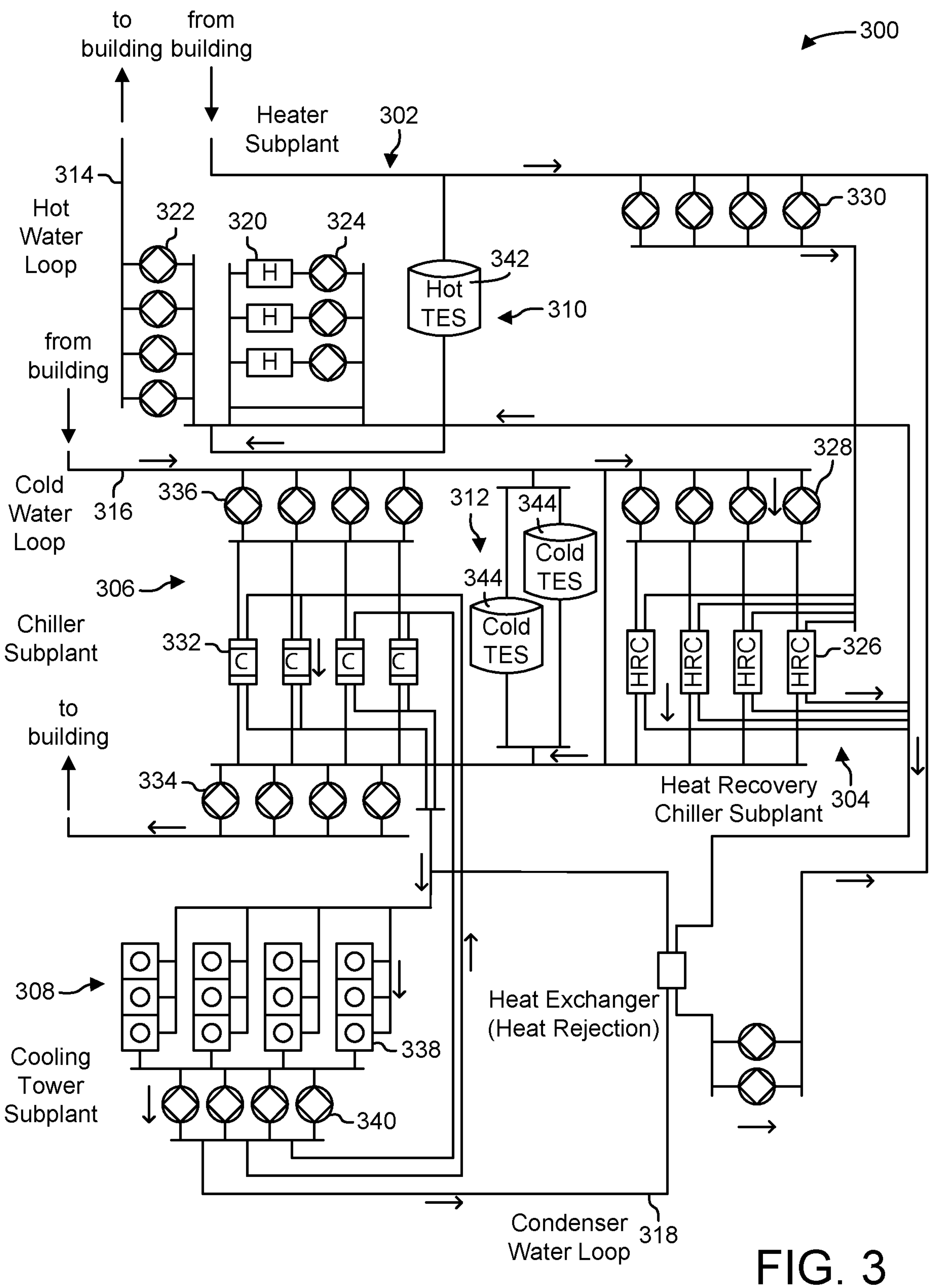
FIG. 3 is a block diagram of a waterside system that may be used in conjunction with the building of FIGS. 1-2, according to an exemplary embodiment.

Referring now to FIG. 3, a block diagram of a waterside system 300 is shown, according to an exemplary embodiment. In various embodiments, waterside system 300 may supplement or replace waterside system 120 in HVAC system 100 or may be implemented separate from HVAC system 100. When implemented in HVAC system 100, waterside system 300 may include a subset of the HVAC devices in HVAC system 100 (e.g., boiler 104, chiller 102, pumps, valves, etc.) and may operate to supply a heated or chilled fluid to AHU 106. The HVAC devices of waterside system 300 may be located within building 10 (e.g., as components of waterside system 120) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve the thermal energy loads (e.g., hot water, cold water, heating, cooling, etc.) of a building or campus. For example, heater subplant 302 may be configured to heat water in a hot water loop 314 that circulates the hot water between heater subplant 302 and building 10. Chiller subplant 306 may be configured to chill water in a cold water loop 316 that circulates the cold water between chiller subplant 306 building 10. Heat recovery chiller subplant 304 may be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) may be used in place of or in addition to water to serve the thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 may include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 226. Cooling tower subplant 208 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves may be integrated with the pumps or positioned upstream or downstream of the pumps to control the fluid flows in waterside system 300. In various embodiments, waterside system 300 may include more, fewer, or different types of devices and/or subplants based on the particular configuration of waterside system 300 and the types of loads served by waterside system 300.

Figure 4:
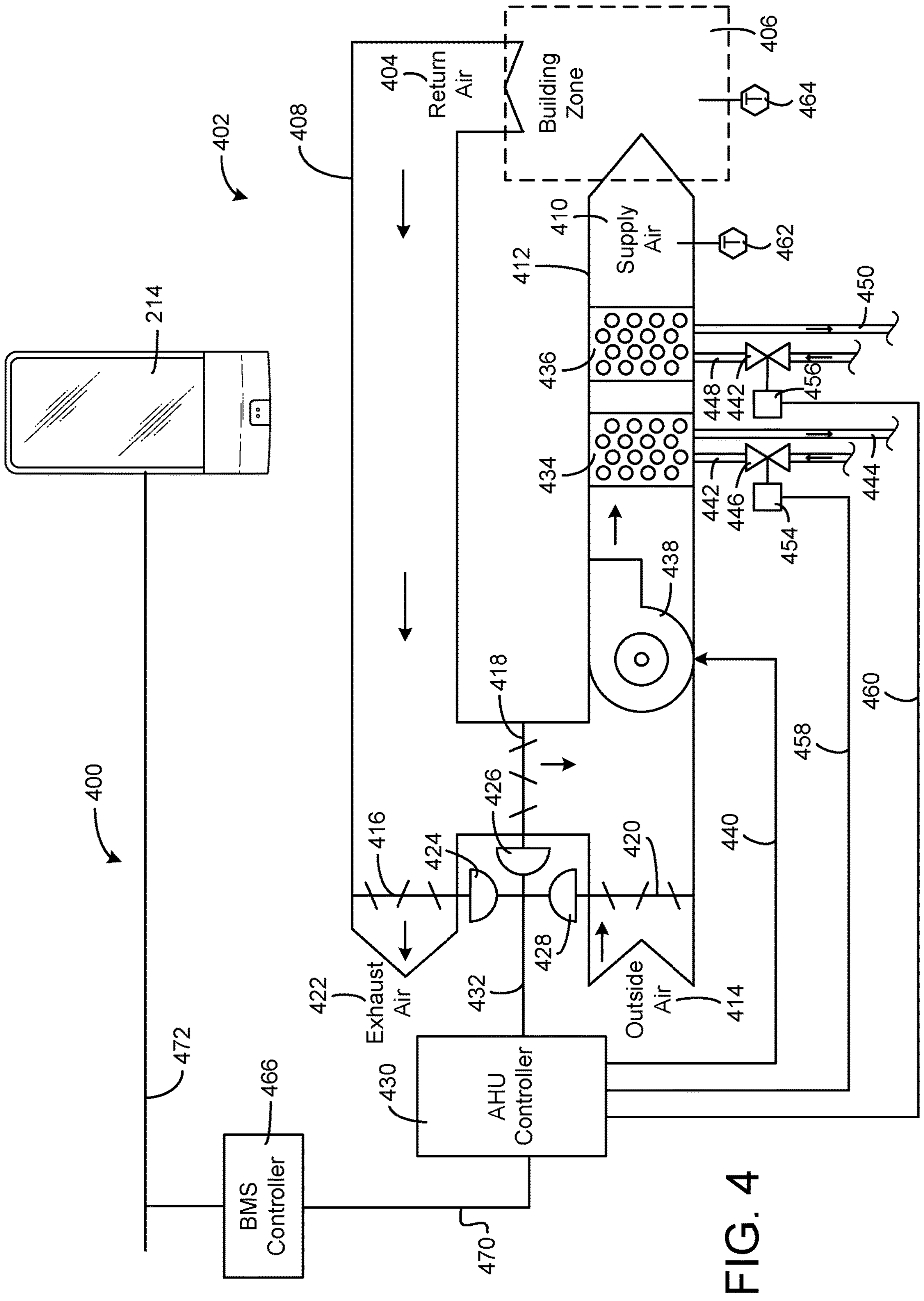
FIG. 4 is a block diagram of an airside system that may be used in conjunction with the building of FIGS. 1-2, according to an exemplary embodiment.

Referring now to FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 612. In some embodiments, AHU 402 is a rooftop unit located on the roof of building 10 (e.g., AHU 402 as shown in FIG. 1) or otherwise positioned to receive both return air 404 and outside air 414. AHU 402 may be configured to operate exhaust air damper 416, mixing damper 418, and outside air damper 420 to control an amount of outside air 414 and return air 404 that combine to form supply air 410. Any return air 404 that does not pass through mixing damper 418 may be exhausted from AHU 402 through exhaust damper 416 as exhaust air 422.

Each of dampers 416-420 may be operated by an actuator. For example, exhaust air damper 416 may be operated by actuator 424, mixing damper 418 may be operated by actuator 426, and outside air damper 420 may be operated by actuator 428. Actuators 424-428 may communicate with an AHU controller 430 via a communications link 432. Actuators 424-428 may receive control signals from AHU controller 430 and may provide feedback signals to AHU controller 430. Feedback signals may include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that may be collected, stored, or used by actuators 424-428. AHU controller 430 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 612. Fan 438 may be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 200 (e.g., from cold water loop 316) via piping 442 and may return the chilled fluid to waterside system 200 via piping 444. Valve 446 may be positioned along piping 442 or piping 444 to control a flow rate of the chilled fluid through cooling coil 474. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 200 (e.g., from hot water loop 314) via piping 448 and may return the heated fluid to waterside system 200 via piping 450. Valve 452 may be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 may be controlled by an actuator. For example, valve 446 may be controlled by actuator 454 and valve 452 may be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 612 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a set point temperature for supply air 410 or to maintain the temperature of supply air 410 within a set point temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a control device 214. BMS controller 466 may include one or more computer systems (e.g., servers, supervisory controllers, subsystem controllers, etc.) that serve as system level controllers, application or data servers, head nodes, or master controllers for airside system 400, waterside system 200, HVAC system 100, and/or other controllable systems that serve building 10. BMS controller 466 may communicate with multiple downstream building systems or subsystems (e.g., HVAC system 100, a security system, a lighting system, waterside system 200, etc.) via a communications link 470 according to like or disparate protocols (e.g., LON, BACnet, etc.). In various embodiments, AHU controller 430 and BMS controller 466 may be separate (as shown in FIG. 4) or integrated. In an integrated implementation, AHU controller 430 may be a software module configured for execution by a processor of BMS controller 466.

In some embodiments, AHU controller 430 receives information from BMS controller 466 (e.g., commands, set points, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Control device 214 may include one or more of the user control devices. Control device 214 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Control device 214 may be a computer workstation, a client terminal, a remote or local interface, or any other type of user interface device. Control device 214 may be a stationary terminal or a mobile device. For example, control device 214 may be a desktop computer, a computer server with a user interface, a laptop computer, a tablet, a smartphone, a PDA, or any other type of mobile or non-mobile device. Control device 214 may communicate with BMS controller 466 and/or AHU controller 430 via communications link 472.

Figure 5:
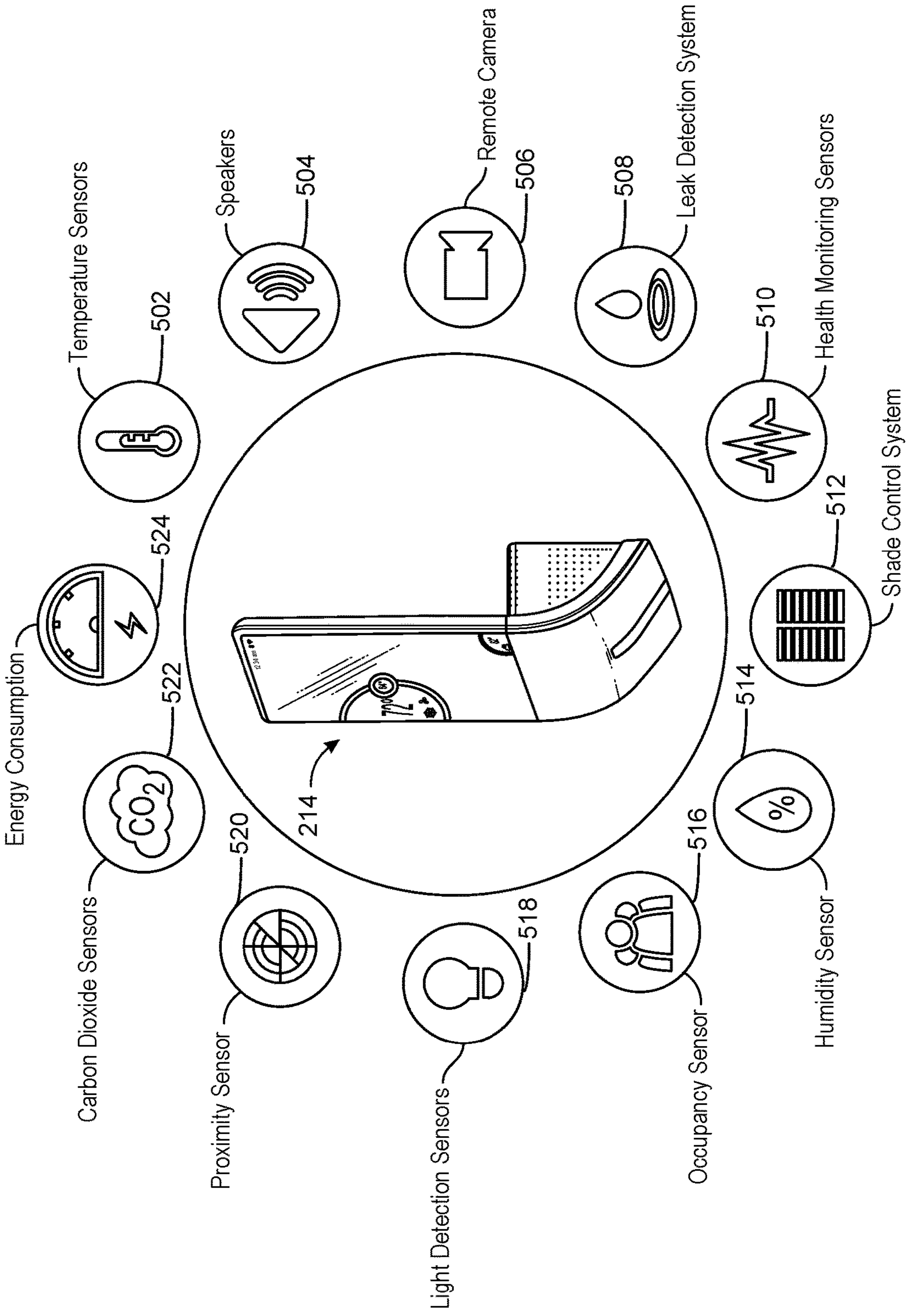
FIG. 5 is a drawing of the connections of the control device of FIG. 2 and FIG. 4, according to an exemplary embodiment.

Referring now to FIG. 5, control device 214 is shown as a connected smart hub or private area network (PAN), according to some embodiments. Control device 214 may include a variety of sensors and may be configured to communicate with a variety of external systems or devices. For example, control device 214 may include temperature sensors 502, speakers 504, leak detection system 508, health monitoring sensors 510, humidity sensors 514, occupancy sensors 516, light detection sensors 518, proximity sensor 520, carbon dioxide sensors 522, or any of a variety of other sensors. Alternatively, control device 214 may receive input from external sensors configured to measure such variables. The external sensors may not communicate over a PAN network but may communicate with control device 214 via an IP based network and/or the Internet.

In some embodiments, speakers 504 are located locally as a component of control device 214. Speakers 504 may be low power speakers used for playing audio to the immediate occupant of control device 214 and/or occupants of the zone in which control device 214 is located. In some embodiments, speakers 504 may be remote speakers connected to control device 214 via a network. In some embodiments, speakers 504 are a building audio system, an emergency alert system, and/or alarm system configured to broadcast building wide and/or zone messages or alarms.

Control device 214 may communicate with a remote camera 506, a shade control system 512, a leak detection system 508, a HVAC system, or any of a variety of other external systems or devices which may be used in a home automation system or a building automation system. Control device 214 may provide a variety of monitoring and control interfaces to allow a user to control all of the systems and devices connected to control device 214. Exemplary user interfaces and features of control device 214 are described in greater detail below.

Figure 6:
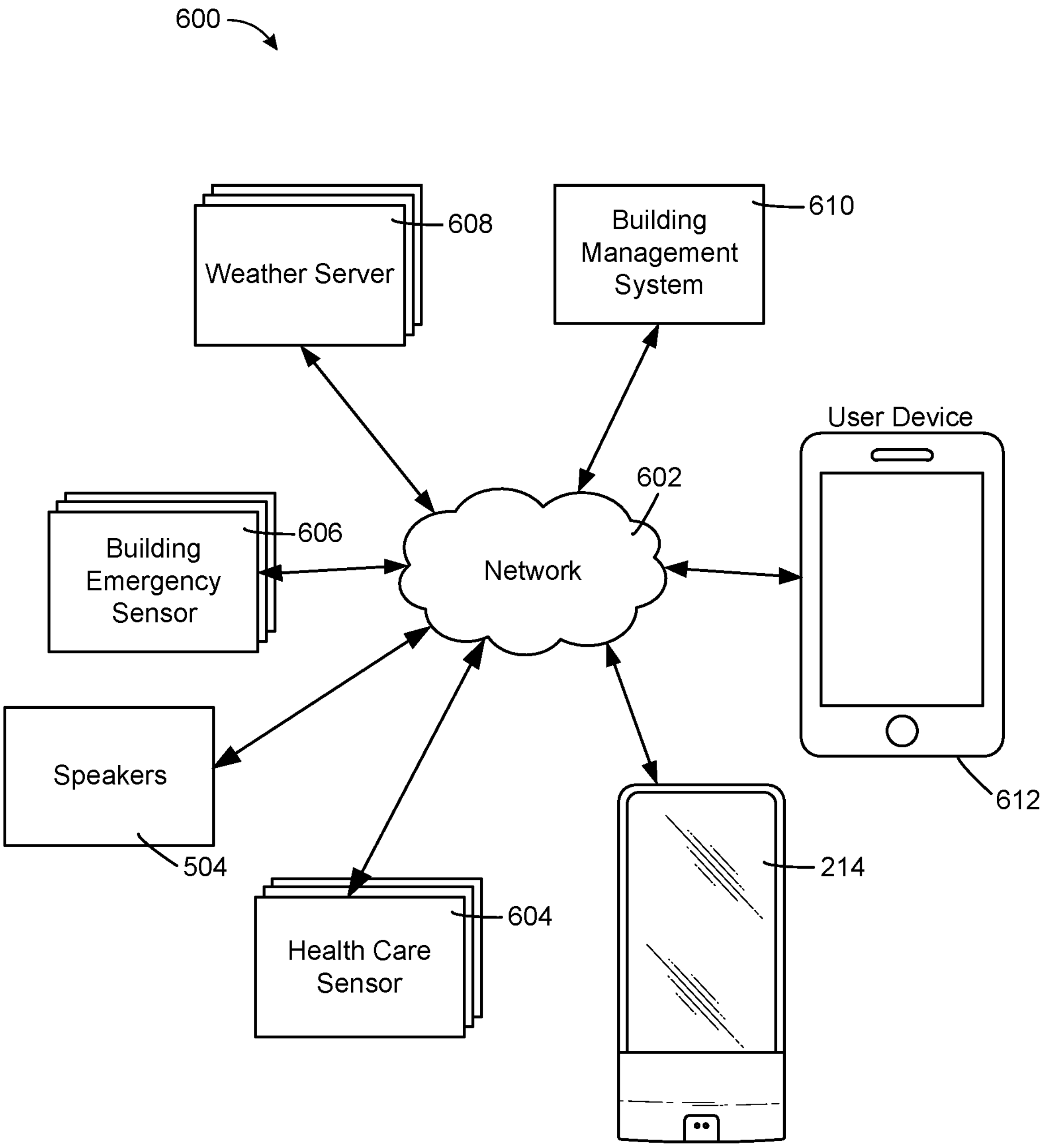
FIG. 6 is a diagram of a communications system located in the building of FIGS. 1 and 2, according to an exemplary embodiment.

Referring now to FIG. 6, a block diagram of communications system 600 is shown, according to an exemplary embodiment. System 600 can be implemented in a building (e.g. building 10) and is shown to include control device 214, network 602, healthcare sensor(s) 604, building emergency sensor(s) 606, weather server(s) 608, building management system 610, and user device 612. System 600 connects devices, systems, and servers via network 602 so that building information, HVAC controls, emergency information, navigation directions, and other information can be passed between devices (e.g., control device 214, user device 612, and/or building emergency sensor(s) 606 and servers and systems (e.g., weather server(s) 608 and/or building management system 610). In some embodiments, control device 214 is connected to speakers 504 as described with reference to FIG. 5.

In some embodiments, network 602 communicatively couples the devices, systems, and servers of system 600. In some embodiments, network 602 is at least one of and/or a combination of a Wi-Fi network, a wired Ethernet network, a Zigbee network, and a Bluetooth network. Network 602 may be a local area network or a wide area network (e.g., the Internet, a building WAN, etc.) and may use a variety of communications protocols (e.g., BACnet, IP, LON, etc.) Network 602 may include routers, modems, and/or network switches.

In some embodiments, control device 214 is configured to receive emergency information, navigation directions, occupant information, concierge information, and any other information via network 602. In some embodiments, the information is received from building management system 610 via network 602. In various embodiments, the information is received from the Internet via network 602. In some embodiments, control device 214 is at least one of or a combination of a thermostat, a humidistat, a light controller, and any other wall mounted and/or hand held device. In some embodiments, control device 214 is connected to building emergency sensor(s) 606. In some embodiments, building emergency sensor(s) 606 are sensors which detect building emergencies. Building emergency sensor(s) 606 may be smoke detectors, carbon monoxide detectors, carbon dioxide detectors (e.g., carbon dioxide sensors 522), an emergency button (e.g., emergency pull handles, panic buttons, a manual fire alarm button and/or handle, etc.) and/or any other emergency sensor. In some embodiments, the emergency sensor(s) include actuators. The actuators may be building emergency sirens and/or building audio speaker systems (e.g., speakers 504), automatic door and/or window control (e.g., shade control system 512), and any other actuator used in a building.

In some embodiments, control device 214 may be communicatively coupled to weather server(s) 608 via network 602. In some embodiments, the control device 214 may be configured to receive weather alerts (e.g., high and low daily temperature, five-day forecast, thirty-day forecast, etc.) from weather server(s) 608. Control device 214 may be configured to receive emergency weather alerts (e.g., flood warnings, fire warnings, thunder storm warnings, winter storm warnings, etc.) In some embodiments, control device 214 may be configured to display emergency warnings via a user interface of control device 214 when control device 214 receives an emergency weather alert from weather server(s) 608. The control device 214 may be configured to display emergency warnings based on the data received from building emergency sensor(s) 606. In some embodiments, the control device 214 may cause a siren (e.g., speakers 504 and/or building emergency sensor(s) 606) to alert occupants of the building of an emergency, cause all doors to become locked and/or unlocked, cause an advisory message be broadcast through the building, and control any other actuator or system necessary for responding to a building emergency.

In some embodiments, control device 214 is configured to communicate with building management system 610 via network 602. Control device 214 may be configured to transmit environmental setpoints (e.g., temperature setpoint, humidity setpoint, etc.) to building management system 610. In some embodiments, building management system 610 may be configured to cause zones of a building (e.g., building 10) to be controlled to the setpoint received from control device 214. In some embodiments, building management system 610 may be configured to control the lighting of a building. In some embodiments, building management system 610 may be configured to transmit emergency information to control device 214. In some embodiments, the emergency information is a notification of a shooter lockdown, a tornado warning, a flood warning, a thunderstorm warning, and/or any other warning. In some embodiments, building management system 610 is connected to various weather servers or other web servers from which building management system 610 receives emergency warning information. In various embodiments, building management system is a computing system of a hotel. Building management system 610 may keep track of hotel occupancy, may relay requests to hotel staff, and/or perform any other functions of a hotel computing system.

Control device 214 is configured to communicate with user device 612 via network 602. In some embodiments, user device 612 is a smartphone, a tablet, a laptop computer, and/or any other mobile and/or stationary computing device. In some embodiments, user device 612 communicates calendar information to control device 214. In some embodiments, the calendar information is stored and/or entered by a user into a calendar application. In some embodiments, calendar application is at least one of Outlook, Google Calendar, Fantastical, Shifts, CloudCal, DigiCal, and/or any other calendar application. In some embodiments, control device 214 receives calendar information from the calendar application such as times and locations of appointments, times and locations of meetings, and/or any other information. Control device 214 may be configured to display building map direction to a user associated with user device 612 and/or any other information.

In some embodiments, a user may press a button on a user interface of control device 214 indicating a building emergency. The user may be able to indicate the type of emergency (e.g., fire, flood, active shooter, etc.) Control device 214 may communicate an alert to building management system 610, user device 612, and any other device, system, and/or server.

In some embodiments, control device 214 is communicably coupled to healthcare sensor(s) 604 via network 602. In some embodiments, control device is configured to monitor healthcare sensor(s) 604 collecting data for occupants of a building (e.g., building 10) and determine health metrics for the occupants based on the data received from the healthcare sensor(s) 604. In some embodiments, healthcare sensor(s) 604 are one or more smart wrist bands, pacemakers, insulin pumps, and/or any other medical device. The health metrics may be determined based on heart rates, insulin levels, and/or any other biological and/or medical data.

Figure 7:
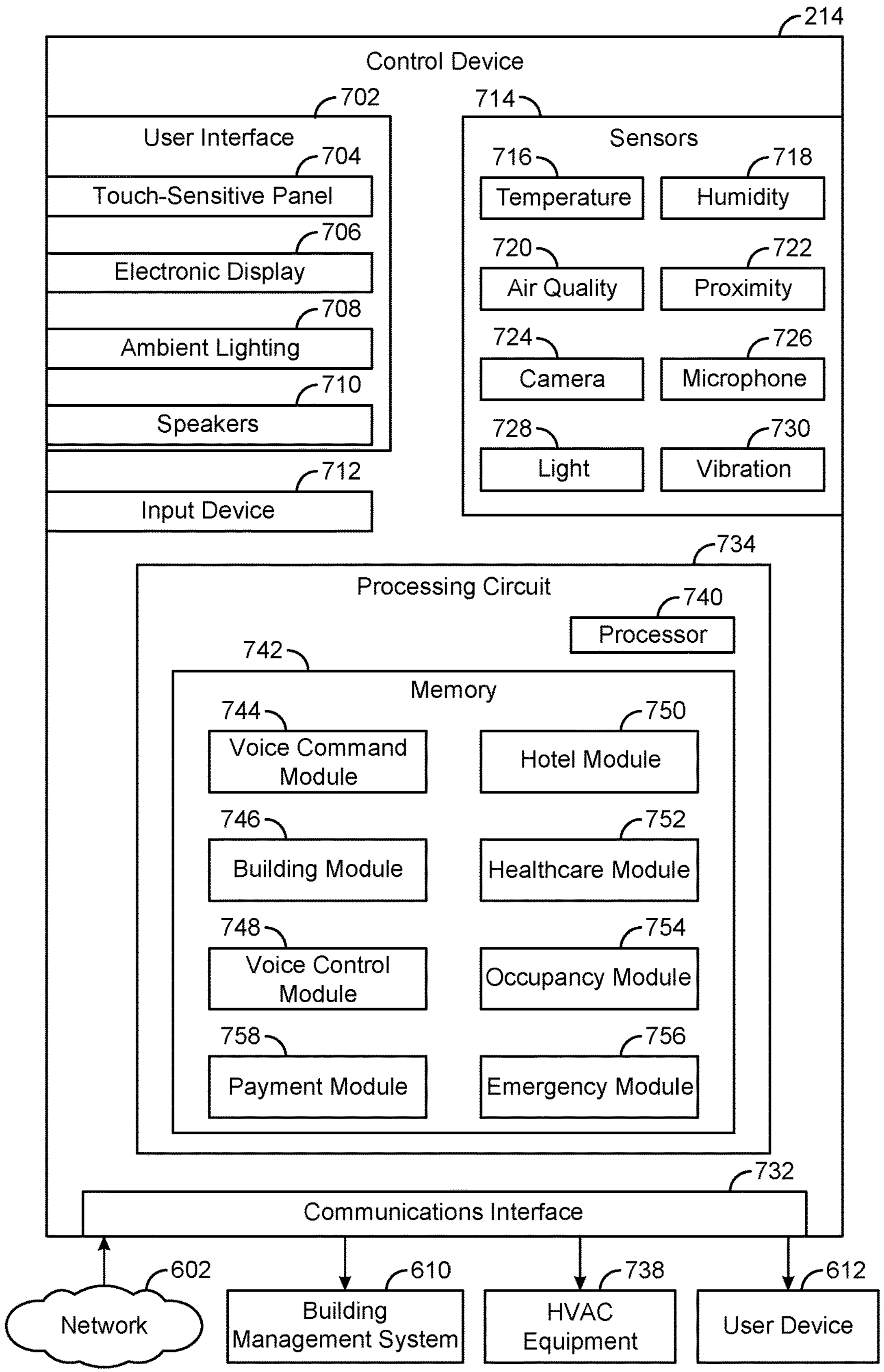
FIG. 7 is a block diagram illustrating the control device of FIGS. 2, 3, and 5 in greater detail, according to an exemplary embodiment.

Referring now to FIG. 7, a block diagram illustrating control device 214 in greater detail is shown, according to some embodiments. Control device 214 is shown to include a variety of user interface devices 702 and sensors 714. User interface devices 702 may be configured to receive input from a user and provide output to a user in various forms. For example, user interface devices 702 are shown to include electronic display 706, an electronic display 706, ambient lighting 708, speakers 710 (e.g., speakers 504), and input device 712. In some embodiments, user interface devices 702 include a microphone configured to receive voice commands from a user, a keyboard or buttons, switches, dials, or any other user-operable input devices. It is contemplated that user interface devices 702 may include any type of device configured to receive input from a user and/or provide an output to a user in any of a variety of forms (e.g., touch, text, video, graphics, audio, vibration, etc.).

Sensors 714 may be configured to measure a variable state or condition of the environment in which control device 214 is installed. For example, sensors 714 are shown to include a temperature sensor 716, a humidity sensor 718, an air quality sensor 720, a proximity sensor 722, a camera 724, a microphone 726, a light sensor 728, and a vibration sensor 730. Air quality sensor 720 may be configured to measure any of a variety of air quality variables such as oxygen level, carbon dioxide level, carbon monoxide level, allergens, pollutants, smoke, etc. Proximity sensor 722 may include one or more sensors configured to detect the presence of people or devices proximate to control device 214. For example, proximity sensor 722 may include a near-field communications (NFC) sensor, a radio frequency identification (RFID) sensor, a Bluetooth sensor, a capacitive proximity sensor, a biometric sensor, or any other sensor configured to detect the presence of a person or device. Camera 724 may include a visible light camera, a motion detector camera, an infrared camera, an ultraviolet camera, an optical sensor, or any other type of camera. Light sensor 728 may be configured to measure ambient light levels. Vibration sensor 730 may be configured to measure vibrations from earthquakes or other seismic activity at the location of control device 214.

Still referring to FIG. 7, control device 214 is shown to include a communications interface 732 and a processing circuit 734. Communications interface 732 may include wired or wireless interfaces (e.g., jacks, antennas, transmitters, receivers, transceivers, wire terminals, etc.) for conducting data communications with various systems, devices, or networks. For example, communications interface 732 may include an Ethernet card and port for sending and receiving data via an Ethernet-based communications network and/or a Wi-Fi transceiver for communicating via a wireless communications network. Communications interface 732 may be configured to communicate via local area networks or wide area networks (e.g., the Internet, a building WAN, etc.) and may use a variety of communications protocols (e.g., BACnet, IP, LON, etc.).

Communications interface 732 may include a network interface configured to facilitate electronic data communications between control device 214 and various external systems or devices (e.g., network 602, building management system 610, HVAC equipment 738, user device 612, etc.) For example, control device 214 may receive information from building management system 610 or HVAC equipment 738 indicating one or more measured states of the controlled building (e.g., temperature, humidity, electric loads, etc.) and one or more states of the HVAC equipment 738 (e.g., equipment status, power consumption, equipment availability, etc.). In some embodiments, HVAC equipment 738 may be lighting systems, building systems, actuators, chillers, heaters, and/or any other building equipment and/or system. Communications interface 732 may receive inputs from building management system 610 or HVAC equipment 738 and may provide operating parameters (e.g., on/off decisions, set points, etc.) to building management system 610 or HVAC equipment 738. The operating parameters may cause building management system 610 to activate, deactivate, or adjust a set point for various types of home equipment or building equipment in communication with control device 214.

Processing circuit 734 is shown to include a processor 740 and memory 742. Processor 740 may be a general purpose or specific purpose processor, an application specific integrated circuit (ASIC), one or more field programmable gate arrays (FPGAs), a group of processing components, or other suitable processing components. Processor 740 may be configured to execute computer code or instructions stored in memory 742 or received from other computer readable media (e.g., CDROM, network storage, a remote server, etc.).

Memory 742 may include one or more devices (e.g., memory units, memory devices, storage devices, etc.) for storing data and/or computer code for completing and/or facilitating the various processes described in the present disclosure. Memory 742 may include random access memory (RAM), read-only memory (ROM), hard drive storage, temporary storage, non-volatile memory, flash memory, optical memory, or any other suitable memory for storing software objects and/or computer instructions. Memory 742 may include database components, object code components, script components, or any other type of information structure for supporting the various activities and information structures described in the present disclosure. Memory 742 may be communicably connected to processor 740 via processing circuit 734 and may include computer code for executing (e.g., by processor 740) one or more processes described herein. For example, memory 742 is shown to include a voice command module 744, a building module 746, a voice control module 748, a payment module 758, a hotel module 750, a healthcare module 752, an occupancy module 754, and an emergency module 756. The functions of some of these modules is described in greater detail below.

In some embodiments, voice command module 744 is configured to receive audio data from microphone 726. Voice command module 744 may be configured to translate audio data into spoken words. In some embodiments, voice command module 744 may be configured to perform Internet searches based on the spoken words via network 602. In various embodiments, voice command module 744 may send requests to building management system 610 based on the spoken words.

Occupancy Tracking Features

Figure 8:
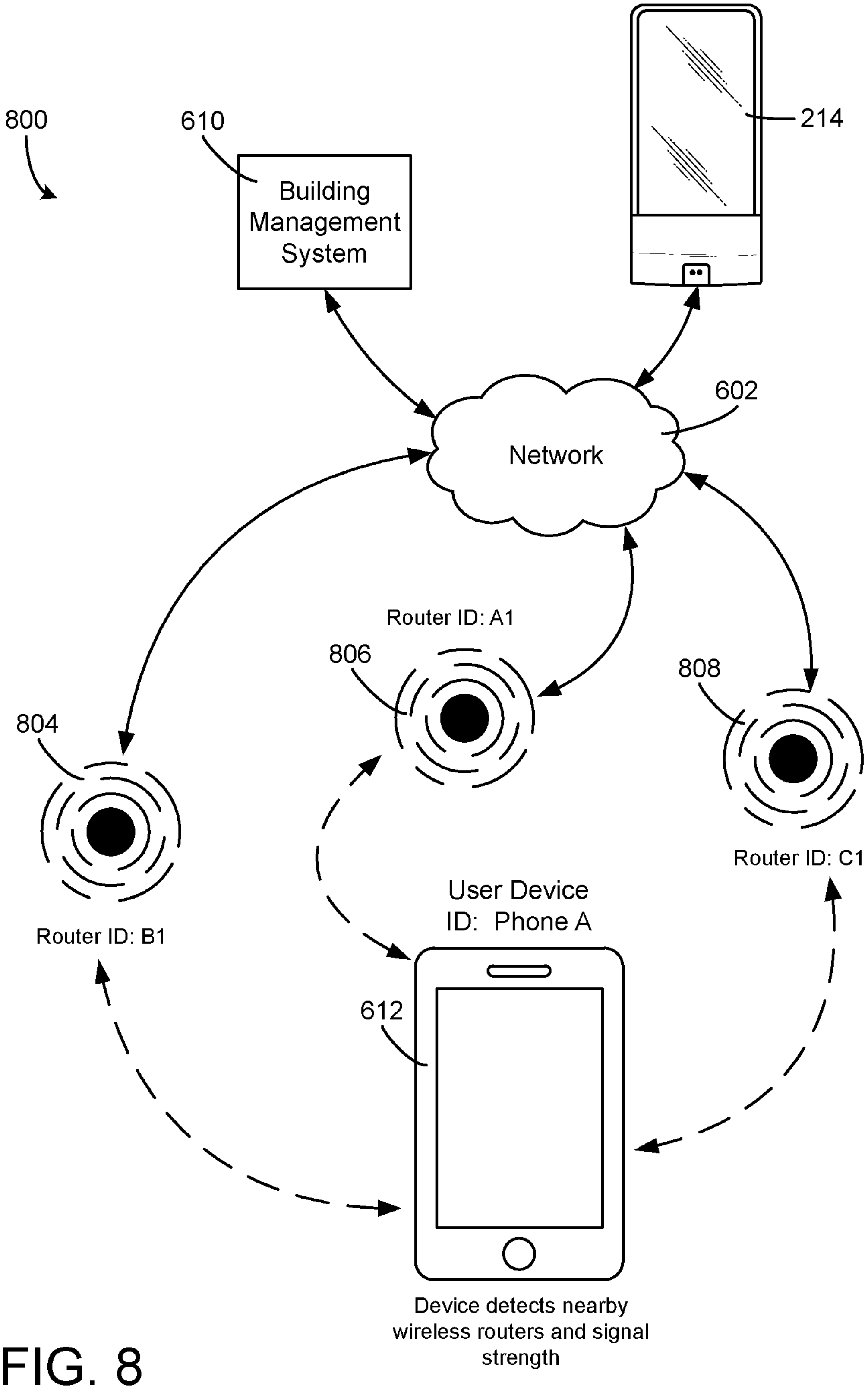
FIG. 8 is a block diagram illustrating the control device of FIG. 7 connected to three routers located in the building of FIGS. 1 and 2, according to an exemplary embodiment.

Referring now to FIG. 8, a block diagram of an occupancy tracking system 800 is shown according to an exemplary embodiment. System 800 can be implemented in a building space (e.g., building 10) to determine the occupancy of the building space based on Wi-Fi router connections and signal strengths. System 800 is shown to include building management system 610, control device 214, network 602, routers 804-808, and user device 612. In some embodiments, building management system 610 operates the building space as described in FIGS. 1-4. In various embodiments, control device 214 operates the building space as described in FIGS. 1-4. Building management system 610 is shown to be connected to control device 214 and routers 804-808. In some embodiments, network 602 is at least one of and/or a combination of a Wi-Fi network, a wired Ethernet network, a Zigbee network, and a Bluetooth network. Network 602 may be a local area network or a wide area network (e.g., the Internet, a building WAN, etc.) and may use a variety of communications protocols (e.g., BACnet, IP, LON, etc.).

Building management system 610 may include an application server. The application server may be a remote server and may be hosted at a remote location. The application server may be configured to provide a web-based presence for users and/or building administrators to access information regarding occupancy of the building. In some embodiments, the application server allows users and/or building administrators to view data pertaining to the number of users in the building space and their respective locations. The application server may communicate with user device 612 through routers 804-808 or may communicate to user device 612 via mobile data (e.g. 1G, 2G, 3G, LTE, etc.).

In some embodiments, the application server integrates a building facility web application with the determined number and location of occupants. In some embodiments, the building facility application may control room, zone, building, and campus lighting, booking, public service announcements and other features of a building facility. In some embodiments, the building facility web application may identify a user when a device associated with the user (e.g., user device 612) is detected in a room, zone, building and/or campus based on wireless signal strengths. The building facility web application may automatically login the identified user with the building web facility application. A user that has been logged in may be able to change lighting, environmental setpoints and any other adjustable building facility web application feature via user device 612. In some embodiments, the building facility web application may automatically adjust lighting and environmental setpoints to preferred settings of the identified and logged in user.

Routers 804-808 may be installed for the specific purpose of determining user occupancy or may be existing routers in a wireless building network. In some embodiments, each router may have a unique ID. In FIG. 8, router 804 has the ID B1, router 806 has the ID A1, and router 808 has the ID C1. Routers 804-808 may connect user device 612 to the Internet and/or control device 214 through network 602.

Although only three routers 804-808 are shown in FIG. 8, it is contemplated that system 800 can include any number of routers located in the building space.

Routers 804-808 can be configured to emit, receive, sense, relay, or otherwise engage in unidirectional or bidirectional wireless communications. Routers 804-808 can use any type wireless technology or communications protocol. For example, in various embodiments, the wireless emitters/receivers can be Bluetooth low energy (BLE) emitters, near field communications (NFC) devices, Wi-Fi transceivers, RFID devices, ultrawide band (UWB) devices, infrared emitters/sensors, visible light communications (VLC) devices, ultrasound devices, cellular transceivers, iBeacons, or any other type of hardware configured to facilitate wireless data communications. In some embodiments, routers 804-808 are integrated with various devices within the building (e.g., thermostats, lighting sensors, zone controllers).

Routers 804-808 can broadcast a wireless signal. The wireless signal broadcast by routers 804-808 can include the identifier associated with routers 804-808. For example, routers 804-808 can broadcast a SSID, MAC address, or other identifier which can be used to identify a particular router. In some embodiments, the wireless signal broadcast by routers 804-808 includes multiple emitter identifiers (e.g., a UUID value, a major value, a minor value, etc.). User device 612 can detect the wireless signals emitted by the routers 804-808. User device 612 can be configured to identify the router associated with the wireless signal. In some embodiments, user device 612 detects the signal strength of the wireless signals for each of routers 804-808.

In FIG. 8, user device 612 communicates with routers 804-808. User device 612 may communicate to the routers via Wi-Fi, Zigbee, Bluetooth, and/or any other wireless communication protocol. User device 612 may communicate to routers 804-808 and determine a signal strength of each router. In some embodiments, received signal strength (RSSI) is determined by user device 612 for connections to each of routers 804-808. In some embodiments, user device 612 detects the RSSI of the wireless signals received from each of routers 804-808 without engaging in bidirectional communications with any of routers 804-808. For example, user device 612 can passively detect or measure RSSI without actively sending any return data to routers 804-808. In various embodiments, user device 612 determines RSSI as a percentage, in mW, in dBm, and/or in any other unit or power ratio.

User device 612 may store the location of each router 804-808 in a memory device and may determine (e.g., triangulate, estimate, etc.) the location of user device 612 based on the stored locations of routers 804-808 and the determined RSSI value for each router. In some embodiments, user device 612 is only connected to a single router or only receives a wireless signal from a single router. User device 612 may determine an approximate circular field around the single router in which user device 612 may be located based on the determined RSSI. In some embodiments, the circular field is an approximate radius such as a distance that user device 612 may be located away from the router. For example, a strong RSSI may indicate that user device 612 is close to a particular router, whereas a weaker RSSI may indicate that user device 612 is further from the router. User device 612 can use a mapping table or function to translate RSSI into distance. In some embodiments, the translation between RSSI and distance is a function of the router's broadcast power or other router settings, which user device 612 can receive from each router within broadcast range. In some embodiments, the field is a range of radii. Each radii may be different and user device 612 may be located between the two radii in a disc shaped field. In various embodiments, user device 612 triangulates the location of user device 612 based on one or more signal strengths between known locations of routers.

In various embodiments, routers 804-808 send signal strengths between routers 804-808 and user device 612 to control device 214. Control device 214 may store the location of each router 804-808 in a memory device and may determine (e.g., triangulate, estimate, etc.) the location of user device 612 based on the stored locations of routers 804-808 and the determined RSSI value for each router. In some embodiments, user device 612 is only connected to a single router or only receives a wireless signal from a single router. Control device 214 may determine an approximate circular field around the single router in which user device 612 may be located based on the determined RSSI. In some embodiments, the circular field is an approximate radius such as a distance that user device 612 may be located away from the router. For example, a strong RSSI may indicate that user device 612 is close to a particular router, whereas a weaker RSSI may indicate that user device 612 is further from the router. Control device 214 can use a mapping table or function to translate RSSI into distance. In some embodiments, the translation between RSSI and distance is a function of the router's broadcast power or other router settings, which control device 214 can receive from each router within broadcast range. In some embodiments, the field is a range of radii. Each radii may be different and user device 612 may be located between the two radii in a disc shaped field. In various embodiments, control device 214 triangulates the location of user device 612 based on one or more signal strengths between known locations of routers.

Still referring to FIG. 8, user device 612 may communicate with building management system 610, an application server, and/or control device 214 via the routers 804-808. In some embodiments, user device 612 sends its location within the building space to building management system 610, an application server, and/or control device 214. In some embodiments, user device 612 sends a unique ID to building management system 610 and/or an application server. In FIG. 8, the unique ID of user device 612 is Phone A. In some embodiments, building management system 610 is configured to run a unique heating or cooling schedule based on the ID of the user device 612. For example, an environmental setpoint may be tied to the ID of user device 612. Building management system 610 may be configured to adjust the setpoint of the zone in which user device 612 is located to the environmental setpoint tied to the ID of user device 612.

Figure 9:
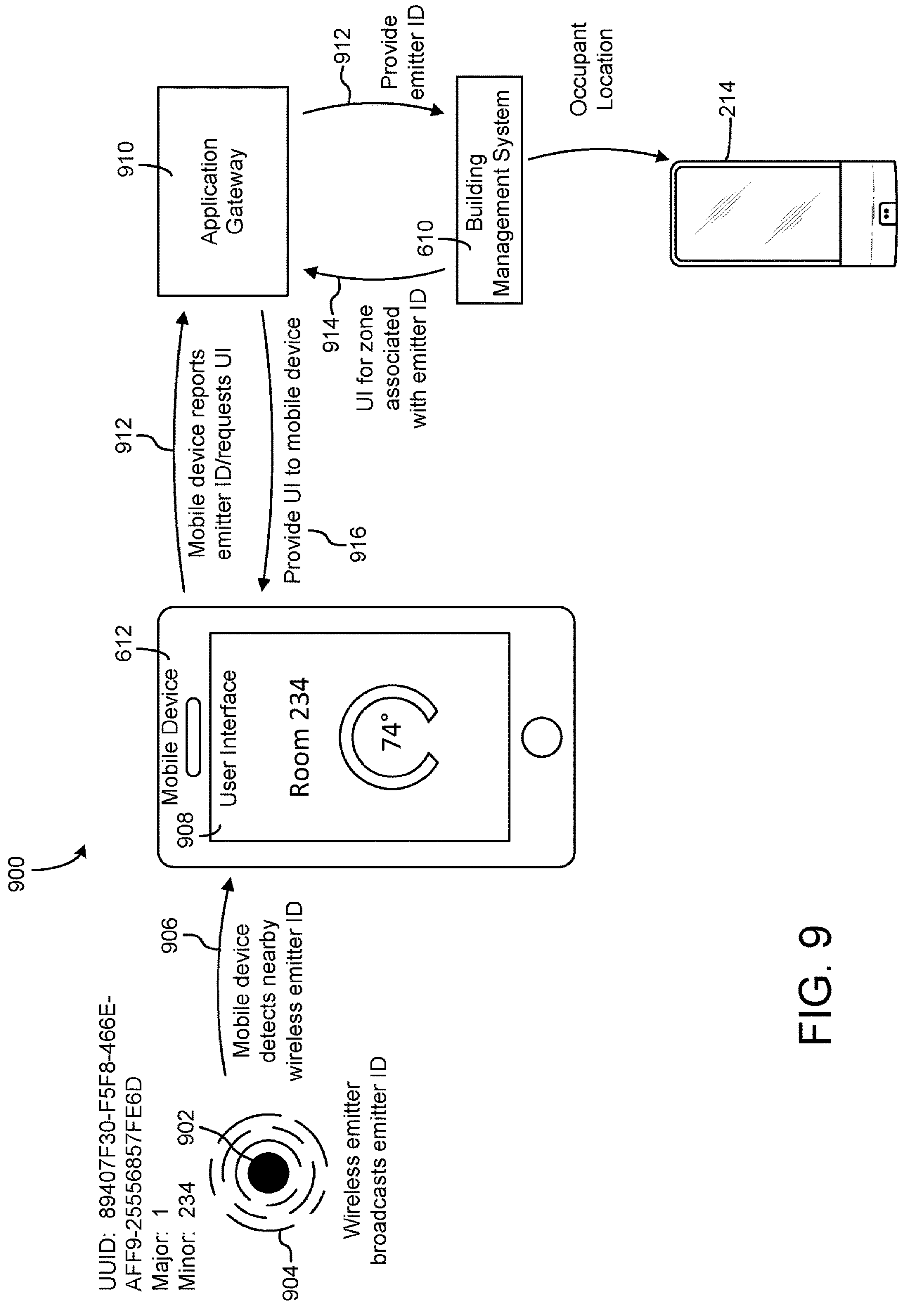
FIG. 9 is a flow diagram illustrating a process for determining the location of a mobile device in the building of FIG. 1 using the plurality of wireless emitters, according to an exemplary embodiment.

Referring now to FIG. 9, a flow diagram illustrating a process 900 for using occupant location in a building is shown, according to an exemplary embodiment. A building (e.g., building 10) is equipped with a plurality of wireless emitters 902. Each of wireless emitters 902 may be located at a different position in the building and may be associated with a different emitter identifier. Although only one wireless emitter 902 is shown in FIG. 9, many wireless emitters 902 may be placed at various locations in or around the building. Each of wireless emitters 902 broadcasts a wireless signal (step 904). The wireless signal broadcast by emitter 902 includes an indication of an emitter identifier associated with wireless emitter 902. In some embodiments, the wireless signal broadcast by emitter 902 include multiple emitter identifiers (e.g., a UUID value, a major value, a minor value, etc.)

Still referring to FIG. 9, a user device 612 detects the wireless signal emitted by wireless emitter 902 (step 906). User device 612 may be, for example, a laptop computer, a tablet, a smart phone, a RFID sensor, a Bluetooth device, a Wi-Fi device, a NFC device, a portable communications device, or any combination thereof. User device 612 may be configured to run remote applications 908 and may function as a UI client. User device 612 may be configured (e.g., by an application running on user device 612) to identify the emitter identifier associated with the wireless signal detected in step 906.

In FIG. 9, user device 612 is shown connecting to an application gateway 910 (e.g., at a predefined IP address, via a wireless data connection) and reporting the emitter identifier associated with the detected wireless signal (step 912). In some embodiments, user device 612 requests a user interface for presentation on user device 612. The request may include the emitter identifier detected by user device 612 and/or a device identifier associated with user device 612. Application gateway 910 may provide the emitter identifier and/or the device identifier to building management system 610. In various embodiments, application gateway 910 and building management system 610 may be combined into a single component or user device 612 may report the emitter identifier directly to building management system 610.

Building management system 610 uses the emitter identifier and/or the device identifier to select a user interface for presentation on user device 612. Building management system 610 may select the user interface for a building zone associated with the emitter identifier reported by user device 612. For example, building management system 610 may select a user interface which includes information and/or control options relating to the building zone associated with the reported emitter identifier. In some embodiments, building management system 610 selects a user interface based on the identity of a user associated with user device 612 (e.g., based on a user identifier or device identifier reported by user device 612). In some embodiments, building management system 610 uses emitter identifier reported by user device 612 to determine the position of user device 612 within the building. Building management system 610 may send the position of user device 612 to control device 214. Building management system 610 may select a user interface for monitoring and/or controlling the building zone in which user device 612 is currently located or a building zone in which user device 612 has been located previously.

Still referring to FIG. 9, building management system 610 is shown providing the selected user interface to application gateway 910 (step 914), which provides the selected user interface to user device 612 (step 916). In other embodiments, BMS controller 12 may provide the selected user interface directly to user device 612. User device 612 may present the selected user interface on a user interface of user device 612. The use interface may be, for example, an electronic display or other user interface element of user device 612. Advantageously, building management system 610 may automatically detect the location of user device 612 and deliver a location-specific user interface to user device 612 without requiring a user to input location information.

Figure 10:
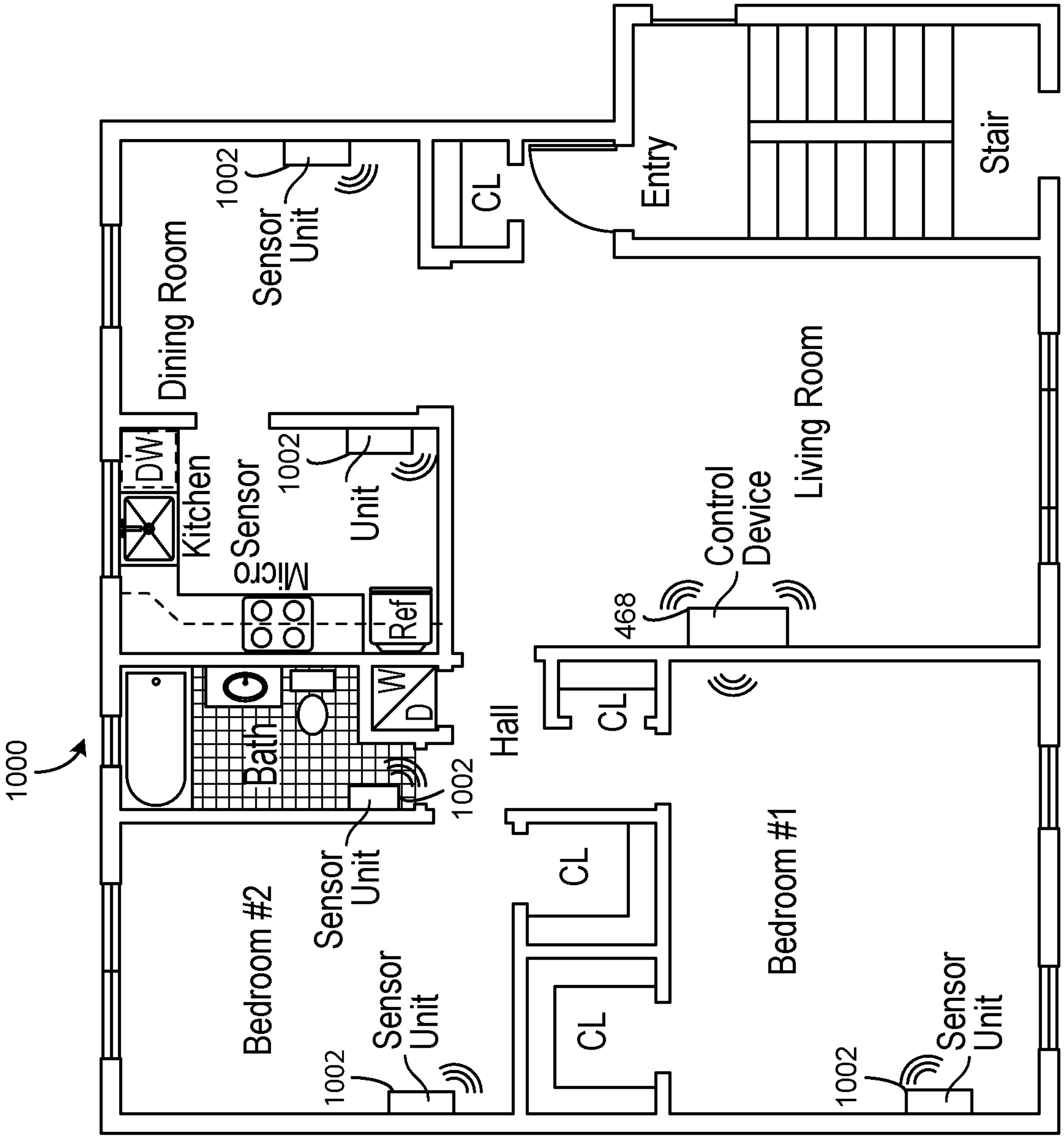
FIG. 10 is a drawing of a floorplan of a building with a main control unit in one room and sensor units in other rooms, according to an exemplary embodiments.

Referring now to FIG. 10, a floorplan 1000 of a home and/or building is shown. The home is shown to include several different zones (e.g., rooms or areas) including a living room, a first bedroom, a second bedroom, a bathroom, a kitchen, and a dining room. A control device 214 may be installed in one of the rooms or zones. For example, FIG. 10 shows a main control unit (e.g., control device 214) installed in the living room. The main control unit may serve as a central hub for monitoring environmental conditions, controlling various devices throughout the home, and/or tracking occupancy through multiple rooms and/or zones of the home.

Sensor units 1002 (e.g., proximity sensor 520, remote camera 506, occupancy sensor 516, routers 804-808, emitter 902, etc.) may be installed in various rooms or zones in the home. For example, FIG. 10 shows a sensor unit installed in each of the bedrooms, the bathroom, the kitchen, and the dining room. In some embodiments, the sensor units 1002 measure signals strengths between user devices (e.g., user device 612). In various embodiments, sensor units 1002 are configured to relay image data and/or audio data to control device 214. Control device 214 may identify occupants based on the image and/or audio data. The measured signal strengths may be used to determine the occupancy of the owner of the user device.

In some embodiments, a building management system and/or control device 214 determines the location of the user device. The sensor units 1002 may be configured to measure environmental conditions within each room or zone and to receive user input (e.g., voice commands via a microphone). For example, each sensor unit 1002 may include a plurality of sensors (e.g., a temperature sensor, a humidity sensor, a smoke detector, a light sensor, a camera, a motion sensor etc.) configured to measure variables such as temperature, humidity, light, etc. in the room or zone in which the sensor unit is installed. The sensor units 1002 may communicate (e.g., wirelessly or via a wired communications link) with the control device 214 and/or with each other. In some embodiments, sensors, such as low power door sensors, can communicate with repeaters disposed in the gang boxes or other locations using a low power overhead protocol. The repeaters can provide wired or wireless communication to the main control unit.

Figure 11:
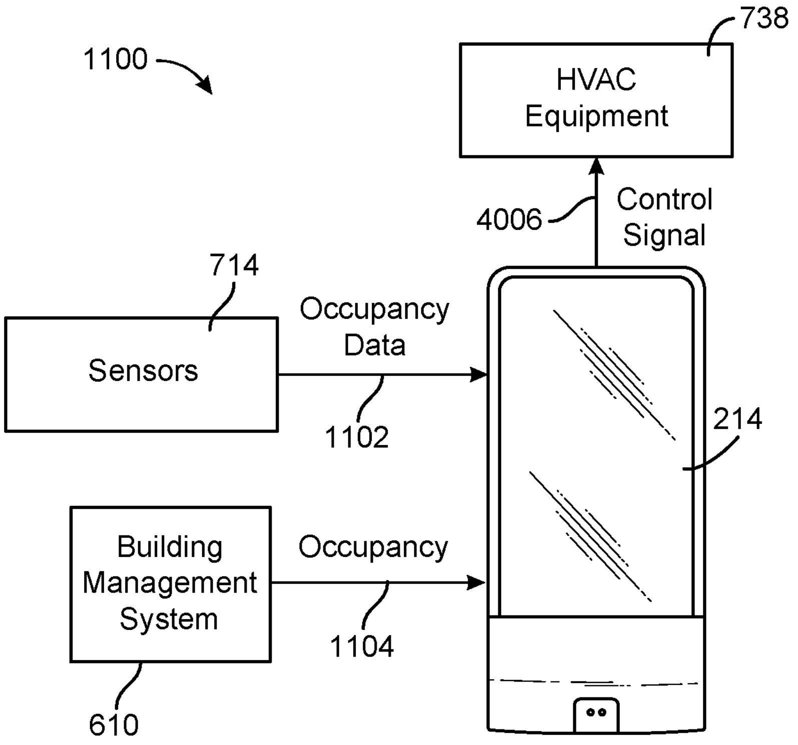
FIG. 11 is a diagram illustrating the control device of FIG. 7 receiving occupancy data, according to an exemplary embodiment.

Referring now to FIG. 11, a diagram of control device 214 receiving occupancy information is shown, according to an exemplary embodiment. In some embodiments, control device 214 is configured to receive occupancy data 1102 from sensors 714. In some embodiments, sensors 714 are at least one or a combination of camera 724, microphone 726, a motion sensor (e.g., proximity sensor 722), and/or any other occupancy sensor. In some embodiments, occupancy module 754 may be configured to process the occupancy data to determine the identity of any detected occupants.

In some embodiments, occupancy module 754 may be configured to determine the identity of an occupant based on occupancy data 1102 received from sensors 714. In some embodiments, the occupancy module 754 receives sensor input from sensors 714 where the sensors may include camera 724. Occupancy module 754 can perform digital image processing to identify the one or more users based on the digital images received from camera 724. In some embodiments, digital image processing is used to identify the faces of the one or more users, the height of the one or more users, or any other physical characteristic of the one or more users. In some embodiments, the digital image processing is performed by image analysis tools such as edge detectors and neural networks. In some embodiments, the digital image processing compares the physical characteristics of the one or more users with physical characteristics of previously identified users.

In some embodiments, the occupancy module 754 receives sensor input from microphone 726. Microphone 726 can be any of a plurality of microphone types. The microphone types include, for example, a dynamic microphone, a ribbon microphone, a carbon microphone, a piezoelectric microphone, a fiber optic microphone, a laser microphone, a liquid microphone, and an audio speaker used as a microphone. In some embodiments, the occupancy controller analyzes the audio data received from the microphone. In some embodiments, the occupancy controller 636 identifies one or more users based on voice biometrics of the audio received from microphone 726. Voice biometrics are the unique characteristics of a speaker's voice. Voice biometrics include voice pitch or speaking style that result from the anatomy of the speaker's throat and/or mouth. In some embodiments, the occupancy module 754 uses a text dependent voice recognition technique. In some embodiments, the occupancy module 754 uses a text independent voice recognition technique to identify the one or more users. Occupancy module 754 may be configured to store voice biometrics linked to individuals. Occupancy module 754 may be configured to match the stored voice biometrics to voice biometrics determined for occupants.

In some embodiments, the occupancy module 754 uses the text dependent voice recognition technique to identify the one or more users based on a password or particular phrase spoken by one of the users. For example, the user may speak a phrase such as "This is Felix, I am home." The occupancy module 754 can perform speech recognition to determine the spoken phrase "This is Felix, I am home" from the audio data received form the microphone. In some embodiments, occupancy module 754 uses one or a combination of a hidden Markov models, dynamic time warping, and a neural networks to determine the spoken phrase. Occupancy module 754 compares the determined spoken phrase to phrases linked to users. If the phrase, "This is Felix, I am home" matches a phrase linked to a user Felix, the occupancy controller identifies the user as Felix.

In some embodiments, occupancy module 754 uses the text independent voice recognition technique to identify one or more users based on particular voice biometrics of the user. The text independent voice recognition technique performs a pattern recognition technique to identify the particular voice biometrics of the speaker from the audio data received from the microphone. The voice biometrics include voice pitch and speaking style. In some embodiments, a plurality of techniques are used to identify the voice biometrics of the user. The techniques include frequency estimation, hidden Markov models, Gaussian mixture models, pattern matching algorithms, neural networks, matrix representation, Vector Quantization, and decision trees.

In some embodiments, the occupancy module 754 is configured to capture audio data from one or more users and perform pre-processing. In some embodiments pre-processing may be compressing the audio data, converting the audio data into an appropriate format, and any other pre-processing action necessary. The occupancy module 754 may be configured to transmit the captured spoken audio data to a voice recognition server via communications interface 732 and network 602 as described with reference to FIGS. 6-7. The voice recognition server (e.g., building management system 610) may be configured to determine the identity of the occupant and transmit the identity of the occupant to occupancy module 754.

Still referring to FIG. 11, control device 214 is configured to receive occupancy information 1104 from building management system 610. In some embodiments, building management system 610 may be configured to determine the location of a user based on trilateration methods as described with reference to FIG. 8. In various embodiments, building management system 610 may be configured to determine the location of a user based on signal strength to an emitter as described with reference to FIG. 9.

The building management system 610 may send the identity of the occupant and the location of the occupant in a building (e.g., building 10). In some embodiments, control device 214 is configured to cause zones and/or buildings to be controlled to environmental conditions (e.g., temperature setpoint, humidity setpoint, etc.) based on environmental condition preferences and location of the occupant. The control device 214 may be configured to generate control signals for HVAC equipment 738 to achieve the preferred environmental conditions. In various embodiments, the control device 214 may be configured to play music in different zones and/or cause a music platform (e.g., Pandora, Spotify, etc.) to play music preferences of the identified user in the zone and/or building which the user is located.

Figure 12:
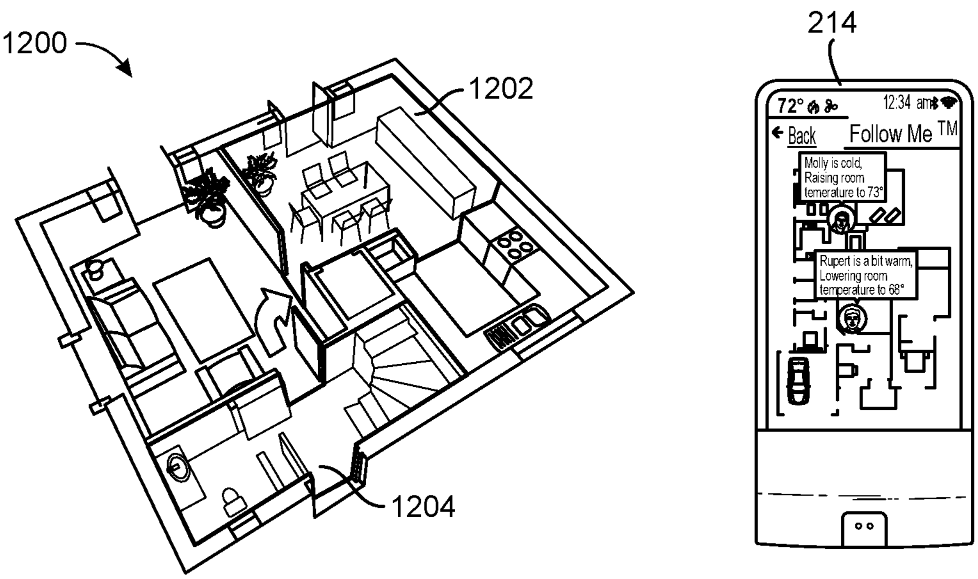
FIG. 12 is a drawing of a building space and an occupant tracking application on the control device of FIG. 7, according to an exemplary embodiment.
Figure 13:
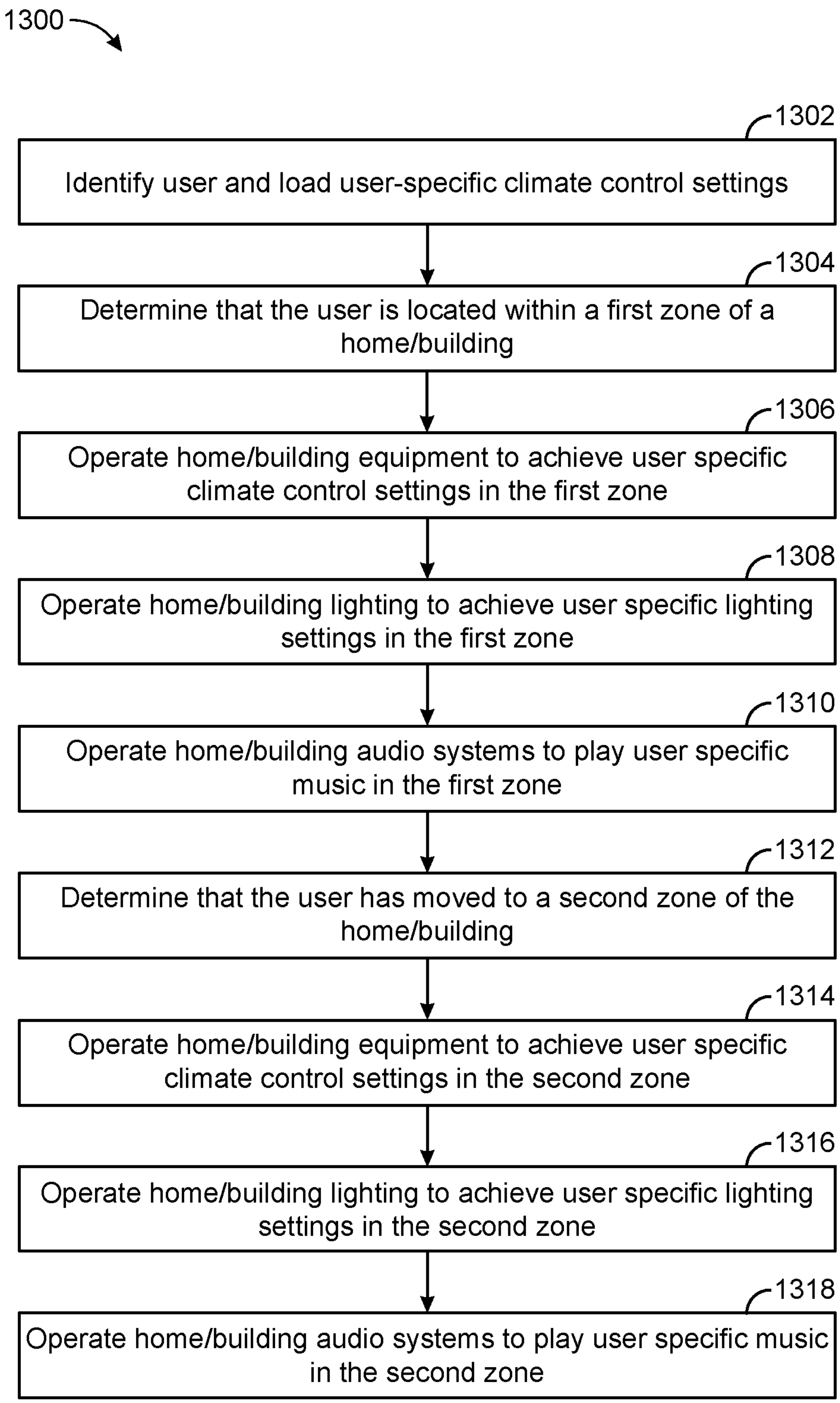
FIG. 13 is a flowchart of operations for controlling zones of a building with the control device of FIG. 11, according to an exemplary embodiment.

Referring now to FIGS. 12-13, a diagram 1200 and flowchart 1300 illustrating a process for controlling a building zone based on detected occupancy is shown, according to an exemplary embodiment. In some embodiments, the process is performed by occupancy module 754, as described with reference to FIG. 7. Control device 214 may identify a user and load user-specific climate control settings for the identified user (step 1302). In some embodiments, control device 214 identifies the user by communicating with a portable device carried by the user (e.g., a phone, a RFID card, a NFC tag, etc.) In other embodiments, the user is identified by voice (FIG. 11), by appearance (FIG. 11), trilateration of wireless signals from a user device (FIG. 8), communicating with wireless emitters via a user device (FIG. 9) or any other data collected by sensors in zones 1202 and 1204. Control device 214 may determine that the user is located within a first zone 1202 of a home or building (step 1304) and may operate home/building equipment to achieve the user-specific climate control settings in the first zone 1202 (step 1306). Control device 214 may turn the lights on in zone 1202 (step 1308). In some embodiments, the lights are dimmed to user specified levels. Control device 214 may be configured to operating music played in zones 1202 when the user is identified (step 1310). In some embodiments, the user is linked to specific songs, playlists, and/or volumes. Control device 214 may be configured to cause audio systems to play certain playlists and/or radios in zone 1202 when the user is identified in zone 1202.

Control device 214 may determine that the user has moved to a second zone 1204 of the home/building (step 1308) and may operate the home/building equipment to achieve the user-specific climate control settings in the second zone 1204 (step 1310). In some embodiments, control device 214 is configured to operate the lighting of zones 1202 and 1204 based upon the location of the user (step 1312). For example, control device 214 may turn off lights in zone 1202 and on in zone 1204 when the user moves from zone 1202 to zone 1204 (step 1316). Control device 214 may be configured to operating music played in zones 1202 and 1204 when the user moves from zone 1202 to 1204 (step 1316). For example, when the user moves to zone 1204, the music may stop playing in zone 1202 and being playing in 1204 (step 1318).

Figure 14A:
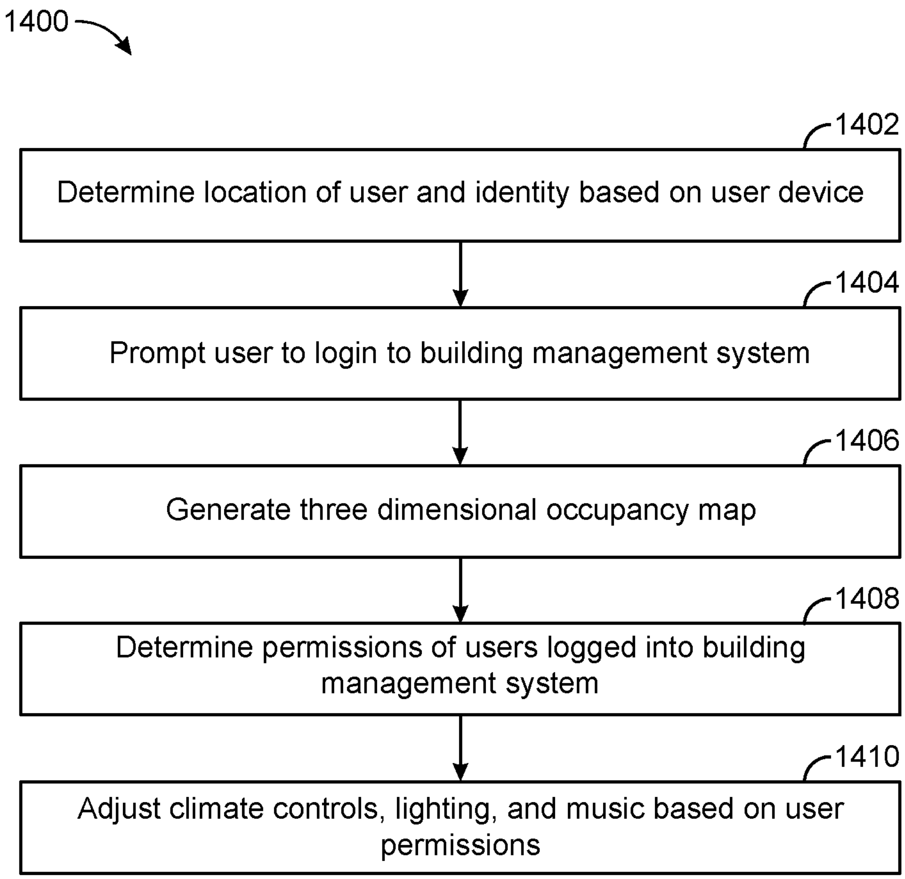
FIG. 14A is a flowchart of operations for controlling zones of a building with the control device of FIG. 11, according to an exemplary embodiment.

Referring now to FIG. 14A, a flowchart 1400 illustrating a building control process which may be performed by occupancy module 754 of control device 214 as described with reference to FIG. 7, according to an exemplary embodiments. In some embodiments, control device 214 is configured to determine the location and identity of a user based on wireless communication (step 1402) with user device 612 when user device 612 is associated with the user. In some embodiments, wireless triangulation is used to determine the location of the user based on signal strengths between user device 612 and routers and/or emitters as described with reference to FIGS. 8-9.

In some embodiments, a unique device identifier (e.g., a serial number, a hardware ID, a MAC address, etc.) may link user device 612 to a particular user profile. When user device 612 is determined to be in the building (e.g., building 10) the user may receive a command to authenticate (i.e., log in) with building management system 610 via user device 612 (step 1404). In some embodiments, user device 612 automatically authenticated with the building management system 610 based on a unique device identifier. In some embodiments, the authentication is performed directly between the user device and the building management system 610. In various embodiments, control device 214 receives the unique device identifier from the user device and facilitates the authentication with building management system 610. In various embodiments, the user may be prompted to enter a user name and password via user device 612 and/or user interface 702 of control device 214 to authenticate with the building management system 610.

In some embodiments, the building management system 610 may be configured to generate a three dimensional building map with the location and identity of multiple building occupants located on the map (step 1406). The building map may contain multiple floors, zones, buildings, and/or campuses. In some embodiments, the three dimensional building map may be accessible via a user device (e.g., user device 612) if the user device has the proper permissions to view the building map. In some embodiments, the user device must be associated with a technician, and/or any other building employee for the user to have access to the three dimensional building map.

In some embodiments, building management system 610 keeps a record of various occupants of the building and associated permissions with each occupant. In some embodiments, the permissions are music permission (i.e., if the user can change music, radio stations, volume, etc. of the music played in various zones of the building). In some embodiments, the permissions allow a user to change music, radio stations, music volume, environmental setpoints, lighting and/or any other adjustable setting of control device 214 via user interface 702, microphone 726, and/or user device 612 associated with the user. In some embodiments, the permissions to change and/or adjust environmental conditions (e.g., temperature setpoint, humidity setpoint, etc.) (step 1408). Based on the permissions and user preferences, the building management system 610 may be configured to send commands to the devices (e.g., control device 214) to adjust environmental zone conditions, lighting, and music of zones (step 1410).

Referring now to FIG. 14B, table 1412 of occupant permissions and preferences is shown, according to an exemplary embodiment. In some embodiments, the table may be permissions and preferences which control device 214 receives from building management system 610 as described with reference to FIG. 11 and/or FIG. 14A. In some embodiments, table 412 contains permissions and preferences for occupant A 1414, occupant B 1416, and occupant C 1418. Permissions and preferences for any number of occupants may be received from building management system 610 and/or stored on control device 214. Occupant A 1414, occupant B 1416, and occupant C 1418 may have preferred preferences such as preferred setpoint 1420, music 1422, lighting 1424, and shades/blinds 1426. Occupant A 1414, occupant B 1416, and occupant C 1418 may have permissions to change and/or operate certain features of control device 214 (i.e., setpoints, music, lighting, etc.) Any number of permissions and/or preferences may be received from building management system 610 for occupant A 1414, occupant B 1416, and occupant C 1418.

Occupant A 1414 has a preferred setpoint of 78 degrees F., occupant B 1416 has a preferred setpoint of 75 degrees F. and occupant C 1418 has no permission to change the setpoint. In some embodiments, when an occupant with a preferred setpoint moves from a first zone to a second zone, the preferred setpoint may follow the occupant and the second zone may be heated and/or cooled to the preferred setpoint. An occupant with no permission to change a setpoint (e.g., occupant C 1418) may not be able to make any changes to the setpoint.

In some embodiments, control device 214 may disable changes to the setpoint whenever occupant C 1418 is determined to be a set distances from control device 214. In some embodiments, control device 214 may disable changes to the lighting whenever occupant C 1418 is identified in the zone that control device 214 is located. In some embodiments, when occupant C 1418 is authenticated and/or logged in with the building management system and/or control device 214 as described with reference to FIG. 14A, occupant C 1418 may be notified via a user device (e.g., user device 612) that occupant C 1418 is unable to change the setpoint. In some embodiments, occupant C 1418 is notified via the user interface 702 (e.g., through images on electronic display 706, audio from speakers 710, etc.) that occupant C 1418 does not have permission to adjust the setpoint.

Occupant A 1414, occupant B 1416, and occupant C 1418 may have permissions and preferences for music 1422 such as the music played in zones of a building (e.g., building 10). In table 1412, occupant A 1414 has a preference for no music, occupant B 1416 has a preferred radio station, and occupant C 1418 does not have permission to play music. In some embodiments, whenever occupant B 1416 is in a zone, the building equipment in that zone may automatically play radio station AM 1130. In some embodiments, when occupant A 1414 enters a zone, the building equipment in that zone will automatically turn off any music that is playing. In some embodiments, any attempt by occupant C 1418 to play music and/or audio will be met by a notification that occupant C 1418 does not have the appropriate permissions to change the music and/or audio.

In some embodiments, control device 214 may disable changes to music preferences whenever occupant C 1418 is determined to be a set distances from control device 214. In some embodiments, control device 214 may disable changes to the lighting whenever occupant C 1418 is identified in the zone that control device 214 is located. In some embodiments, when occupant C 1418 is authenticated and/or logged in with building management system 610 and/or control device 214 via a user device (e.g., user device 612) as described with reference to FIG. 14B, occupant C 1418 may be notified via a user device (e.g., user device 612) that occupant C 1418 is unable to change the music preferences. In some embodiments, occupant C 1418 is notified via the user interface 702 (e.g., through images on electronic display 706, audio from speakers 710, etc.) that occupant C 1418 does not have permission to adjust the music preferences.

Occupant A 1414, occupant B 1416, and occupant C 1418 may have permissions and preferences for lighting 1424. In some embodiments, the lighting in zones and/or a building (e.g., building 10) may be adjusted based on permissions and preferences of occupant A 1414, occupant B 1416, and occupant C 1418. Occupant A 1414 may have no permission to change lighting. Occupant B 1416 may have a preference for lighting in the zone which occupant B occupies to be dim. Occupant C 1418 may have the preference that the lighting associated with the zone which occupant C 1418 occupies be at full brightness.

In some embodiments, control device 214 may disable changes to the lighting whenever occupant A 1414 is determined to be a set distances from control device 214. In some embodiments, control device 214 may disable changes to the lighting whenever occupant A 1414 is identified in the zone that control device 214 is located. In some embodiments, when occupant A 1414 is authenticated and/or logged in with building management system 610 and/or control device 214 via a user device (e.g., user device 612) as described with reference to FIG. 14A, occupant A 1414 may not have the ability to change the lighting settings of control device 214 and may be notified via a user device (e.g., user device 612) that occupant A 1414 is unable to change the lighting settings. In some embodiments, occupant A 1414 is notified via the user interface 702 (e.g., through images on electronic display 706, audio from speakers 710, etc.) that occupant A 1414 does not have permission to adjust the lighting settings.

Occupant A 1414, occupant B 1416, and occupant C 1418 may have permissions and preferences for shades/blinds 1426. In some embodiments, occupant A 1414 has the preference that natural light be used to illuminate the zone which occupant A 1414 occupies whenever possible. Using natural light may include opening shades, opening blinds, and/or opening shutters. Occupant B 1416 and occupant C 1418 may have no permission to open and/or close shades, blinds, and/or shutters. Any attempt by occupant B 1416 and occupant C 1418 to open and/or close shades, blinds, and/or shutters controlled by control device 214 may be met with a notification that occupants A 1416 and/or occupant C 1418 may not have the proper permission to open and/or close the shades, blinds, and/or shutters.

In some embodiments, control device 214 may disable changes to the shades and/or blinds whenever occupants B 1416 and/or occupant C 1418 are determined to be a set distance from control device 214. In some embodiments, control device 214 may disable changes to the shades and/or blinds whenever occupant B 1416 and/or occupant C 1418 are identified in the zone which control device 214 is located. In some embodiments, when occupant B 1416 and/or occupant C 1418 are authenticated with building management system 610 and/or control device 214 via a user device (e.g., user device 612) as described with reference to FIG. 14A, occupants B 1416 and/or occupant C 1418 may be notified via a user device (e.g., user device 612) that occupants B 1416 and/or occupant C 1418 are unable to change the shades and/or blinds. In some embodiments, occupant B 1416 and/or occupant C 1418 are notified via the user interface 702 (e.g., through images on electronic display 706, audio from speakers 710, etc.) that occupants B 1416 and/or occupant C 1418 do not have permission to adjust the shades and/or blinds.

Display and Emergency Features

Figure 15:
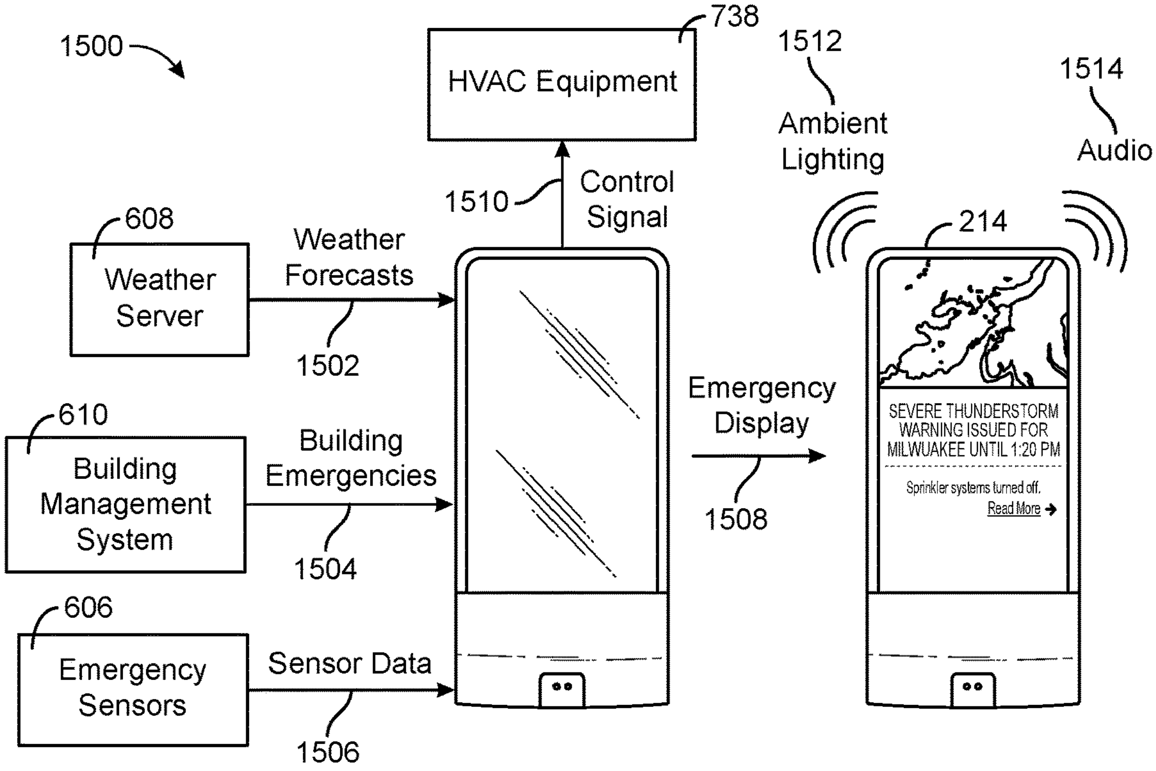
FIG. 15 is a diagram of the control device of FIG. 7 receiving emergency and weather notifications, according to an exemplary embodiment.
Figure 16A:
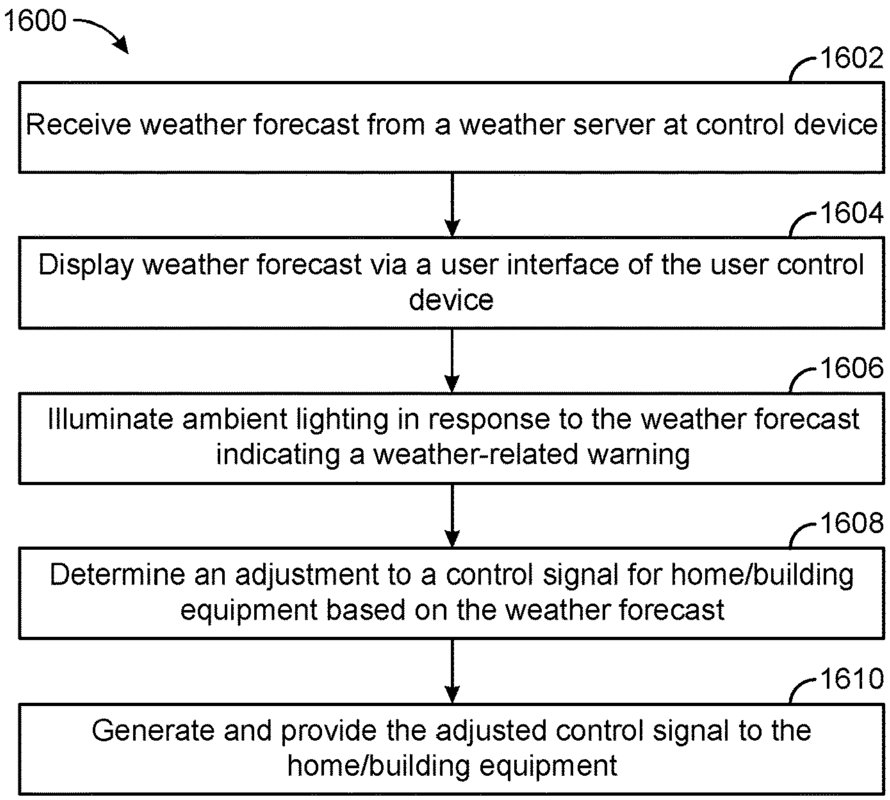
FIG. 16A is a flowchart of operations for receiving emergency information with the control device of FIG. 7, according to an exemplary embodiment.

Referring now to FIGS. 15 and 16A, a diagram 1500 and flowchart 1600 illustrating a control process which may be performed by emergency module 756 and/or building module 746, according to some embodiments. Control device 214 may receive a weather forecast 1502 from a weather server 608 (step 1602) and display the weather forecast 1502 via user interface 702 of control device 214 (step 1604). Control device 214 may illuminate ambient lighting 1512 of control device 214 in response to the weather forecast 1502 indicating a weather-related warning (step 1606). In some embodiments, audio 1514 may be generated when the weather forecast 1502 indicates a weather-related warning. The audio can be a siren, a warning message, and/or any other emergency related audio. Control device 214 may determine an adjustment to a control signal 1510 for HVAC equipment 738 based on the weather forecast (step 1608). Control device 214 may generate and provide an adjusted control signal 1510 to HVAC equipment 738. In some embodiments, the control signal 1510 may cause shutters and/or doors to automatically close. The control signal 1510 may cause building sirens (e.g., speakers 504) to play emergency related audio (e.g., "Please evacuate the building", "Take shelter away from windows", etc.)

Figure 16B:
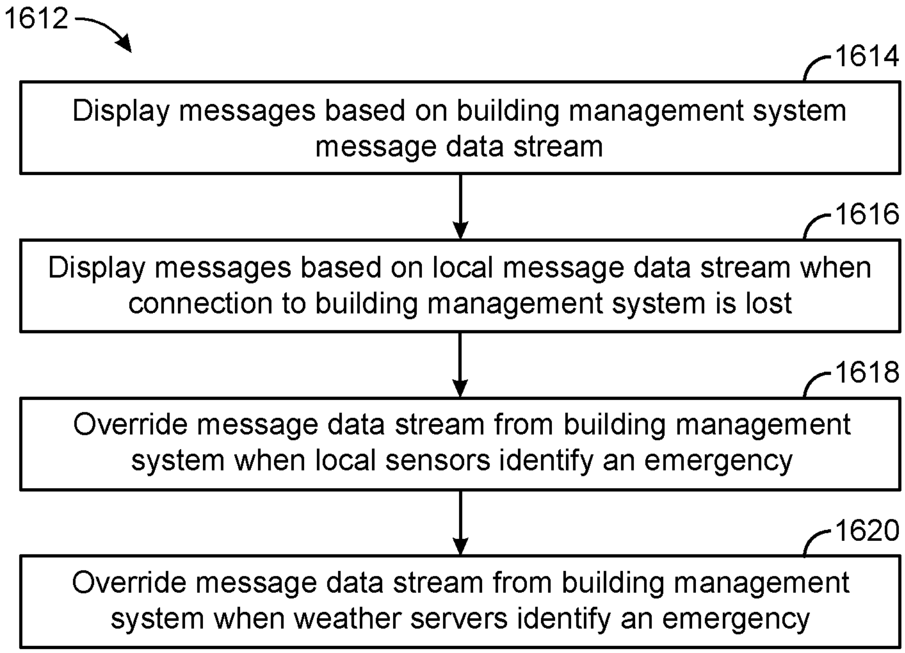
FIG. 16B is a flowchart of operations for prioritizing messages and data streams with the control device of FIG. 7, according to an exemplary embodiment.

Referring now to FIG. 16B, a flowchart of process 1612 illustrating the propriety of message data streams is shown, according to an exemplary embodiment. In some embodiments, process 1612 may be operated by control device 214 as described with reference to FIG. 7. In step 1614, control device 214 receives messages (e.g., general messages, emergency messages, etc.) based on a data stream from the building management system (e.g., building management system 610). Control device 214 may be configured to display general messaging (e.g., zone temperatures, building events, etc.) and/or emergency information on user interface 702 based on a data stream received from building management system 610.

In some embodiments, if a connection is lost between control device 214 and building management system 610, control device 214 may display messages stored and/or generated locally on control device 214 (step 1616) on user interface 702. In some embodiments, the display messages stored and/or generated locally on control device 214 include zone temperatures, zone humidity, building events, etc. In the event that an emergency is detected by emergency sensors (e.g., building emergency sensor(s) 606) connected to control device 214, the general messages received from building management system 610 may be overridden and emergency messages may be display on user interface 702 based on data received from the emergency sensors (step 1618). In some embodiments, when the data received from the emergency sensors is above a predefined threshold and/or below another predefined threshold, an emergency may be identified. In the event that an emergency is detected by emergency sensors (e.g., building emergency sensor(s) 606) connected to control device 214, the general messages stored locally and/or determined by control device 214 may be overridden and emergency messages may be display on user interface 702 based on data received from the emergency sensors.

In some embodiments, control device 214 may receive a message from a weather server (e.g., weather server 608). Control device 214 may be configured to override general messages received from building management system 610 when a notification for weather related emergency and/or any other type of emergency is received from weather server 608 (step 1620). Control device 214 may be configured to display weather related emergency notifications and directions via user interface 702 over the general messages received from building management system 610.

Figure 17:
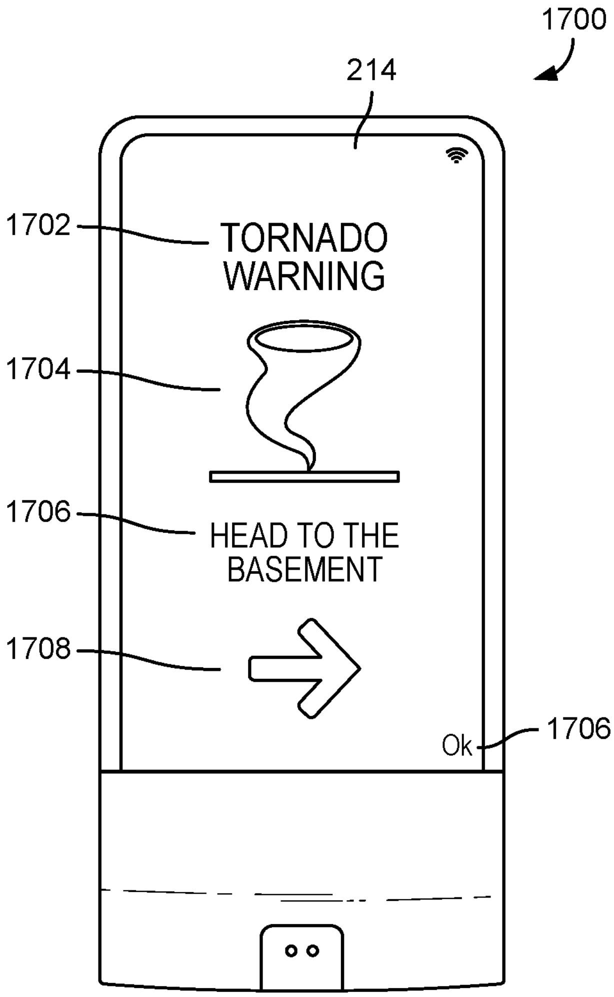
FIG. 17 is a drawing of the control device of FIG. 15 displaying an emergency warning, according to an exemplary embodiment.

Referring now to FIG. 17, a drawing of a device displaying an emergency screen 1700 during an emergency situation is shown, according to an exemplary embodiment. In some embodiments, emergency screen 1700 may be displayed by control device 214. Emergency screen 1700 is shown to include an alert title 1702, an alert icon 1704, instructions 1706, directions 1708, and menu option 1710.

Emergency screen 1700 is shown to have an alert title 1702 describing the contents of the page. In this exemplary embodiment, the title is "TORNADO WARNING." In some embodiments, alert title 1702 is customizable to provide more information. In other embodiments, alert title 1702 is customizable to provide less information. Alert title 1702 may be a button which takes the user to a page related to the title. For example, clicking alert title 1702 may take a user to a menu of pages related to "TORNADO WARNING." In some embodiments, clicking and/or pressing alert title 1702 navigates to a website and/or other entity. The website may be a weather server and may provide more information into the nature of the emergency.

Emergency screen 1700 is also shown to have an alert icon 1704. In this exemplary embodiment, alert icon 1704 is an image of a tornado. Alert icon 1704 may be any symbol, text, etc., and indicates the nature of the alert. For example, alert icon 1704 may be an image of a snowflake, text reading "FLOOD," text reading "FIRE," text reading "ACTIVE SHOOTER," etc. Alert icon 1704 provides information to a user about the alert, and may be any indicator relating to any type of emergency.

Emergency screen 1700 is shown to have instructions 1706. Instructions 1706 can provide information to a user about how to proceed in the current situation. In some embodiments, instructions 1706 may inform a user of how to exit a building. For example, instructions 1706 may inform a user of which room to head to. In other embodiments, instructions 1706 inform a user of which authorities to inform, etc. For example, instructions 1706 may instruct a user to call an ambulance, then the police, then building and/or campus security. Instructions 1706 may be downloaded from a network (e.g., network 602). In some embodiments, instructions are requested from network 602. In various embodiments, instructions are pushed to control device 214. Instructions 1706 may be stored for access by control device 214 in specific situations. In some embodiments, instructions 1706 may be stored locally on control device 214. In other embodiments, instructions 1706 may be stored remotely from control device 214. Instructions 1706 may be stored anywhere and retrieved by control device 214.

Emergency screen 1700 is also shown to have directions 1708. In some embodiments, directions 1708 may be an embodiment of instructions 1706. In other embodiments, directions 1708 provide different information from instructions 1706. Directions 1708 may provide a user information regarding where to go. For example, directions 1708 may be an arrow pointing in the correct direction to go. In some embodiments, control device 214 is portable, and may detect movement to alter directions 1708. For example, directions 1708 may change depending on the direction a user is facing. Directions 1708 may be any indicator providing directional information, and is not limited to those specifically enumerated.

Emergency screen 1700 is also shown to have a menu option 1710. In this exemplary embodiment, option 1710 is an "Ok" button. For example, option 1710 may accept the prompt. In some embodiments, option 1710 may simply dismiss the prompt. In other embodiments, option 1710 may proceed to the next action. In some embodiments, option 1710 is a forward button, a menu, etc. Option 1710 may perform any function, and is not limited to those specifically enumerated.

Figure 18:
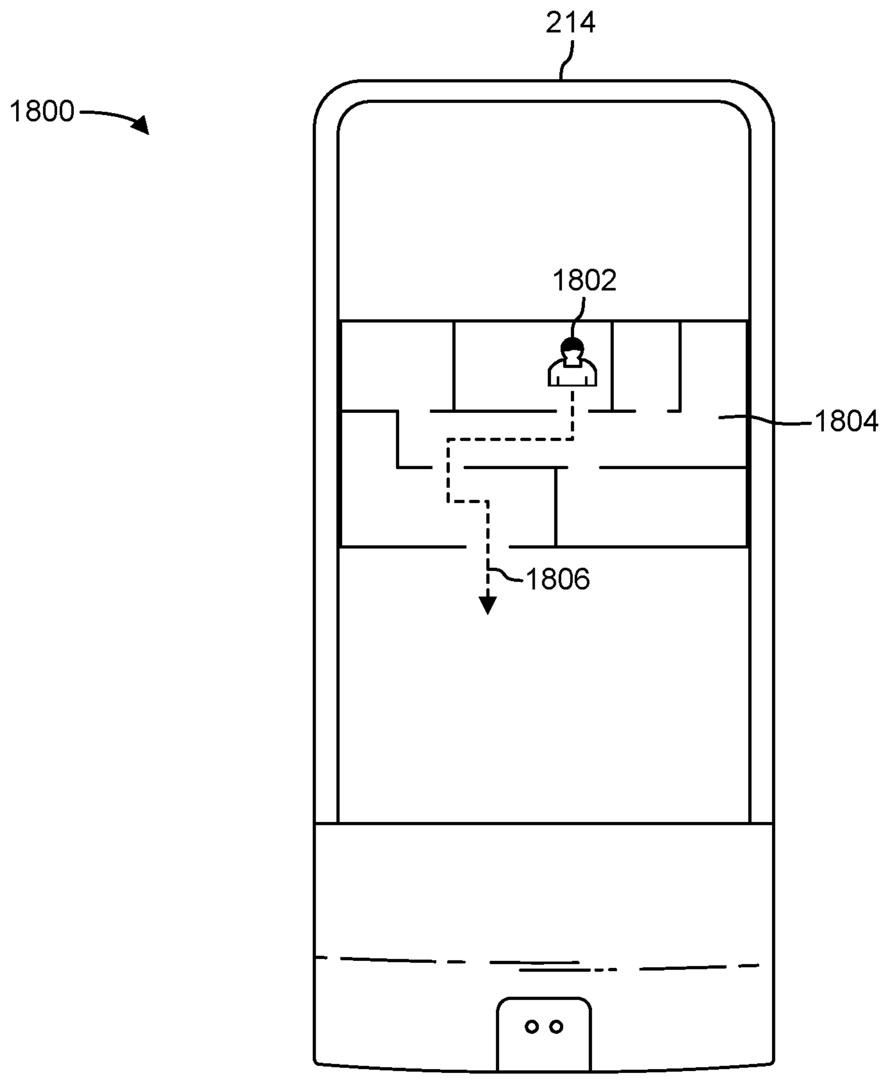
FIG. 18 is a drawing of the control device of FIG. 15 displaying an evacuation route, according to an exemplary embodiment.

Referring now to FIG. 18, an emergency screen 1800 of an evacuation route is shown, according to an exemplary embodiment. In some embodiments, emergency screen 1800 is displayed by control device 214. Screen 1800 is shown to include position indicator 1802, floorplan 1804, and directions 1806. Screen 1800 may include other elements and components, and is not limited to those specifically enumerated.

Screen 1800 is shown to include position indicator 1802. Position indicator 1802 may provide information on the whereabouts of a user, or another person, item, component, etc. For example, in this exemplary embodiment, position indicator 1802 is shown as an image of a person, and indicates the position of the person. In some embodiments, position indicator 1802 may indicate the position of multiple users, items, etc. Position indicator 1802 may further include a differentiating label, which may indicate which user, item, etc. is shown by each of the multiple indicators. In other embodiments, position indicator 1802 may indicate the position of a single user, item, etc. Position indicator 1802 may be any symbol, text, etc., and is not limited to those specifically enumerated.

Screen 1800 is shown to include floorplan 1804. Floorplan 1804 may be a diagram of a floorplan of an area serviced by control device 214. In some embodiments, the area is the area in which control device 214 is installed. In other embodiments, the area is another area, and may be selected by a user. In some embodiments, floorplan 1804 may show multiple locations. For example, floorplan 1804 may show both floors of a two-story building. A user may be able to select multiple locations to display (e.g., the top floor and the fourth floor of a 35 story building). In other embodiments, floorplan 1804 may show a single location. Floorplan 1804 may display any number of any locations, and is not limited to those specifically enumerated.

Screen 1800 is also shown to include directions 1806. Directions 1803 may provide information to a user regarding how to navigate to a certain location (i.e., evacuate). In some embodiments, directions 1806 provide the fastest route out of a building. For example, directions 1806 may direct a user to the exit of a building in case of an emergency. In other embodiments, directions 1806 provide a user with a route to a specified location. For example, directions 1806 may direct a user to a shelter (e.g., a basement fallout shelter, a safe location with no windows, etc.) In yet other embodiments, directions 1806 may allow a user to select options for the route. For example, a user may be able to indicate that she wishes to stay on the same floor, avoid stairs, etc. In yet other embodiments, directions 1806 may enable a user to select multiple destinations. For example, a user may indicate that he wishes to stop by a supply room before continuing to a conference room. The user may be able to make edits to any selections made. Directions 1806 are not limited to those forms and features specifically enumerated.

Figure 19:
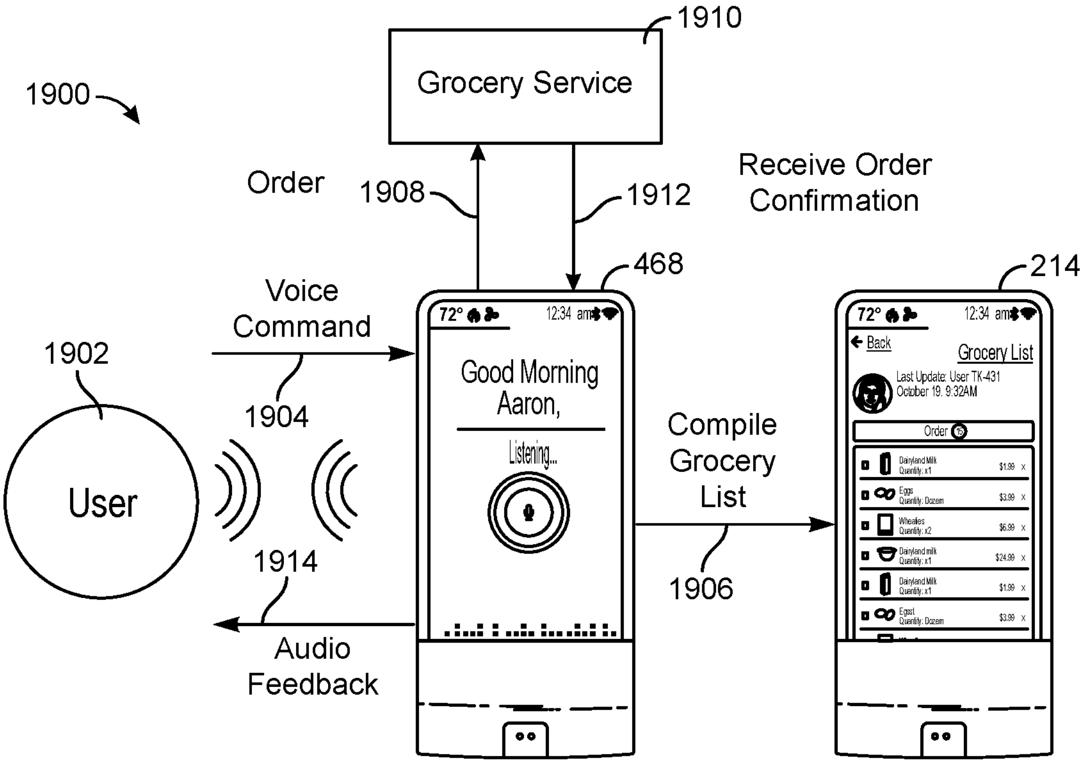
FIG. 19 is a drawing illustrating the control device of FIG. 7 compiling a grocery list, according to an exemplary embodiment.
Figure 20:
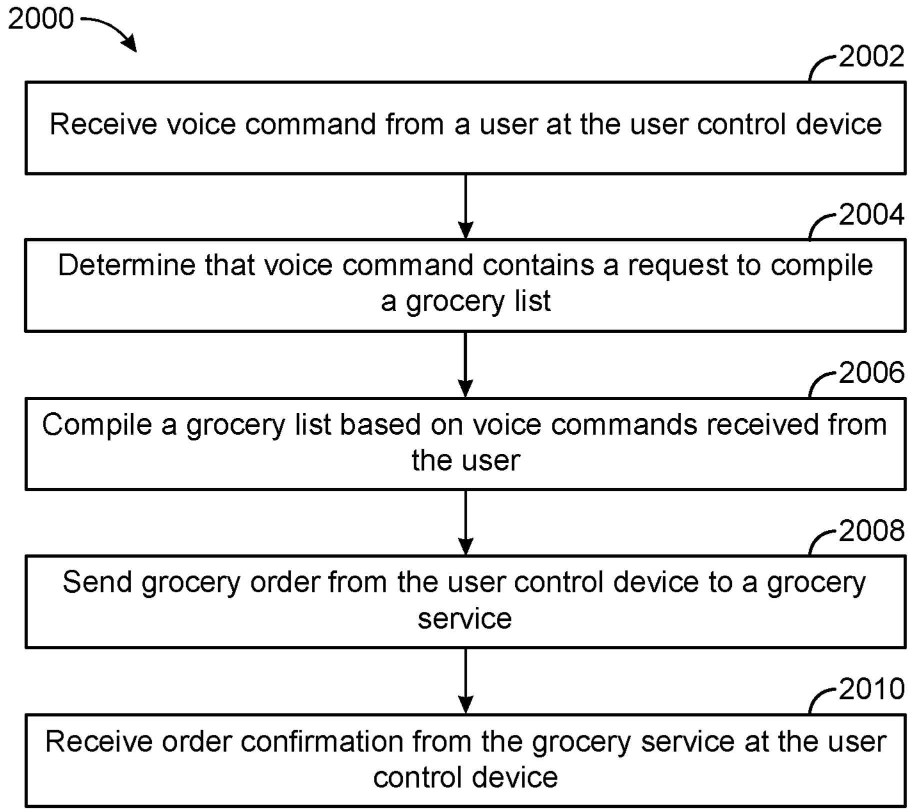
FIG. 20 is a flowchart of operations for compiling a grocery list with the control device of FIG. 19, according to an exemplary embodiment.

Referring now to FIGS. 19-20, a diagram 1900 and flowchart 2000 illustrating a control process which may be performed by voice control module 748 is shown, according to an exemplary embodiment. In some embodiments, flowchart 2000 is performed by voice command module 744. Control device 214 may receive a voice command 1904 from a user 1902 (step 2002) via a microphone (e.g., microphone 726) and may determine that the voice command 1904 contains a request to compile a grocery list (step 2004). In some embodiments, the voice command 1904 may be a concierge question as described with reference to FIGS. 30-32. Control device 214 may compile a grocery list 1906 based on the voice command 1904 received from the user 4102 (step 4156). In some embodiments, control device 214 replies to a concierge questions via a speaker (e.g., speaker 710). In some embodiments, control device 214 is configured to send a grocery order 1908 to a grocery service 1910

(step 2008) and receive an order confirmation 1912 from the grocery service 1910 (step 2010). Control device 214 may provide an audio feedback 1914 indicating that the grocery list has been updated and/or that the grocery order has been placed. In various embodiments, the grocery list can be updated and/or an order can be placed through touch based input. In some embodiments, the steps of flowchart 2000 can be performed by touching buttons on a touch screen associated with control device 214.

Health Care and Hospital Features

Figure 21:
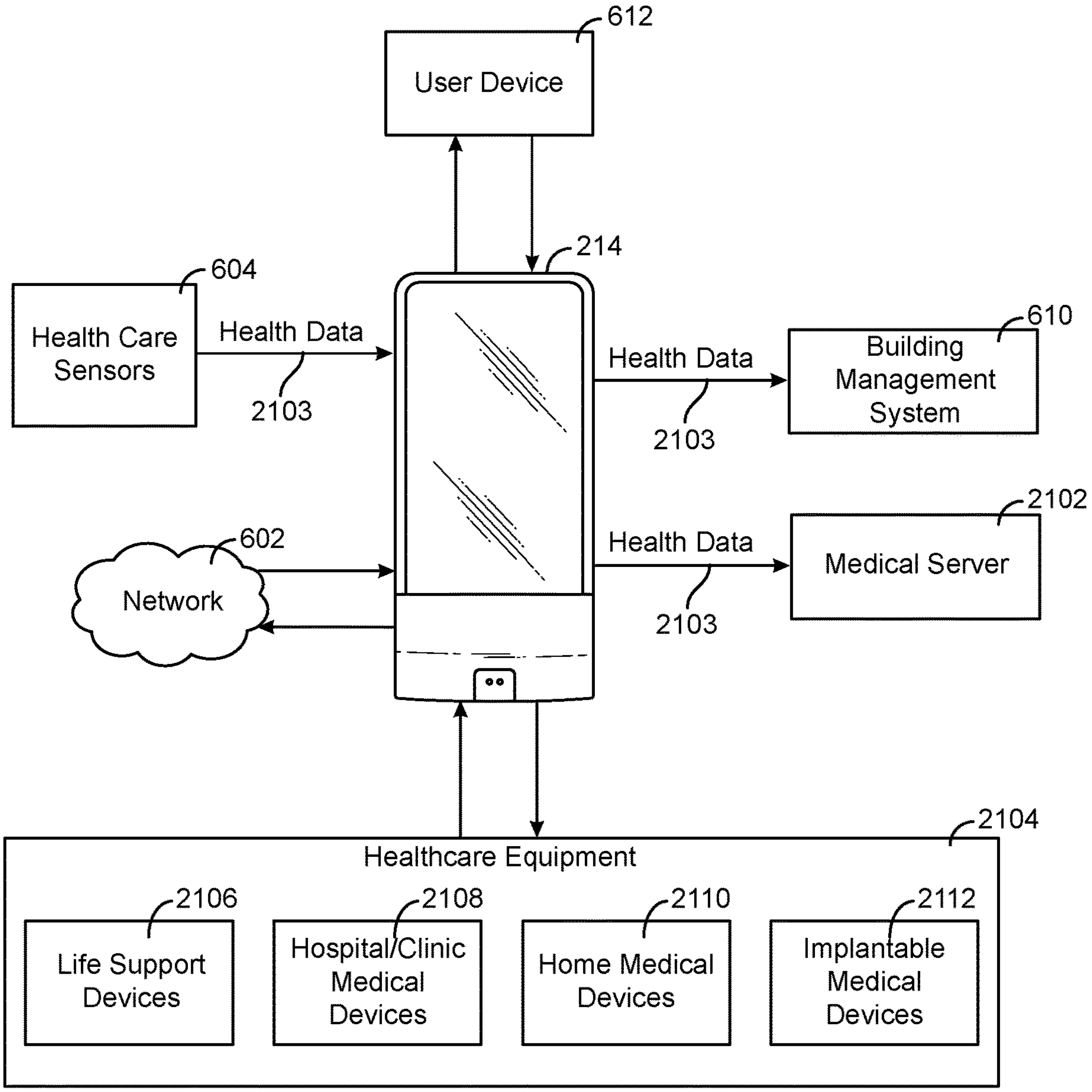
FIG. 21 is a diagram of the control device of FIG. 7 communicating with health related devices and systems, according to an exemplary embodiment.

Referring now to FIG. 21, control device 214 is shown to communicate to various health care devices and systems, according to an exemplary embodiment. In some embodiments, healthcare module 752 facilitates healthcare functions of control device 214. Control device 214 shown to interact with healthcare sensors 604, user device 612, building management system 610, medical server 2102 and network 602. In some embodiments, control device 214 communicates with healthcare equipment 2104. In various embodiments, the healthcare module 752 communicates with healthcare equipment 2104 directly and/or via network 602. In some embodiments, healthcare equipment 2104 is shown to include life support devices 2106, hospital/clinic devices 2108, home medical devices 2110, or implantable medical devices 2112 (e.g., pacemakers, cardioverter defibrillators, etc.).

Healthcare module 752 facilitates healthcare functionality of control device 214. Functions performed by healthcare module 752 may include monitoring the health of occupants of the area in which control device 468 is installed. In some embodiments, healthcare module 752 may monitor an occupant's health through data collected by healthcare sensors 604 and/or may determine a health metric for the occupant based on the data collect by healthcare sensors 604. For example, healthcare module 752 may monitor an individual's health by tracking his temperature through healthcare sensor 604. In some embodiments, healthcare sensor 604 is one or more or a combination of a smartwatch, a smart wrist band, a heart rate monitor, a pacemaker, a portable insulin device, and/or any other wearable medical device. In some embodiments, healthcare sensor 604 is a camera, an infrared camera, and/or any other occupancy detection device. Healthcare module 752 may use healthcare sensors 604 to monitor a user's waking/rest times, heart rate, insulin levels, body temperature, etc. Healthcare module 752 is not limited to monitoring the health attributes specifically enumerated, and may monitor any aspect of a user's bio-status. In some embodiments, control device 214 is configured to forward any data collected by healthcare sensors 604 and/or healthcare equipment 2104 to medical server 2102. In some embodiments, medial server 2102 is a hospital server, a nurses station computing system, and/or an emergency response operator server.

Healthcare module 752 may communicate with user interface 702 or user device 612 belonging to a user to sense and collect health data. For example, healthcare module 752 may communicate with an individual's smartwatch which contains a heart rate monitor to track the individual's heart rate. In some embodiments, control device 214 does not communicate with healthcare sensors 604 which monitor a user's health, and instead collects data solely from healthcare equipment 2104. In other embodiments, control device 214 contains sensors and collects data from other devices, combining the data collected to produce a general metric of a user's health.

Healthcare module 752 may detect a change of a predetermined amount or a sensor value over or under a predetermined threshold value (e.g., abnormally high and/or low heart rate (i.e., bradycardia and tachycardia), abnormally high and/or low insulin level, abnormally high and/or low temperature, etc.). In some embodiments, healthcare module 752 may monitor the heart rate of an occupant and determine if the heart rate is abnormal (i.e., arrhythmia). In some embodiments, healthcare module 752 may alert a user, the monitored occupant, a nurse's station computing system, a hospital server, a hospital computing system, call 911 (i.e., send a message to an emergency response server and/or an emergency response computing system) etc. For example, healthcare module 752 may communicate with user device 612 of a user to display an alert describing the situation triggering the healthcare alert. Healthcare module 752 may communicate with network 602 to update a healthcare system (e.g., medial server 2102) with new data collected, set a flag on a user's condition, etc. For example, healthcare module 752 may send data to a patient database and update a value for a body temperature, blood pressure, etc.

In some embodiments, a heart rate and/or body temperature is measured by a smart wrist band and/or smart watch (e.g., healthcare sensors 604). The heart rate and/or body temperature (e.g., health data 2103) may be sent to control device 214. In some embodiments, healthcare sensors 604 are cameras. The cameras may be heat sensitive. The heat images (e.g., health data 2103) may be sent to control device 214. Control device 214 may determine the body temperature of various occupants of a building (e.g., building 10) based on the heat images (e.g., health data 2103) received form healthcare sensors 604.

Healthcare module 752 may send push alerts to user device 612 from network 602. For example, network 602 may receive a notification that it is time for a middle school individual to take her medication. Control device 214 may communicate with user device 612 of the individual, a teacher, a nurse, etc. to alert the user of user device 612 that it is time for the individual to take her medication. In some embodiments, control device 214 may communicate with a user through user interface 702 to convey healthcare information. For example, network 602 may receive a notification that it is time for an individual's appointment with the nurse. Network 602 may communicate with control device 214 to convey the information to the nurse, the individual, the individual's current teacher, etc. For example, control device 214 may have access to a user's schedule and/or calendar, and adjust actions accordingly. In some embodiments, control device 214 may determine that an individual is currently in math class, and may send an alert to user device 612 of the individual. In other embodiments, control device 214 may determine that an individual is currently in a free period with a specific teacher in a specific room, and may send an alert to a control device 214 installed in the room, or to a user device 612 of the teacher. Control device 214 may convey healthcare information through any media, and is not limited to those specifically discussed.

Healthcare module 752 may contain some or all of the features of occupancy module 754. The occupancy detectors (e.g., healthcare sensors 604, sensors 714, etc.) may be installed in a patient room in a health care facility and may be used to monitor the presence of the patient in the room. Healthcare module 752 may communicate with the network 602, medical server 2102, and/or building management system 610 to alert medical personnel if a patient leaves their room without permission. Healthcare module 752 may communicate with a user interface to determine the identities of persons in a patient's room. For example, the occupancy detector may use a camera and facial recognition software to determine the identities of medical personnel that are present. Healthcare module 752 may use camera and facial recognition to determine the presence of visitors and other unauthorized personnel in a patient's room.

In some embodiments, the healthcare module 752 communicates with users or relevant persons when an emergency situation arises (e.g., building management system 610, medical server 2102, user device 612, etc.) Healthcare module 752 may receive the patient's health information from the network, healthcare sensors 604, and/or healthcare equipment 2104, and display it to medical personnel if a medical alert is detected (e.g., abnormal blood pressure, abnormal oxygen saturation, abnormal heart rate, abnormal heart rhythm, etc.). In another embodiment, healthcare module 752 may communicate to the patient or to medical personnel when a regular medical procedure is scheduled. For example, healthcare module 752 may communicate to the patient or to medical personnel when a pill is to be taken, when an IV is to be replaced, when a wound dressing is to be changed, etc. In another embodiment, healthcare module 752 may communicate with alert module to communicate with user device 612 of a patient. For example, if a patient is undergoing treatment requiring regular pill taking may receive alerts from an alert module on a mobile device (e.g., a smartphone, smart watch, wearable, laptop, etc.).

Healthcare module 752 may communicate with any systems, devices, etc. connected to control device 214. For example, healthcare module 752 may issue an alert to medical personnel which is pushed to control device 214 (e.g., a nurse's station) and mobile devices (e.g., user device 612 of medical personnel assigned to the patient, etc.) Healthcare module 752 may issue an alert which is pushed to user devices 612 through network 602. Healthcare module 752 may be in communication with all modules of control device 214.

In some embodiments, healthcare module 752 may require the credentials of healthcare personnel to make changes related to treatment of the patient. The healthcare module 752 may record the unique identity of any user making changes to a patient's treatment.

Figure 22:
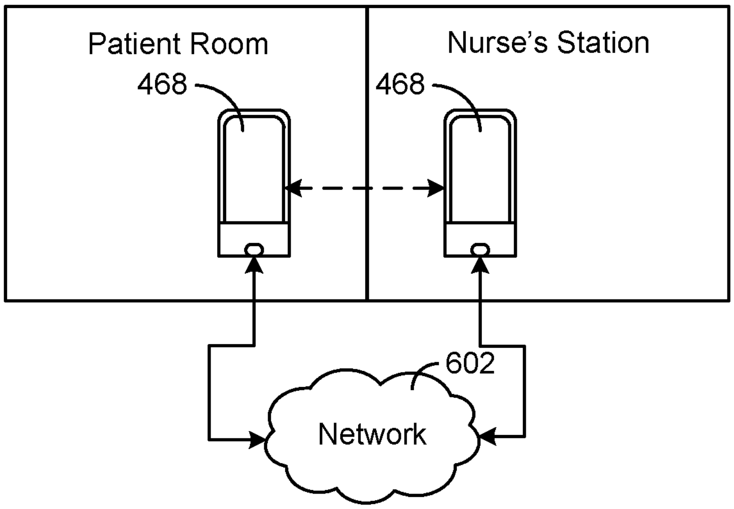
FIG. 22 is a drawing of a medical application for the control device of FIG. 21, according to an exemplary embodiment.
Figure 23:
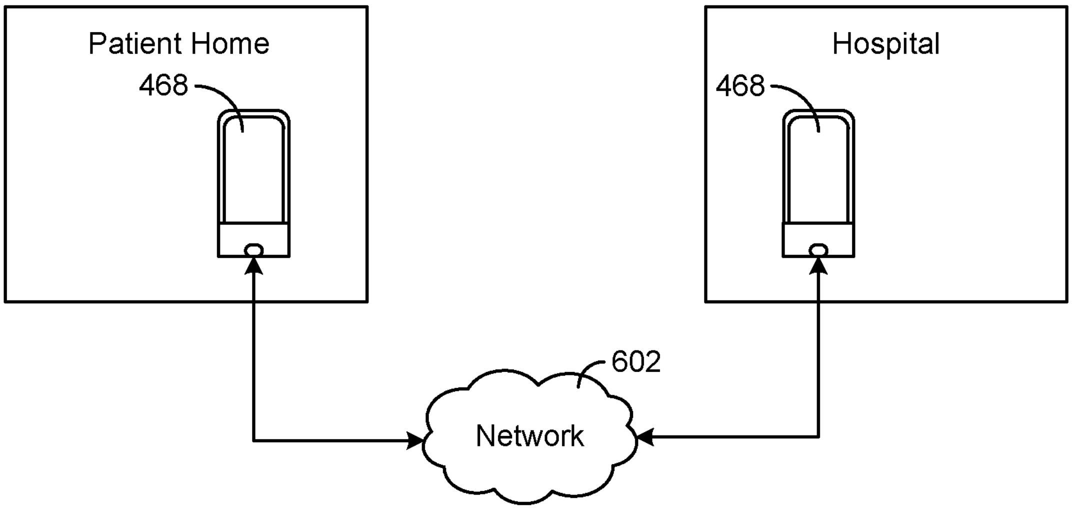
FIG. 23 is a drawing of another medical application for the control device of FIG. 21, according to an exemplary embodiment.

Referring now to FIGS. 22 and 23, drawings of control device 214 communicating with other control devices 468 are shown, according to exemplary embodiments. In some embodiments, other control device 214 may be located locally, such as in another room of the same building. For example, referring to FIG. 22, control device 214 is located in a patient's room in a hospital. Control device 214 may communicate with another control device 214 at a nurse's station in the same hospital. The control device 214 may be directly connected and may communicate directly with each other. In another embodiment, the control device 214 may be connected via a network.

In various embodiments, other control devices 468 are located remotely, such as in other buildings, states, countries, etc. For example, referring to FIG. 23, control device 214 in a patient's home or an assisted living facility may communicate with control device 214 at a hospital to facilitate out-patient care of the patient. Other control devices 468 may be located anywhere relative to control device 214, and are not limited to locations specifically discussed or described.

In an exemplary scenario, a patient may be discharged from a medical care facility, such as a hospital to their home or to an assisted living facility. The patient may, for example, have received a routine checkup or may have been treated for a chronic or acute medical situation. The patient may be automatically monitored by healthcare equipment 2104 as descried with reference to FIG. 21 after being discharged using one or more control device 214 provided in the patient's home or assisted living facility. The patient's health may be monitored using implantable medical devices 2112 or home medical devices 2110 to allow remote medical personnel to monitor the post care recovery of the patient. Control device 214 may be utilized to facilitate continuing medical care (e.g., physical therapy, medication schedule, follow-up visits to a medical facility, etc.).

Control device 214 may continue to monitor the health of the patient after receiving medical care. If control device 214 detects a medical alert, it may take an action, depending on the severity of the medical alert. For example, control device 214 may prompt the patient to return to the hospital, alert a local medical person (e.g., an in-home nurse or caretaker), or may have an ambulance sent to the patient's location.

In some embodiments, control device 214 can transmit patient data to a central computer system (over a local network or via the internet) in compliance with HIPPA standards and regulations.

In some embodiments, control device 214 may not collect personal health data without consent of the person whose data is being collected. In other embodiments, control device 214 may offer an opt-out system, where control device 214 is prevented from collecting personal health data when a user specifically opts out. In yet other embodiments, control device 214 may collect data from all users, and anonymize all data before storing, analyzing, etc. For example, control device 214 may collect data from all patients undergoing a particular procedure and anonymize all data before sending to a research facility, hospital, etc.

Control device 214 may collect data from each person, and each person is given a window of time to opt-out out retroactively or delete data. In some embodiments, control device 214 may communicate with the users through the user interface, a mobile device, and/or the network to inform users that their data has been collected. For example, control device 214 may push a notification out to all applicable users over the network that his or her information has been collected, and will be stored or sold to a hospital within 24 hours. In some embodiments users may be given the full 24 hours to opt-out or delete data. In other embodiments, users may be given any predetermined period of time in which to respond or take action.

Control device 214 may communicate with users to ask for permission to share his or her information. For example, control device 214 may display a prompt on a mobile device of each person whose data was collected. In some embodiments, control device 214 may share a user's data when permission has been granted. In other embodiments, control device 214 may share non-sensitive user data that has been anonymized.

Figure 24:
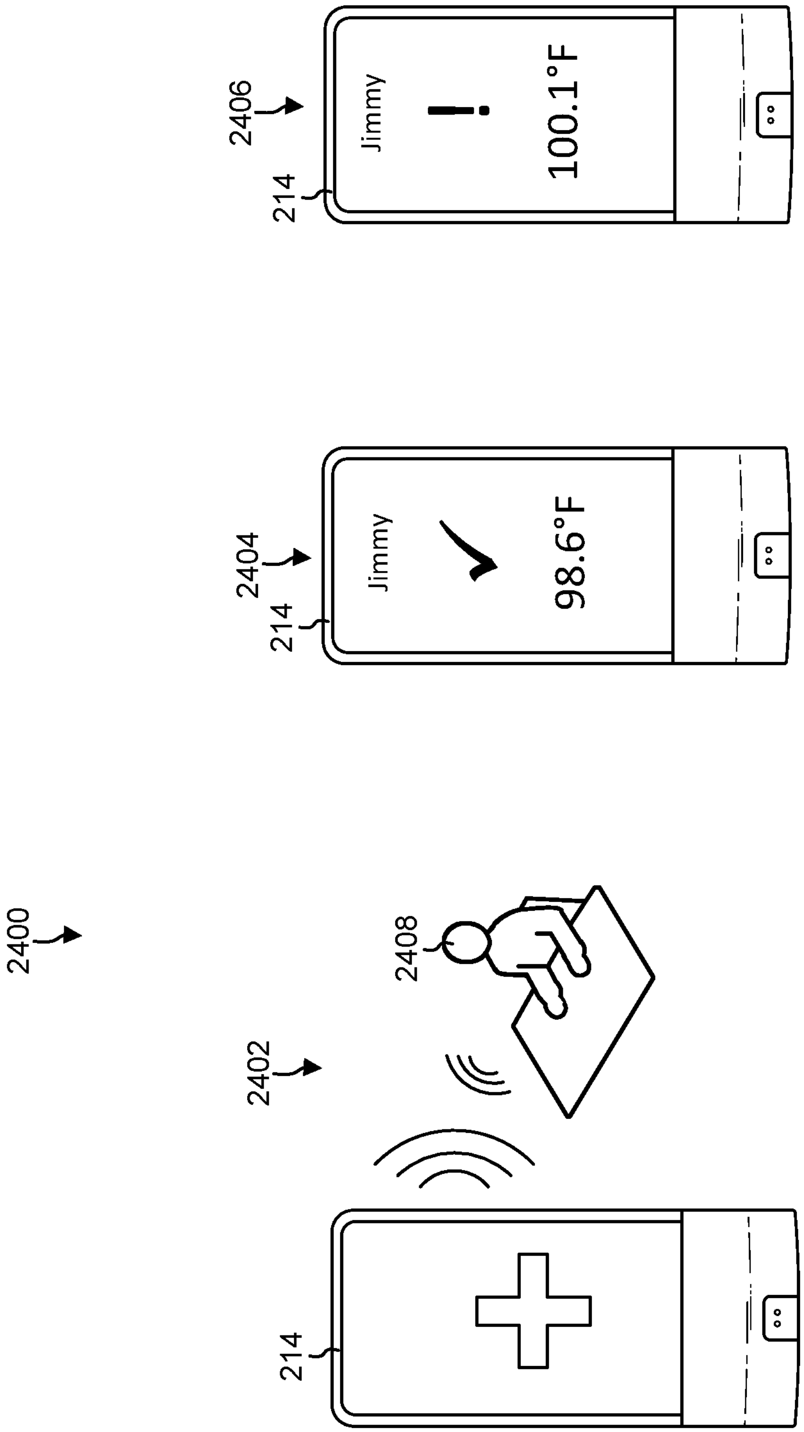
FIG. 24 is a diagram of the control device of FIG. 21 monitoring the health of an individual, according to an exemplary embodiment.

Referring now to FIG. 24, a diagram of scenario 2400 in which control device 214 monitors an individual's 2408 health is shown, according to some embodiments. In part 2402, control device 648 is shown to communicate with an individual 2408 via audio, visual items on a screen, a device, etc. The device may be a smartphone, smart watch, fitness tracker, etc. In other embodiments, the device may be a medical device, such as a pace maker, insulin pump, etc. The device may be any device, and is not limited to those specifically enumerated.

The individual 2408 may communicate directly with control device 214 through a user interface, voice commands, etc. For example, individual 2408 may tell control device 214 that he does not feel well. In some embodiments, control device 214 may trigger an alert or take some other action depending on the information received. In other embodiments, control device 214 may wait for specific instructions to take action before executing any commands.

In part 2404, a screen of control device 214 during normal health monitoring operation is shown. Control device 214 has confirmed that individual's 2408 body temperature, displays the temperature, the individual's name, an indication that all is well, and takes no further action. In some embodiments, control device 214 stores the information. In other embodiments, control device 214 sends the information to healthcare institutions, facilities, professionals (e.g., medical server 2102, building management system 610, etc.) Control device 214 may handle all information in accordance with HIPAA rules and regulations.

Control device 214 may monitor and collect any health data, such as blood pressure, heart rate, etc. For example, control device 214 may communicate with a heart rate monitor, and raise an alarm if an individual's heart rate becomes irregular, over a threshold rate, etc. For example, control device 214 may detect that an individual is experiencing a high amount of stress using a combination of body temperature and heart rate. Control device 214 is not limited to the health statistics specifically enumerated.

In part 2406, control device 214 has automatically detected that a health condition has arisen. In this exemplary depiction, the health condition is a fever, detected by the high body temperature. In other embodiments, the health condition may be high stress, arrhythmia, low blood sugar, etc. Control device 214 may produce a sound, vibrate, flash the screen, etc. to present an alert to a user. In some embodiments, control device 214 may send a signal to a user device (e.g., user device 612, network 602, building management system 610, medical server 2102, etc.) or some other system or device to display the alert, as described above.

Figure 25:
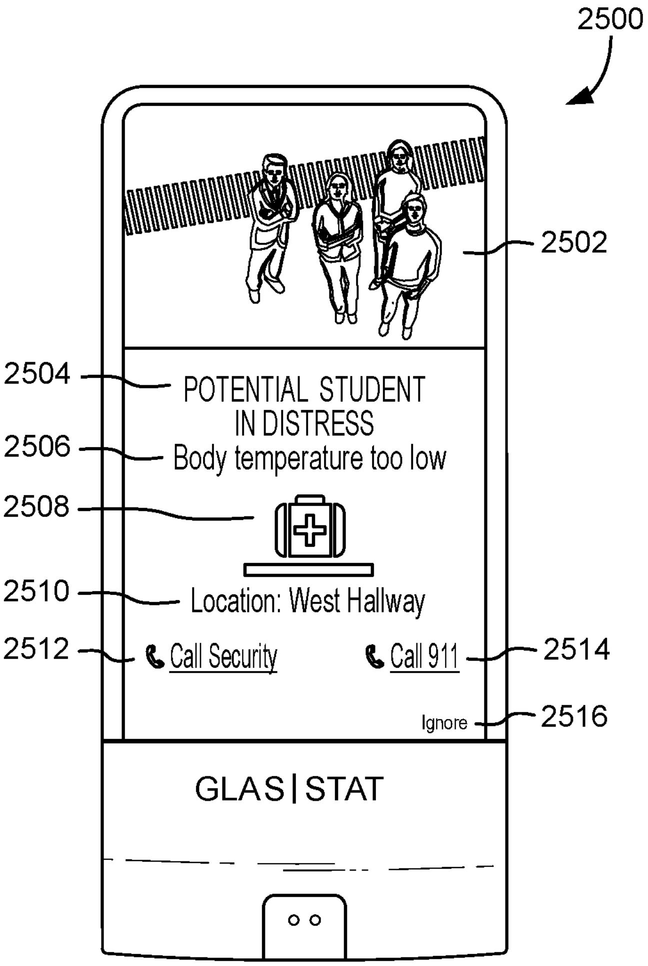
FIG. 25 is a drawing of a medical emergency screen displayed by the control device of FIG. 21, according to an exemplary embodiment.

Referring now to FIG. 25, a drawing of a screen 2500 displayed when an individual is in distress is shown, according to an exemplary embodiment. Screen 2500 is shown to include a live feed 2502 of the particular individual. In some embodiments, live feed 2502 may be a map or floorplan indicating where the individual is located. In other embodiments, live feed 2502 may be a still photo of the individual to help healthcare professionals locate the individual.

Screen 2500 further includes an alert message 2504 and a cause 2506. Alert message 2504 may display any message, such as "STUDENT COLLAPSE," "STUDENT EMERGENCY," etc. In some embodiments, alert message 2504 may be customized to provide more information, such as the individual's name, emergency contact information, etc. In other embodiments, alert message 2504 may be customized to display anything that may be more helpful or appropriate for the environment in which user control device is installed. Alert message 2504 is not limited to those messages specifically enumerated.

Cause 2506 may be any reason, such as "Cardiac distress," "Low blood sugar," etc. In some embodiments, cause 2506 may be customized to provide more information, such as the individual's name, emergency contact information, etc. In other embodiments, cause 2506 may be customized to display anything that may be more helpful or appropriate for the environment in which user control device is installed. Cause 2506 is not limited to those messages specifically enumerated.

Screen 2500 is further shown to include an icon 2508. Icon 2508 may give a user a quick impression of what the alert is related to. Control device 214 is capable of providing alerts for many different categories, such as inclement weather, security, health, etc. Control device 214 is not limited to those categories specifically enumerated. Icon 2508 may be a symbol, a word, etc., and may be any indication of what the alert is related to.

Screen 2500 is further shown to include a location 2510. Location 2510 may give a user the location of the particular individual to which the alert is related. In some embodiments, location 2510 is provided as text. In other embodiments, location 2510 is provided as a map. For example, location 2510 may be displayed as live feed 2502. Location 2510 may be displayed or presented to the user in any form, and is not limited to those specifically enumerated.

Screen 2500 is finally shown to include options 2512, 2514, and 2516. Options 2512, 2514, and 2516 may provide a user with options of actions to take. In some embodiments, screen 2500 may include more options. In other embodiments, screen 2500 may include fewer options. The options presented may be customized to be more appropriate for each situation. For example, if an individual's insulin pump needs to be restarted, control device 214 may present the option of restarting the pump. In some embodiments, option 2516 to ignore the alert may not be available. For example, if an individual is in critical condition, such as cardiac arrest, user control device may automatically execute options 2512 and 2514 by calling security and 911.

Concierge and Hotel Features

Figure 26A:
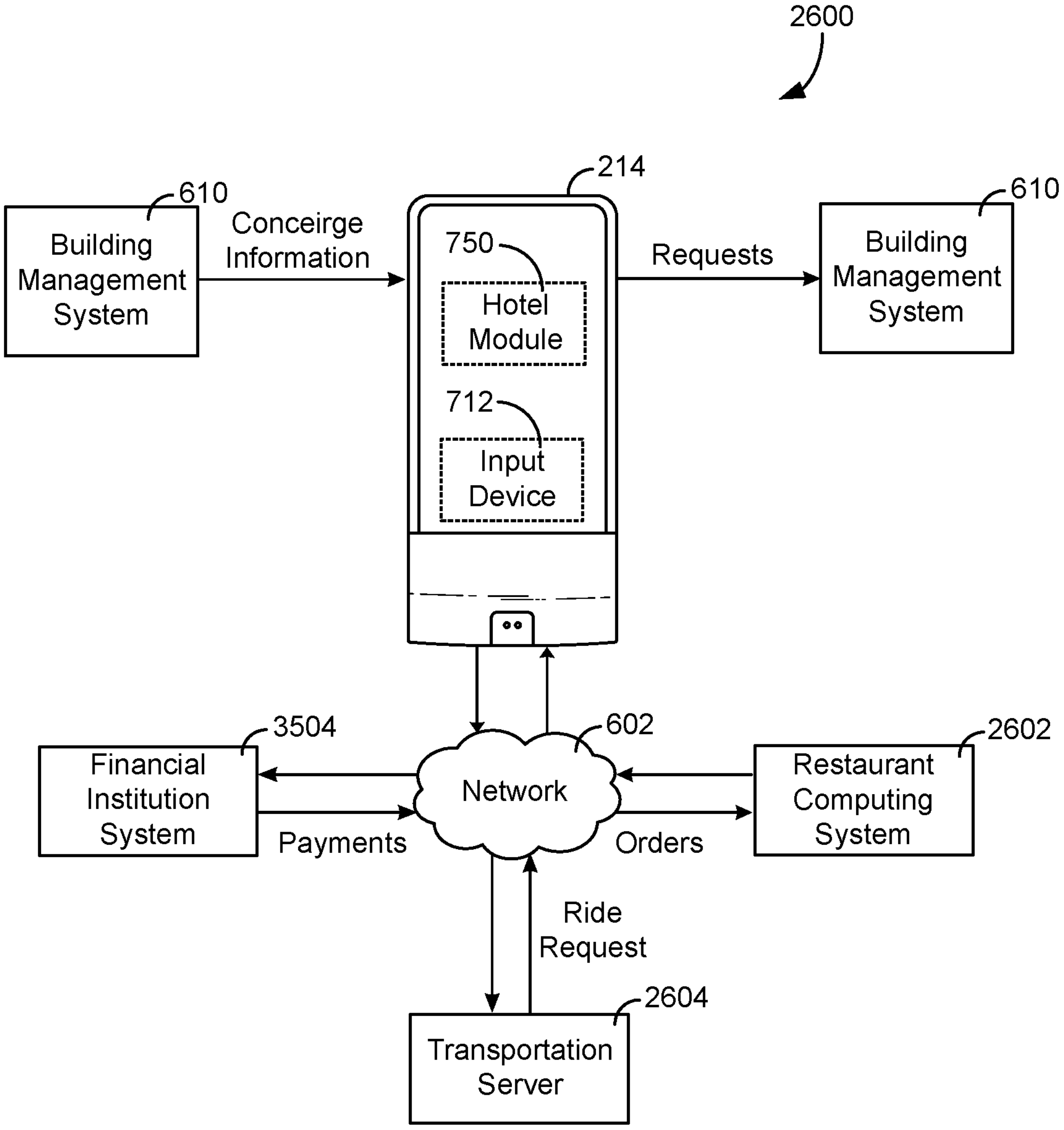
FIG. 26A is a diagram of the control device of FIG. 7 for hotel use, according to an exemplary embodiment.

Referring now to FIG. 26A, a diagram of control device 214 is shown for use in a hotel, according to an exemplary embodiment. In some embodiments, control device 214 receives concierge information from building management system 610. In some embodiments, the concierge information may include local attractions, local restaurants, and/or any other concierge related information. In some embodiments, hotel module 750 is configured to cause control device 214 to send a request for specific concierge information to building management system 610 via network 602 when a user requests concierge information via user interface 702 and/or microphone 726. In some embodiments, hotel module 750 may cause control device 214 to search for concierge information via the Internet (e.g., network 602) if the building management system does not have the requested concierge information.

In some embodiments, hotel module 750 is configured to process orders for food from local restaurants. In some embodiments, control device 214 (i.e., hotel module 750) may send a request to a restaurant computing system 2602 for a menu. Control device 214 may display the menu to the user via user interface 702 and may allow the user to order food directly through user interface 702 (i.e., enter orders through user interface 702). In some embodiments, the user may be able to send a reservation request to restaurant computing system 2602 via hotel module 750 and display device 702. A user may place an order via user interface 702 causing hotel module 750 to communicate with restaurant computing system 2602 via network 602. Hotel module 750 may cause payment module 758 to process any payment transactions for food orders with financial institution system 3504. Payment transactions are described in further detail at FIGS. 35-39.

In some embodiments, hotel module 750 is configured to process requests for taxis, busses, subways, trains, and/or planes. In some embodiments, control device 214 communicates with transportation server 2604. Transportation server 2604 may be Uber, Lyft, and/or any other taxi service. In some embodiments, transportation server 2604 is an airline server, a buss server, a train server, etc. Hotel module 750 may allow a user to request a ride from transportation server 2604 and may cause payment module 758 to process payment transactions via network 602 and financial institution system 3504. In some embodiments, input device 712 may be configured to scan credit and/or debit cards for payment for transactions with restaurant computing system 2602 and/or transportation server 2604. In some embodiments, payment module 758 facilitates the transaction with financial institution system 3504. Input device 712 is described in further detail in FIGS. 35-39.

Figure 26B:
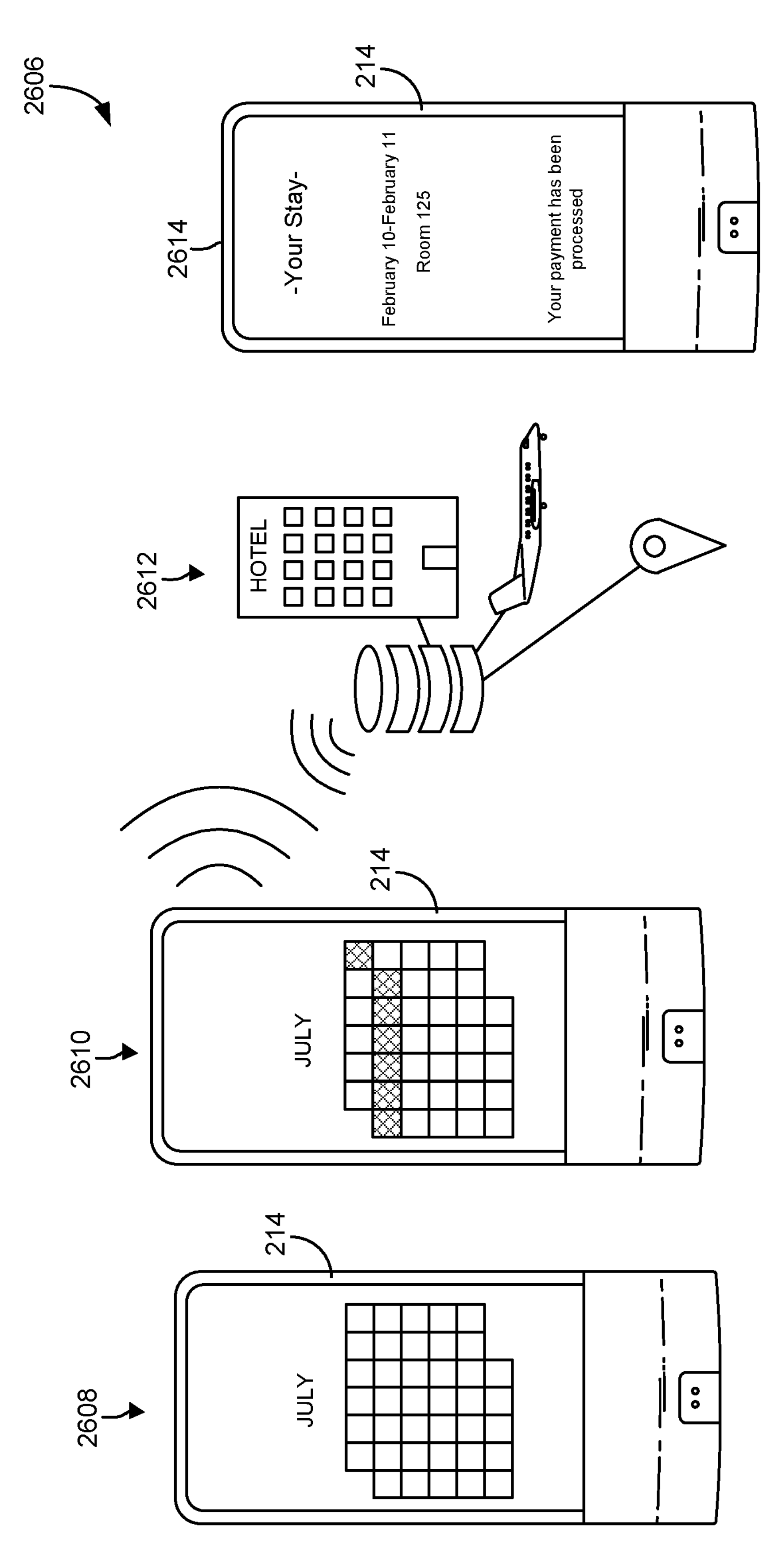
FIG. 26B is a flow diagram of operations for scheduling hotel reservations with the control device of FIG. 7, according to an exemplary embodiment.

Referring now to FIG. 26B, a process 2606 for scheduling a stay at a hotel is shown, according to some embodiments. In some embodiments, process 2606 is performed by hotel module 750 of control device 214. Process 2606 may be applied to scheduling any event, and is not limited to hotels, cruises, etc. Process 2606 begins with step 2608, in which a user provides input to a control device 214. The user may provide input through any means. For example, the user may provide input by voice command, tactile input to a user interface (e.g., user interface 702), gesture input, input to a mobile device (e.g., user device 612), etc.

According to this exemplary embodiment, a calendar interface may be provided to a user via the user interface and/or the mobile device. In some embodiments, the calendar interface may show the user's appointments and events. For example, a user's work and personal calendar events may be displayed on the calendar interface. In other embodiments, multiple users' schedules may be displayed on the calendar interface.

The calendar interface may show information such as availabilities for a hotel. In some embodiments, the control device 214 is located inside the hotel which it displays availability for. In some embodiments, the calendar interface may provide all availabilities. In other embodiments, the calendar interface may be sorted according to room size, amenities, etc. The calendar interface may not be specific to a single hotel. In some embodiments, the calendar interface may display availabilities for multiple hotels. The hotels shown may be selected by a user. In other embodiments, control device 214 may automatically select multiple hotels according to criteria such as price range, length of stay, amenities, distance to destinations, hotel ratings, etc.

The information may be displayed in any format. For example, control device 214 may display the information as drop-down boxes, check boxes, etc. In some embodiments, control device 214 may display content directly from a hotel's website, a travel website, etc. In other embodiments, control device 214 may display content parsed from a website, in a format native to control device 214.

Process 2606 continues with step 2610, in which a user selects a range of days for her stay at the hotel. In some embodiments, a user selects a range of consecutive days. In other embodiments, a user may select a set of non-consecutive days. The user may enter other information, such as billing information, number of guests, destination, etc. In some embodiments, the calendar interface may display the range of days selected as darkened days, checked boxes, etc. The information input by the user is transmitted from control device 214 to a building management system for a hotel (e.g., building management system 610) and/or any other server for the hotel.

Process 2606 continues with step 2612, the information transmitted from control device 214 is received by a database. In some embodiments, control device 214 may book a stay at the hotel directly using entered billing information. In other embodiments, control device 214 connects the user to a travel agent, to the hotel's booking website with the fields pre-populated, etc. The information transmitted from control device 214 may be received by any system, and is not limited to databases. In some embodiments, the database is connected to a hotel's main system, and hotel staff are notified. In some embodiments, the hotel's main system is building management system 610.

The database may be connected to additional services, such as destinations, airlines, etc. For example, control device 214 may automatically suggest flights from a billing address entered by the user to the destination entered by the user. In some embodiments, control device 214 may automatically select flights and present the user with a confirmation dialog. In other embodiments, control device 214 presents a set of available flights for the scheduled hotel stay. Control device 214 may also suggest, book, etc. activities, such as local attractions, tours, ground transportation, etc.

Control device 214 may learn from information entered by the user with his permission. For example, control device 214 may store information such as a user's preferences for flight times, direct vs. non-direct flights, seat preferences, hotel chain preferences, pillow firmness preferences, attractions, tours, ground transportation, etc. A user may be presented with a dialog confirming that she is allowing control device 214 to store or analyze such data. In some embodiments, the data is stored remotely. In other embodiments, the data is stored locally on control device 214.

Process 2606 continues with step 2614 in which control device 214 provides the user with information. In some embodiments, control device 214 provides a confirmation of all bookings made. In other embodiments, control device 214 provides a list of prospective bookings, contact information for each option, etc. Control device 214 may provide the user with any information. In some embodiments, control device 214 may not provide the user with further information.

In this exemplary embodiment, control device 214 is shown to provide the user with information through a user interface (e.g., user interface 702). In other embodiments, control device 214 may provide the user with information through any medium, format, etc. For example, control device 214 may provide the user with information through speakers (e.g., speakers 710), a mobile device (e.g., user device 612), etc.

Figure 27:
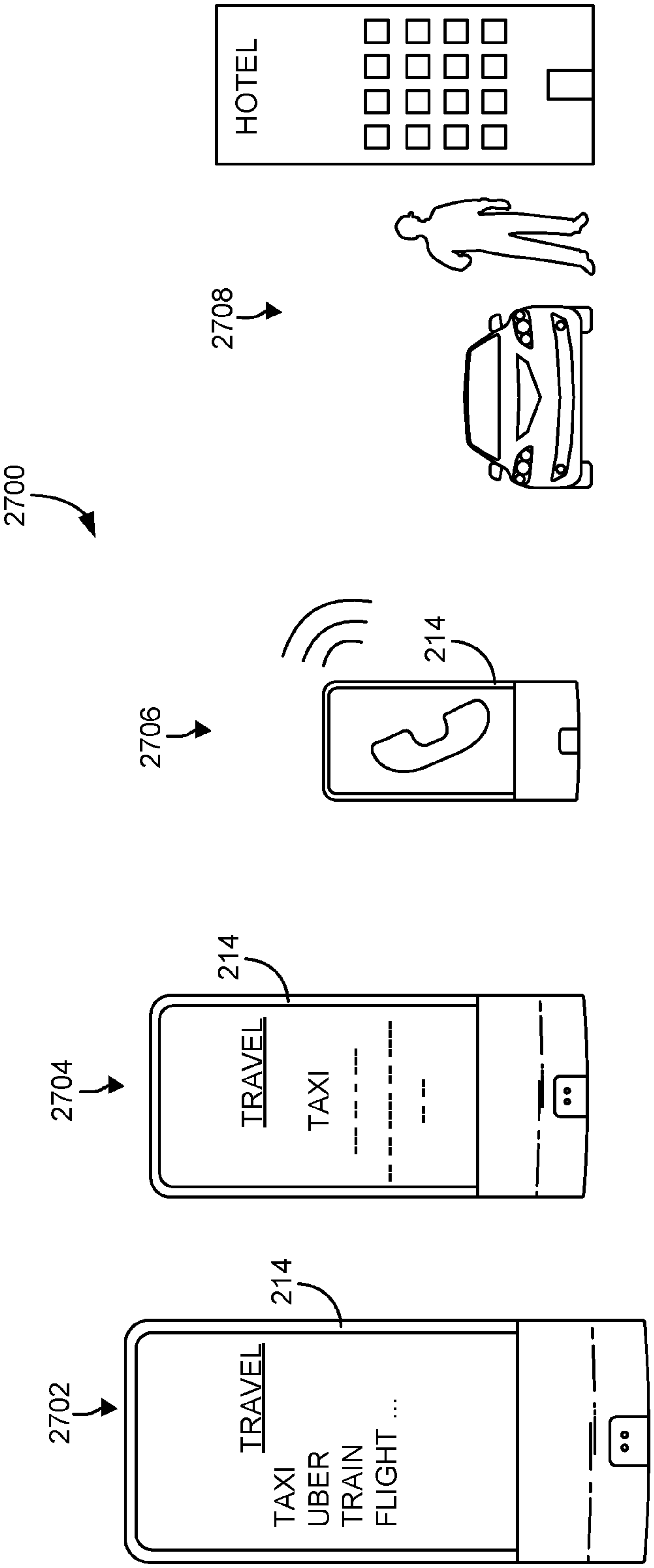
FIG. 27 is a flow diagram of operations for calling a taxi with the control device of FIG. 7, according to an exemplary embodiment.

Referring now to FIG. 27, a process 2700 for arranging transportation via control device 214 is shown, according to some embodiments. In some embodiments, process 2700 is performed by voice command module 744 and/or hotel module 750. Process 2700 begins with step 2702, in which a user is presented with a screen having options for arranging transportation. In some embodiments, process 2700 is performed automatically. In other embodiments, a user may choose to enter a transportation mode to arrange transportation via control device 214.

Process 2700 continues with step 2704, in which control device 214 may present the user with a list of available modes of transportation. For example, control device 214 may present the user with a list of links to different sites of different modes of transportation. In some embodiments, each option is a link which takes the user to a set of available options. Availability may be determined by criteria such as the current time, the desired time, the location, the distance, the mode of travel, extra considerations for the passenger (oversize luggage, animals, etc.), etc. In some embodiments, the user may enter the criteria via user interface 702. In various embodiments, the user may enter the criteria via microphone 726 and voice command module 744. Control device 214 may suggest the closest form of transportation if the selected mode is unavailable. In some embodiments, control device 214 may make suggestions and/or arrange the list of modes of transportation (i.e., most relevant mode of transportation to least relevant mode of transportation) based on the most commonly used, least expensive, fastest, a target destination, etc. For example, if no taxis are available at the desired time, control device 214 may suggest taking the subway.

Process 2700 continues with step 2706, in which control device 214 may make arrangements for the final selection. For example, once the user has selected the taxi company, times, options, etc., control device 214 may place a call to the company to make arrangements. In some embodiments, control device 214 may enter the information in the company's website. In other embodiments, control device 214 may present the information to the user, who will make the final arrangements himself.

Process 2700 continues with step 2708, in which the user is connected with her transportation. In some embodiments, the transportation travels to pick up the user. In other embodiments, the user travels to board the transportation. The travel arrangements may be made for travelling to a destination, travelling from a destination, etc. Travel arrangements may be made for any purpose.

Figure 28:
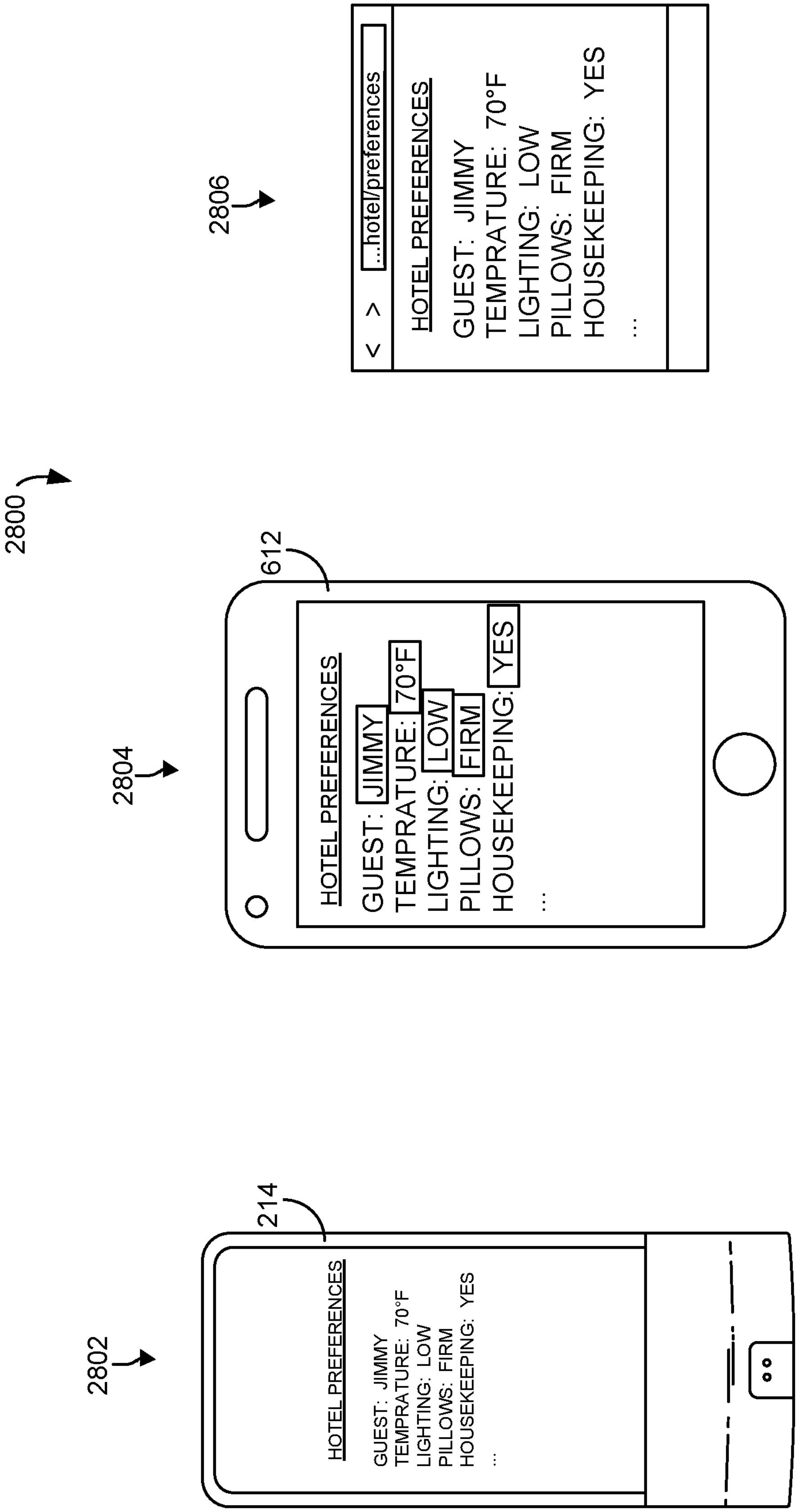
FIG. 28 is a set of drawings of screen displays for selecting room preference of a hotel with the control device of FIG. 7, according to an exemplary embodiment.

Referring now to FIG. 28, drawings of embodiments 2802, 2804, and 2806 are shown illustrating options to set arrangement preferences, according to some embodiments. Some embodiments are useful in hotel arrangements. In other embodiments, a user may select preferences for any arrangements, such as travel (e.g., flights, ground transportation, etc.). Embodiment 2802 shows a preferences interface displayed on control device 214. Available options may include guest name, temperature preference, lighting preference, pillow firmness preference, housekeeping preference, etc. Any options may be available for a user to select, and a user may be able to change her preferences. For example, a user may prefer low lighting in the summer and medium lighting in the winter. Embodiment 2804 shows a preferences interface displayed on user device 612 of a user. Embodiment 2806 shows a preferences interface displayed on a web browser.

Other ways of making arrangements may be available via control device 214. In some embodiments, a user may be able to set preferences through voice command, gesture input, etc. In other embodiments, a user may set preferences through specific applications, the hotel's website, etc. In some embodiments, the control device 214 can send payment and/or credit card information for the transportation. In some embodiments, hotel module 750 may process payment with input device 712 and payment module 758.

Figure 29:
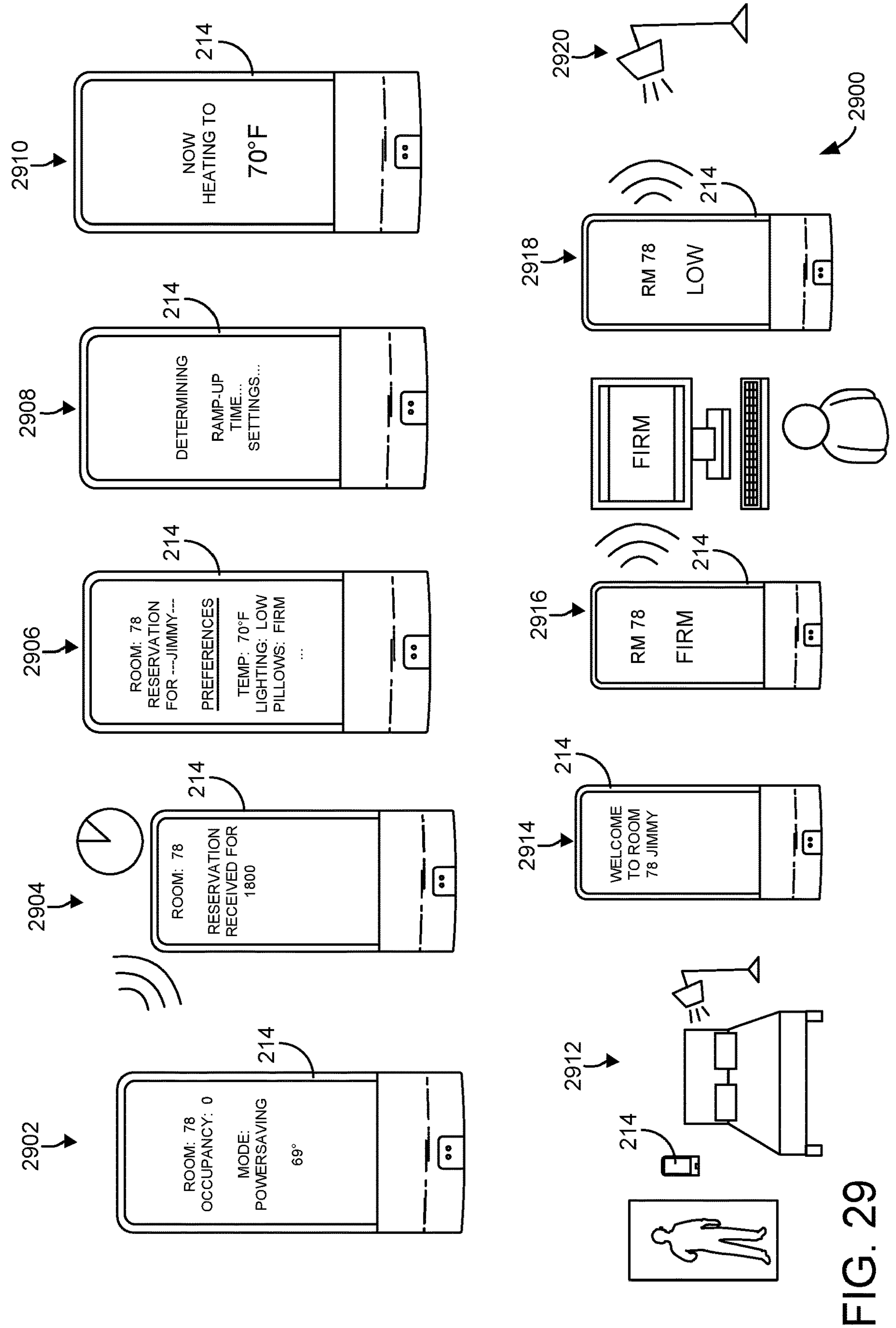
FIG. 29 is a flow diagram of operations for preparing a hotel room for an occupant with the control device of FIG. 7, according to an exemplary embodiment.

Referring now to FIG. 29, a process 2900 is shown for preparing a hotel room for a guest's stay, according to some embodiments. Process 2900 begins with step 2902, in which a control device 214 installed in an unoccupied room is in a power-saving state. Control device 214 may display relevant information for the room, such as the room number, the current occupancy, the mode, and the current conditions. Control device 214 may display more information. In some embodiments, control device 214 may display less information. Control device 214 may be customized to display the information needed for each situation.

Process 2900 continues with step 2904, in which control device 214 receives reservation information for the room at a first time. Control device 214 may display a confirmation message. In some embodiments, control device 214 may send a confirmation message to the front desk, main system, etc. In other embodiments, control device 214 may send a confirmation message to the user. In this exemplary embodiment, the reservation information is received at 1 p.m. local time, and the reservation is for 6 p.m. local time.

Process 2900 continues with step 2906, in which the reservation information and/or preferences are analyzed. The received information may include room number, temperature, humidity, lighting level, pillow firmness, etc. Other information and preferences may be set. The format in which the information is presented to the system, control device 214, etc. may be any format. For example, the system may receive the information as raw data while control device 214 receives data parsed into packets for each category of preference.

Process 2900 continues with step 2908, in which control device 214 may determine the amount of time needed to reach the guest's preferred settings, and when to begin preparing. Control device 214 may determine the approximate time of arrival of a guest and the approximate amount of time needed to reach the environmental setpoints of the guest.

Process 2900 continues with step 2910, in which control device 214 has determined the amount of time needed, the time at which to begin preparing, etc. For example, the preparation for a guest Jimmy arriving at 6 p.m. is shown to begin at 4 p.m. Control device 214 may begin to change the temperature, humidity, etc. of the room. For example, control device 214 may begin to heat the room from 69° F. to Jimmy's preferred 70° F.

Process 2900 continues with step 2912, in which control device 214 informs hospitality services of the guest's preferences. In this exemplary embodiment, Jimmy prefers firm pillows. Control device 214 is shown to inform the front desk of Jimmy's preference. In some embodiments, control device 214 communicates directly with the front desk (e.g., a computer at the front desk). In other embodiments, control device 214 goes through an intermediary (e.g., network 602) to communicate with the front desk. Control device 214 may communicate with the front desk through any means, and may transmit any information. Control device 214 may be compliant with all privacy rules and regulations.

Process 2900 continues with step 2914, in which control device 214 communicates with hotel equipment (e.g., HVAC equipment 738) to achieve the guest's preferences. In this exemplary embodiment, Jimmy prefers low lighting. Control device 214 may communicate with lights (e.g., HVAC Equipment 738) of the room to dim. In some embodiments, control device 214 may communicate directly with lights 2920. In other embodiments, control device 214 may communicate through an intermediary, such as hotel automation system (e.g., building management system 610), network 602, etc. Control device 214 may communicate with hotel equipment (e.g., HVAC Equipment 738) through any communications protocol, and is not limited to those specifically enumerated.

Process 2900 continues with step 2916, in which the guest arrives at the room at a time indicated by his reservation information transmitted to control device 214. In this exemplary embodiment, Jimmy arrives at Room 78 at 6 p.m. local time. Control device 214 is shown to display one or more room settings. For example, control device 214 is shown to be mounted to a wall of the room, and displays the current room temperature—Jimmy's preferred 70° F. Lighting 2920 may be at Jimmy's preferred low setting. In some embodiments, accommodations such as bed inclination level/mattress firmness (e.g., hotel module 750) may be adjusted. In other embodiments, fewer settings may be adjusted.

Process 2900 continues with step 2918, in which the guest is greeted by control device 214. In some embodiments, control device 214 greets the guest purely visually. For example, control device 214 may display text saying "Welcome to Room 12, Aaron." In other embodiments, control device 214 may greet the guest using sound. For example, control device 214 may say "Welcome to Room 78, Jimmy." Control device 214 may greet the user through any means. Control device 214 may be customizable to use a greeting a user has selected, or a greeting specific to the hotel, the room, etc. the user is staying in. Control device 214 may provide options to the user, such as a call for room service, access to the front desk, concierge, etc. In some embodiments, control device 214 performs many of the functions of the concierge desk. In other embodiments, control device 214 connects a user to the concierge desk.

Figure 30:
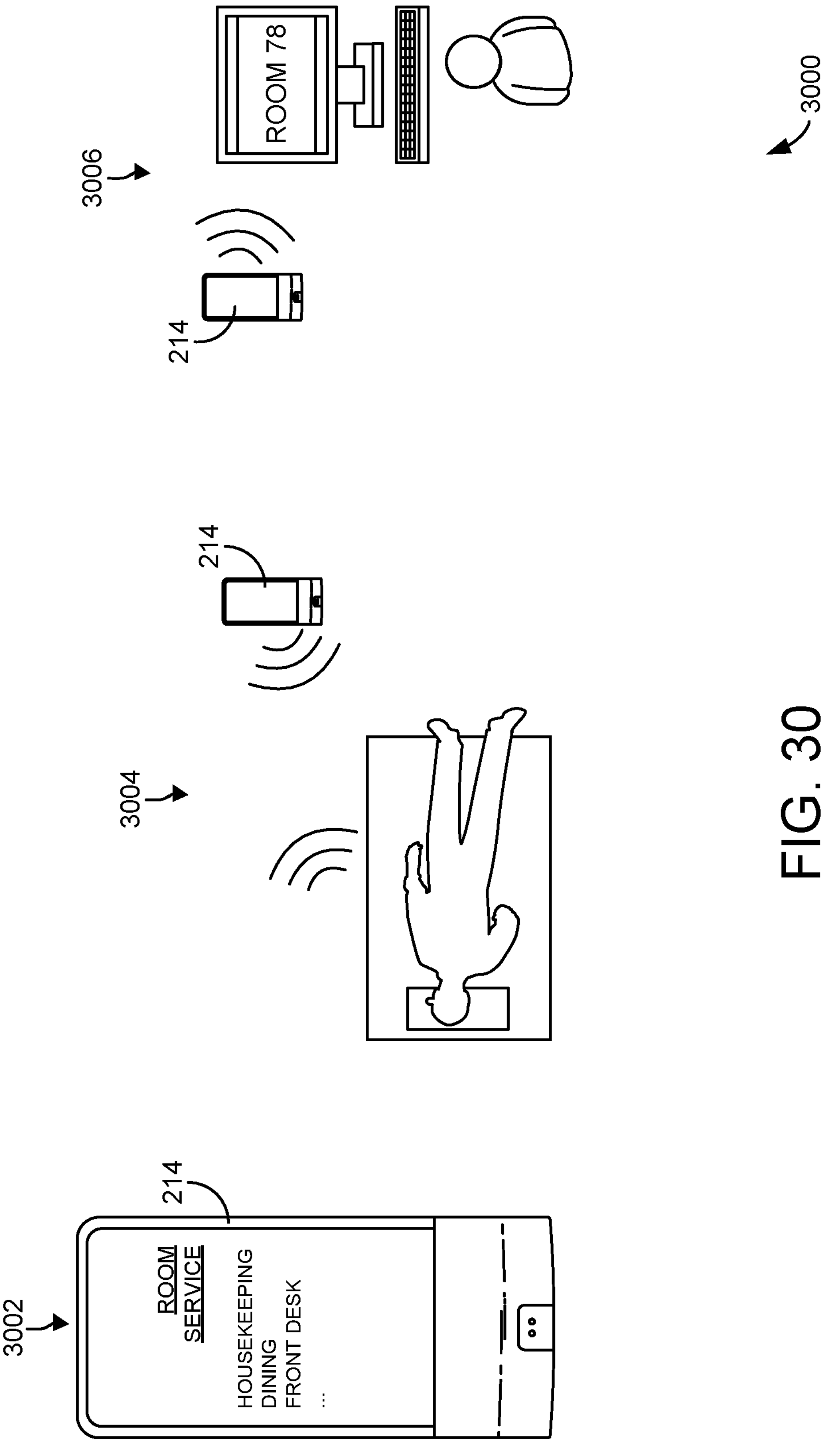
FIG. 30 is a flow diagram of operations for communicating with a front desk with the control device of FIG. 7, according to an exemplary embodiment.

Referring now to FIG. 30, a process 3000 is shown for communicating with a front desk in the event of a service call. In some embodiments, process 3000 is performed by voice command module 744 and/or hotel module 750. In some embodiments, the service call can be made via a voice command and/or through user interface 702. Process 3000 begins with step 3002, in which a set of options available for a user to make a service call regarding is shown on control device 214. In some embodiments, the options are displayed through another medium, such as a mobile device (e.g., user device 612) of a user. Each option displayed may be a link. In some embodiments, the link may take the user to a page with more information about the option. In other embodiments, the link may trigger the service call to be made.

Process 3000 continues with step 3004, in which the user chooses an option and inputs the selection to control device 214. In some embodiments, the user may provide the input as a voice command. In other embodiments, the user may provide the selection as a button press, a tactile input, a gesture, etc. via a user interface (e.g., user interface 702). Any input method may be used.

Process 3000 continues with step 3006, in which the selection is transmitted from control device 214 to the appropriate system. In some embodiments, the appropriate system is building management system 610. For example, if the selection made is a request for new towels, housekeeping would be notified. In some embodiments, housekeeping may be notified via building management system 610. In some embodiments, selections made indicate that other departments, such as the front desk, billing, etc. are contacted. In some embodiments, the front desk and billing are connected to building management system 610.

In other embodiments, the request made can be executed automatically by control device 214. For example, if the user requests that the light be turned off when there are multiple lights in the room, control device 214 may use voice command detection (e.g., voice control module 748). Control device 214 may detect which occupancy sensor (e.g., sensors 714) detected the user's voice, or which sensor detected the voice the "loudest." Control device 214 may decide the location of the user using an algorithm and turn off the light nearest that location.

Figure 31:
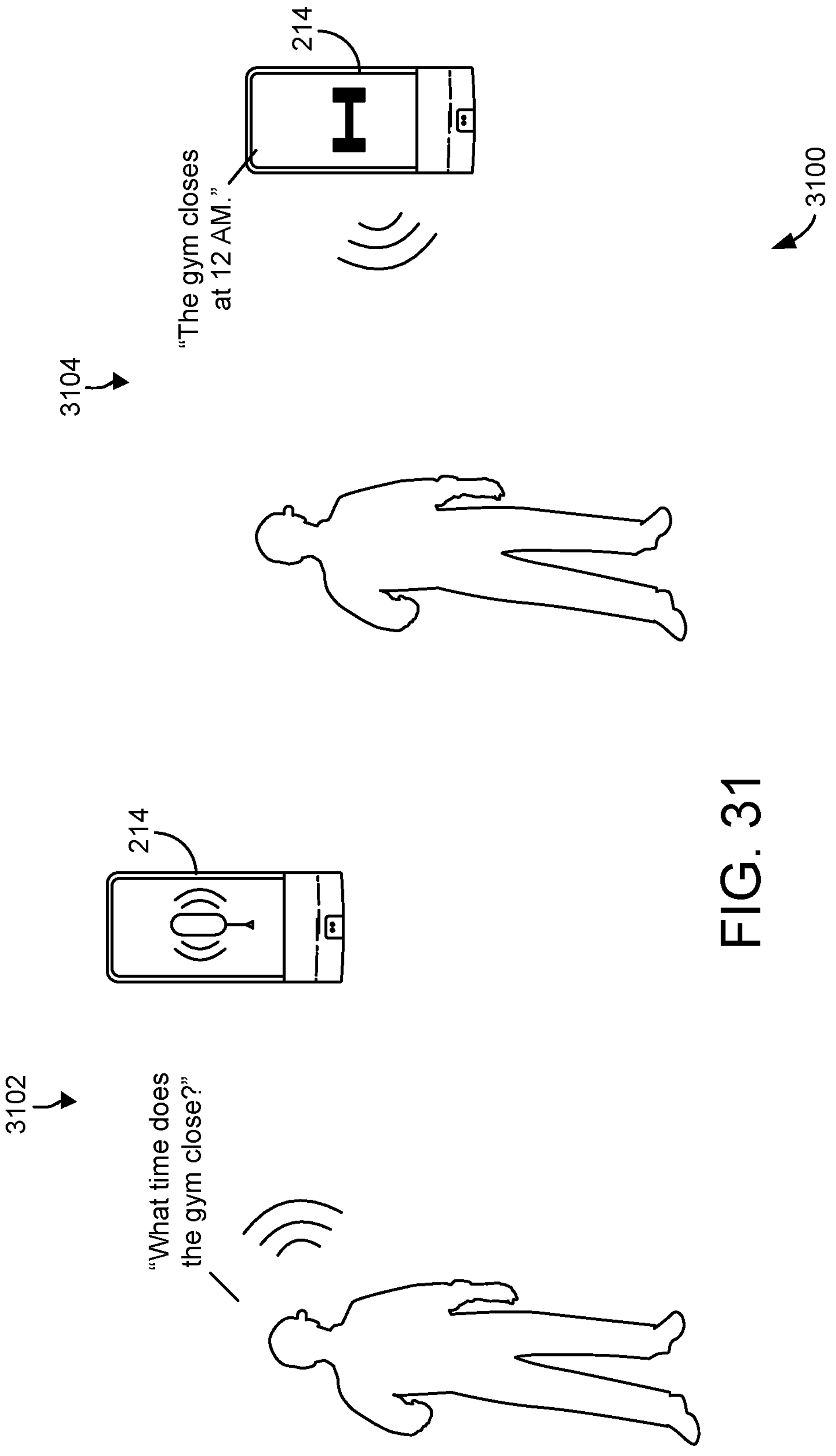
FIG. 31 is a flow diagram of operations for using a concierge feature of the control device of FIG. 7, according to an exemplary embodiment.

Referring now to FIG. 31, a process 3100 is shown for utilizing a concierge feature of control device 214, according to some embodiments. In some embodiments, process 3100 is performed by voice command module 744 and/or hotel module 750. Process 3100 begins with step 3102, in which a user asks control device 214 "What time does the gym close?" Control device 214 may access the requested information. In some embodiments, the information is stored remotely from control device 214. In other embodiments, the information is stored locally on control device 214. In yet other embodiments, control device 214 may search for the information, call the front desk, etc.

The user may request information in any way. In some embodiments, the user may request information through voice commands. In other embodiments, the user may request information through tactile input (e.g., via user interface 702), via a mobile device (e.g., user device 612), etc.

Process 3100 continues with step 3104, in which user control device has obtained the requested information, and transmits the information to the user. In some embodiments, control device 214 provides the information to the user through speakers. For example, control device 214 may say "The gym closes at 12 a.m." In other embodiments, control device 214 may transmit the information through text, images, etc. Control device 214 may present the information to the user via a user interface (e.g., user interface 702), a mobile device (e.g., user device 612), etc.

In some embodiments, control device 214 provides information to the user in the same way the user requested the information. For example, if the user asked a question using a voice command, control device 214 would answer the question via speakers. In other embodiments, control device 214 may provide information to the user according to her preferences. In yet other embodiments, control device 214 would answer the question via a default method, which may be customizable.

Figure 32:
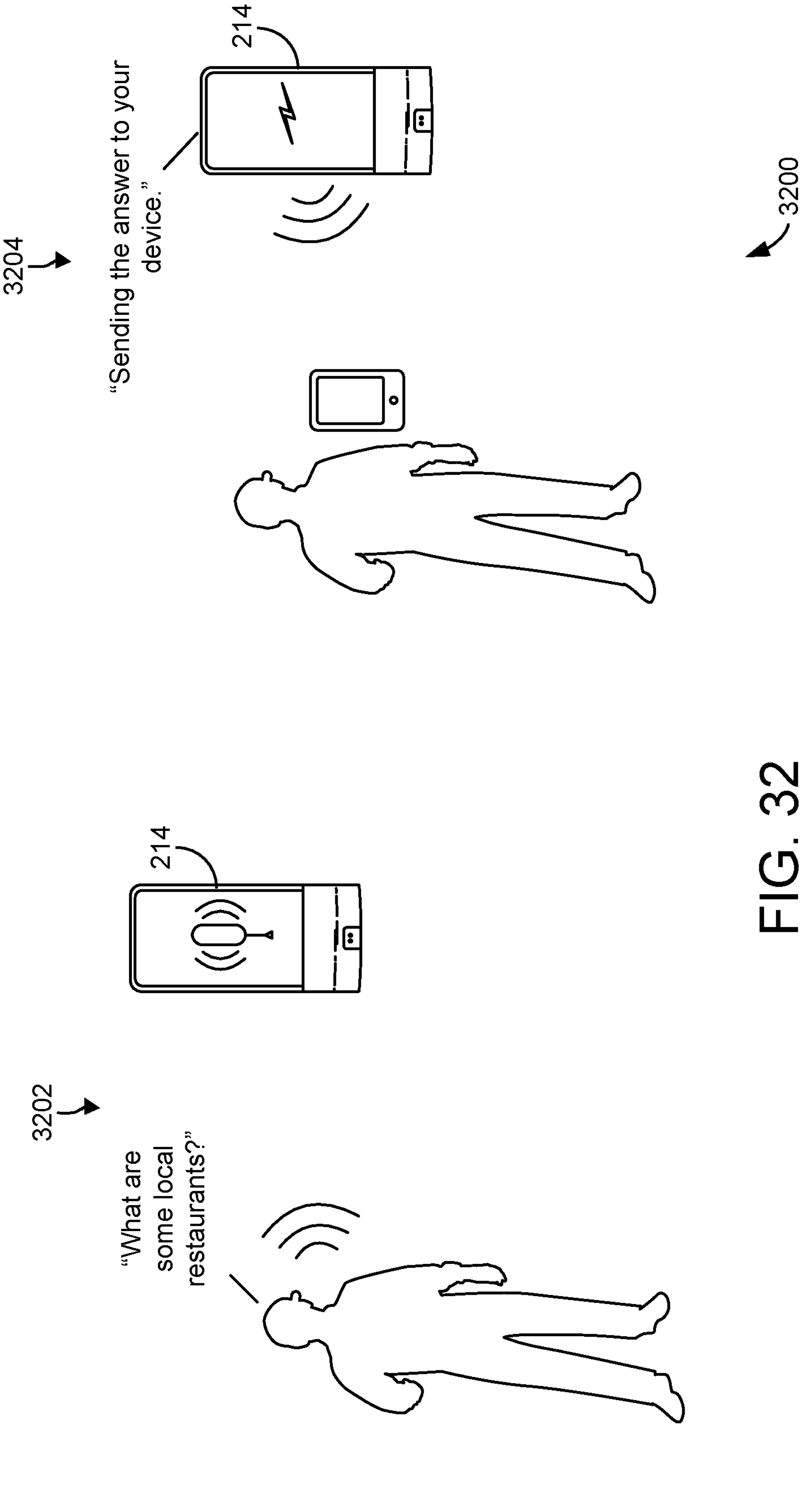
FIG. 32 is another flow diagram of operations for using a concierge feature of the control device of FIG. 7, according to an exemplary embodiment.

Referring now to FIG. 32, a process 3200 is shown for utilizing a concierge feature of control device 214, according to another exemplary embodiment. In some embodiments, process 3200 may be performed by hotel module 750 of control device 214 and/or voice command module 744. Process 3200 begins with step 3202, in which a user asks control device 214 "What are some local restaurants?" Control device 214 may access the requested information. In some embodiments, the information is stored remotely from control device 214. In other embodiments, the information is stored remotely on building management system 610. In yet other embodiments, control device 214 may search for the information on the Internet (e.g., via network 602), call the front desk, etc.

The user may request information in any way. In some embodiments, the user may request information through voice commands. In other embodiments, the user may request information through tactile input (e.g., via user interface 702), via a mobile device (e.g., user device 612), etc.

Process 3200 continues with step 3204, in which user control device has obtained the requested information, and transmits the information to the user. In some embodiments, control device 214 provides the information to the user through speakers. In other embodiments, control device 214 may transmit the information through text, images, etc. if the answer is too long or too complicated to answer over speakers. For example, if the information requested is an explanation for why the sky is blue, user control device may, as a default, present the information to the user through text. Control device 214 may present the information to the user via user interface 702, user device 612, etc.

Figure 33:
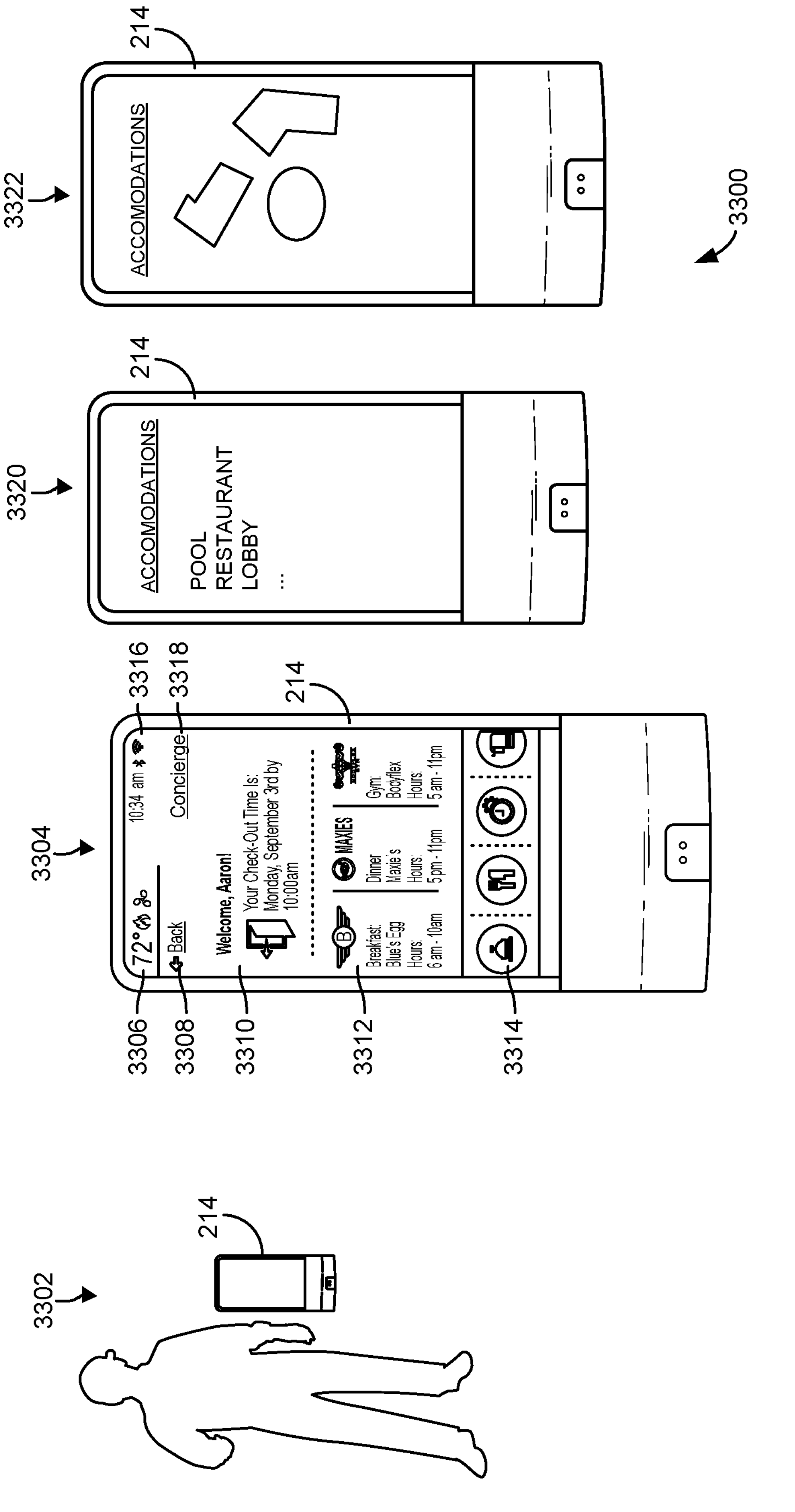
FIG. 33 is a flow diagram of operations for requesting hotel accommodations with the control device of FIG. 7, according to an exemplary embodiment.

Referring now to FIG. 33, a process 3300 for requesting accommodation information from control device 214 is shown, according to some embodiments. Process 3300 begins with step 3302, in which a user requests information from control device 214. In some embodiments, the user may request information via voice command. In other embodiments, the user may request information via a tactile input through user interface 702, gesture input, etc. Control device 214 may access the requested information. In some embodiments, the information is stored remotely from control device 214. In other embodiments, the information is stored locally on control device 214. In yet other embodiments, control device 214 may search for the information, call the front desk, etc.

The user may request information in any way. In some embodiments, the user may request information through voice commands. In other embodiments, the user may request information through tactile input (e.g., user interface 702), via a mobile device (e.g., user device 612), etc.

Process 3300 continues with step 3304, in which user control device has obtained the requested information, and transmits the information to the user. In some embodiments, control device 214 provides the information to the user through speakers. In other embodiments, control device 214 may transmit the information through text, images, etc. In this exemplary embodiment, the information is presented through an interface of a companion application for control device 214. The exemplary embodiment includes a room status indicator 3306. The exemplary embodiment also includes a menu option 3308. The exemplary embodiment includes a message 3310 that greets the user and provides relevant information. For example, if the user is leaving the hotel on that day, message 3310 may include the time of checkout.

The exemplary embodiment includes an information section 3312 that provides relevant information regarding attractions and accommodations. In some embodiments, the attractions and accommodations are local to the hotel. In other embodiments, a user may specify the location, distance, price, etc. Control device 214 may store the information. In some embodiments, control device 214 may access the information from an outside site, such as Yelp, Google Reviews, etc.

The exemplary embodiment includes a navigation section 3314 that provides navigation tools. In some embodiments, the tools are buttons represented by icons. In other embodiments, the tools may be text links, check boxes, etc. Navigation section 3314 may be customized to provide relevant options. The exemplary embodiment further includes a system indicator 3316. The exemplary embodiment further includes a page title 3318.

Process 3300 continues with step 3318, in which a screen shows accommodations available at the hotel. A user may input a selection through control device 214 by any means previously described.

Process 3300 continues with step 3320, in which a screen showing a floorplan is displayed on control device 214. In some embodiments, the floorplan may display a user selection, such as a pool. In this exemplary embodiment, the user selected the pool from the screen of control device 214. The location of the pool on the floorplan is shown on the screen. In other embodiments, other information may be shown on control device 214, as described earlier.

Figure 34:
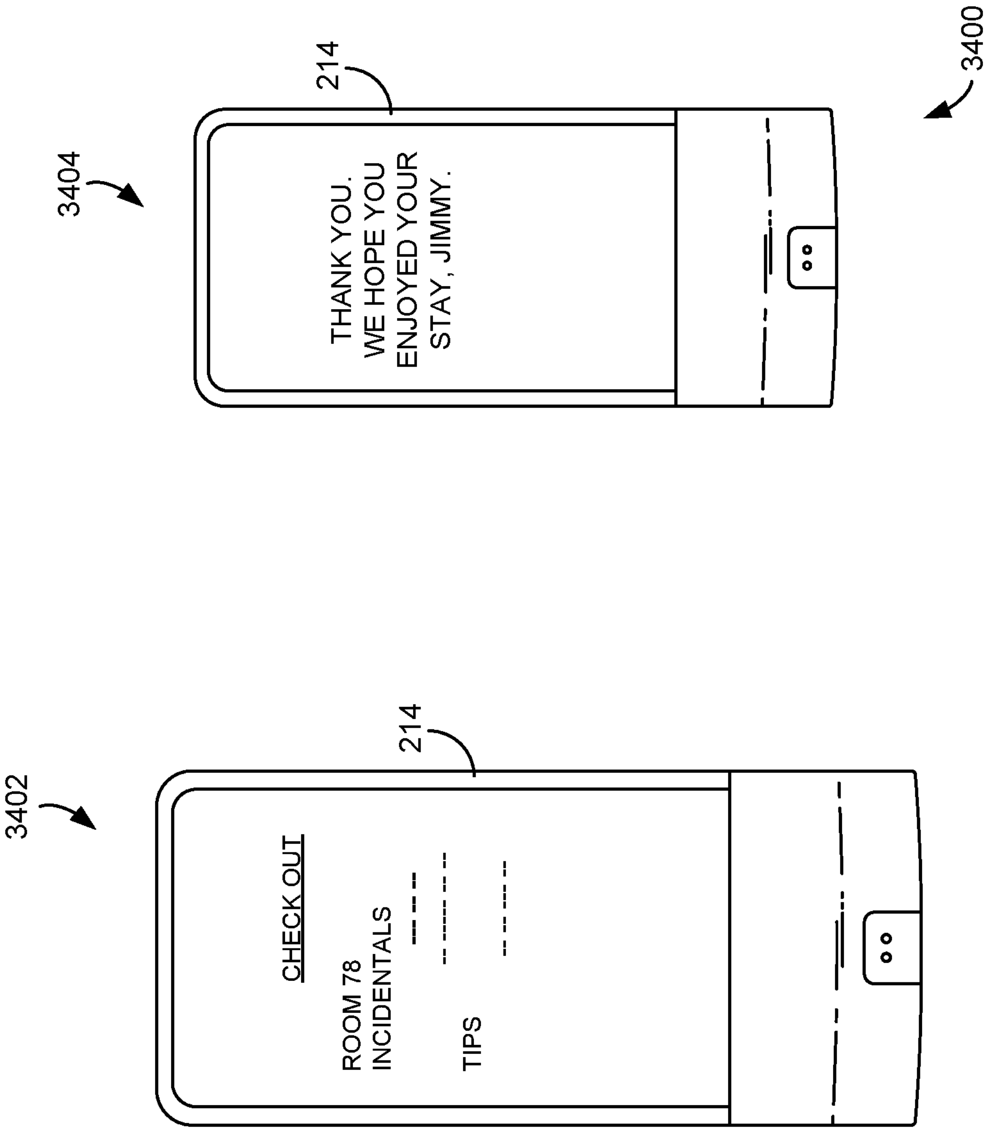
FIG. 34 is a flow diagram of operations for checking out of a hotel room with the control device of FIG. 7, according to an exemplary embodiment.

Referring now to FIG. 34, a process 3400 is shown for assisting a user with checkout without having to go to the front desk. Process 3400 begins with step 3402, in which control device 214 presents a checkout screen to the user. In some embodiments, the screen is presented automatically at checkout time. In other embodiments, the screen may be requested by the user. The screen may include information such as the room number, incidental charges, total charges, tip amounts, etc. Process 3400 may not proceed without confirmation from the user that the information presented is correct, and that she accepts all charges shown.

Process 3400 continues with step 3404, in which control device 214 thanks the user for staying with the hotel with a parting message. In some embodiments, the parting message may be customized to the user's liking. In other embodiments, the parting message is customized for the hotel. The parting message may be delivered in any way. In some embodiments, the parting message is delivered via speakers. In other embodiments, the parting message is delivered as text, images, etc. The parting message may be accompanied by a receipt for the total of the stay. In some embodiments, the receipt may be printed by control device 214. In other embodiments, the receipt may be printed at the front desk and delivered to or picked up by the user. Process 3400 may be executed by control device 214 and/or hotel module 750.

In some embodiments, control device 214 prompts the user to enter payment information and/or swipe a credit and/or debit card via input device 712. This may allow the user to pay for their stay and/or any additional charges without stopping at the front desk. In some embodiments, the control device facilitates transfer of funds from a financial account associated with a user to a financial account associated with the hotel. The financial account may be held with financial institution system 3504 and control device 214 may facilitate the transfer of funds with hotel module 750 and payment module 758. In some embodiments, the user is required to swipe their card with input device 712 at the beginning of their stay and simply confirm the amount and/or leave a tip when their stay expires.

Payment Features

Referring to FIGS. 35-39, in some embodiments, control device 214 may include payment features allowing a user to make payments with a variety of different devices using a variety of different payment protocols. For example, control device 214 may be installed in any location in which a user may make a payment directly, without the involvement of a cashier or other worker, such as in a vehicle (e.g., a taxi), a parking structure, a public transportation station, a hotel, or a retail location (e.g., a store checkout line, a trade show, a convention, etc.).

Figure 35:
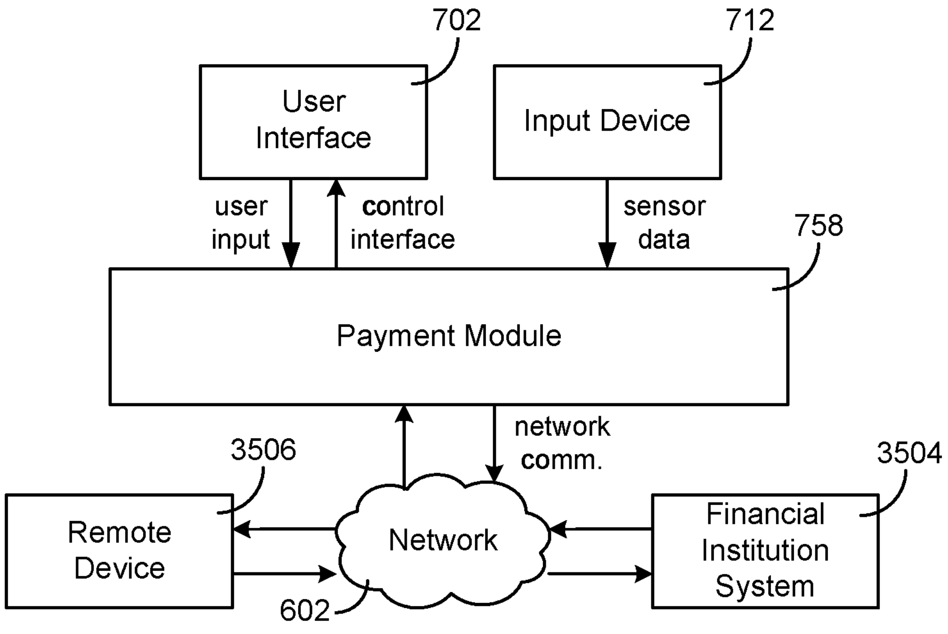
FIG. 35 is a block diagram illustrating the payment module of FIG. 7 in greater detail, according to an exemplary embodiment.

Referring specifically to FIG. 35, payment module 758 is shown in detail. Payment module 758 is shown to interact with user interface 702, input device 712, financial institution system 3504, and network 602. In some embodiments, payment module 758 may interact with a remote device 3506. Remote device 3506 may be any device providing data related to a financial transaction. For example, remote device 3506 may be a cash register or terminal, a taximeter, a mobile device, or any other device capable of providing data related to a financial transaction. The remote device may be directly coupled to control device 214 and directly communicates with control device 214 with a wired or wireless connection. In some embodiments, remote device 3506 is coupled to control device 486 through network 602 and communicates with control device 214 through the network 602.

Figure 36:
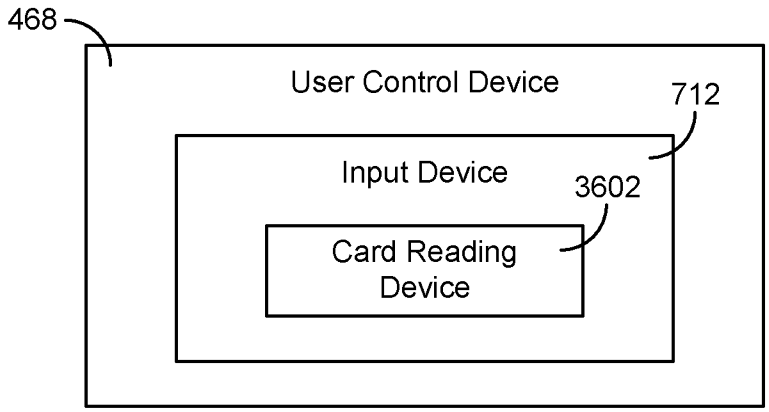
FIG. 36 is a block diagram illustrating the input device of FIG. 7 in greater detail, according to an exemplary embodiment.

Referring now to FIG. 36, a block diagram illustrating an input device 712 of user control device 468 is shown, according to an exemplary embodiment. Input device 712 is shown to include a card reading device 3602. Card reading device 3602 may be any device that is able to receive information from a card (e.g., credit card, debit card, gift card, commuter card, etc.).

Figure 37:
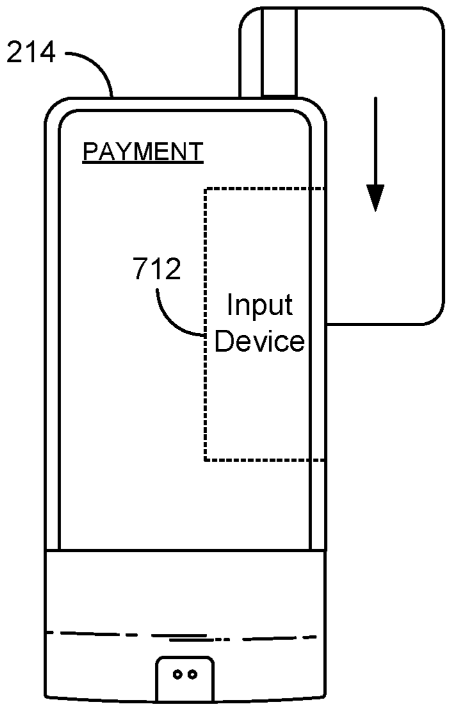
FIG. 37 is a drawing illustrating the control device of FIG. 7 receiving a payment, according to an exemplary embodiment.

Referring to FIG. 37, a diagram of a control device processing payment with an input device, according to an exemplary embodiment. In one embodiment, card reading device 3602 may be a magnetic strip reader that is configured to receive information encoded in a magnetic strip on the card. Information encoded on a magnetic strip of the user's card may be read by the card reading device by inserting the card into the card reading device or by swiping the card through the card reading device. In another embodiment, card reading device 3602 may be a chip reader that is configured to receive information encoded on a microchip on the card. Information encoded on the microchip of the user's card may be read by the card reading device by inserting the card into card reading device 3602. In another embodiment, card reading device 3602 may use another technology to receive information encoded on the user's card. For example, card reading device 3602 may include an infrared scanning mechanism to read information encoded in a bar code on the user's card.

In some embodiments, input device 712 (e.g., card reader, wireless reader, etc.) may be integrated into the user control device. For example, input device 712 may be integrally formed with the display or the base. In other embodiments, input device 712 may be coupled to the display or the base (e.g., as an aftermarket device, etc.). In other embodiments, input device 712 may be separate from control device 214 and may be connected to control device 214 through a wired connection or a wireless connection.

Figure 38:
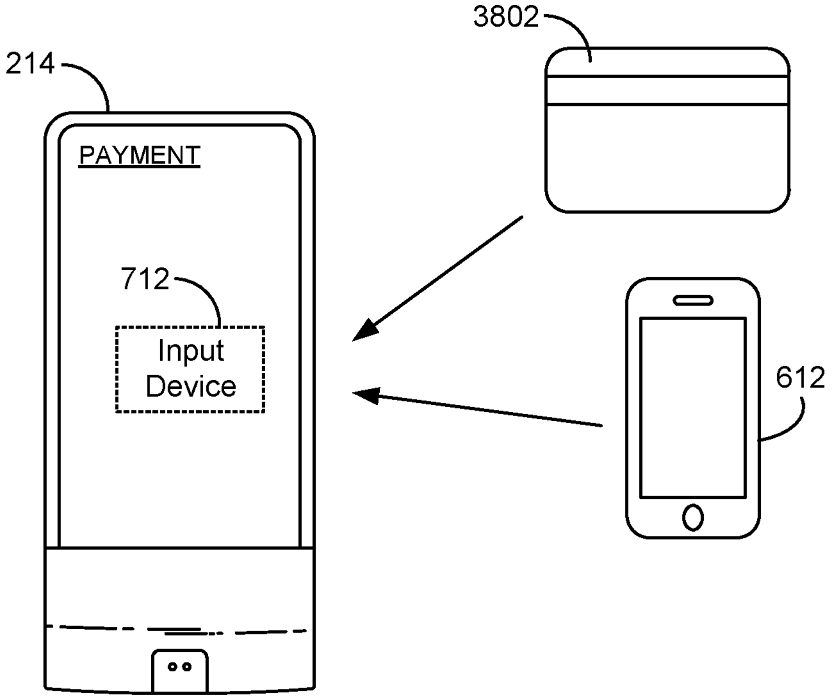
FIG. 38 is another drawing illustrating the control device of FIG. 7 receiving a payment, according to an exemplary embodiment.

Referring now to FIG. 38, a diagram of control device 214 processing a payment with input device 712 is shown, according to an exemplary embodiment. In FIG. 38, control device 214 is shown to include input device 712 that is able to receive information from card 3802 (e.g., credit card, debit card, gift card, commuter card, etc.) or user device 612 without physically interacting with the card or mobile device using a wireless protocol (e.g., ZigBee, Bluetooth, Wi-Fi, NFC, RFID, etc.). In one exemplary embodiment, a user may make a payment by passing a device capable of NFC communication in close proximity to the user control device to make a payment using a mobile payment service (e.g., Apple Pay, Google Wallet, Android Pay, etc.).

Figure 39:
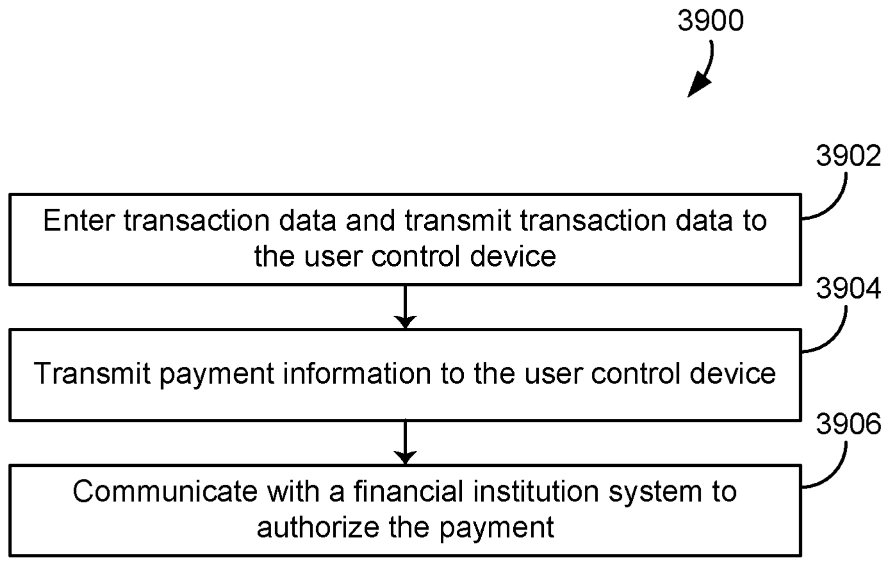
FIG. 39 is a flowchart of operations for processing a transaction with the control device of FIG. 7, according to an exemplary embodiment.

Referring now to FIG. 39, a process 3900 for making a payment with user control device 214 is shown according to some embodiments. In some embodiments, process 3900 is performed by payment module 758 of control device 214. Process 3900 begins with step 3902 in which transaction data is entered and the transaction data is communicated to control device 214. In some embodiments, the transaction data may be entered directly into control device 214 with user interface 702. In some embodiments, the transaction data is received from a remote device. For example, transaction data may be received from a cash register, a payment terminal, a taximeter, a mobile device, etc.

The process continues with step 3904 in which payment data is received by user control device 214. Payment data may be received, for example, by swiping a card through a card reader (e.g., input device 712, card reading device 3602, etc.), inserting a card into a card reader, passing a card under a sensor (e.g., an infrared sensor), or holding a card or mobile device close to control device 214. The payment data may include various information such as authentication data, encryption data, decryption data, etc.

The process continues with step 3906 in which user control device 214 communicates with financial institution system 3504 to authorize the payment. Financial institution system 3504 may, for example, be a credit card company or a banking network. The control device 214 communicates a variety of information to financial institution system 3504 including payment data and transaction data to authorize the payment.

Thermostat with Direction Display

Figure 40:
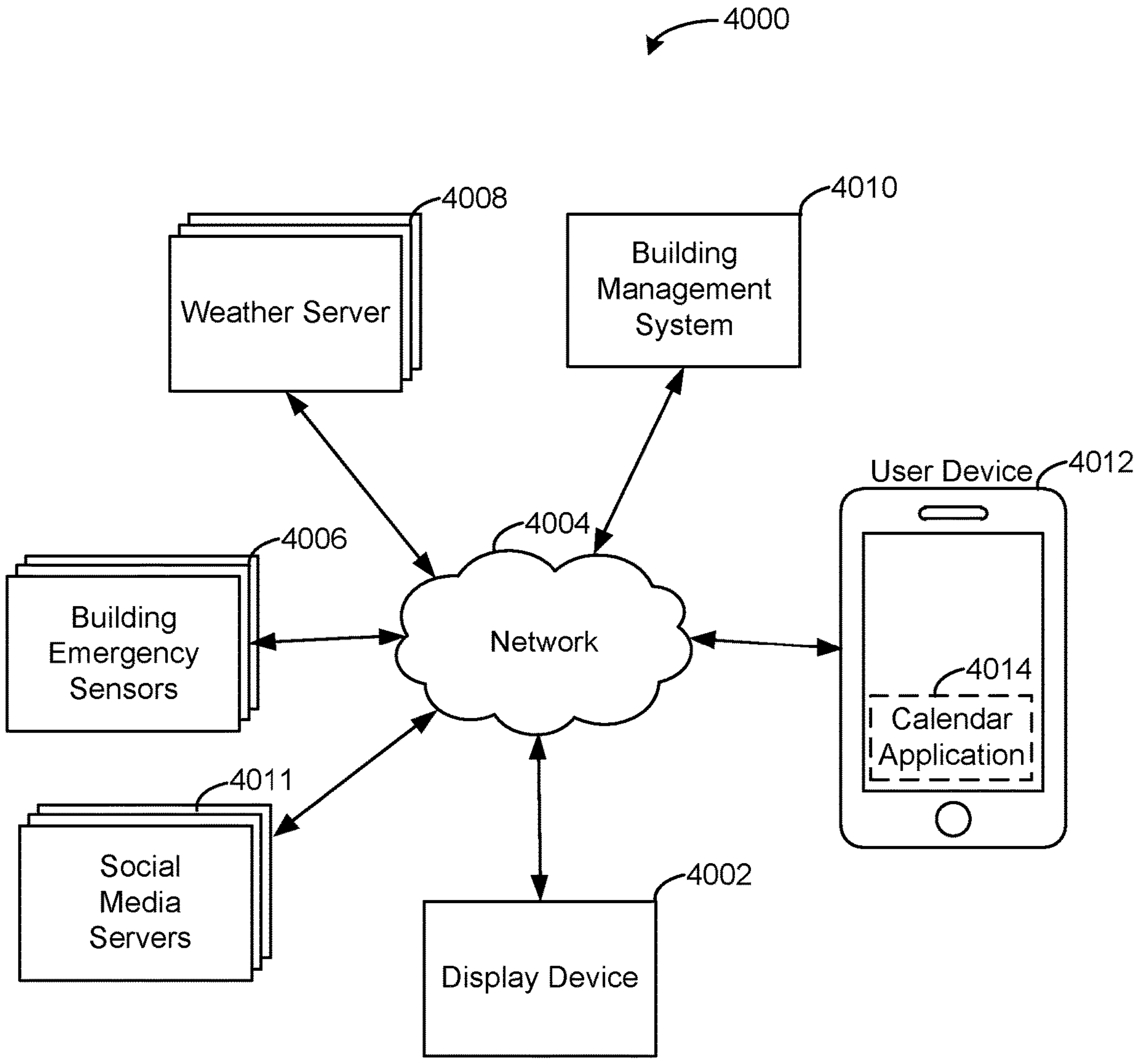
FIG. 40 is a block diagram of a communications system located in the building of FIG. 1, according to an exemplary embodiment.

Referring now to FIG. 40, a block diagram of communications system 4000 is shown, according to an exemplary embodiment. System 4000 can be implemented in a building (e.g. building 10) and is shown to include display device 4002, network 4004, building emergency sensor(s) 4006, weather server(s) 4008, building management system 4010, social media server(s) 4011, and user device 4012. System 4000 connects devices, systems, and servers via network 4004 so that emergency information, navigation directions, and other information can be passed between devices (e.g., display device 4002, user device 4012, building emergency sensor(s) 4006) and servers and systems (e.g., social media server(s) 4011, weather server(s) 4008, and building management system 4010).

In some embodiments, network 4004 communicatively couples the devices, systems, and servers of system 4000. In some embodiments, network 4004 is at least one of and/or a combination of a Wi-Fi network, a wired Ethernet network, a Zigbee network, a Bluetooth network, and/or any other wireless network. Network 4004 may be a local area network or a wide area network (e.g., the Internet, a building WAN, etc.) and may use a variety of communications protocols (e.g., BACnet, IP, LON, etc.). Network 4004 may include routers, modems, and/or network switches. Network 4004 may be a combination of wired and wireless networks.

In some embodiments, display device 4002 is configured to receive emergency information and navigation directions via network 4004. In some embodiments, display device 4002 is a wall mounted device with a display screen. For example, display device 4002 can be a thermostat, a humidistat, a light controller, and any other wall mounted device with a display screen. In some embodiments, display device 4002 is connected to building emergency sensor(s) 4006 and receives emergency data from the building emergency sensor(s) 4006. In some embodiments, building emergency sensor(s) 4006 are sensors which detect building emergencies. Building emergency sensor(s) 4006 can include, for example, smoke detectors, carbon monoxide detectors, fire pull handles, panic buttons, gunshot detection sensors, and any other emergency sensor. In some embodiments, the emergency sensor(s) include actuators. The actuators may be building emergency sirens, a sprinkler and/or sprinkler system, an automatic door controller and/or automatic door control system, and any other actuator used in a building. In some embodiments, building emergency sensor(s) 4006 may communicate with building management system 4010. Building management system 4010 may sensor data from the building emergency sensor(s) 4006. In various embodiments, building management system 4010 may send the sensor data and/or emergency information associated with the sensor data to display device 4002.

In some embodiments, display device 4002 is communicatively coupled to weather server(s) 4008 via network 4004. In some embodiments, display device 4002 is configured to receive weather alerts (e.g., high and low daily temperature, five-day forecast, thirty-day forecast, etc.) from the weather server(s) 4008. Display device 4002 may be configured to receive emergency weather alerts (e.g., flood warnings, fire warnings, thunder storm warnings, winter storm warnings, etc.) from the weather server(s) 4008. In some embodiments, display device 4002 is configured to display emergency warnings via a user interface of display device 4002 when display device 4002 receives an emergency weather alert from weather server(s) 4008. Display device 4002 may be configured to display emergency warnings based on the data received from building emergency sensor(s) 4006. In some embodiments, display device 4002 causes a siren to alert occupants of the building of an emergency, causes all doors to become locked and/or unlocked, causes an advisory message be broadcast through the building, and/or controls any other actuator or system necessary for responding to a building emergency. In some embodiments, the building management system 4010 communicates with weather server 4008. Building management system 4010 may communicate (e.g., send) information from weather server 4008 to display device 4002.

In some embodiments, display device 4002 is configured to communicate with building management system 4010 via network 4004. Display device 4002 may be configured to transmit environmental setpoints (e.g., temperature setpoint, humidity setpoint, etc.) to building management system 4010. In some embodiments, building management system 4010 is configured to cause zones of a building (e.g., building 10) to be controlled to the setpoint received from display device 4002. For example, building management system 4010 may be configured to control the temperature, humidity, lighting, or other environmental conditions of a building based on the setpoints or control signals received from display device 4002. In some embodiments, building management system 4010 is configured to transmit emergency information to display device 4002. The emergency information can include, for example, a notification of a shooter lockdown, a tornado warning, a flood warning, a thunderstorm warning, and/or any other warning. In some embodiments, building management system 4010 is connected to various weather servers and/or other web servers from which building management system 4010 receives emergency warning information.

In some embodiments, the display device 4002 is configured to communicate with one or more social media server(s) 4011 via network 4004. Social media server(s) 4011 may include, but are not limited to, servers supporting Facebook, Instagram, Twitter, Snapchat, WhatsApp, and/or other social media platforms. In some embodiments, the display device 4002 may have a profile or other presence on a social media platform, such that a user may send a direct message, post, tweet, etc. to the display device 4002. For example, a user may tweet at (i.e., via Twitter) or send a direct message to (e.g., via Facebook Messenger, WhatsApp, etc.) the display device 4002 and/or the building management system 4010 to indicate that an emergency is ongoing in a building (e.g., "@displaydevice4002 a fire just started in Room X"). The display device 4002 may receive such a message, tweet, post, etc., extract relevant information therefrom using a natural language processing approach, and generate emergency directions based on the extracted information. In some embodiments, the display device 4002 is configured to send a message or comment to the user in response, for example using an automated chat bot approach.

In various embodiments, the display device 4002 accesses the social media server(s) to passively monitor social media activity of one or more occupants of a building to identify events in a building and/or emergencies in a building. For example, the display device 4002 may access a message sent from a first user of a social media server 4011 to a second user of the social media server 4011 which mentions an ongoing emergency in the building. As another example, the display device 4002 may analyze pictures and/or videos posted publically by a social media user (e.g., via Snapchat, Instagram, etc.) to identify building occupancy, events in the building, emergencies in the building, etc. and respond accordingly. For example, a user may post a video that shows an active shooter in a building, and the display device 4002 may receive said video, analyze said video to determine a location of the shooter in the building, and generate one or more directions to provide to one or more building occupants to help the occupants find safety. Various such interactions between the social media server(s) 4011 and the display device 4002 are contemplated by the present disclosure.

Display device 4002 can be configured to communicate with user device 4012 via network 4004. In some embodiments, user device 4012 communicates calendar information to display device 4002. User device 4012 can include any user-operable computing device such as smartphones, tablets, laptop computers, desktop computers, wearable devices (e.g., smart watches, smart wrist bands, smart glasses, etc.), and/or any other computing device. User device 4012 can be a mobile device or a non-mobile device. In some embodiments, the calendar information is stored and/or entered by a user into calendar application 4014. Calendar application 4014 may be one or a combination of Outlook, Google Calendar, Fantastical, Shifts, CloudCal, DigiCal, and/or any other calendar application. Display device 4002 may receive calendar information from the calendar application such as times and locations of appointments, times and locations of meetings, information about the expected location of the user, and/or any other calendar information. Information about the expected location of the user may be information that the user will depart for an airport or another location at a specific time or in a range of times. Display device 4002 may be configured to display direction to a user associated with user device 4012 based on the calendar information stored in calendar application 4014.

In various embodiments, the user device 4012 provides various data and information regarding use of the user device 4012 to the display device 4002 and/or the building management system 4010. For example, the display device 4002 may collect a live feed of the usage of the user device 4012 to facilitate identification and characterization of building emergencies and/or to facilitate the provision of directions to a user in case of an emergency. For example, the display device 4002 may receive data relating to an emergency call made by the user device 4012, the location of the user device 4012 (e.g., based on GPS data collected by the user device 4012), social media activity of a user of the user device 4012, etc. In some embodiments, the display device 4002 activates a microphone and/or camera of the user device 4012 in an emergency situation to monitor the safety of a user in an emergency situation.

In some embodiments, a user may press a button on a user interface of display device 4002 indicating a building emergency. The user may be able to indicate the type of emergency (e.g., fire, flood, medical, active shooter, etc.). Display device 4002 may communicate an alert to building management system 4010, user device 4012, social media server 4011 and/or any other device, system, or server. For example, display device 4002 may be configured to cause the social media server 4011 to generate a social media notification relating to a building emergency for a user.

Figure 41:
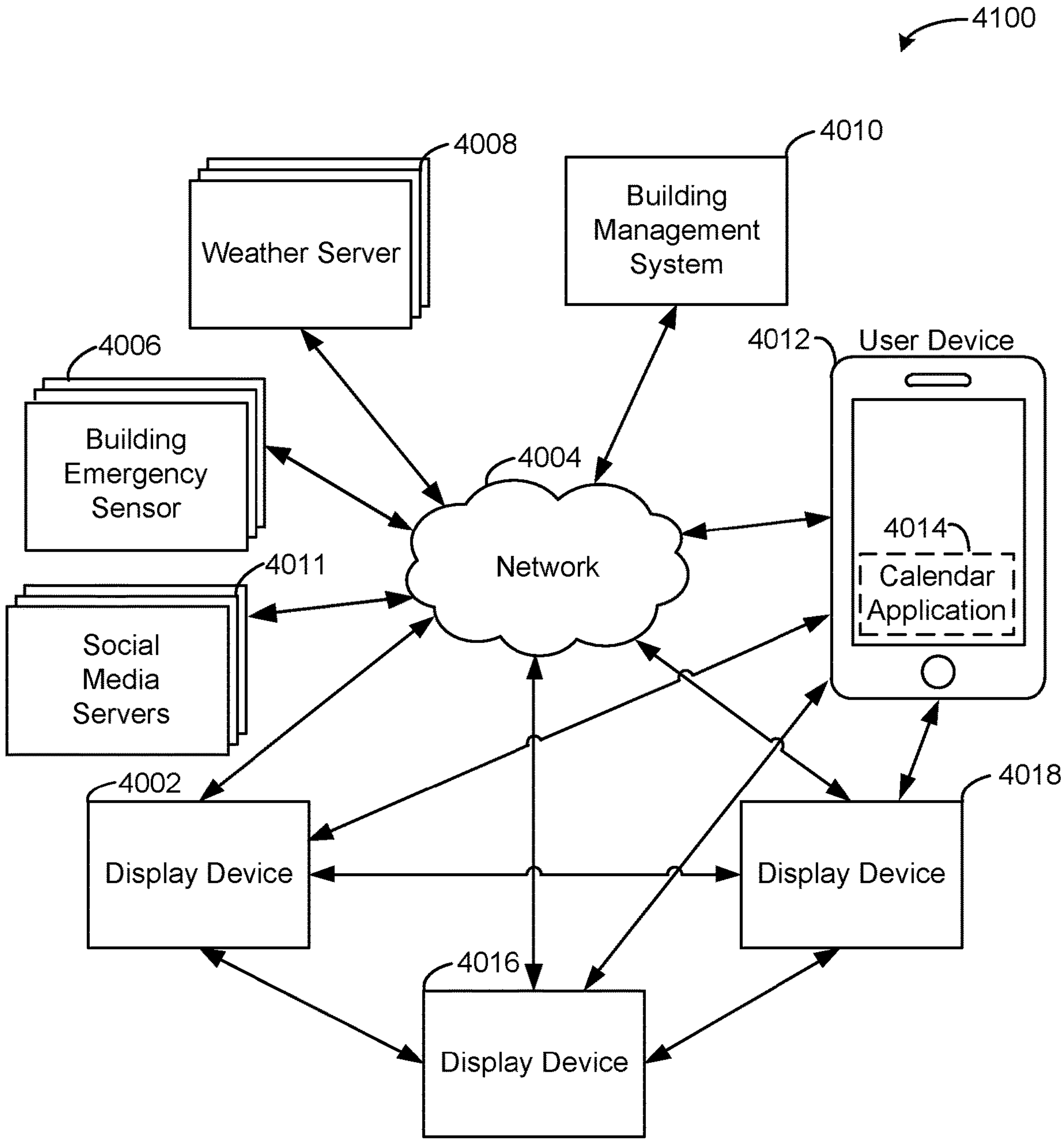
FIG. 41 is a block diagram of a communications system located in the building of FIG. 40 where the display devices are communicating ad hoc, according to an exemplary embodiment.

Referring now to FIG. 41, a block diagram of communications system 4100 is shown, according to an exemplary embodiment. System 4100 can be implemented in a building (e.g. building 10) and is shown to include display device 4002, network 4004, building emergency sensor(s) 4006, weather server(s) 4008, building management system 4010, and user device 4012. These components may be the similar or the same as described with reference to FIG. 40. System 4100 connects devices, systems, and servers via network 4004 so that emergency information, navigation directions, and other information can be passed between devices (e.g., display device 4002, user device 4012, building emergency sensor(s) 4006) and servers and systems (e.g., weather server(s) 4008 and building management system 4010).

In some embodiments, system 4100 includes display devices 4016 and 4018. Display devices 4016 and 4018 may be identical and/or similar to display device 4002. In some embodiments, display devices 4016 and 4018 have the ability to communicate to display device 4002 but are different from display device 4002. For example, display device 4016 and display device 4018 can be smart actuators, building controllers, etc., while display device 4002 can be a smart thermostat. Display device 4002, display device 4016, and display device 4018 may be located in different locations of a building (e.g., building 10). In some embodiments, display device 4002, display device 4016, display device 4018 and user device 4012 may communicate to each other ad hoc. In some embodiments, display device 4002, display device 4016, and display device 4018 may communicate to each other via network 4004. In some embodiments, ad hoc communication may be at least one of (ad hoc Wi-Fi, ad hoc Zigbee, ad hoc Bluetooth, NFC, etc.) In some embodiments, the devices form a MANET, a VANET, a SPAN, an IMANET, and/or any other ad hoc network. In some embodiments, the devices are connected and communicate via RS-485, Ethernet, and/or any other wired, wireless, or combination of wired and wireless communication method.

In some embodiments, display device 4002, display device 4016, display device 4018 send navigation directions to one another via ad hoc communication. In some embodiments, one of the display devices determines a route for a building occupant. The route may be the fastest or shortest path to a destination (e.g., a conference room, an office, etc.). Display device may handoff the navigation directions to other display devices (e.g., display device 4016, display device 4018, etc.) along the path of the occupant. In some embodiments, the route may meet a need of the occupant, such as a route that will accommodate wheelchairs if the occupant is in a wheelchair or traveling with someone in a wheelchair.

In some embodiments, user device 4012 is configured to communicate with display device 4002, display device 4016, and display device 4018 via ad hoc communication. In some embodiments, user device 4012 may communicate with the display devices (e.g., display device 4002, display device 4016, display device 4018, etc.) and request navigation directions. In some embodiments, a user may check in with a display device and the display device may display navigation information for the individual associated with the user device 4012. Checking in with the display device may be holding user device 4012 a certain distance from the display device so that user device 4012 can communicate with the display device via NFC. In various embodiments, checking in with the display device includes connecting to the display device via Wi-Fi, Bluetooth, or Zigbee and entering a password and/or username.

Figure 42:
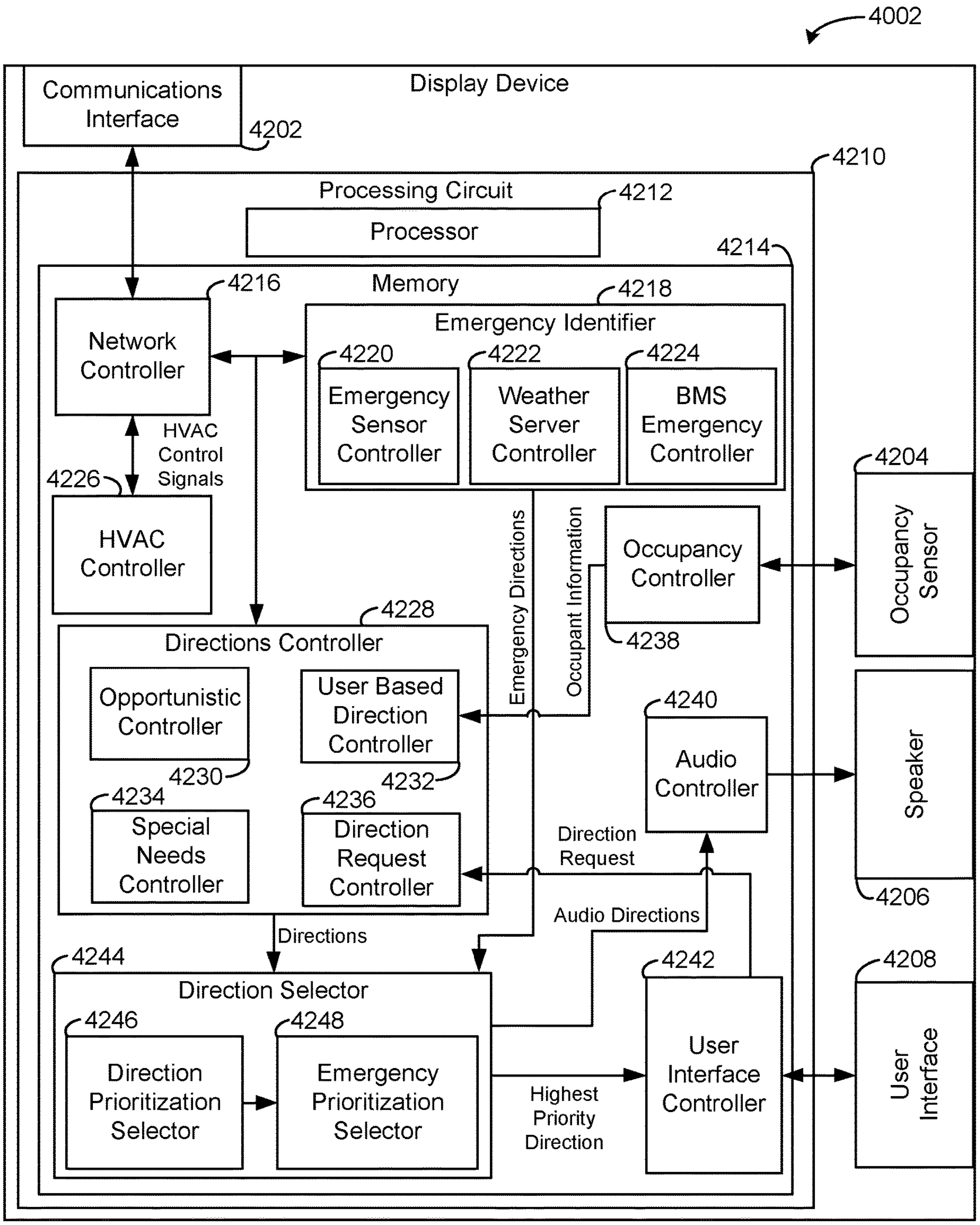
FIG. 42 is a block diagram illustrating the display device of FIGS. 40-41 in greater detail, according to an exemplary embodiment.

Referring now to FIG. 42, a block diagram illustrating display device 4002 in greater detail is shown, according to an exemplary embodiment. Display device 4002 is shown to include a communications interface 4202, an occupancy sensor 4204, a speaker 4206, a user interface 4208, and a processing circuit 4210. Display device 4002 can be configured to display directions and/or other types of information to a user via user interface 4208. In some embodiments, display device 4002 is configured to determine a highest priority direction and/or emergency notification and display the direction and/or emergency notification on user interface 4208. In some embodiments, displaying the directions on user interface 4208 is accompanied by playing the direction and/or emergency notification via speaker 4206. The priority of direction and/or emergency notification may be determined based on detecting emergencies, identifying users with occupancy sensor 4204, and receiving directions over communications interface 4202.

Communications interface 4202 may be configured to communicate with network 4004 as described with reference to FIGS. 40-41. Communications interface 4202 can be configured to communicate via local area networks (e.g., a building LAN), wide area networks (e.g., the Internet, a cellular network, etc.), conduct direct communications (e.g., NFC, Bluetooth, etc.) ad hoc with devices (e.g., ad hoc Wi-Fi, ad hoc Zigbee, ad hoc Bluetooth, NFC etc.), and/or with ad hoc networks (e.g., MANET, a VANET, a SPAN, an IMANET, and any other ad hoc network). In some embodiments, communications interface 4202 communicates ad hoc with display device 4002, display device 4016, and/or display device 4018. In some embodiments, communications interface 4202 includes an application gateway configured to receive input from applications running on client devices. Communications interface 4202 can include one or more wireless transceivers (e.g., a Wi-Fi transceiver, a Bluetooth transceiver, a NFC transceiver, a cellular transceiver, etc.) for communicating with mobile devices.

In some embodiments, communications interface 4202 communicates with display device 4016, display device 4018, building emergency sensor(s) 4006, weather server(s) 4008, building management system 4010, and/or user device 4012 as described with reference to FIGS. 40-41 to receive environmental condition information, direction requests and/or emergency notifications. Communications interface 4202 may receive navigation requests from user device 4012. Communications interface 4202 may receive navigation direction and/or building maps from building management system 4010. In some embodiments, emergency information and/or alerts are received via communications interface 4202 from building management system 4010. In some embodiments, emergency information is received form building emergency sensor(s) 4006. In some embodiments, emergency information is received from weather server(s) 4008.

Occupancy sensor 4204 may be used to detect occupancy and determine the identity of the occupant. Occupancy sensor 4204 may be one or a combination of motion sensors, cameras, microphones, capacitive sensors, or any number of other sensors. For example, occupancy sensor 4204 can include one or more cameras which detect heat signatures. Occupancy sensor 4204 may detect separate objects and distinguish between humans and other objects. Occupancy sensor 4204 can include one or more transducers that detect some characteristic of their respective environment and surroundings. Occupancy sensors, such as a camera, may be used to determine if an occupant is using a wheelchair, cane, crutches, and/or any other assistance device.

Speaker 4206 may be configured to project audio. The audio may be warning messages, direction messages, alternate route suggestion messages and any other message. Speaker 4206 may be any kind of electroacoustic transducer and/or combination of transducers that are configured to generate sound waves based on electrical signals. Speaker 4206 may be a loudspeaker (e.g., various combinations of subwoofers, woofers, mid-range drivers, tweeters, etc.) and may broadcast messages to an entire zone and/or an entire building (e.g., building 10). In some embodiments, speaker 4206 includes filters. In some embodiments, the filters are various combinations of high pass filters, low pass filters, band pass filters, etc.

User interface 4208 may be a touch screen display configured to receive input from a user and display images and text to a user. In some embodiments, user interface 4208 is at least one or a combination of a resistive touch screen and a capacitive touch screen (e.g., projective capacitive touch screen). In some embodiments, user interface 4208 is a swept-volume display, a varifocal mirror display, an emissive volume display, a laser display, a holographic display, a light field display, and/or any other display or combination of displays. User interface 4208 may be configured to display images and text to a user but may not be configured to receive input from the user. In some embodiments, user interface 4208 is one or a combination of a CRT display, an LCD display, an LED display, a plasma display, and/or an OLED display.

Processing circuit 4210 is shown to include a processor 4212 and memory 4214. Processor 4212 can be a general purpose or specific purpose processor, an application specific integrated circuit (ASIC), one or more field programmable gate arrays (FPGAs), a group of processing components, or other suitable processing components. Processor 4212 may be configured to execute computer code and/or instructions stored in memory 4214 or received from other computer readable media (e.g., CDROM, network storage, a remote server, etc.).

Memory 4214 can include one or more devices (e.g., memory units, memory devices, storage devices, etc.) for storing data and/or computer code for completing and/or facilitating the various processes described in the present disclosure. Memory 4214 can include random access memory (RAM), read-only memory (ROM), hard drive storage, temporary storage, non-volatile memory, flash memory, optical memory, or any other suitable memory for storing software objects and/or computer instructions. Memory 4214 can include database components, object code components, script components, or any other type of information structure for supporting the various activities and information structures described in the present disclosure. Memory 4214 can be communicably connected to processor 4212 via processing circuit 4210 and can include computer code for executing (e.g., by processor 4212) one or more processes described herein.

Memory 4214 is shown to include a network controller 4216, an emergency identifier 4218, a HVAC controller 4226, a directions controller 4228, a direction selector 4244, an occupancy controller 4238, an audio controller 4240, and user interface controller 4242. Each of these components is described in greater detail below.

Network controller 4216 may contain instructions to communicate with a network (e.g., network 4004) and ad hoc to other devices (e.g., display device 4016, display device 4018, user device 4012, etc.). In some embodiments, network controller 4216 contains instructions to communicate over wireless and wired communication methods. In some embodiments, wireless communication methods are communicating in a Wi-Fi network, a Zigbee network, and/or a Bluetooth network via communications interface 4202. In some embodiments, the communication methods are wired such as via RS-485, Ethernet (e.g., CAT5, CAT5e, etc.), and/or any other wired communication method. Network controller 4216 may be configured to facilitate communication a local area network or a wide area network (e.g., the Internet, a building WAN, etc.) and may be configured to use a variety of communications protocols (e.g., BACnet, IP, LON, etc.). In some embodiments, network controller 4216 facilitates ad hoc communication. The ad hoc communication may be at least one of (ad hoc Wi-Fi, ad hoc Zigbee, ad hoc Bluetooth, NFC etc.). In some embodiments, network controller 4216 facilitates communication over an ad hoc network (e.g., MANET, a VANET, a SPAN, an IMANET, and any other ad hoc network).

Emergency identifier 4218 can be configured to determine whether an emergency is occurring. The emergency can be an emergency inside the building (e.g., a fire, a dangerous person, a critical fault or operating condition in the BMS, etc.) or an emergency outside the building (e.g., a tornado, dangerous weather conditions, etc.). In some embodiments, emergency identifier 4218 is configured to determine emergency alerts based on information received from network controller 4216. Emergency identifier 4218 may include emergency sensor controller 4220, weather server controller 4222, and BMS emergency controller 4224. Emergency sensor controller 4220 may be configured to communicate with building emergency sensor(s) 4006 described with reference to FIGS. 40-41 via network controller 4216 and communications interface 4202. In some embodiments, emergency sensor controller 4220 can send commands to building emergency sensor(s) 4006. In some embodiments, the commands are to activate actuators, deactivate actuators, gather sensor data, etc. and are sent to emergency sensor(s) 4006 and/or emergency sensor controller 4220.

Emergency sensor controller 4220 may receive sensor data from building emergency sensor(s) 4006 via network controller 4216 and communications interface 4202. Emergency sensor controller 4220 may be configured to analyze the sensor data and determine if an emergency is present. Emergency sensor controller 4220 may determine the nature and/or location of the emergency based on the analysis of the sensor data. The nature of the emergency may be an earthquake, a fire, a gas leak, etc. Emergency sensor controller 4220 may be configured to determine and/or retrieve applicable directions for the determined emergency. In some embodiments, emergency sensor controller 4220 determines that an emergency is occurring when the sensor data is above and/or below a predefined threshold. For example, if emergency sensor controller 4220 determines that sensor data/information indicates that carbon monoxide levels cross a predefined threshold, the air is dangerous to breath and the building should be evacuated.

In some embodiments, building emergency sensor(s) 4006 are configured to determine the nature of the emergency. Emergency sensor controller 4220 may be configured to receive the nature of the emergency from building emergency sensor(s) 4006 via network controller 4216 and communications interface 4202. Emergency sensor controller 4220 can be configured to generate emergency directions based on the emergency. In some embodiments, the emergency directions are to evacuate a building, hide under tables and/or desks, close windows, and any other direction relevant to an emergency situation. Emergency sensor controller 4220 may send the determined emergency directions to direction selector 4244.

In some embodiments, the building emergency sensor(s) 4006 are configured to identify a location of an emergency in the building (e.g., a location of a fire, a location of an active shooter) and the emergency sensor controller 4220 is configured to receive the location of the emergency from the building emergency sensor(s) 4006 via network controller 4216 and communications interface 4202. In such embodiments, the emergency sensor controller 4220 can be configured to generate emergency directions based on the location of the emergency, for example to direct a user away from the emergency (e.g., away from a fire, away from an active shooter, along an evacuation route that avoids a dangerous area). The emergency directions may update dynamically as the emergency moves through a building, e.g., as the emergency sensor(s) 4006 detect the emergency (e.g., a fire, a gunshot) in changing locations in the building.

In some embodiments, the existence, nature, and/or location of an emergency may be determined based at least in part on live data received from the user device 4012 and/or other web-based live data streams (e.g., social media). For example, the emergency identifier 4218 may receive an indication of a call or message transmitted from the user device 4012 to an emergency response system. As another example, the emergency identifier 4218 may receive social media posts that indicate that an emergency event is occurring. The emergency identifier 4218 may use this live data to identify an ongoing emergency and/or determine the nature and/or location of the emergency.

Weather server controller 4222 may be configured to communicate with weather server(s) 4008 as described with reference to FIGS. 4-5. Weather server controller 4222 may be configured to query weather server(s) 4008 for weather information and/or weather related emergency information. In some embodiments, weather server controller 4222 is configured to determine emergency directions based on the information received from weather server(s) 4008. The emergency directions may be sent to direction selector 4244. In some embodiments, the directions are to evacuate a building, hide under tables and/or desks, close windows, and any other direction relevant to an emergency situation.

BMS emergency controller 4224 may be configured to communicate with building management system 4010 as described with reference to FIGS. 4-5. In some embodiments, BMS emergency controller 4224 may be configured to receive emergency information from building management system 4010. In some embodiments, the information received is weather related emergencies, active shooter emergencies, unsafe building emergencies, and any other emergency information received from building management system 4010. In some embodiments, BMS emergency controller 4224 is configured to send the emergency information received form building management system 4010 to direction selector 4244.

In some embodiments, building management system 4010 may include one or more databases which store building maps, room and meeting schedules, and/or any other information regarding a building (e.g., building 10). In some embodiments, BMS emergency controller 4224 is configured to request the building information from building management system 4010 and send the building related information to directions controller 4228.

Still referring to FIG. 42, HVAC controller 4226 may communicate with the building management system 4010 via network controller 4216, communications interface 4202, and network 4004 as described with further reference to FIGS. 4-5. HVAC controller 4226 may be configured to receive temperature setpoints and humidity setpoints via user interface 4208. In some embodiments, HVAC controller 4226 provides a control signal to building management system 4010 via network controller 4216 and/or communications interface 4202. The control signal may cause the building management system 4010 to condition and/or heat a zone and/or building to a setpoint temperature. Further, the control signals may cause building management system 4010 to achieve a humidity value in a building and/or zone based on a humidity setpoint.

HVAC controller 4226 may use any of a variety of control algorithms (e.g., state-based algorithms, extremum-seeking control algorithms, PID control algorithms, model predictive control algorithms, feedback control algorithms, etc.) to determine appropriate control actions for any HVAC equipment connected to building management system 4010 as a function of temperature and/or humidity. For example, if the temperature is above a temperature set point received from user interface 4208, HVAC controller 4226 may determine that a cooling coil and/or a fan should be activated to decrease the temperature of a supply air delivered to a building zone. Similarly, if the temperature is below the temperature set point, HVAC controller 4226 may determine that a heating coil and/or a fan should be activated to increase the temperature of the supply air delivered to the building zone. HVAC controller 4226 may determine that a humidification or dehumidification component of building management system 4010 should be activated or deactivated to control the ambient relative humidity to a humidity set point for a building zone.

Directions controller 4228 may be configured to determine directions for an occupant or a group of occupants of a building (e.g., building 10). In some embodiments, directions controller 4228 includes an opportunistic controller 4230, a user based direction controller 4232, a special needs controller 4234, and a direction request controller 4236. Opportunistic controller 4230 may be configured to generate and/or determine building event directions and/or messages based on information received from the building management system 4010. In some embodiments, opportunistic controller 4230 is configured to receive building event information from building management system 4010 and/or calendar application 4014 of user device 4012 as described with reference to FIGS. 4-5. In some embodiments, the event information may include an image to display on user interface 4208. The event information may include all events in a building at a specific time. Opportunistic controller 4230 may be configured to determine if the location of the event is nearby the location of display device 4002. In some embodiments, only events that are nearby the location of the display device 4002 are determined to be displayed on user interface 4208.

In some embodiments, opportunistic controller 4230 analyzes calendar information from one or more mobile devices (e.g., user device 4012) received via network controller 4216 and communications interface 4202. Based on the calendar information, display device 4002 may learn what events are occurring in the building. Opportunistic controller 4230 may be configured to generate an event image (e.g., various combinations of logos, admission fees, locations, start and end times, etc.) relating to the event and may determine proper audio notifications to be served along with the generated event image.

User-based direction controller 4232 may be configured to generate navigation directions for an occupant. In some embodiments, user based direction controller 4232 may be configured to receive the identity of an occupant from occupancy controller 4238. The identity may be the identity of an occupant a predetermined distance from display device 4002. In some embodiments, the user based direction controller 4232 may be configured to query the building management system 4010 via network controller 4216 and communications interface 4202 for information associated with the identified occupant. In some embodiments, building management system 4010 may reply with the name of the occupant, the schedule of the occupant, any meetings and/or events that the occupant is a participant (e.g., optional participant, required participant, etc.), and may also reply with any special needs of the occupant, such as wheel chair accessible directions. User based direction controller 4232 may be configured to generate directions to any locations which the identified occupant may be scheduled to be. In some embodiments, user based direction controller 4232 may be configured to communicate with a calendar application (e.g., calendar application 4014) via ad hoc and/or network communications with a user device (e.g., user device 4012) to determine the schedule of a building occupant. In some embodiments, user based direction controller 4232 may be configured to generate arrows, building maps, audio directions, and any other form of directions. User based direction controller 4232 may be configured to send the directions to direction selector 4244.

Special needs controller 4234 may determine if the occupant identified by user based direction controller 4232 has any special needs. For example, special needs controller 4234 may be configured to communicate with building management system 4010 and receive any information relating to any physical and/or mental disabilities associated with the identified user. The disabilities may be that the identified occupant is deaf, mute, blind, in a wheelchair, on crutches, etc. In some embodiments, special needs controller 4234 may determine building directions based on the disability of the occupant. For example, if the identified occupant is in a wheel chair, the special needs controller 4234 may generate directions to a location that circumnavigates any stairs. If the identified occupant is determined to be deaf, the special needs controller 4234 may be configured to generate audio directions only and not visual directions. In some embodiments, the audio directions are a series of turns (e.g., "go forward to end of hall turn right, go forward to end of hall turn left," etc.)

Direction request controller 4236 may be configured to receive direction requests from user interface 4208. Direction request controller may communicate with user interface controller 4242 and may receive the direction request from user interface controller 4242. In some embodiments, direction request controller 4236 is configured to display directions to a requested location in response to a building occupant requesting directions via user interface 4208. The requested location can include, for example, a conference room, a meeting room, an office, etc. In some embodiments, direction request controller 4236 may be configured to display a map showing where the user is, where the destination is, the shortest route to the destination, etc. In some embodiments, direction request controller 4236 is configured to generate text directions indicating which turns to make in order to navigate to the destination. Further, direction request controller 4236 may be configured to generate audio messages to be played along with the visual directions.

In some embodiments, occupancy controller 4238 may be configured to determine the identity of an occupant based on information received from occupancy sensor 4204. The identity of the occupant may be provided to user based direction controller 4232. In some embodiments, the occupancy controller 4238 receives sensor input from occupancy sensor 4204 where the sensor may be a camera. Occupancy controller 4238 can perform digital image processing to identify the one or more users based on the digital images received from the camera. In some embodiments, digital image processing is used to identify the faces of the one or more users, the height of the one or more users, or any other physical characteristic of the one or more users. In some embodiments, the digital image processing is performed by image analysis tools such as edge detectors and neural networks. In some embodiments, the digital image processing compares the physical characteristics of the one or more users with physical characteristics of previously identified users.

In some embodiments, occupancy controller 4238 receives sensor input from a microphone. The microphone can be any of a plurality of microphone types. The microphone types include, for example, a dynamic microphone, a ribbon microphone, a carbon microphone, a piezoelectric microphone, a fiber optic microphone, a laser microphone, a liquid microphone, and an audio speaker used as a microphone. In some embodiments, the occupancy controller analyzes the audio data received from the microphone. In some embodiments, occupancy controller 4238 identifies one or more users based on voice biometrics of the audio received from the microphone. Voice biometrics are the unique characteristics of a speaker's voice. Voice biometrics include voice pitch or speaking style that result from the anatomy of the speaker's throat and/or mouth. In some embodiments, the voice biometrics of linked users is stored on display device 4002 in occupancy controller 4238. In some embodiments, the voice biometrics are stored on building management system 4010 and must be retrieved by occupancy controller 4238. In some embodiments, occupancy controller 4238 uses a text dependent voice recognition technique. In some embodiments, occupancy controller 4238 uses a text independent voice recognition technique to identify the one or more users.

In some embodiments, occupancy controller 4238 uses the text dependent voice recognition technique to identify the one or more users based on a password or particular phrase spoken by one of the users. For example, the user may speak a phrase such as "This is Felix, I am home." Occupancy controller 4238 can perform speech recognition to determine the spoken phrase "This is Felix, I am home" from the audio data received form the microphone. In some embodiments, occupancy controller 4238 uses one or a combination of a hidden Markov models, dynamic time warping, neural networks to determine the spoken phrase, etc. Occupancy controller 4238 compares the determined spoken phrase to phrases linked to users. If the phrase, "This is Felix, I am home" matches a phrase linked to a user Felix, occupancy controller 4238 can identify the user as Felix. In some embodiments, the linked phrases are stored on occupancy controller 4238. In various embodiments, the linked phrases are stored on building management system 4010.

In some embodiments, occupancy controller 4238 is configured to capture audio data from one or more users and perform pre-processing. In some embodiments pre-processing may be compressing the audio data, converting the audio data into an appropriate format, and any other pre-processing action necessary. Occupancy controller 4238 may be configured to transmit the captured spoken audio data to a voice recognition server via communications interface 4202 and network 4004 as described with reference to FIGS. 40-41. The voice recognition server may be configured to determine the identity of the occupant and transmit the identity of the occupant to occupancy controller 4238.

Audio controller 4240 may be configured to receive audio directions from direction selector 4244. Audio controller 4240 may generate an analog signal for speaker 4206 based on a digital audio signal from direction selector 4244. In some embodiments, audio controller 4240 may be configured to convert a digital audio signal into an analog audio signal (i.e., digital to audio conversion (DAC)). In some embodiments, audio controller 4240 may contain a text to speech application program interface (API) that is configured to generate spoken words based on the received navigation direction. In some embodiments, the text to speech API is one or a combination of Watson Text to Speech, Cortana text to speech, an open source text to speech API, a proprietary text to speech API, and/or any other text to speech API.

User interface controller 4242 may be configured to display images on user interface 4208. The images can include, for example, maps, text, arrows, and/or any other image used to display direction to an occupant of a building. In some embodiments, user interface controller 4242 is configured to receive input from use interface 4208. The input may be rotating a map, zooming in on a map, typing in a conference room navigation request, and any other input that can be received from user interface 4208. In some embodiments, user interface controller 4242 receives images to display from direction selector 4244. In some embodiments, user interface controller 4242 sends direction requests to direction request controller 4236.

Direction selector 4244 may be configured to receive directions from direction controller 4228. Direction selector 4244 may be configured to receive emergency directions from emergency identifier 4218. In some embodiments, direction prioritization selector 4246 is configured to receive the directions for directions controller 4228. Direction selector 4244 may be configured to prioritize the directions received from directions controller 4228 and the emergency directions received from emergency identifier 4218. Direction prioritization selector 4246 may be configured to rank each direction request in order of highest priority. In some embodiments, directions requested via user interface 4208 may have the highest priority over opportunistic directions and/or direction determined based on information from occupancy sensor 4204. The ranking system may contain a queue which directions may be placed. The length of time which a direction is in the queue may factor into determining the priority for that direction. For example, a conference advertisement may be received from opportunistic controller 4230 and may be placed into a display queue. The longer the advertisement sits in the queue, the higher the priority level for the advertisement may grow. When the priority level crosses a predefined level, the advertisement may be displayed and the priority level reset. In some embodiments, the priority of a direction may determine the period of time that the direction is displayed on user interface 4208.

In some embodiments, direction prioritization selector 4246 may provide the highest priority direction to emergency prioritization selector 4248. Emergency prioritization selector may provide the directions received from direction prioritization selector 4246 to user interface controller 4242 if no emergency is present. If an emergency is present, emergency prioritization selector may provide the emergency directions to user interface controller 4242 instead of the directions from direction prioritization selector 4246. In some embodiments, emergency directions for multiple emergencies (e.g., floods, tornados, storms, earthquakes, etc.) may be ranked base on order of priority. For example, if emergency prioritization selector 4248 receives a notification from emergency identifier 4218 that there is an active shooter in the building (e.g., building 10) and a notification that there is a flooding, emergency prioritization selector 4248 may rank the active shooter directions as higher priority, and may show these directions exclusively and/or for longer periods of time. In some embodiments, the highest priority emergency direction is the direction that is most likely to cause harm to occupants of the building.

In various embodiments, emergency prioritization selector 4248 may combine emergency directions when occupants of the building must respond to multiple emergencies simultaneously. For example, if there is a fire and a tornado, the emergency prioritization selector 4248 may combine fire response directions with tornado response directions. Emergency prioritization selector 4248 may create emergency messages which tell occupants of the building to go to a certain exit. The route to the exit may bypass rooms and/or hallways with large windows. Emergency prioritization selector 4248 may be able to combine any amount or type of emergency directions.

Figure 43:
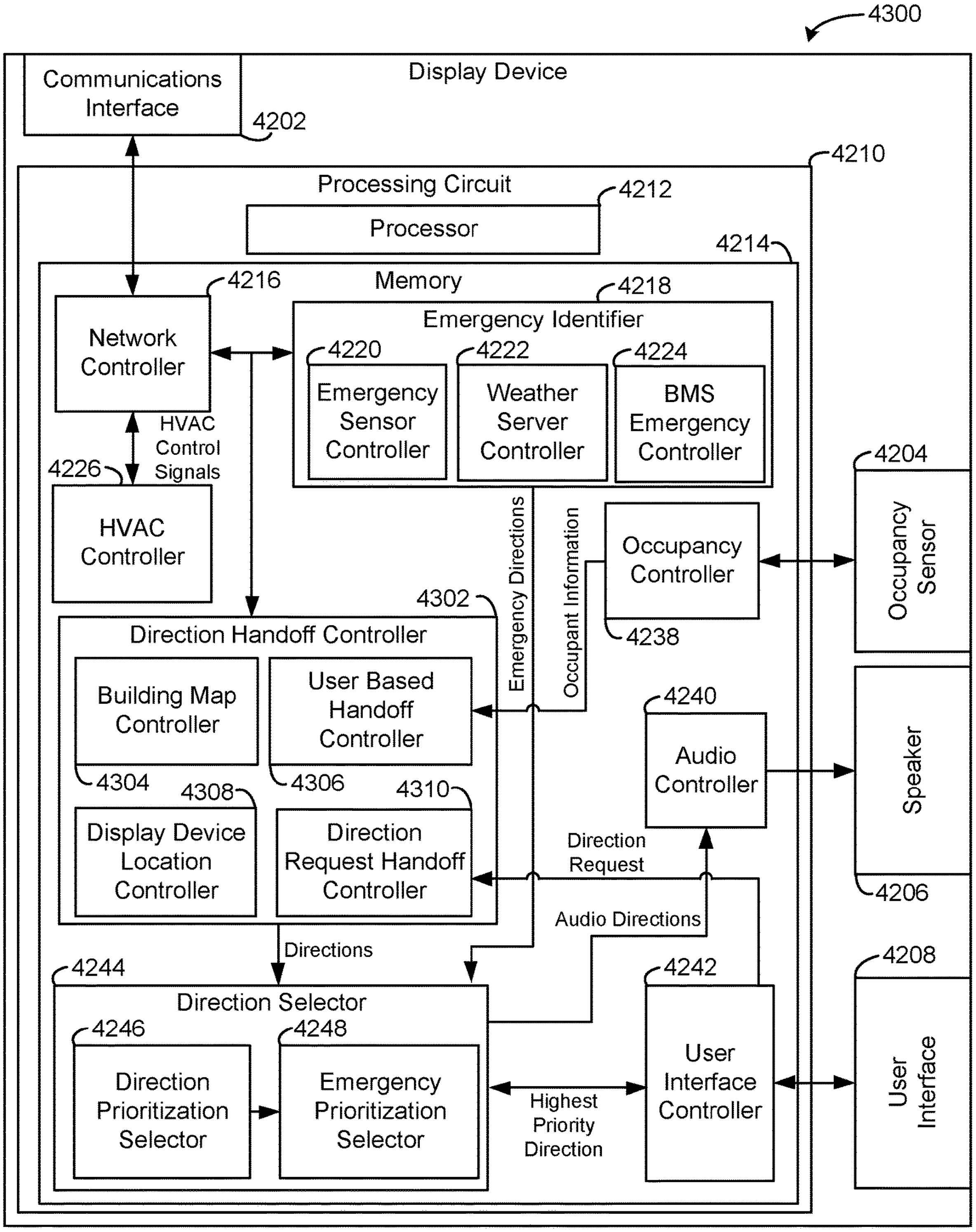
FIG. 43 is a block diagram illustrating another embodiment of the display device of FIGS. 40-41 in greater detail, according to an exemplary embodiment.

Referring now to FIG. 43, display device 4300 is shown as an alternate embodiment of display device 4002. Some components of display device 4300 are the same as display device 4002 as described with reference to FIGS. 40-42. These components include, communications interface 4202, occupancy sensor 4204, speaker 4206, user interface 4208, processing circuit 4210, processor 4212, memory 4214, network controller 4216, emergency identifier 4218, emergency sensor controller 4220, weather server controller 4222, BMS emergency controller 4224, HVAC controller 4226, occupancy controller 4238, audio controller 4240, user interface controller 4242, direction selector 4244, direction prioritization selector 4246, and emergency prioritization selector 4248. Display device 4300 is shown to further include direction handoff controller 4302. In some embodiments, display device 4300 has some or all of the functionality of display device 4002. Direction handoff controller 4302 is shown to include building map controller 4304, user based handoff controller 4306, direction request handoff controller 4310, and display device location controller 4308. Display device 4300 may be configured to determine navigation direction and emergency directions as described with reference to display device 4002.

In addition to determining navigation directions, emergency directions, and prioritizing directions, display device 4300 may be configured to communicate with other display devices (e.g., display device 4016, display device 4018, etc.) and pass directions to other display devices. In some embodiments, display device 4300 passes direction to other display devices that are on the route of a navigation path. In some embodiments, the direction handoff is performed via network 4004 as described with reference to FIGS. 4-5. In various embodiments, the direction handoff is performed ad hoc (e.g., by sending the directions directly from display device to display device).

Building map controller 4304 may be configured to maintain and/or store a building map. The building map may include multiple floors, multiple campuses, etc. Building map controller 4304 may receive updates from building management system 4010 via network 4004. In some embodiments, building map controller 4304 may be configured to receive a map when first installed in the building. In some embodiments, building map controller 4304 contains the locations of all other display devices in the building. In some embodiments, building map controller 4304 is configured to receive map updates from building management system 4010. In various embodiments, building map controller 4304 may receive notices from building management system 4010 that a hallway and/or exit may be closed and/or blocked. In some embodiments, a hallway and/or exit may be blocked based on an emergency (e.g., a certain hallway is on fire and is not transmissible by an occupant. In various embodiments, a hallway and/or exit may be blocked when there are building renovations and/or repairs being done in the building.

User based handoff controller 4306 may have all of the functionality of user based direction controller 4232 and special needs controller 4234. In addition to this functionality, user based handoff controller 4306 may be configured to generate a message to send to other devices along the determined path and/or route. The other devices may be targeted based on their location along the route. Further, the time at which the user based handoff controller 4306 causes the message to be sent may be based on an anticipated and/or determined walking speed of a user. For example, the message to display the directions for a user may be displayed when it is anticipated that the user will be passing the next display device based on an anticipated and/or determined walking speed. User based handoff controller 4306 may cause network controller 4216 and communications interface 4202 to send the message to other targeted display devices.

Display device location controller 4308 may be configured to maintain the location of the display device 4300. In some embodiments, display device location controller 4308 may perform an initial configuration routine in which the display device may prompt an installer with a building map and request that the installer identify the location of the display device 4300. In some embodiments, a password may be entered via user interface 4208 allowing an authorized individual to change the location of the display device 4300. In various embodiments, display device location controller 4308 may be configured to periodically prompt users to confirm the location of the display device 4300. In various embodiments, display device location controller 4308 may prompt the user by asking the user if the directions it is displaying are correct or incorrect. If the user indicates via user interface 4208 that the direction displayed by display device location controller 4308 are incorrect, display device location controller 4308 may be configured to cause a message to be sent to building management system 4010. Building management system 4010 may notify a building technician that the location of display device 4300 needs to be correct and/or updated.

Direction request handoff controller 4310 may contain some or all of the functionality of direction request controller 4236. In addition to this functionality, direction request handoff controller 4310 may be configured to generate a message to send to other devices along the determined path and/or route. The other devices may be targeted based on their location along the route. Further, the time at which direction request handoff controller 4310 causes the message to be sent may be based on an anticipated and/or determined walking speed of a user. For example, the message to display the directions for a user may be displayed when it is anticipated that the user will be passing the next display device based on an anticipated and/or determined walking speed. Direction request handoff controller 4310 may cause network controller 4216 and communications interface 4202 to send the message to other targeted display devices.

Figure 44:
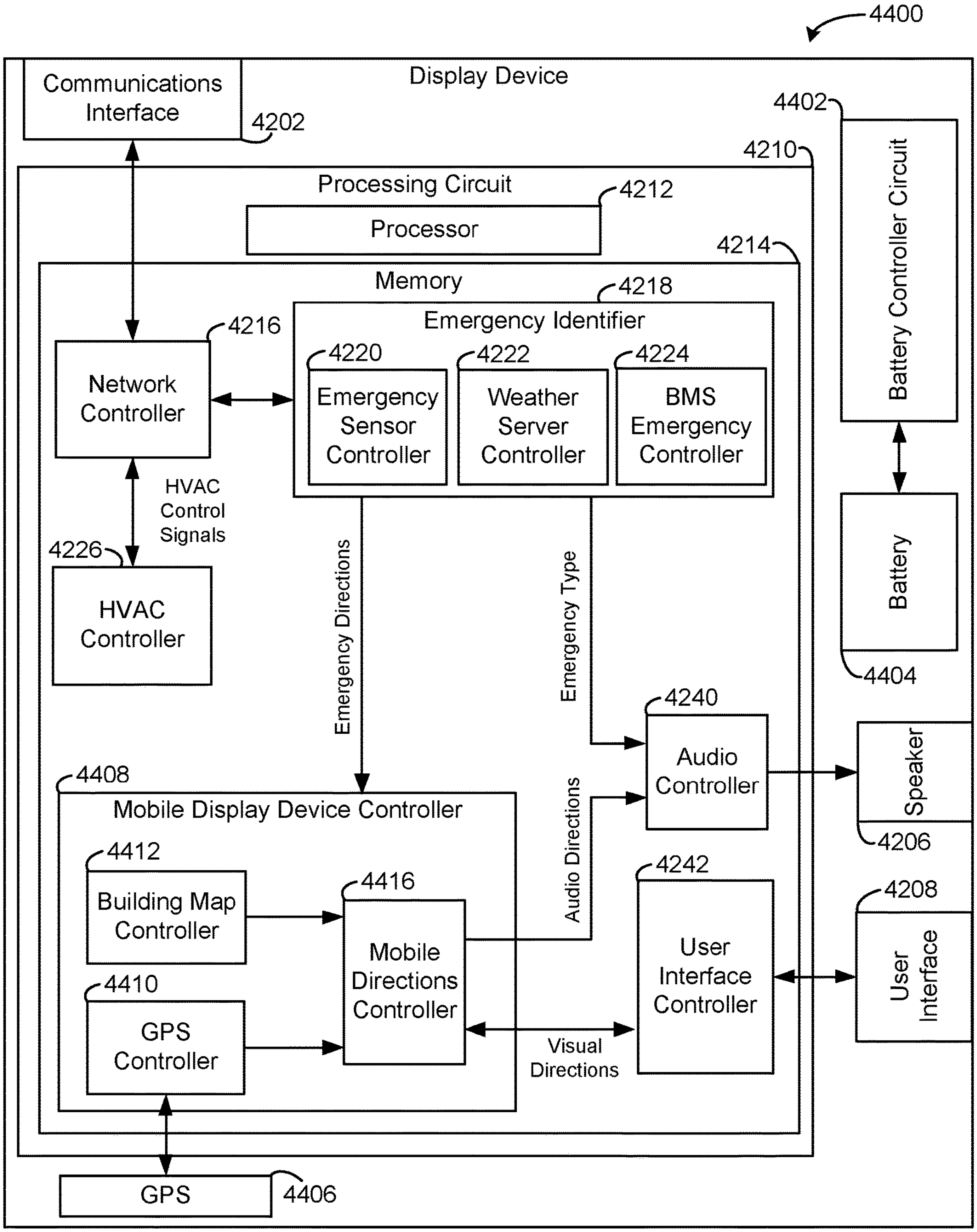
FIG. 44 is a block diagram illustrating another embodiment of the display device of FIGS. 40-41 in greater detail, according to an exemplary embodiment.

Referring now to FIG. 44, display device 4400 is shown as an alternate embodiment of display device 4002. In some embodiments display device 4400 has some and/or all of the functionality of display device 4002. Various components of display device 4400 shown are the same as in display device 4002 as described with reference to FIGS. 4-6. The components include communications interface 4202, speaker 4206, user interface 4208, processing circuit 4210, processor 4212, memory 4214, network controller 4216, HVAC controller 4226, emergency identifier 4218, emergency sensor controller 4220, weather server controller 4222, BMS emergency controller 4224, audio controller 4240, and user interface controller 4242. Display device 4400 may be configured to be removed from a wall (e.g., a wall mount) in the event of an emergency. In some embodiments, display device 4400 is configured to be torn off the wall. In various embodiments, display device 4400 unhooks from a wall mount so that it can be easily removed. Display device 4400 may provide navigation directions for evacuating a building in case of a fire, an active shooter, etc. Display device 4400 is shown to include battery controller circuit 4402, battery 4404, and GPS 4406. Memory 4214 is shown to include mobile display device controller 4408.

Battery controller circuit 4402 is configured to charge and/or discharge battery 4404. Battery controller circuit 4402 may receive AC power and/or DC power. Battery controller circuit 4402 may include a rectifier circuit configured to convert the AC power into DC power. In some embodiments, the rectifier is a full wave rectifier, a half wave rectifier, a full bridge rectifier, and any other type of rectifier. In some embodiments, the rectified wave is filtered to smooth out any voltage ripple present after the wave is rectified. Battery controller circuit 4402 may be configured to configured to perform maximum power point tracking (MPPT) when charging the battery if the power source is a solar cell and/or solar panel. In some embodiments, battery controller circuit 4402 includes circuits configured to perform slow charging (i.e. trickle charging) and/or fast charging. In some embodiments, the temperature of the battery 4404 is monitored while fast charging is performed so that the battery 4404 does not become damaged.

In some embodiments, the battery 4404 stores charge which can be released to power display device 4400. In some embodiments, battery controller circuit 4402 begins discharging battery 4404 when battery controller circuit detects that a wired power source of the display device 4400 is removed (i.e. display device 4400 is removed from the wall). Battery 4404 may be any type or combination of batteries. In some embodiments, the battery is a nickel cadmium (Ni—Cd) battery and/or a nickel-metal hydride (Ni-MH) battery. In various embodiments, the battery is a lithium ion battery and/or a lithium polymer battery.

GPS 4406 may be configured to determine the location of the display device 4400. In some embodiments, GPS 4406 determines the coordinates of display device 4400. GPS 4406 may send the coordinates of display device 4400 to GPS controller 4410. In some embodiments, GPS controller 4410 logs and tracks the location of display device 4400. In some embodiments, GPS controller 4410 is configured to determine what direction display device 4400 is moving by analyzing a plurality of GPS coordinate readings. Building map controller 4412 may contain some of all of the functionality of building map controller 4304 as described with reference to FIG. 7. Building map controller 4412 may be configured to provide a map of the building that display device 4400 is located in to mobile directions controller 4416.

In some embodiments, mobile directions controller 4416 generates audio directions and visual directions for display device 4400. Mobile directions controller 4416 may be configured to provide audio directions to audio controller 4240 as described with reference to FIGS. 6-7. In various embodiments, mobile directions controller 4416 may be configured to provide visual direction to user interface controller 4242 as described with reference to FIGS. 42-43. Mobile direction controller 4416 may be configured to generate a display for user interface 4208. In some embodiments, the display may be a map displaying the location of display device 4400 and a trace leading to the nearest exit.

In some embodiments, mobile directions controller 4416 may be configured to determine directions based on the nature of the emergency determined by emergency identifier 4218. For example, if there is a fire in the building, the mobile directions controller 4416 may navigate the user holding the display device 4400 to the nearest accessible exit. If the emergency is an active shooter in the building, the display device may direct the user holding display device 4400 to an exit and/or may navigate the user holding display device 4400 to a room that can be locked and/or easily barricaded.

In some embodiments, audio controller 4240 is configured to use sound navigation when appropriate. For example, if there is an active shooter in the building, audio controller 4240 may be configured to be silent so that the shooter is not alerted of the location of the user holding display device 4400. In some embodiments, if there is a fire, smoke may be thick enough and/or impair the vision of the user holding display device 4400. Audio controller 4240 may be configured to play audio directing the user holding display device 4400 to an exit without needing the user to be able to see user interface 4208.

Figure 45:
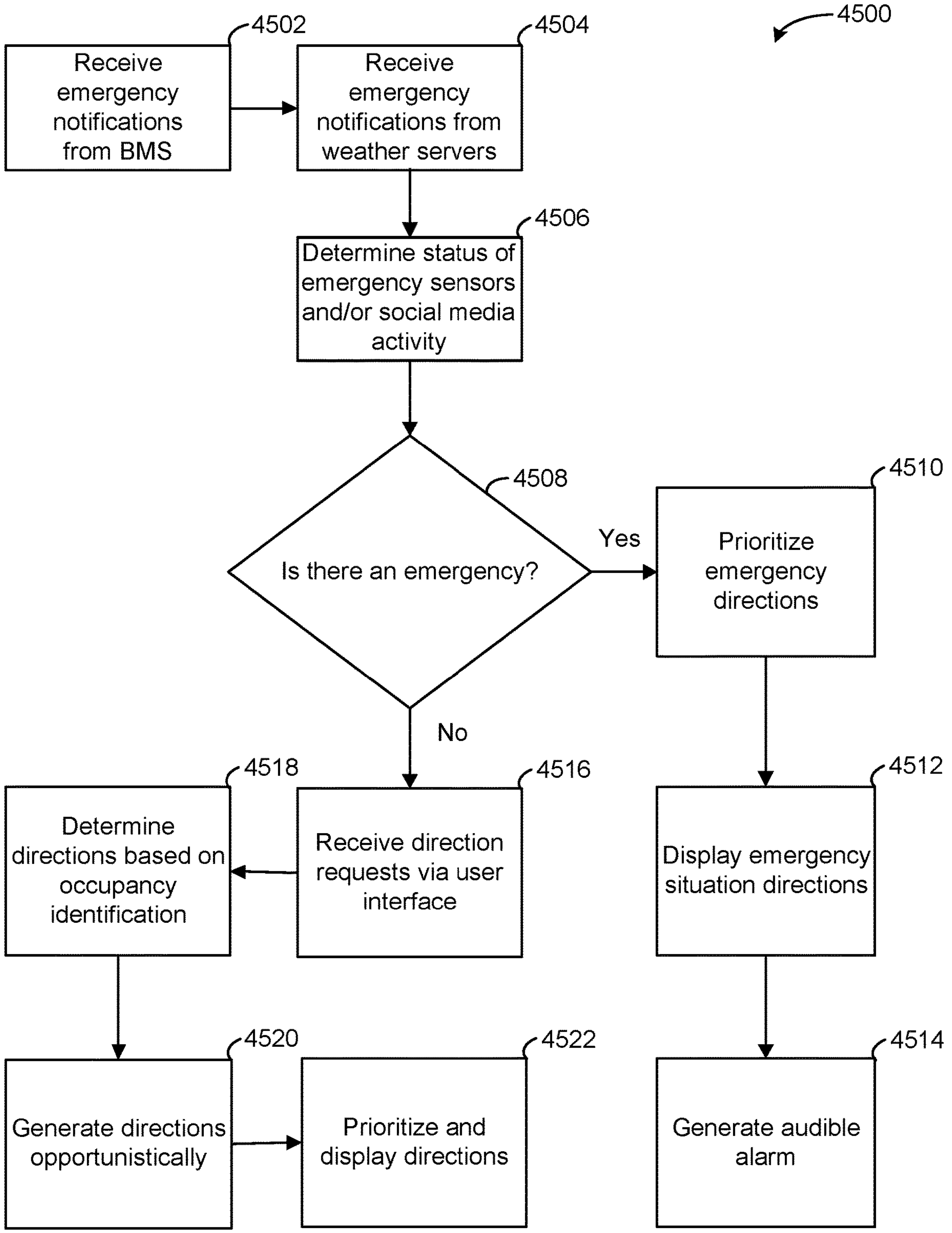
FIG. 45 is a flow diagram of operations for prioritizing directions and displaying the directions on the display device of FIGS. 40-44, according to an exemplary embodiment.

Referring now to FIG. 45, a flow diagram of process 4500 for prioritizing directions for a display device is shown, according to an exemplary embodiment. In some embodiments, process 4500 is performed by display device 4002, as described with reference to FIGS. 40-41. In step 4502, display device 4002 receives emergency notifications from a BMS (e.g., building management system 4010.) In some embodiments, the emergency notification is a weather related notification (winter storm watch, flooding, tornado warning, tornado watch, etc.). In some embodiments, the emergency notification is related to a building emergency (e.g., an active shooter in the building, unsafe water in the building, structurally unsafe areas of the building, etc.)

In step 4504, display device 4002 receives weather related emergency notifications from weather servers (e.g., weather server(s) 4008.) The alert may be a winter storm watch, a flooding warning, a tornado warning, a tornado watch, etc. In step 4506, display device 4002 may receive and/or query emergency sensors (e.g., building emergency sensor(s) 4006) for data indicating a building emergency. In some embodiments, the emergency sensors are configured to determine the nature of the emergency and provide an emergency notification directly to the display device 4002. In some embodiments, the emergency notification is one or a combination of a fire, a gas leak, unsafe carbon monoxide levels, etc. At step 4506, the display device 4002 may also access social media server(s) 4011 to receive and/or monitor data indicating or relating to a building emergency.

The display device 4002 may thereby receive one or more data streams that include multiple messages indicating one or more emergencies relating to the building. The data streams may include a weather data stream indicating weather conditions associated with the building (i.e., as received from weather server(s) 4008), a social media data stream indicating social media postings, comments, messages and/or other activity (i.e., as received from the social media server(s) 4011, a news data stream indicating one or more events associated with the building (e.g., as received from the social media server(s) 4011, the calendar application 4014, the user device 4012, the building management system 4010, etc.), and/or other relevant data streams.

In step 4508, a decision is made by display device 4002 based on the presence or absence of any emergencies. That is, based on the one or more data streams received in steps 4502-4506, the display device 4002 may determine an existence of an emergency and/or a nature or type of the emergency. If display device 4002 does not determine that there is a building and/or weather related emergency in step 4502, step 4504, and step 4506, the display device 4300 may perform 4516 and display non-emergency related directions. If display device 4002 determines that there is a building and/or weather related emergency in step 4502, step 4504 and/or step 4506 display device 4002 may prioritize the emergency directions and display emergency related directions.

In step 4510, display device 4002 may prioritize all the emergencies determined in step 4502, step 4504, and/or step 4506. Display device 4002 may determine the priority of emergencies based on emergency severity and/or immediate impact to occupants of a building. For example, a winter storm warning may have a lower priority than an active shooter.

In step 4512, display device 4002 may display the emergency directions. In some embodiments, the emergency directions are actions (e.g., emergency response directions) to take in lieu of the building and/or weather related emergency. For example, if there is a tornado, the directions may be to hide under desks and/or tables. If there is a fire, the display device 4002 may display evacuation directions and/or a route to the nearest exit. If there are multiple emergencies present, the display device 4002 may cycle emergencies and/or choose the most important emergency to display. In some embodiments, display device 4002 generates custom directions to accommodate the proper actions to take when there are multiple emergencies. For example, if there is a fire and an active shooter present in a building, display device 4002 may turn off all sound on display device 4002 and display a message to the individual to keep silent. The display device 4002 may then precede to direct building occupants to the nearest exits.

In step 4514, the display device 4002 may generate audible alarms. In some embodiments, the audible alarm may be a loudspeaker message disclosing what the emergency is and/or the proper actions to take in lieu of the emergency. In some embodiments, the audible directions are directions to the nearest exit. The directions may be "Turn left at the end of hallway and proceed to exit" and/or any other message indicating the proper directions that a user should take to evacuate the building.

If display device 4002 determines that no emergencies are present in step 4508, the display device may perform step 4516. In step 4516, display device 4002 receive user direction request via a user interface. In some embodiments, a user may input a specific conference room, meeting room, and/or office.

In step 4518, display device 4002 may identify an occupant based on digital video processing from a camera, digital audio processing from a microphone, and/or any other processing of occupancy sensors that can be used to identify a user. In some embodiments, display device 4002 stores features of users that can be matched by using digital video processing and/or digital audio processing. In some embodiments, display device 4002 sends a query with identified physical features of a user to a building management system (e.g., building management system 4010). The building management system may return the identity of the user. In some embodiments, the building management system may return a schedule indicating locations and times of meetings which the user may be required to attend, or which may be of interest to the user. In some embodiments, display device 4002 generates navigation direction based on the identity of the user and/or based on the schedule received from the building management system.

In step 4520, display device 4002 may generate directions opportunistically. In some embodiments, directions may be based on events occurring in the building. In some embodiments, display device communicates with a building management system (e.g., building management system 4010) and/or a building scheduler system. In some embodiments, display device 4002 generates opportunistic directions based on the location of display device 4002 in the building and/or the events occurring in the building. In some embodiments, display device 4002 communicates with the scheduling applications of mobile devices of users in the building and/or passing by display device 4002. In some embodiments, display device 4002 determines what events are occurring in the building and their nature (e.g., public, private, etc.). In some embodiments, display device 4002 generates directions opportunistically based on the schedules of mobile devices in the building.

In some embodiments, display device 4002 prioritizes the directions determined in steps 4516-4520 (step 4522). The directions can be ranked in order of highest priority. In some embodiments, requested directions (step 4516) may have the highest priority over opportunistic directions (step 4520) and/or direction determined based on information from an occupancy sensor (step 4518). The ranking system may contain a queue which directions may be placed. The length of time which a direction is in the queue may factor into determining the priority for that direction. For example, if a conference advertisement is received from a building management system, the priority for displaying this advertisement may be low. In some embodiments, the priority of a direction may determine how long the direction is displayed on a user interface of display device 4002. The highest priority direction may be displayed on a user interface of display device 4002.

Figure 46:
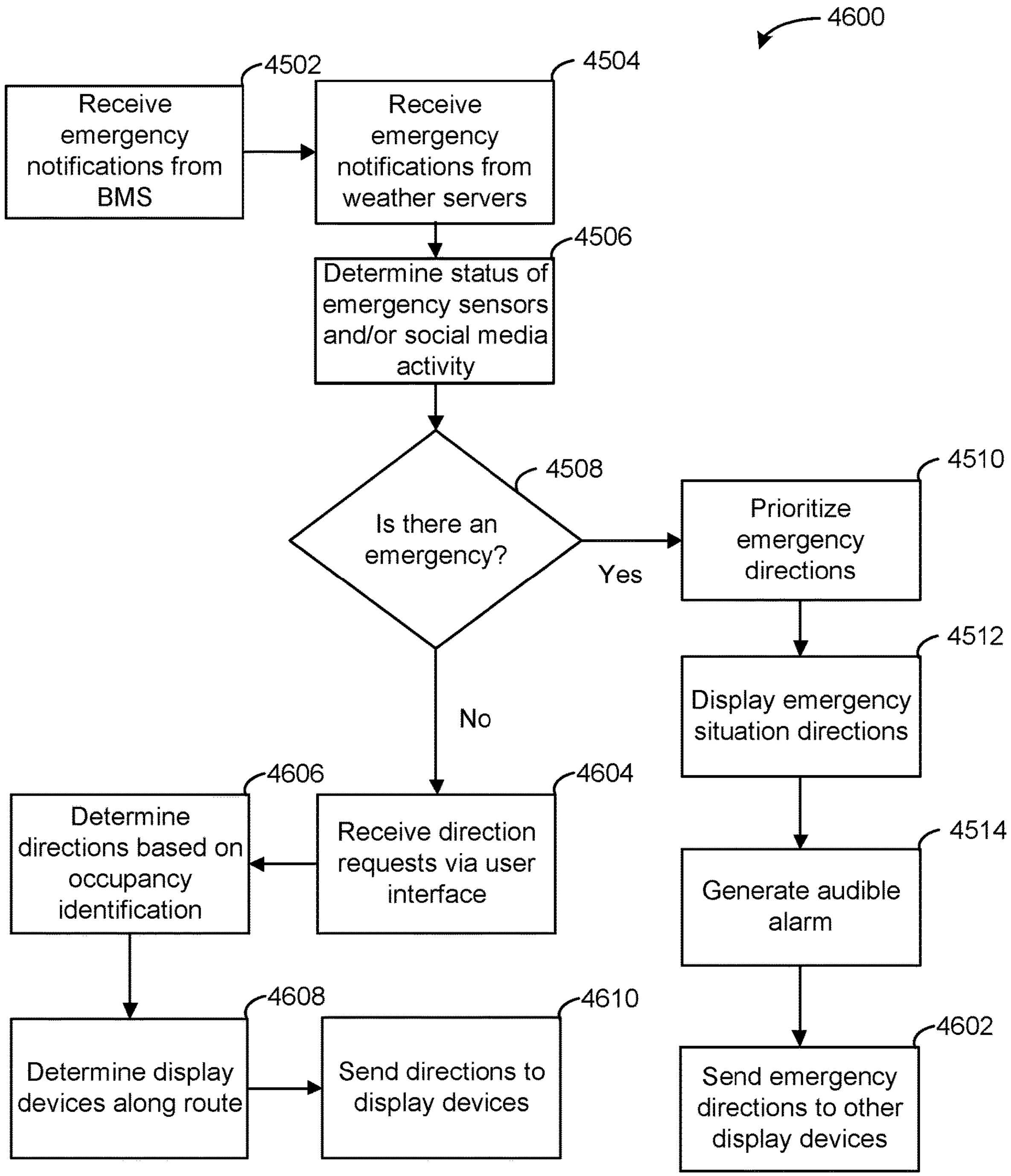
FIG. 46 is a flow diagram of operations for handing off directions between multiple display devices of FIGS. 40-44, according to an exemplary embodiment.

Referring now to FIG. 46, a flow diagram of process 4600 for handing off directions between display devices is shown, according to an exemplary embodiment. In some embodiments, process 4600 is performed by display device 4300, as described with reference to FIG. 43. Process 4600 may include some or all of the steps of process 4500 as described with reference to FIG. 45. In step 4508, display device 4300 determines if there is an emergency present in the building in which display device 4300 is located. If there is an emergency, steps 4510, 4512, and 4514 are performed as described with reference to FIG. 45.

In step 4602, display device 4300 sends emergency directions to other display devices located in the building. In some embodiments, display device 4300 determines where other display devices are located in the building with a display device location controller (e.g., display device location controller 4308). In some embodiments, display device 4300 sends the emergency directions to other devices located in the building via ad hoc communication (e.g., ad hoc Wi-Fi, ad hoc Zigbee, ad hoc Bluetooth, NFC etc.). In some embodiments, display device 4300 is configured to communicate ad hoc to the other display devices. In various embodiments, display device 4300 may be configured to transmit the emergency directions to the other display devices via network 4004 as described with reference to FIG. 40. In some embodiments, network 4004 may connect display devices on multiple floors, multiple zones, multiple buildings, and multiple campuses. In some embodiments display device 4300 may send emergency directions to display devices located on a different floor than the display device 4300, a different zone than the display device 4300, a different building than the display device 4300, and a different campus than the display device 4300.

In step 4508, if no emergency is present, display device 4300 may receive direction requests from user interface (step 4604). In some embodiments, display device 4300 may be configured to allow users to enter destinations via a touch screen user interface. In some embodiments, the destination is a conference room, a meeting room, and/or an office. Display device 4300 may be configured to display an arrow, a map, turn by turn directions, and/or generate audio directions. Display device 4300 may determine other display devices along the route to the destination (step 4608) and may send display directions to these devices ad hoc and/or over network 4004 (step 4610).

In step 4606, display device 4300 may determine directions for an occupant based on the identity of the occupant. In some embodiments, display device 4300 uses at least one of a camera and/or a microphone to determine the identity of an occupant. An occupancy controller (e.g., occupancy controller 4238) may be configured to identify occupants based on data received from occupancy sensors (e.g., cameras, microphones, etc.). Display device 4300 may be connected to a network (e.g., network 4004) and may be able to retrieve meeting information associated with the identified user. Display device 4300 may be configured to display directions (arrows, turn by turn directions, maps, etc.) based on any destinations that are indicated by the identified user's meeting schedule. In some embodiments, display device 4300 is configured to determine other display devices along the route to the destination (step 4608) and may send display directions to these devices ad hoc and/or over network 4004 (step 4610).

Figure 47:
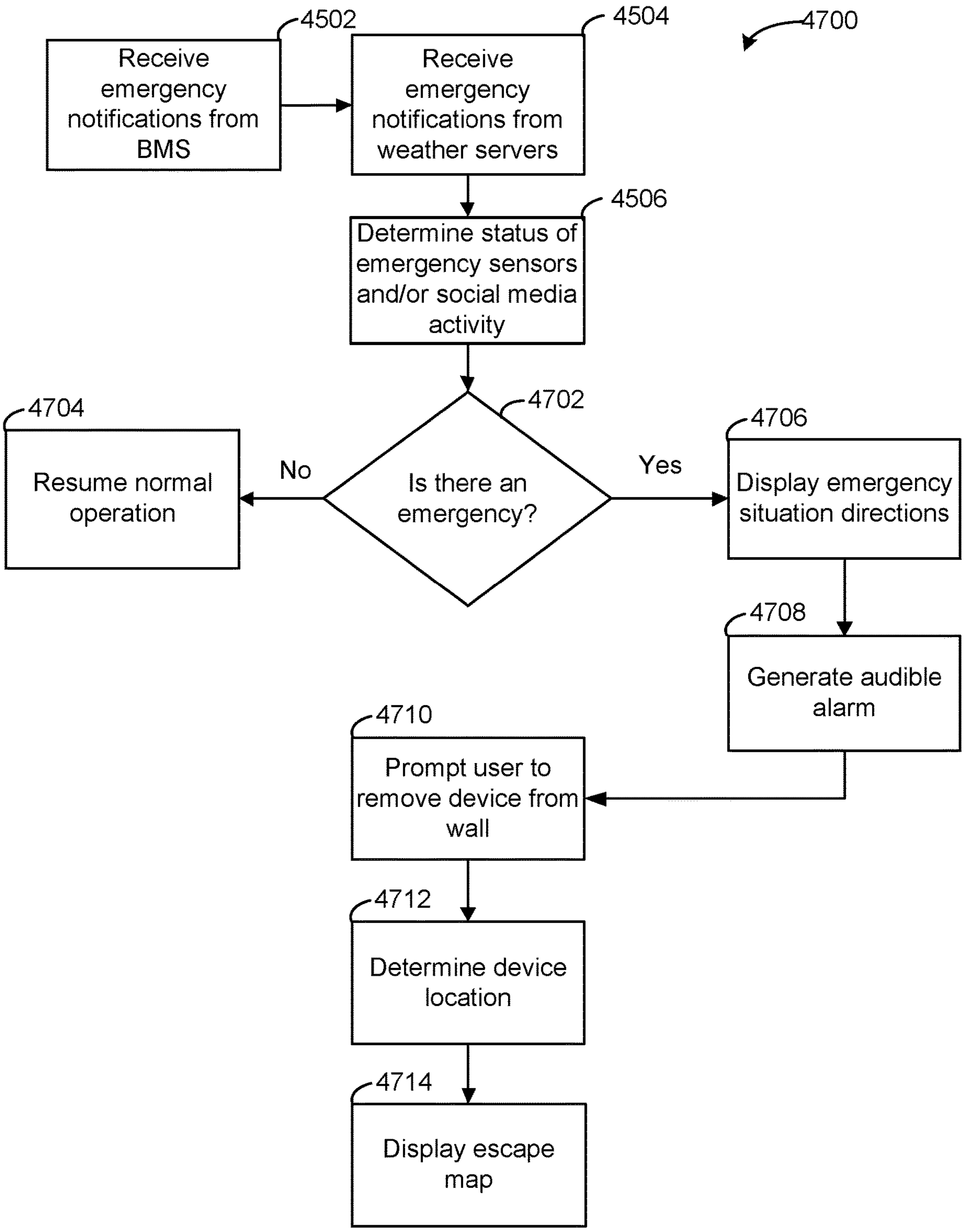
FIG. 47 is a flow diagram of operations for detaching the display device of FIGS. 4-8 from the wall in an emergency situation, according to an exemplary embodiment.

Referring now to FIG. 47, a flow diagram of process 4700 for removing a display device from a wall and using it as a map in an emergency situation, according to an exemplary embodiment. In some embodiments, process 4700 is performed by display device 4400, as described with reference to FIG. 44. In step 4702, display device 4400 determines if there is an emergency present in the building in which display device 4400 is located. In step 4706, display device 4400 determines if there is a building emergency as determined by steps 4502, 4504, and 4506, as described with reference to FIG. 45. If there is no building and/or weather related emergency, display device 4400 may resume normal operation (e.g., 4704). In some embodiments, normal operation is receiving environmental setpoints via user interface 4208 and regulating environmental conditions of zones and/or a building (e.g., building 10) with HVAC controller 4226. In some embodiments, normal operation is waiting for an emergency message to be received such as in steps 4502, 4504, and 4506 as described with reference to FIG. 45.

In some embodiments, if an emergency is determined in at least one of steps 4502, 4504, and 4506 as described with reference to FIG. 45, display device 4400 displays emergency situation directions (step 4706). In some embodiments, the emergency situation directions are evacuation directions, phone numbers to call, an appropriate course of action to take, etc. In step 4708, display device 4400 may generate an alarm. In some embodiments, the alarm is a siren, a building-wide message, and/or any other audible alarm.

In step 4710, display device 4400 may prompt a user to remove display device 4400 from the wall. In some embodiments, user interface 4208 intermittently periodically displays a message "Remove From Wall For Evacuation" for a predefined duration of time. In some embodiments, the user may press a button on user interface 4208 which confirms that the user has removed the device from the wall. In some embodiments, display device 4400 may use GPS 4406 and GPS controller 4410 to determine that display device 4400 has is changing location and has been removed from its original location. In some embodiments, display device 4400 has a sensor such as a switch which detects that the device has been removed from the wall.

In step 4712, display device 4400 may determine its current location with GPS 4406. In some embodiments, GPS controller 4410 may communicate with GPS 4406 to determine coordinates of display device 4400. In some embodiments, the coordinates are a latitude, a longitude, and an altitude. Display device 4400 may be configured to use the coordinates to determine the location of the display device 4400 and the user who has removed display device 4400 from the wall in the building. In some embodiments, display device 4400 uses GPS controller 4410 to poll GPS 4406 for coordinates periodically. In some embodiments, GPS controller 4410 receives a new coordinate when one of the coordinates (i.e., altitude, longitude, and latitude) has changed more than a predefined amount.

In step 4714, the display device may use building map controller 4412 and mobile directions controller 4416 to determine a route to an evacuation point and/or a safe zone with the GPS coordinates of GPS controller 4410. In some embodiments, user interface controller 4242 may display the location of the user on user interface 4208 and a map with a route indicating the necessary directions to take to reach the evacuation point and/or safe zone.

Figure 48:
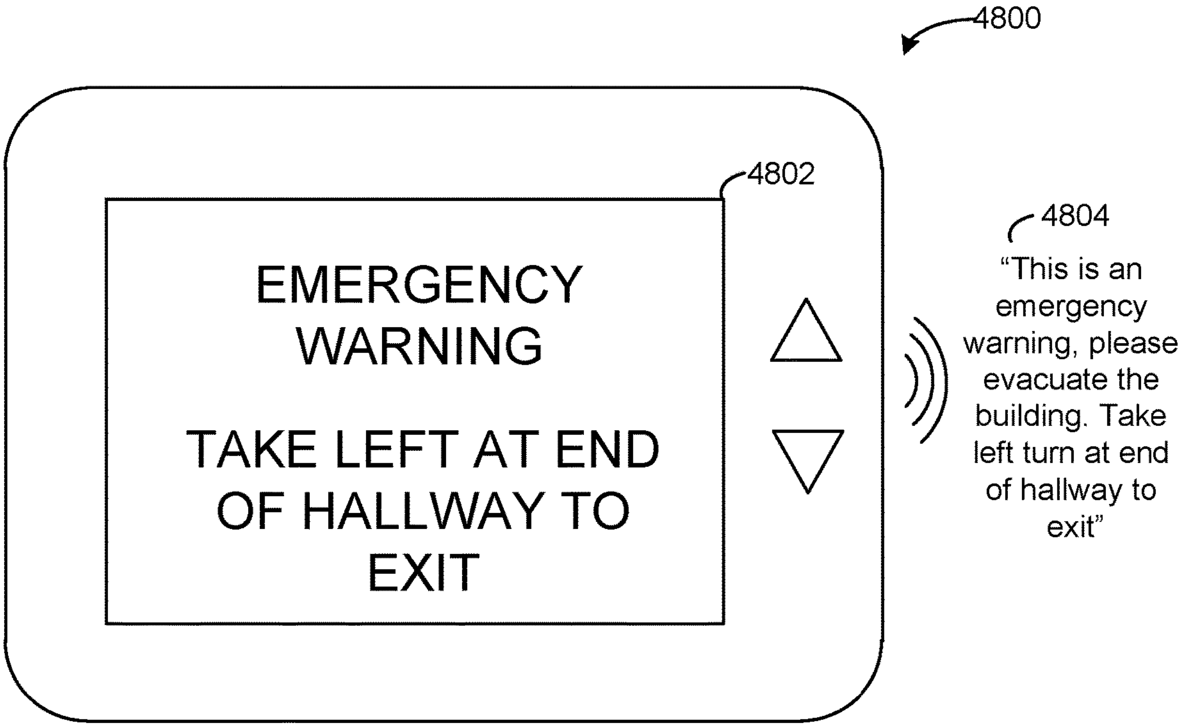
FIG. 48 is a drawing of the display device of FIGS. 40-44 displaying an emergency warning, according to an exemplary embodiment.

Referring now to FIG. 48, a drawing 4800 of an emergency display for display device 4002 is shown, according to an exemplary embodiment. In some embodiments, display device 4002 is configured to display emergency directions on user interface 4208. Emergency directions 4802 display text based directions for exiting a building. In some embodiments, the directions may be map based. Map based directions may allow an individual to see their current location on a map and a route to the nearest exit, evacuation zone, and/or safe zone. Audio 4804 may be broadcast by display device 4002 to accompany the visual emergency message. In some embodiments audio 4804 is broadcast via speaker 4206. The emergency audio, audio 4804, may give audible directions to occupants of the building to evacuate. In some embodiments, audio 4804 may give occupants of the buildings evacuation directions and/or directions to a safe zone.

Figure 49:
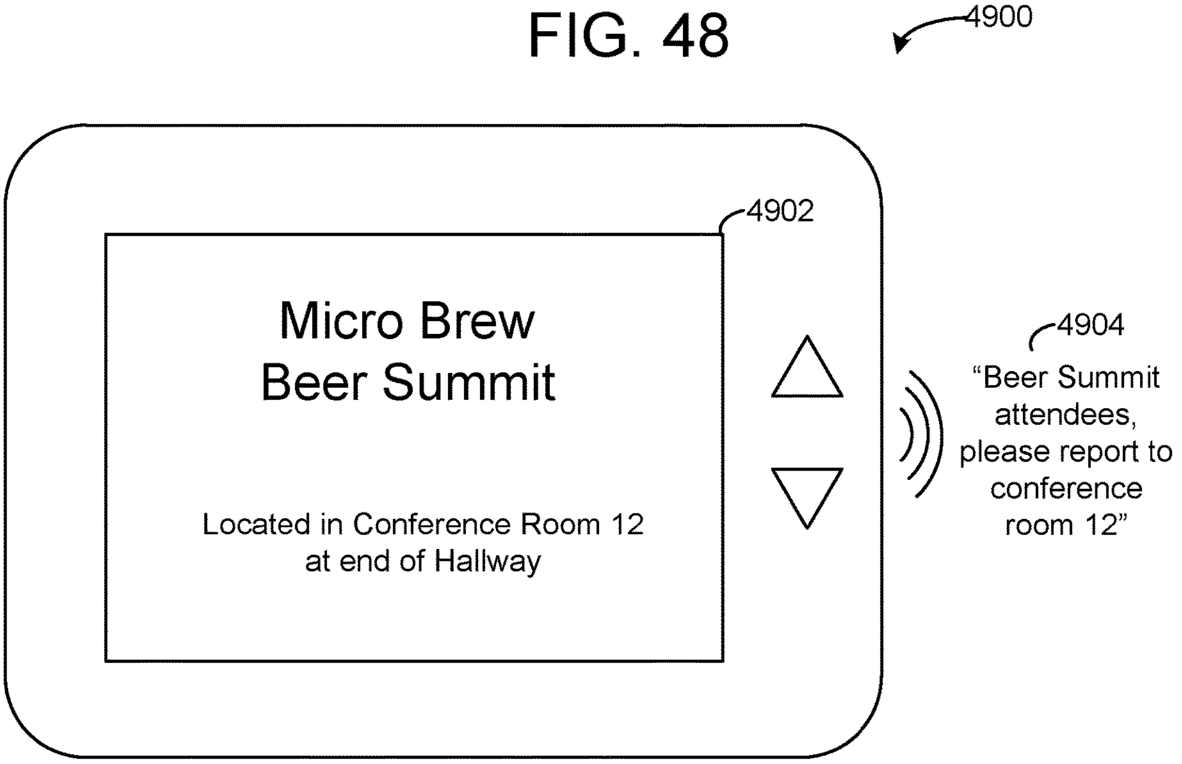
FIG. 49 is a drawing of the display device of FIGS. 40-44 displaying a building event notification, according to an exemplary embodiment.

Referring now to FIG. 49, a drawing 4900 of an opportunistic display for display device 4002 is shown, according to an exemplary embodiment. In some embodiments, the opportunistic message may be a message generated and/or determined by opportunistic controller 4230 as described with reference to FIGS. 42-44. In some embodiments, display device 4002 is configured to display opportunistic messages and opportunistic directions on user interface 4208. Opportunistic message 4902 displays advertise a building event and display directions to said building event. The advertisement may include a logo, the location of an event, a cost of an event, and/or any other information that could be used in the advertisement. Audio 4904 may be broadcast by display device 4002 to accompany the opportunistic message. In some embodiments audio 4804 is broadcast via speaker 4206. The opportunistic audio message, audio 4804, may give audible directions to occupants of the building to report to certain rooms, floors, building, and/or any other location. In some embodiments, audio 4904 is music and/or any other audio based message or sound.

Figure 50:
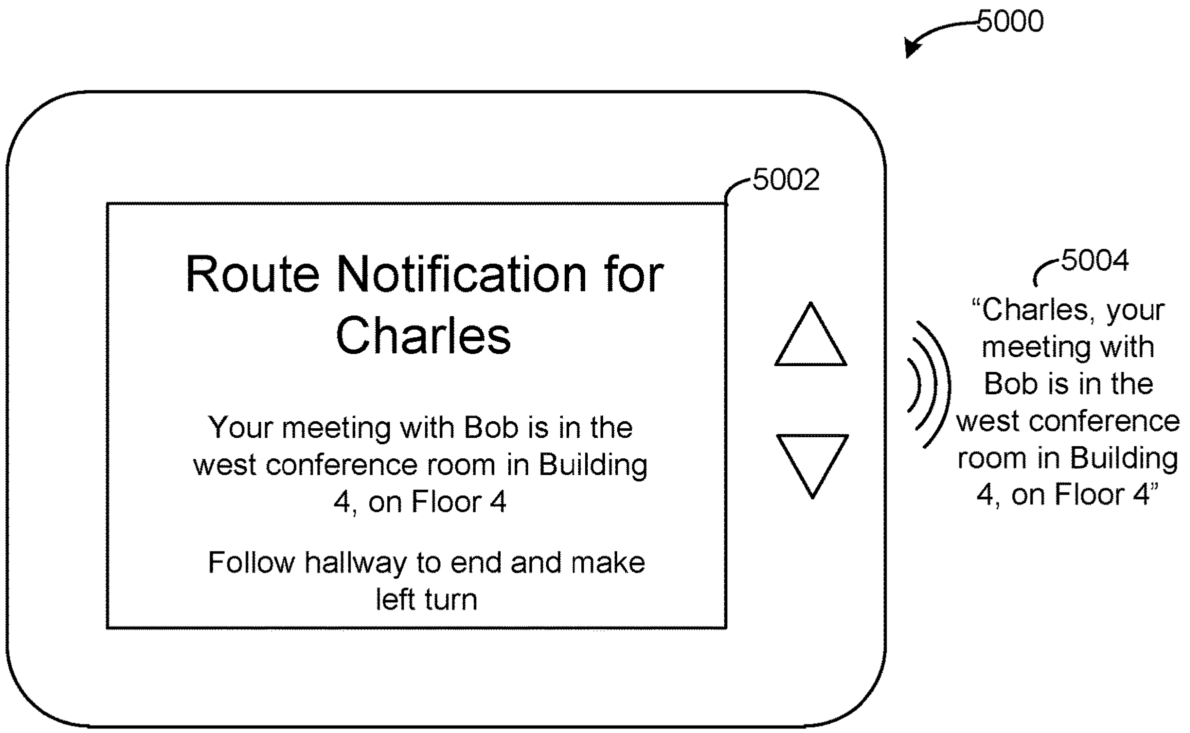
FIG. 50 is a drawing of the display device of FIGS. 40-44 displaying a route notification, according to an exemplary embodiment.

Referring now to FIG. 50, a drawing 5000 of a route notification 5002 for display device 4002 and/or display device 4300 is shown, according to an exemplary embodiment. In some embodiments, display device 4002 and/or display device 4300 is configured to display directions on user interface 4208. In some embodiments, the directions are for an identified and/or tracked occupant. Route notification 5002 may include the name of the occupant being given directions. In some embodiments, route notification 5002 includes a route destination (e.g., "West Conference room in Building 4, on Floor 4"). Further, directions may be given to the occupant. The directions may be the appropriate turns to take to reach a location (e.g., "follow hallway to end and make left turn").

In some embodiments, audio 5004 may be broadcast by display device 4002 and/or display device 4300 to accompany the direction message 5102. In some embodiments audio 5004 is broadcast via speaker 4206. The audio 5104 may give audible directions to occupants of the building to report to certain rooms, floors, building, and/or any other location. In some embodiments, audio 5004 is music and/or any other audio based message or sound. Audio 5004 may identify an occupant by name and/or handle before playing directions for the occupant.

Figure 51:
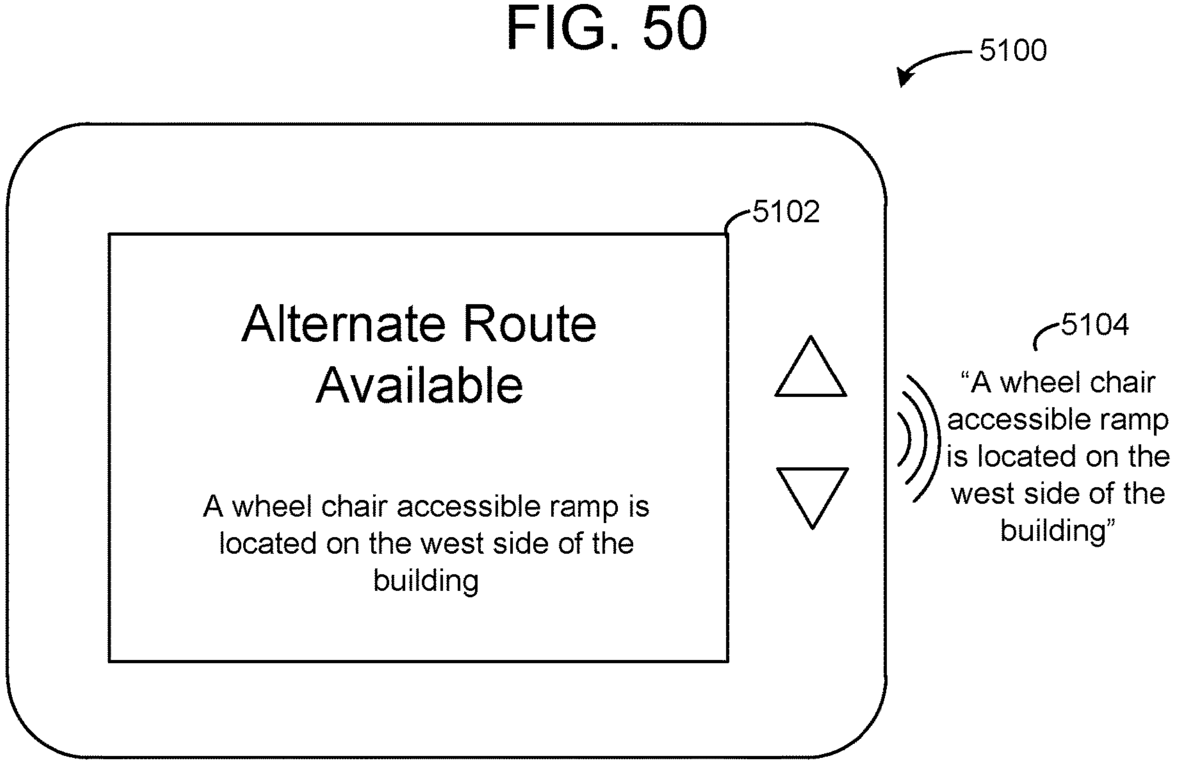
FIG. 51 is a drawing of the display device of FIGS. 40-44 displaying a handicap route notification, according to an exemplary embodiment.

Referring now to FIG. 51, a drawing 5100 of an alternate route notification for display device 4002 and/or display device 4300 is shown, according to an exemplary embodiment. In some embodiments, display device 4002 and/or display device 4300 is configured to display alternate route directions on user interface 4208. In some embodiments, the directions are for an identified and/or tracked occupant. In some embodiments, the identified and/or tracked occupant has a known disability. Alternate route message 5102 may give directions to an occupant of an alternate route based on the disability of the occupant. For example, the route may direct an occupant to a wheelchair ramp instead of a staircase if the identified occupant has crutches, a wheelchair, and/or any other disability prohibiting the occupant from ascending and/or descending stairs.

In some embodiments, audio 5104 may be broadcast by display device 4002 and/or display device 4300 to accompany the alternate route message 5102. In some embodiments audio 5104 is broadcast via speaker 4206. The audio 5104 may give audible directions to occupants of alternate routes. In some embodiments, the audio 5104 may direct an occupant to a wheelchair accessible ramp. In some embodiments, audio 5104 is music and/or any other audio based message or sound. Audio 5104 may identify an occupant by name and/or handle before playing directions for the alternate route.

Figure 52:
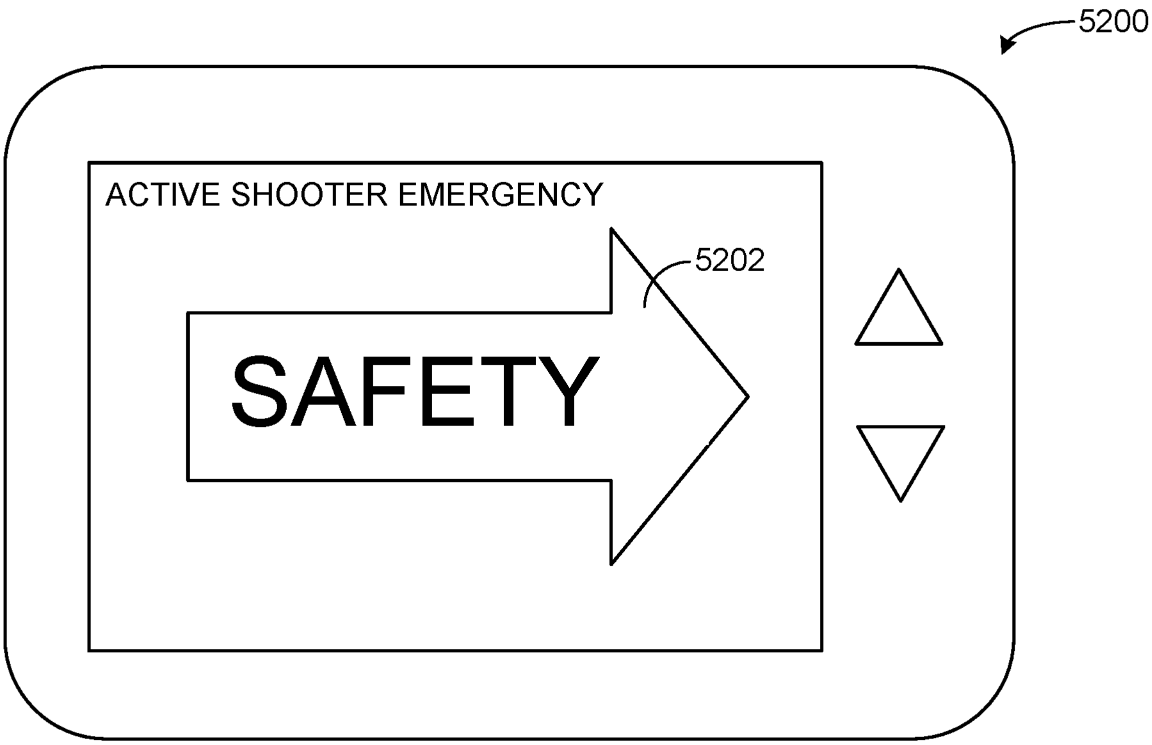
FIG. 52 is a drawing of the display device of FIGS. 40-44 displaying an emergency direction, according to an exemplary embodiment.

Referring now to FIG. 52, a drawing 5200 of another alternate route notification for display device 4002 and/or display device 4300 is shown, according to an exemplary embodiment. In the embodiment shown, display device 4002 (and/or display device 4300 and/or display device 4400) is configured to display an arrow 5202 that points in a direction that a user/occupant of the building should move to avoid an emergency. More particularly, in the example shown, the arrow 5202 points away from a location of an active shooter detected by the building emergency sensor(s) 4006. In such an example, the display device 4002 determines a route based on a location of the active shooter and a building map or floorplan to determine a safe direction for an occupant to travel. The arrow 5202 thereby directs the occupant in a safe direction (e.g., away from danger). In some embodiments, the arrow 5202 may be updated to point in various directions in real time as the location of the active shooter detected by the building emergency sensor(s) 4006 changes. The display device 4002 and/or display device 4300 thereby facilitates a user in fleeing an active shooter.

More particularly, in the example of FIG. 52, the processing circuit 4210 of the display device 4002 may receive, via the communications interface 4202, a first indication of a first location of a shooter from a shot detection system. The shot detection system may be included with the building emergency sensors 4006 and may be configured to detect a gunshot in the building and determine a location of the gunshot in the building. The processing circuit 4210 may determine and escape route, an evacuation route, or other route to safety based on the first location of the shooter, the location of the display device 4002, and the location of one or more additional display devices (e.g., display device 4016, display device 4018), and a floor plan of the building, A first navigation direction may be displayed on the display device 4002 (e.g., as shown in FIG. 52) to direct a user along a route that avoids the shooter within the building. A second navigation direction may be displayed on a second display device (e.g., display device 4016, display device 4018) to show a user a next step on the safe route to avoid the shooter.

In some cases, the shooter may move within the building. The shot detection system may detect a second location of a gunshot and provide the second location to the display device 4002. The display device may then update the escape route and the associated navigations directions on the display device 4002 and on the one or more additional display devices (e.g., display device 4016, display device 4018) to direct the user along an update route that avoids the second location. The user may thereby be guided to safety along a route that avoids the active shooter in the building. For example, with reference to FIG. 52, the arrow 14202 may be updated to point in a new direction (e.g., switched from pointing right to pointing left) when the gunman is detected as relocating to the right of the display device 4002.

Halo Light Emitting Diode (LED) System

A display device includes a housing having a front portion, a rear portion, and a halo having a rim which is disposed between the front portion and the rear portion, according to some embodiments. In some embodiments, the halo receives light emitted by one or more LEDs and diffuses the light along sides of the display device. The halo includes multiple light guiding portions which each have a receiving post and a sweep portion, according to some embodiments. In some embodiments, each of the light guiding portions protrude from a rim of the halo which is positioned between the front portion and rear portion of the display device. In some embodiments, the halo is made of or includes a translucent material and/or a transparent material. In some embodiments, the LEDs are disposed along a path of an LED board and are each configured to emit light received by a corresponding light guiding portion. In some embodiments, the light guiding portions are cantilever portions, having an overall S-shape, protruding at one end from the rim. In some embodiments, the light guiding portions include exterior surfaces coated (e.g., cladded) with an opaque material which does not allow light to pass through along substantially an entire length of the light guiding portions. In some embodiments, a surface of the receiving posts and an exterior surface of the rim does not include the opaque material, such that light may enter and exit the light guiding portions only at the receiving post and exterior surface of the rim, respectively.

In some embodiments, the halo facilitates notification of a user regarding any of information, a message, an event, etc., at a wider viewing angle. For example, if the user is not positioned directly in front of the display device, the user may be unable to view a front display panel of the display device, according to some embodiments. In some embodiments, the halo directs light outwards from sides of the display device, so that the light emitted by the LEDs can be viewed by a user at a generally side angle.

In some embodiments, the display device is a thermostat, e.g., the control device 214 as described with reference to FIGS. 2-39. In some embodiments, the display device is the display device 4002 as described with reference to FIGS. 40-52. In some embodiments, the display device is configured to receive information from any of a sensor, another controller, a network, etc. as described herein. In some embodiments, the display device is configured to patterningly adjust an operation of one or more of the LEDs (e.g., which LEDs switch on/off, when certain LEDs switch on/off, a brightness of one or more of the LEDs, a color of one or more of the LEDs, etc.) to provide unique visual notifications to the user. In some embodiments, the display device includes a controller configured to determine patterned operations of the LEDs to produce the unique visual notifications. In some embodiments, the display device is a general display device and may be used for a variety of applications (e.g., building systems, security systems, reminder systems, emergency exit systems, fire alarm systems, indoor air quality systems, automotive systems, alarm systems, intrusion detection systems, etc.).

Advantageously, the display device facilitates visual notification regarding a variable, an event, a change in a variable, etc., to a user at a wider viewing angle, according to some embodiments.

Figure 53:
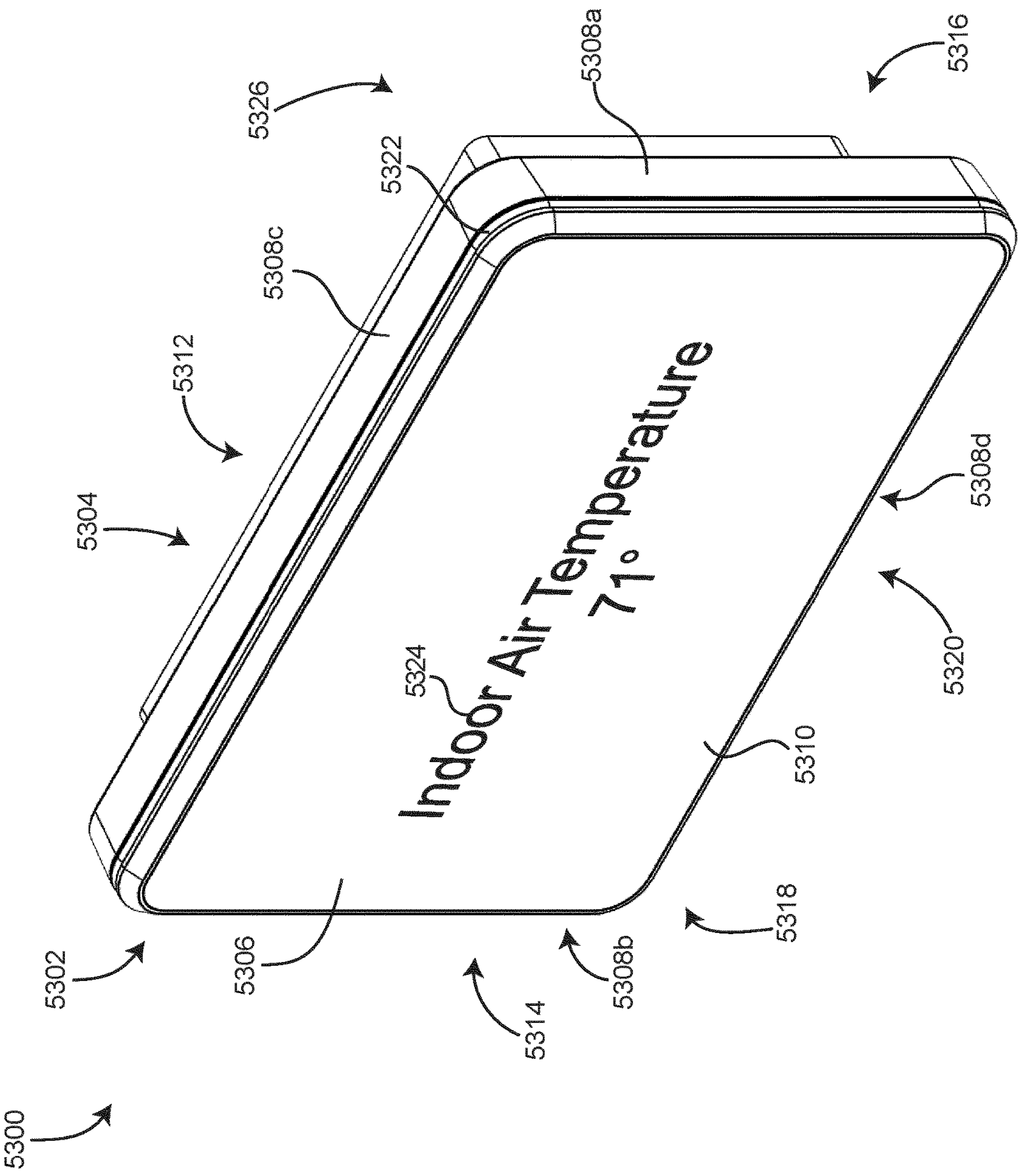
FIG. 53 is an isometric view of a display device, according to some embodiments.

Referring now to FIG. 53, display device 5300 is shown, according to some embodiments. Display device 5300 may be control device 214 as described with reference to FIGS. 2-39 and/or the display device 4002 as described with reference to FIGS. 40-52 and can include any and/or all of the components and/or be configured to perform any of the operations of control device 214 and/or the display device 4002. For example, the visual notifications described with reference to control device 214 can be implemented via the LED halo of display device 5300. Display device 5300 is shown to include a front 5318, a left side 5314, a right side 5316, a top 5312, a bottom 5320, and a rear 5326, according to some embodiments. In some embodiments, display device 5300 is configured to be a wall-mounted display device. In some embodiments, display device 5300 includes a mounting portion configured to mount display device 5300 to a wall. In some embodiments, display device 5300 is configured to be at least partially received by the wall. In some embodiments, display device 5300 includes a flat portion configured to facilitate mounting of display device 5300. In some embodiments, display device 5300 is configured to sit (e.g., rest, lay, be adjacent to, etc.) a surface (e.g., a face, a table, a top surface of equipment, etc.). In some embodiments, display device 5300 is configured to display any of sensor information, equipment information, controller information, messages, alerts, etc., shown as display information 5324, to a user. Display device 5300 is configured to facilitate an alert or a message to a user based on information received from any of equipment, a controller, a sensor, a remote server, etc., according to some embodiments. In some embodiments, display device 5300 is configured to provide an alert to a user via user interface 5306. In some embodiments, user interface 5306 is or includes any of an LCD screen, an LED screen, a resistive touch screen, a surface capacitive touch screen, a projected capacitive touch screen, a surface acoustic wave touch screen, an infrared touch screen, etc. In some embodiments, user interface 5306 includes one or more buttons. In some embodiments, user interface 5306 is configured to receive an input from a user (e.g., through any of a touchscreen, one or more buttons, a wireless device, etc.) and provide the input to any of a controller, equipment, etc. In some embodiments, the input adjusts a display of user interface 5306. For example, the input may indicate an adjustment of an LEDs (e.g., brightness, color, pattern, etc.), of display device 5300, according to some embodiments. In some embodiments, the input adjusts information, alerts, data, etc., displayed by user interface 5306. For example, the input from the user may transition user interface 5306 from displaying a first message (e.g., a time of day) to displaying a second message (e.g., a date), according to some embodiments. In some embodiments, user interface 5306 displays one or more environmental conditions (e.g., temperature, pressure, indoor air quality, etc.) of a space. In some embodiments, the space which user interface 5306 displays information regarding is a space within which display device 5300 is positioned. In some embodiments, the space which user interface 5306 displays information regarding is another space which display device 5300 is not positioned within. In some embodiments, user interface 5306 displays one or more environmental conditions of one or more spaces (e.g., the space which display device 5300 is positioned within, a second space, a third space, etc.). In some embodiments, user interface 5306 displays information (e.g., environmental condition information) regarding various rooms of a building.

In some embodiments, user interface 5306 transitions between a set of predetermined messages/alerts/information. For example, user interface 5306 may iteratively display an indoor air temperature, an indoor air quality, an outdoor air temperature, a time of day, an alert, etc. In some embodiments, user interface 5306 transitions from displaying one message/information/alert at an end of a predetermined time period. For example, user interface 5306 may display a different message/information/alert every 1 second, every 5 seconds, etc., upon a request received from the user through user interface 5306, or upon an event (e.g., an alert), according to some embodiments.

Display device 5300 includes a front portion 5302 and a rear portion 5304, according to some embodiments. In some embodiments, front portion 5302 and rear portion 5304 are coupled (e.g., removably coupled, fixedly coupled, selectively coupled, fastened, integrally formed, etc.) to each other. In some embodiments, front portion 5302 and rear portion 5304 are removably coupled (e.g., by fasteners). In some embodiments, front portion 5302 and rear portion 5304 are configured to interface with each other (e.g., a slip fit, a frictional fit, a snap fit, etc.). In some embodiments, front portion 5302 and rear portion 5304 use a combination of fasteners and an interfaced fit (e.g., a slip fit, a frictional fit, a snap fit, etc.).

In some embodiments, front portion 5302 includes user interface 5306. In some embodiments, front portion 5302 includes an aperture (e.g., an opening, a hole, a recess, etc.) configured to receive user interface 5306 therein. In some embodiments, front portion 5302 includes a covering 5310 configured to interface with front portion 5302. In some embodiments, covering 5310 is a protective covering configured to protect user interface 5306 from damage. In some embodiments, covering 5310 is disposed in front of user interface 5306. Covering 5310 may be any of a glass material, a plastic material, etc. In some embodiments, covering 5310 is translucent. In some embodiments, covering 5310 is transparent. In some embodiments, covering 5310 is configured to allow light emitted by user interface 5306 to pass through.

Covering 5310 is disposed outside of front portion 5302, according to some embodiments. In some embodiments, covering 5310 is disposed adjacent an inner surface of front portion 5302. In some embodiments, covering 5310 covers at least part of or an entire area of the aperture of front portion 5302 which receives user interface 5306. In some embodiments, covering 5310 is received in an aperture (e.g., an opening, a hole, a recess, etc.) of front portion 5302. In some embodiments, covering 5310 is received within the aperture within which user interface 5306 is received.

In some embodiments, sides 5308 (e.g., walls, borders, faces, surfaces, panels, etc.) are disposed between front portion 5302 and rear portion 5304. In some embodiments, sides 5308 extend between rear portion 5304 and front portion 5302. In some embodiments, any of sides 5308 are integrally formed with at one of front portion 5302 and rear portion 5304. For example, in some embodiments, sides 5308 are integrally formed with front portion 5302. In some embodiments, sides 5308 are integrally formed with rear portion 5304. In some embodiments, one or more of sides 5308 are integrally formed with one of front portion 5302 or rear portion 5304, while one or more other sides 5308 are integrally formed with another of front portion 5302 or rear portion 5304. For example, left side 5308*a* and right side 5308*b* are integrally formed with front portion 5302 and upper side 5308*c* and bottom side 5308*d* are integrally formed with rear portion 5304 (or vice versa), according to some embodiments.

In some embodiments, sides 5308 are coupled (e.g., removably coupled, attached, fastened, fixed, slip fit, frictionally fit, snap fit, etc.) to at least one of front portion 5302 and rear portion 5304. In some embodiments, sides 5308, front portion 5302, and rear portion 5304 define an enclosure having an inner volume therein. In some embodiments, any of user interface 5306, a controller, a power circuit, etc., or any other components, subcomponents or devices (e.g., LEDs) are disposed within the inner volume defined by front portion 5302, rear portion 5304 and sides 5308.

In some embodiments, sides 5308 are generally planar. For example, as shown in FIG. 53, sides 5308 are generally flat surfaces extending between front portion 5302 and rear portion 5304, according to some embodiments. In some embodiments, sides 5308 are slanted at an angle. In some embodiments, sides 5308 have an arcuate curvature. In some embodiments, sides 5308 are generally curved and have a non-constant radius of curvature.

Opposite sides 5308 are substantially parallel to each other, according to some embodiments. For example, left side 5308*a* is shown generally parallel to right side 5308*b* and upper side 5308*c* is generally parallel to bottom side 5308*d*, according to some embodiments. In some embodiments, opposite sides 5308 are not parallel to each other. For example, in some embodiments, left side 5308*a* non-parallel with right side 5308*b*. In some embodiments, adjacent sides 5308 are substantially perpendicular to each other. For example, as shown in FIG. 53, left side 5308*a* is substantially perpendicular to upper side 5308*c* (which is adjacent left side 5308*a*), according to some embodiments. In some embodiments, left side 5308*a* is substantially perpendicular to bottom side 5308*d*. In some embodiments, left side

5308*a*, right side 5308*b*, upper side 5308*c*, and bottom side 5308*d* are integrally formed with each other.

In some embodiments, a halo 5322 is positioned between front portion 5302 and rear portion 5304. In some embodiments, halo 5322 is positioned between sides 5308 and one of front portion 5302 and rear portion 5304. For example, as shown in FIG. 1, sides 5308 are integrally formed with rear portion 5304, and halo 5322 is positioned between rear portion 5304/sides 5308 and front portion 5302, according to some embodiments. In some embodiments, halo 5322 is configured to any of diffuse, direct, guide, focus, scatter, etc., light emitted by one or more LEDs. In some embodiments, halo 5322 facilitates light emission, diffusion, direction, guidance, focusing, scattering, outwards along and/or outwards from display device 5300. For example, in some embodiments, halo 5322 diffuses light emitted by one or more LEDs in one or more directions generally normal to sides 5308. In some embodiments, halo 5322 facilitates a wider viewing angle of the light emitted by the one or more LEDs to provide an alert to an observer.

Figure 54:
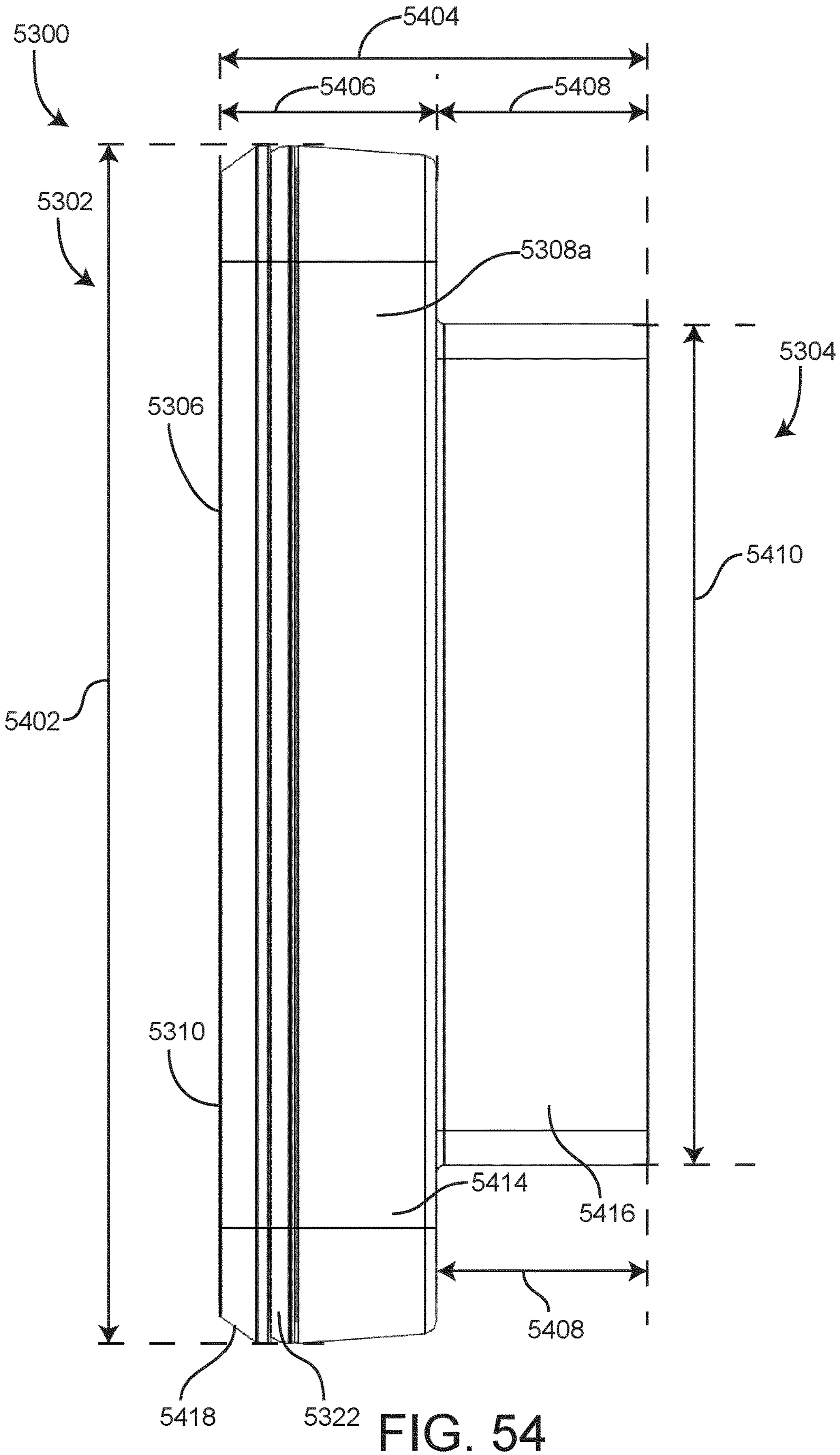
FIG. 54 is a side view of the display device of FIG. 53, according to some embodiments.
Figure 55:
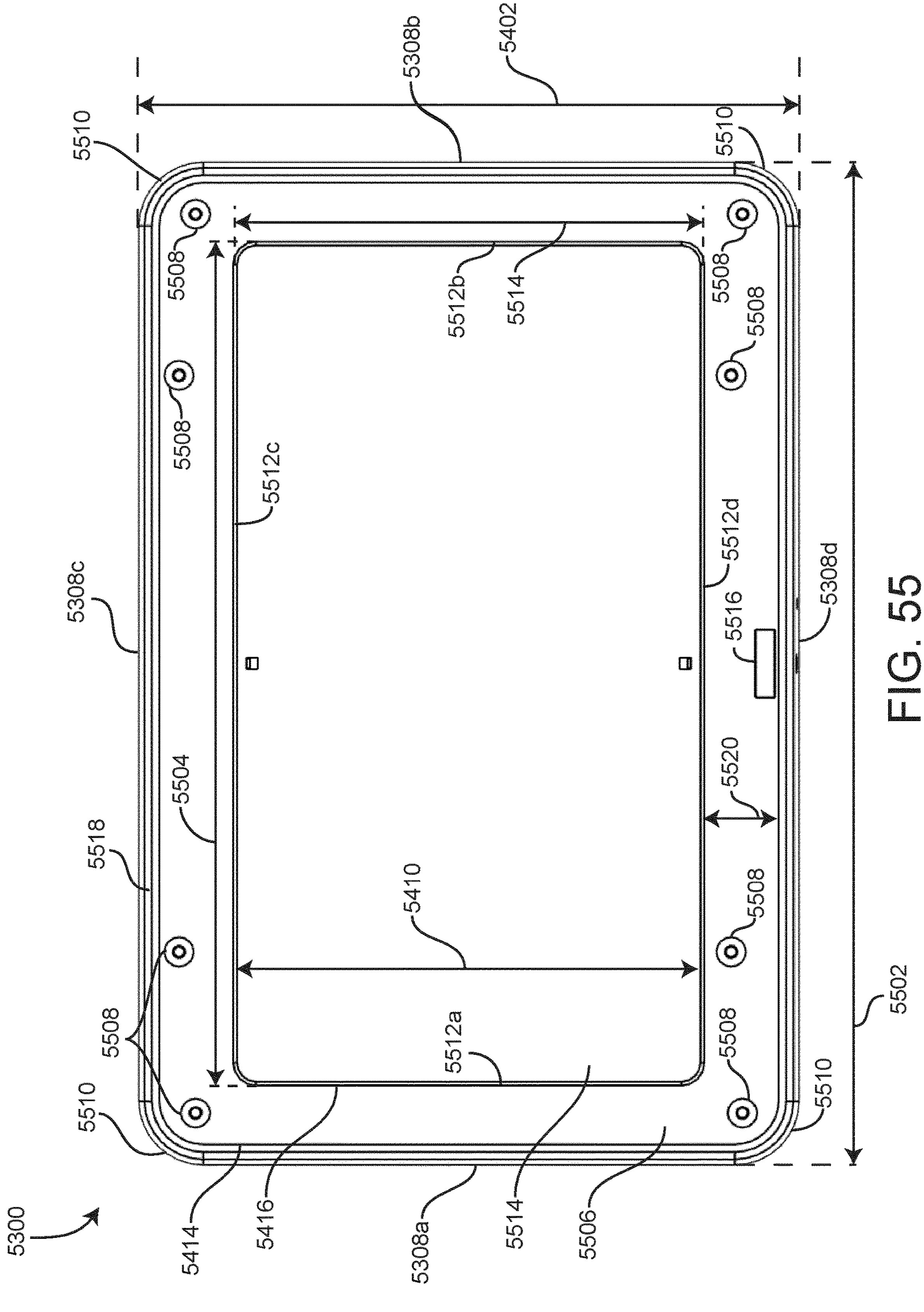
FIG. 55 is a rear view of the display device of FIG. 53, according to some embodiments.
Figure 56:
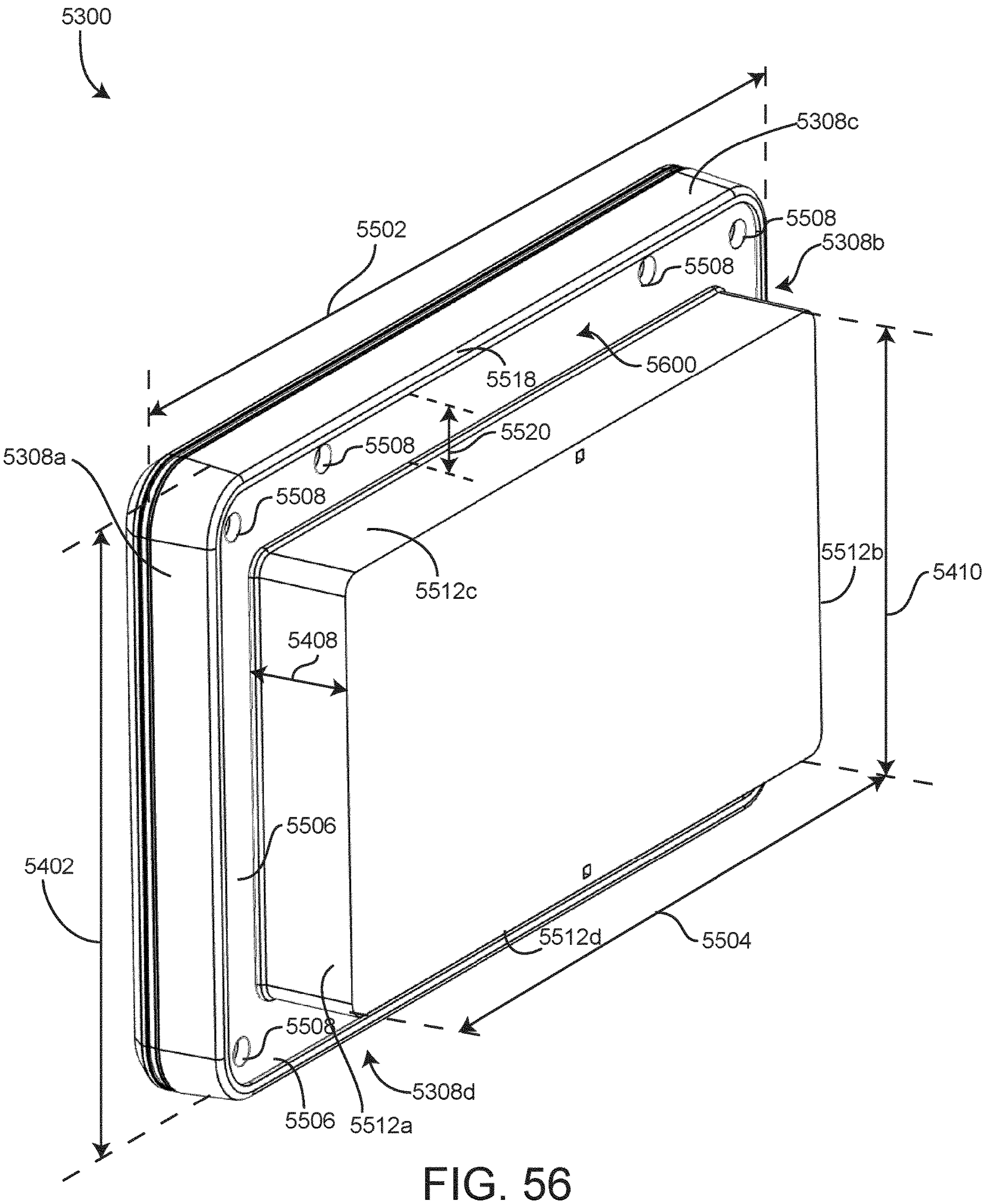
FIG. 56 is a rear elevated view of the display device of FIG. 53, according to some embodiments.

Referring now to FIGS. 54-56, display device 5300 is shown in greater detail, according to some embodiments. In some embodiments, display device 5300 has an overall height 5402. In some embodiments, an overall height of front portion 5302 is substantially equal to height 5402. In some embodiments, height 5402 is a distance from a bottom-most edge (e.g., bottom side 5308*d*) and an upper-most edge (e.g., upper side 5308*c*). In some embodiments, height 5402 is an average height of display device 5300. In some embodiments, display device 5300 includes a bezel (e.g., a rim, a retainer, etc.), shown as bezel 5418. In some embodiments, bezel 5418 extends substantially an entire perimeter of front portion 5302.

Rear portion 5304 is shown to include a first modular portion 5414 and a second modular portion 5416, according to some embodiments. In some embodiments, first modular portion 5414 and second modular portion 5416 are integrally formed. In some embodiments, first modular portion 5414 and second modular portion 5416 define rear portion 5304. First modular portion 5414 is shown to have an overall height substantially equal to height 5402, according to some embodiments. In some embodiments, first modular portion 5414 includes and/or is sides 5308. In some embodiments, first modular portion 5414 is configured to interface with one or more of sides 5308 and front portion 5302. For example, first modular portion 5414 is configured to interface with sides 5308 and/or front portion 5302 with at least one of a slip fit, a frictional fit, a snap fit, fasteners, etc., according to some embodiments.

In some embodiments, second modular portion 5416 has a height 5410 and depth 5408. Height 5410 is shown less than overall height 5402 of display device 5300, according to some embodiments. In some embodiments, height 5410 is substantially equal to or greater than overall height 5402. In some embodiments, second modular portion 5416 protrudes (e.g., extends, juts from, extrudes from, etc.), surface 5506 of first modular portion 5414. In some embodiments, second modular portion 5416 protrudes a distance from surface 5506 substantially equal to depth 5408. Advantageously, if display device 5300 is a wall-mounted display device, second modular portion 5416 is configured to extend within and be received by an aperture of the wall, according to some embodiments. In some embodiments, second modular portion 5416 extends at least partially within an aperture of a wall. In some embodiments, first modular portion 5414 extends at least partially within an aperture of a wall. For example, in some embodiments, the aperture (e.g., of the wall) is a recess (e.g., cavity, indent) which is stepped to both receive first modular portion 5414 and at least partially receive second modular portion 5416. In some embodiments, second modular portion 5416 extends from surface 5506 of first modular portion 5414 which is disposed sub-flush a rim 5518 of first modular portion 5414. In some embodiments, rim 5518 is cooperatively formed by sides 5308. In some embodiments, rim 5518 extends along an entire perimeter of first modular portion 5414. In some embodiments, rim 5518, surface 5506, and sides 5512 of second modular portion define a recess 5600 having a width 5520 which runs along an entire perimeter of display device first modular portion 5414. In some embodiments, recess 5600 is configured to interface with a protrusion of a mounting plate (e.g., a wall mounting plate, a wall, etc.).

In some embodiments, first modular portion 5414 includes one or more fastener elements (e.g., posts, apertures, threaded bores, clips, latches, etc. configured to fasten display device 5300 to a wall), shown as fastener elements 5508. Fastener elements 5508 are shown as bores configured to receive a fastener to removably couple display device 5300 to a surface. In some embodiments, fastener elements 5508 are threaded bores. In some embodiments, fastener elements 5508 are bores configured to receive self-tapping screws. In some embodiments, fastener elements 5508 are disposed along a patterned path. In some embodiments, fastener elements 5508 are disposed proximate corners of display device 5300. In some embodiments, fastener elements 5508 are evenly spaced a distance apart.

In some embodiments, second modular portion 5416 is generally rectangular having sides (e.g., walls, panels, sidewalls, etc.), shown as sides 5512. In some embodiments, second modular portion 5416 is a generally rectangular shape having a length 5504 and a height 5410. In some embodiments, adjacent sides 5512 form a rounded intersection point. For example, side 5512*c* and side 5512*a* are adjacent each other, and intersect to form a fillet. In some embodiments, second modular portion 5416 is a generally rectangular shape having filleted (e.g., rounded) corners. In some embodiments, second modular portion 5416 is a generally rectangular shape having chamfered corners. In some embodiments, first modular portion 5414 is generally rectangular shaped having height 5402 and length 5502. In some embodiments, first modular portion 5414 is generally rectangular shaped having filleted corners (e.g., corners 5510). In some embodiments, first modular portion 5414 is generally rectangular shaped having chamfered corners. In some embodiments, a center of a cross section of first modular portion 5414 is substantially coincident with a center of a cross section of second modular portion 5416.

In some embodiments, second modular portion 5416 includes a surface (e.g., a back surface, a back plate, a back panel, a back wall, etc.), shown as rear surface 5514. In some embodiments, rear surface 5514 includes any of fastener elements 5508. In some embodiments, rear surface 5514 includes one or more apertures (e.g., bores, openings, through-holes, rectangular openings, etc.), configured to facilitate wired connections to a controller (e.g., a processing circuit, a power board, etc.) disposed within display device 5300. In some embodiments, rear surface 5514 is removably connected to sides 5512, facilitating easy access to internal components of display device 5300. In some embodiments, rear surface 5514 is removably connected to sides 5512 with any one of or a combination of fasteners, a slip fit, a frictional fit, a snap fit, etc. In some embodiments, rear surface 5514 is configured to be received by an aperture cooperatively formed by sides 5512.

In some embodiments, surface 5506 of first modular portion 5414 includes a rectangular aperture (e.g., opening, recess, hole, etc.), shown as rectangular opening 5516. In some embodiments, rectangular opening 5516 is configured to receive a protrusion of another member (e.g., a mounting plate, a wall, etc.) to connect display device 5300 to the other member. In some embodiments, rectangular opening 5516 is configured to allow a wired connection (e.g., a USB connection, a power connection, etc.) to a controller disposed within display device 5300. In some embodiments, one or more rectangular openings 5516 are included on rear surface 5514.

Figure 57:
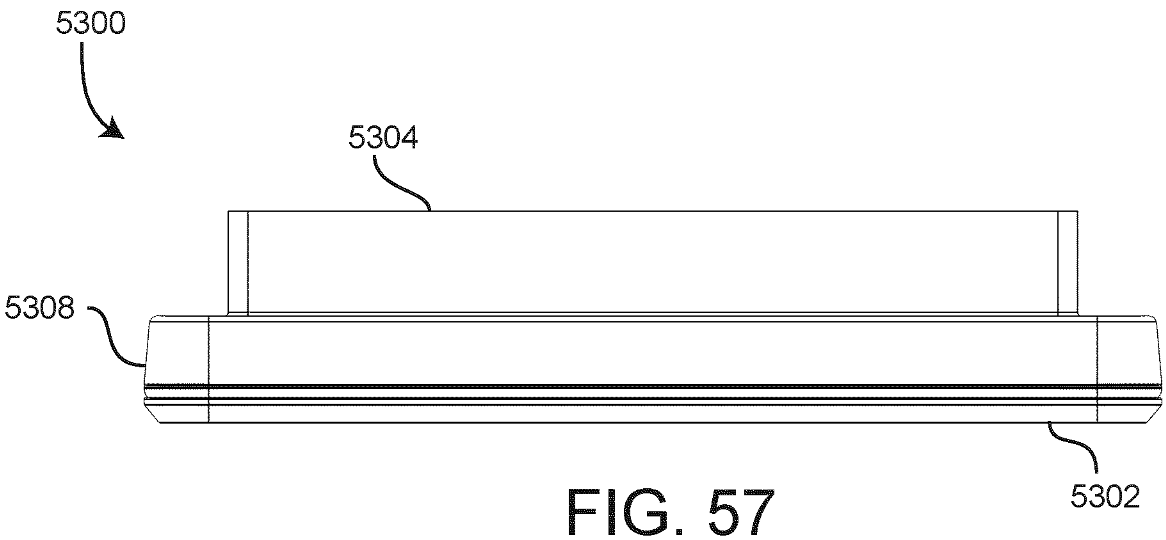
FIG. 57 is a top view of the display device of FIG. 53, according to some embodiments.
Figure 58:
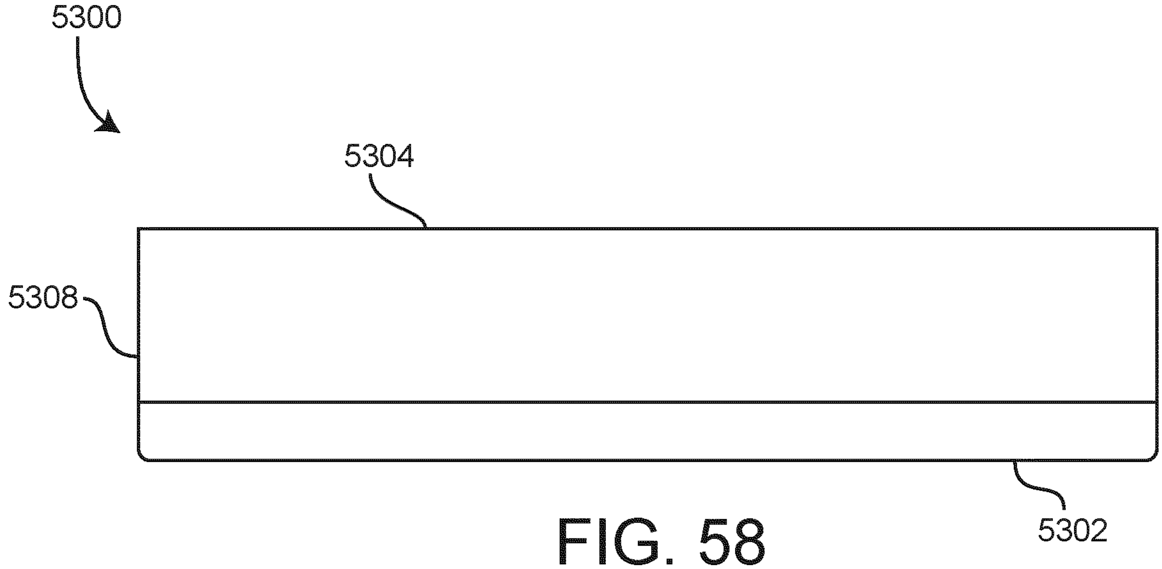
FIG. 58 is a top view of the display device of FIG. 53, according to some embodiments.
Figure 59:
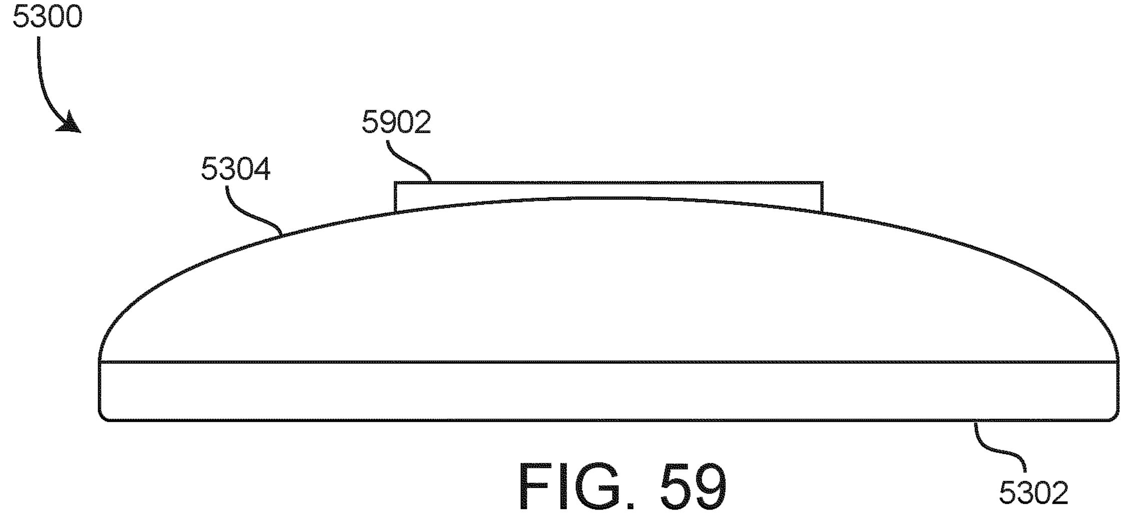
FIG. 59 is a top view of the display device of FIG. 53, according to some embodiments.

Referring now to FIGS. 57-59, various configurations display device 5300 are shown, according to some embodiments. Referring now to FIG. 57 display device 5300 is shown according to FIGS. 53-56, according to some embodiments. In some embodiments, display device 5300 includes front portion 5302 and rear portion 5304 which couple with each other. Front portion 5302 is shown having an overall rectangular shape with length (e.g., length 5502) greater than length (e.g., length 5504) of rear portion 5304, according to some embodiments.

Referring now to FIG. 58, display device 5300 is shown having rear portion 5304 substantially equal in length to length of front portion 5302, according to some embodiments. In some embodiments, rear portion 5304 is generally rectangular shaped.

Referring now to FIG. 59, display device 5300 is shown including a rear portion 5304 which is generally curved, according to some embodiments. In some embodiments, rear portion 5304 includes a mounting plate 5902 configured to facilitate mounting of display device 5300 to a surface (e.g., a wall). In some embodiments, mounting plate 5902 is integrally formed with rear portion 5304. In some embodiments, mounting plate 5902 includes a flat rear surface configured to interface with the flat surface. In some embodiments, mounting plate 5902 includes one or more fastener elements (e.g., screws, clips, hangers, etc.), configured to removably couple mounting plate 5902 with the surface.

Figure 60:
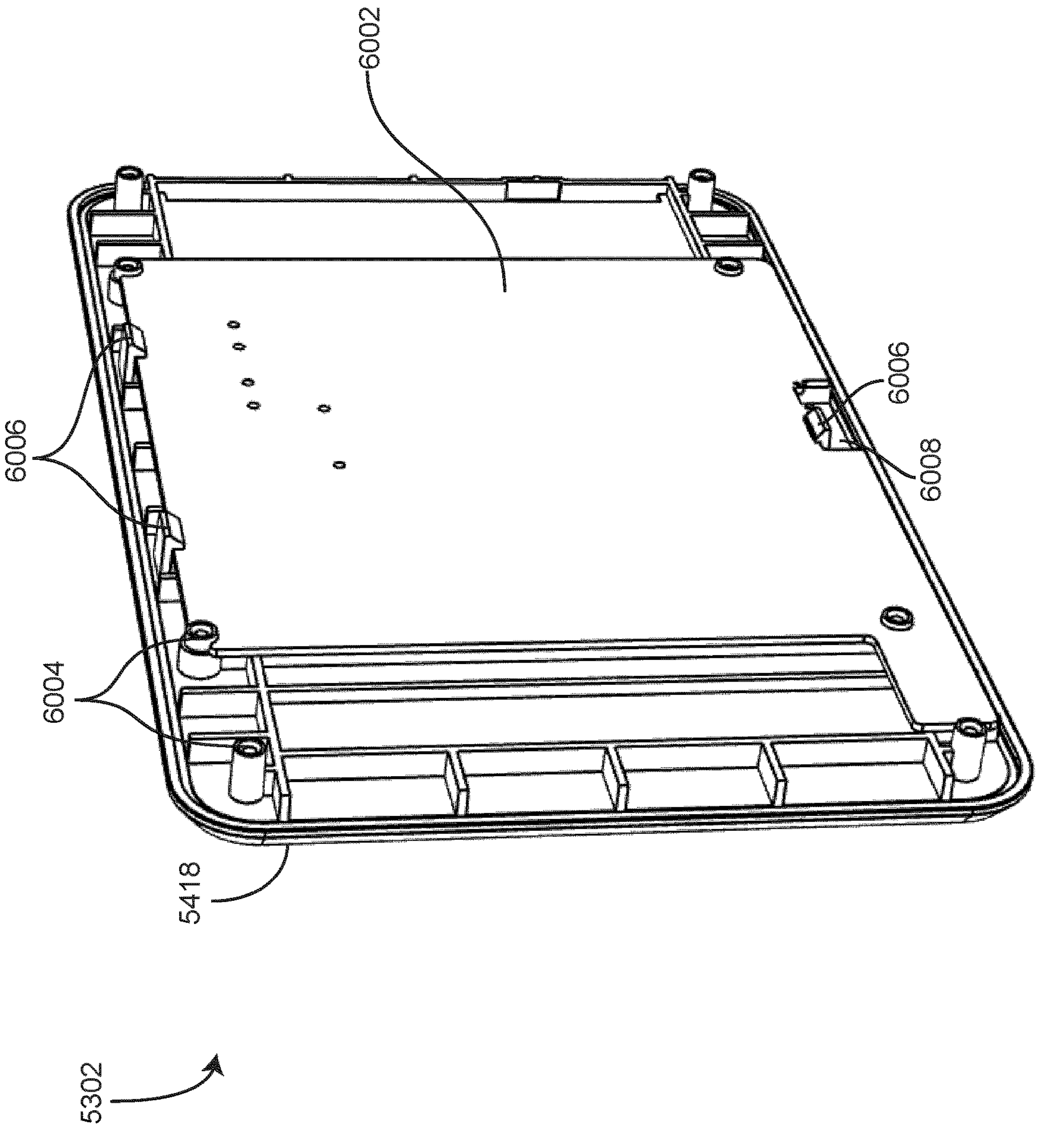
FIG. 60 is a rear elevated view of a front portion of the display device of FIG. 53, according to some embodiments.
Figure 61:
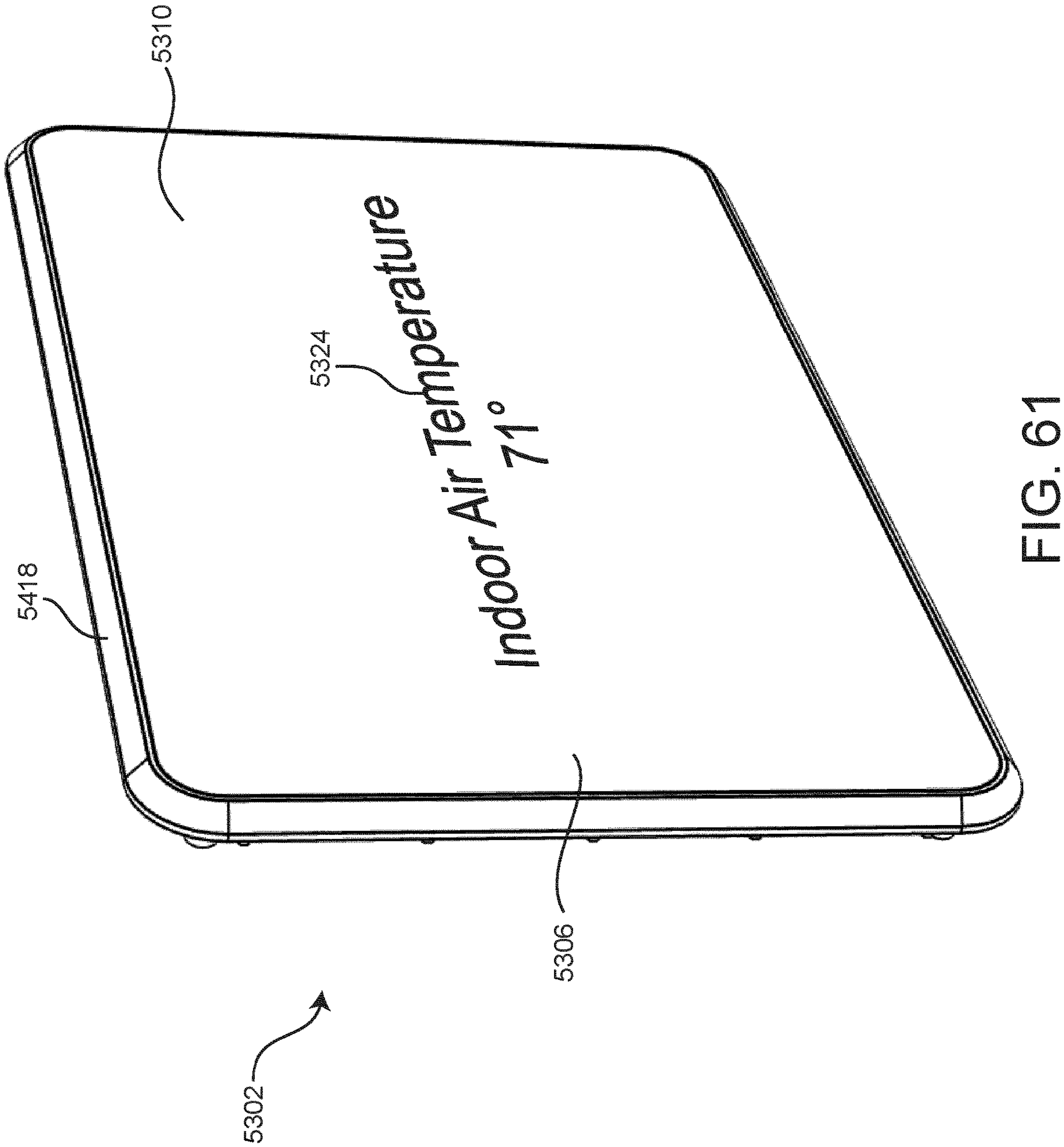
FIG. 61 is a front elevated view of the front portion of FIG. 60, according to some embodiments.

Referring now to FIGS. 60 and 61, front portion 5302 is shown in greater detail, according to some embodiments. In some embodiments, front portion 5302 is configured to couple (e.g., removably, etc.) with a controller 6002 (e.g., a processing circuit). In some embodiments, controller 6002 is configured to control an operation of user interface 5306. In some embodiments, controller 6002 is configured to removably couple with front portion 5302 with one or more retaining clips 6006 (e.g., snap clips, latches, etc.). In some embodiments, retaining clips 6006 protrude from front portion 5302 and are configured to interface with an edge of controller 6002. In some embodiments, controller 6002 includes one or more notches 6008 (e.g., recessions, grooves, etc.) configured to facilitate coupling between controller 6002 and front portion 5302. In some embodiments, notches 6008 provide an edge with which retaining clips 6006 interface.

Referring still to FIGS. 60 and 61, front portion 5302 is shown to include posts 6004, according to some embodiments. In some embodiments, posts 6004 extend from front portion 5302. In some embodiments, posts 6004 provide a surface to which controller 6002 is adjacent. In some embodiments posts 6004 include a bore configured to interface with a fastener. For example, the bore is a threaded bore, according to some embodiments. In some embodiments, one or more of posts 6004 extend to a surface or a corresponding post of rear portion 5304. In some embodiments, posts 6004 extend from a back surface of front portion 5302. In some embodiments, bezel 5418 retains at least one of user interface 5306 or covering 5310 in position.

Figure 62:
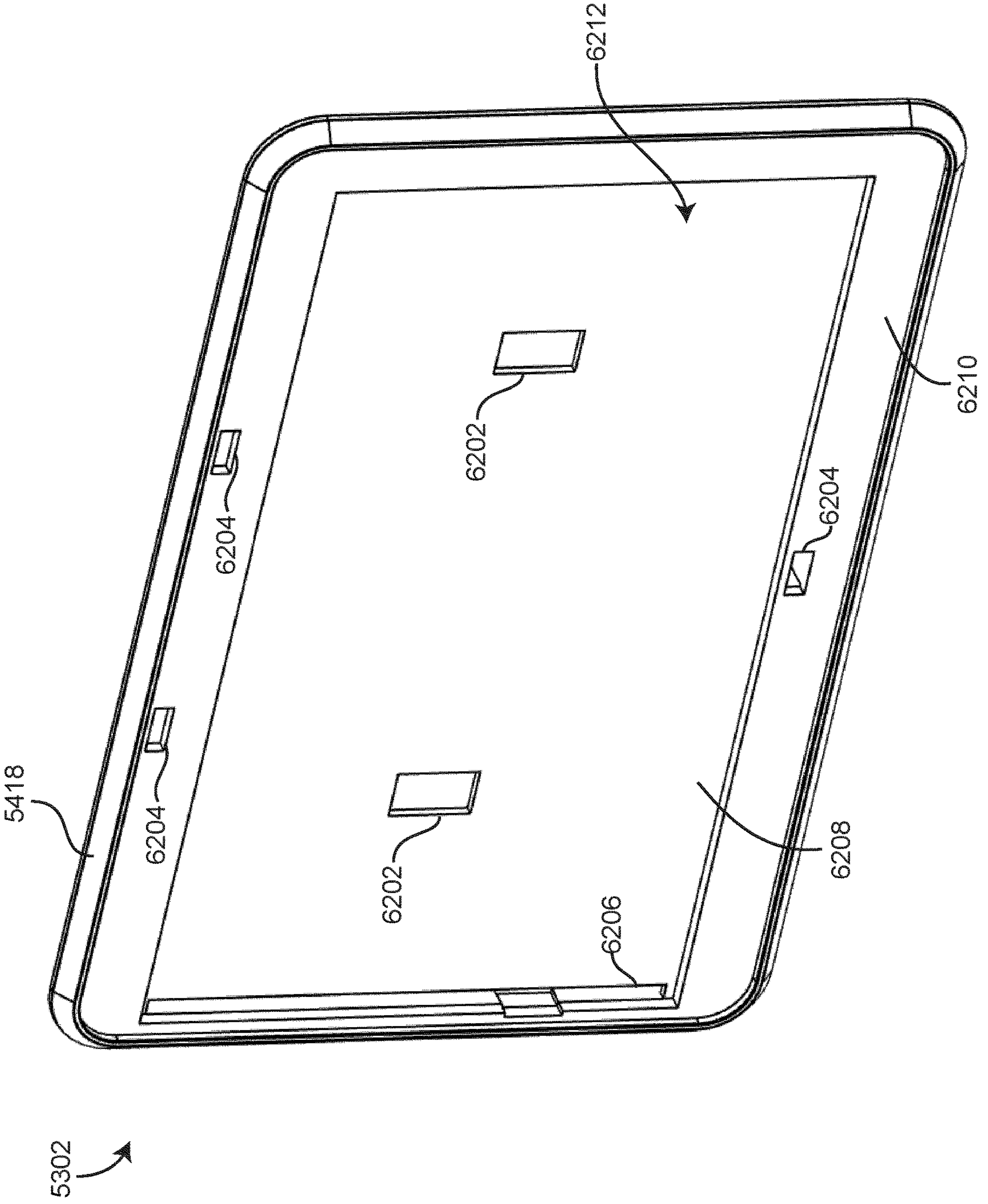
FIG. 62 is a front isometric view of the front portion of FIG. 60, according to some embodiments.

Referring now to FIG. 62, front portion 5302 is shown without user interface 5306 and covering 5310 assembled, according to some embodiments. In some embodiments, front portion 5302 includes a first surface 6210 and a second surface 6208. In some embodiments, second surface 6208 is offset a distance relative to surface 6210 such that second surface 6208 offset the distance relative to surface 6210 defines a recess (e.g., an indent, an aperture, etc.), shown as recess 6212. In some embodiments, recess 6212 is configured to receive user interface 5306. In some embodiments, second surface 6208 includes one or more apertures (e.g., openings, holes, etc.), shown as rectangular apertures 6202. In some embodiments, rectangular apertures 6202 facilitate wired connection between user interface 5306 and a controller. In some embodiments, rectangular apertures 6202 facilitate removable connection between user interface 5306 and front portion 5302.

In some embodiments, recess 6212 is generally rectangular. Recess 6212 is shown to include an aperture (e.g., opening, hole, etc.), shown as vertical aperture 6206, according to some embodiments. In some embodiments, vertical aperture 6206 is a notch and extends partially along a height of second surface 6208. In some embodiments, front portion 5302 includes one or more apertures, shown as apertures 6204. In some embodiments, apertures 6204 are rectangular and extend at least partially into first surface 6210.

Figure 63:
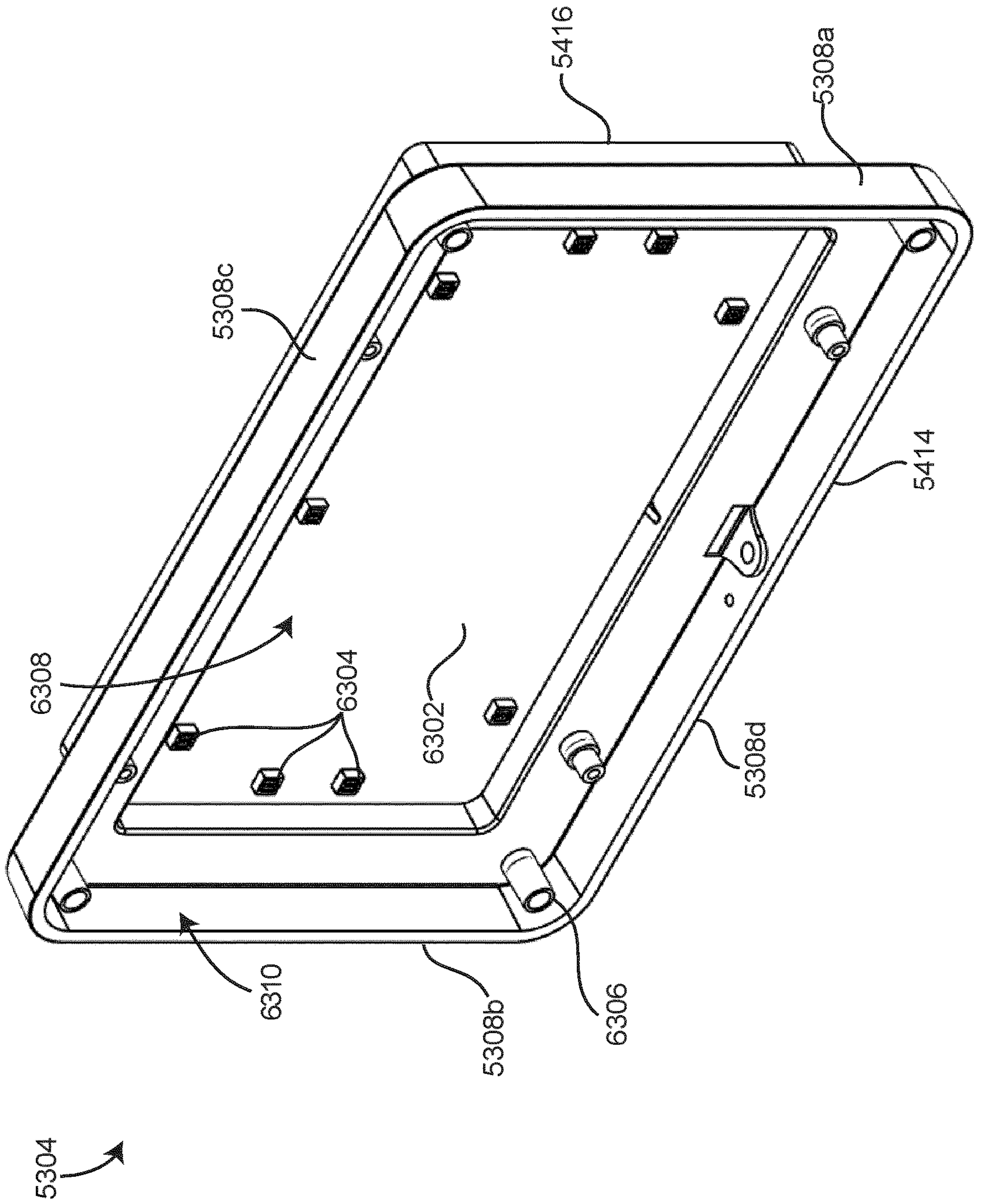
FIG. 63 is an isometric view of a rear portion of the display device of FIG. 53, shown to include an LED board, according to some embodiments.

Referring now to FIG. 63, rear portion 5304 is shown in greater detail, according to some embodiments. Rear portion 5304 includes an LED board 6302 (e.g., a processing circuit, a controller, a PCB board, etc.) disposed within an inner volume 6308 of second modular portion 5416, according to some embodiments. In some embodiments, LED board 6302 is disposed within an inner volume 6310 of first modular portion 5414. LED board 6302 is shown to include light emitting devices, shown as LEDs 6304, according to some embodiments. In some embodiments, LEDs 6304 are configured to emit light which is directed through halo 5322 and emits from a side of display device 5300. In some embodiments, LED board 6302 is communicably connected with controller 6002.

Referring still to FIG. 63, rear portion 5304 is shown to include mating posts 6306, according to some embodiments. In some embodiments, mating posts 6306 are configured to interface (e.g., be adjacent to) a surface of front portion 5302. In some embodiments, mating posts 6306 facilitate removable connection between front portion 5302 and rear portion 5304.

LED Board

Figure 64:
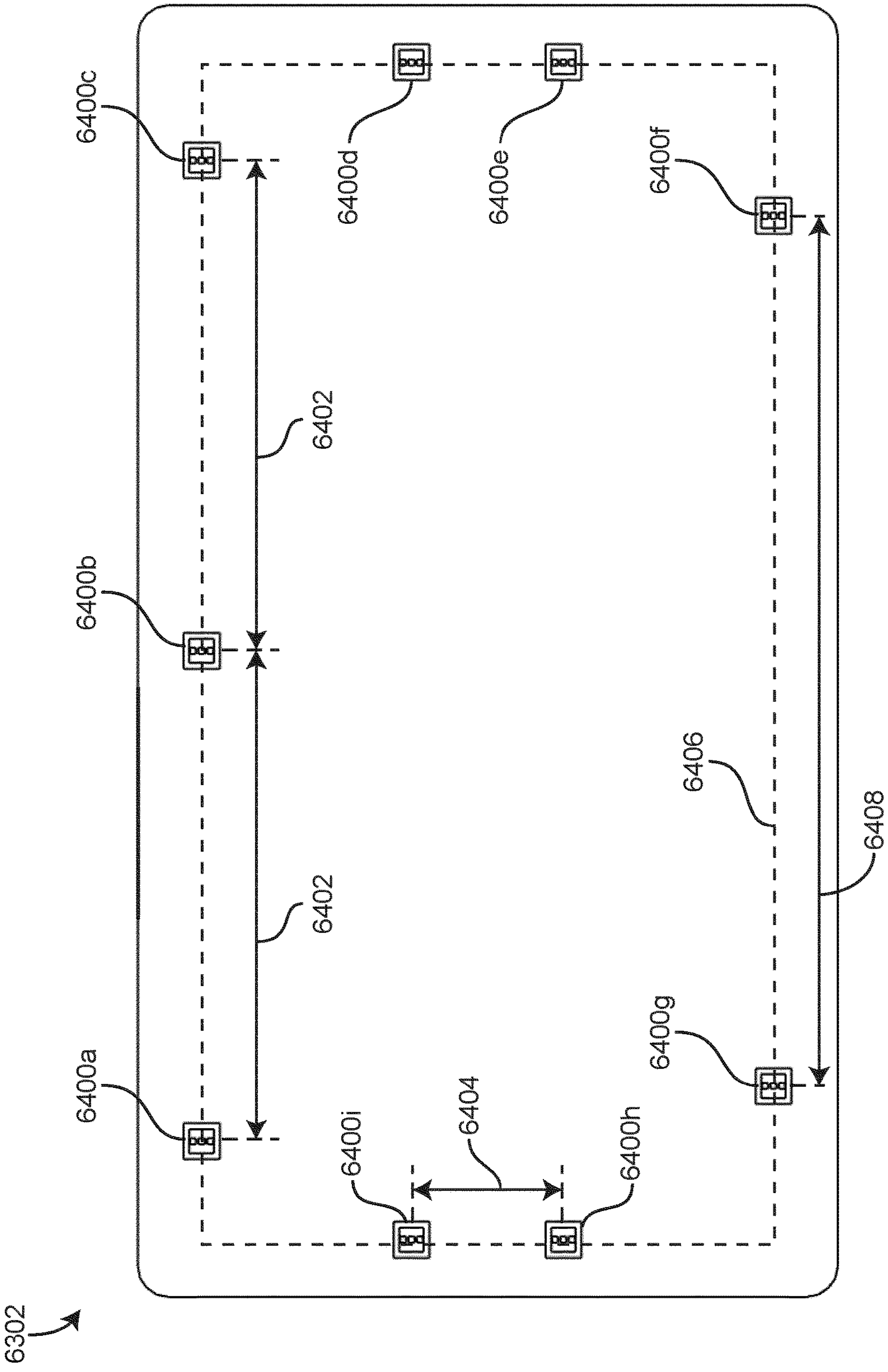
FIG. 64 is a front view of the LED board of FIG. 63, according to some embodiments.
Figure 65:
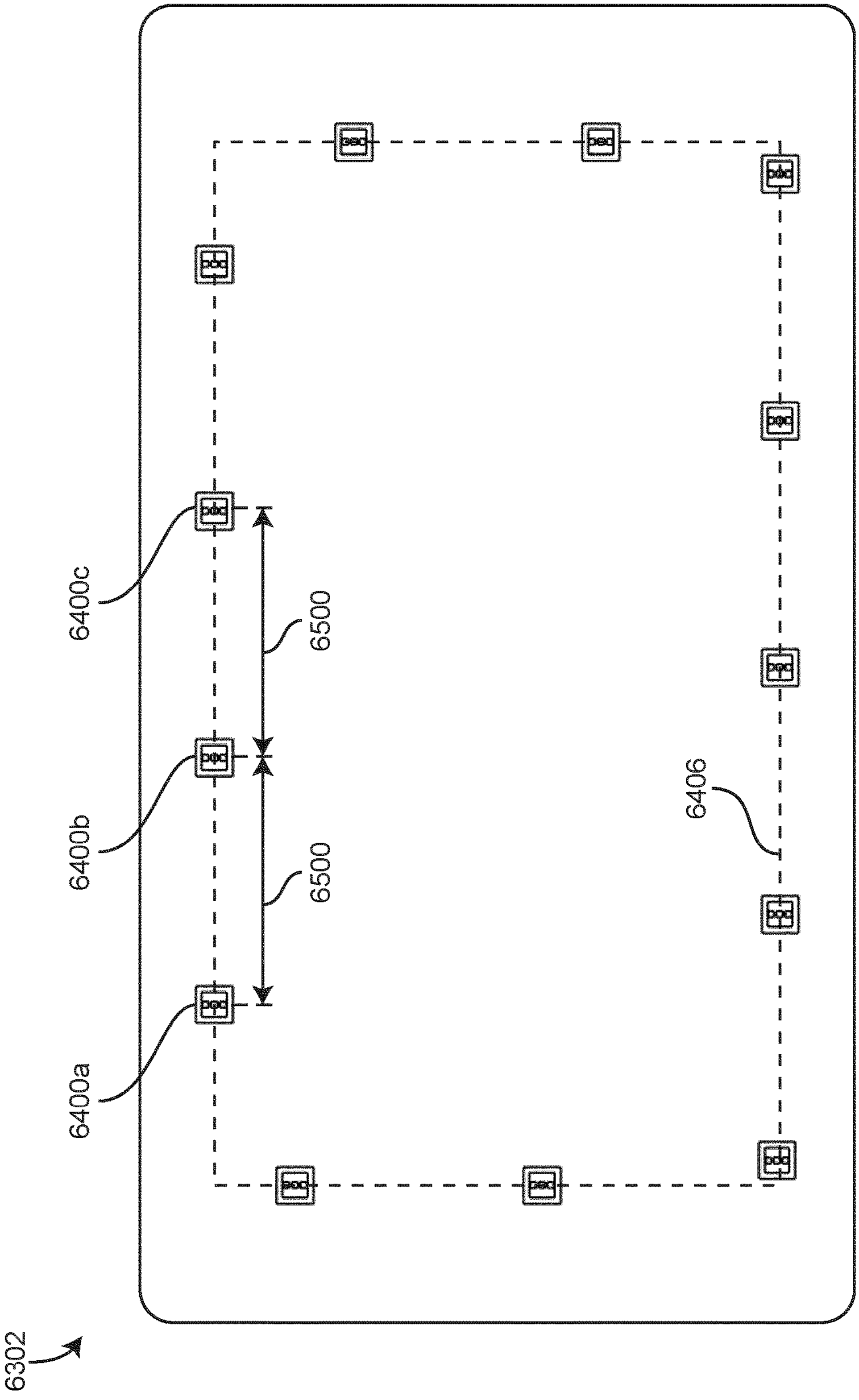
FIG. 65 is a front view of the LED board of FIG. 63, according to some embodiments.

Referring now to FIGS. 64 and 65, LED board 6302 is shown in greater detail, according to some embodiments. FIG. 64 shows LEDs 6400 disposed along path 6406, according to some embodiments. Path 6406 is generally rectangular, according to some embodiments. In some embodiments, path 6406 is generally elliptical, generally square, etc., or any other geometric shape. In some embodiments, LEDs 6400 are spaced non-evenly along path 6406. For example, as shown in FIG. 64, LED **6400*a* is disposed a distance 6402 from adjacent LED 6400*b* along path 6406, while LED 6400*g* is disposed a distance 6408 from adjacent LED 6400*f* along path 6406, according to some embodiments. In some embodiments, LEDs 6400 are placed along path 6406 based on a desired function of display device 5300. In some embodiments, LEDs 6400 are light emitting diodes. In some embodiments, LEDs 6400 are multi-color LEDs (e.g., red-green-blue (RGB) LEDs). In some embodiments, LEDs 6400 are single color LEDs (e.g., white LEDs). In some embodiments, LEDs 6400 are dimmable LEDs (e.g., brightness can be adjusted, intensity of emitted light can be adjusted, etc.). In some embodiments, LEDs 6400 receive signals through LED board 6302 to cause LEDs 6400 to adjust a brightness of one or more of LEDs 6400. In some embodiments, LEDs 6400 receive signals through LED board 6302 to cause LEDs 6400 to switch from an on-state to an off-state. In some embodiments, LEDs 6400 receive signals through LED board 6302 to adjust a color of one or more of LEDs 6400. Any of the brightness, on/off state, color, etc., of any of LEDs 6400 is adjusted according to one or more predetermined patterns, according to some embodiments. For example, in some embodiments, certain LEDs 6400 (e.g., LEDs 6400***a-c*) are actuated between an on-state and an off-state for a predetermined amount of time (e.g., on for 5 seconds, off for 4 seconds, etc.) while other LEDs 6400 (e.g., LEDs 6400*d-i*) are not actuated between an on-state and an off-state. Any of the dimming, color, etc., of o any of LEDs 6400 is configured to operate according to a similar pattern, or a combination of patterns thereof.

As shown in FIG. 64, LED board 6302 includes nine LEDs 6400, according to some embodiments. In some embodiments, LED board 6302 includes more or less than nine LEDs 6400.

FIG. 65 shows LEDs 6400 equally spaced along path 6406, according to some embodiments. For example, LED 6400*a* is shown spaced a distance 6500 along path 6406 from LED 6400*b*, according to some embodiments. In some embodiments, each of LEDs 6400 are spaced distance 6500 along path 6406 relative to a neighboring LED 6400. For example, LEDs 6400*a-b* are spaced distance 6500 apart along path 6406, and LEDs 6400*b-c* are also spaced distance 6500 apart along path 6406, according to some embodiments. In some embodiments, one or more of LEDs 6400 are offset relative to path 6406. For example, LED 6400*a* is offset a predetermined amount from path 6406, according to some embodiments. In some embodiments, each of LEDs 6400 are proximate a portion of halo 5322.

Halo

Referring now to FIGS. 66-71, halo 5322 is shown in greater detail, according to some embodiments. In some embodiments, halo 5322 is configured to receive light emitted by any of LEDs 6400 and direct, diffuse, scatter, etc., the emitted light along at least one of sides 5308. In some embodiments, halo 5322 is configured to produce a glow along at least one of sides 5308. Since LEDs 6400 can be configured to operate in a patterned manner (e.g., on-state, off-state, brightness, color, etc.), halo 5322 may diffuse, direct, scatter, etc., the emitted light along at least one of sides 5308 according to a currently used pattern, according to some embodiments. In some embodiments, halo 5322 facilitates a glow along sides 5308 of display device 5300. In some embodiments, halo 5322 facilitates indicating a message to a user (e.g., a particular pattern represents and/or corresponds to a particular event). In some embodiments, halo 5322 facilitates a wider off-axis viewing angle of the message. For example, in some embodiments, display device 5300 is a thermostat. In some embodiments, LEDs 6400 may transition between a blue color and a red color which corresponds to the indoor air temperature of the conditioned space. In some embodiments, the blue color indicates a low temperature, and the red color indicates a high temperature. In some embodiments, a wavelength ($\lambda$) of light emitted by LEDs 6400 and directed by halo 5322 is dependent on the temperature. In some embodiments, LEDs 6400 emit light at any wavelength ($\lambda$) within the visible spectrum of light. Advantageously, this facilitates notifying a user or an occupant of the conditioned space without the user/occupant necessarily being able to observe user interface 5306, according to some embodiments. For example, if a user is not in front of display device 5300 such that the user can observe user interface 5306 directly, the user may still be notified of a changing temperature (or any other variable) of the conditioned space by observing the light emitted from display device 5300 by halo 5322.

In some embodiments, halo 5322 is or includes translucent and/or transparent material. In some embodiments, halo 5322 is configured to allow light to pass through. In some embodiments, one or more exterior surfaces of halo 5322 are coated with a material which does not allow light to pass through. For example, in some embodiments, all exterior surfaces of halo 5322 are coated with a material (e.g., a coating, a paint, etc.)

Figure 66:
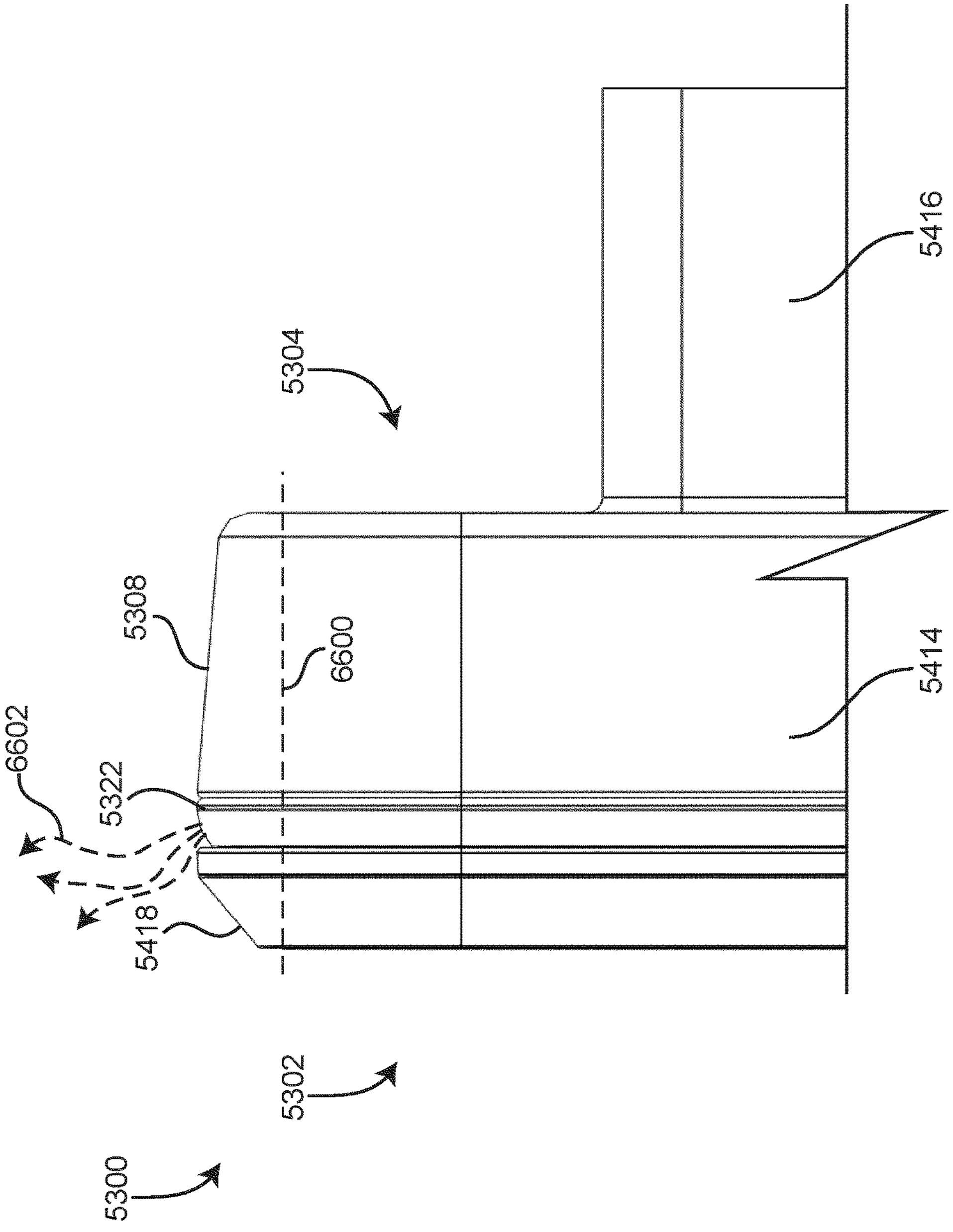
FIG. 66 is a side view of a portion of the display device of FIG. 53, shown to include a halo, according to some embodiments.

Referring to FIG. 66, in some embodiments, at least a portion of halo 5322 is positioned between front portion 5302 and rear portion 5304. In some embodiments, at least a portion of halo 5322 is positioned adjacent front portion 5302 at a first side and adjacent rear portion 5304 at an opposite site. In some embodiments, at least a portion of halo 5322 is adjacent bezel 5418.

Referring still to FIG. 66, an outer edge of halo 5322 is shown angled relative to a horizontal axis 6600, according to some embodiments. In some embodiments, the outer edge of halo 5322 is arcuate, curved, etc. In some embodiments, halo 5322 extends along an entire perimeter of display device 5300. In some embodiments, the angled/curved profile of halo 5322 facilitates a directing of light. For example, in FIG. 66, an outer edge of halo 5322 is angled such that emitted light 6602 is generally directed towards a front of display device 5300.

Figure 67:
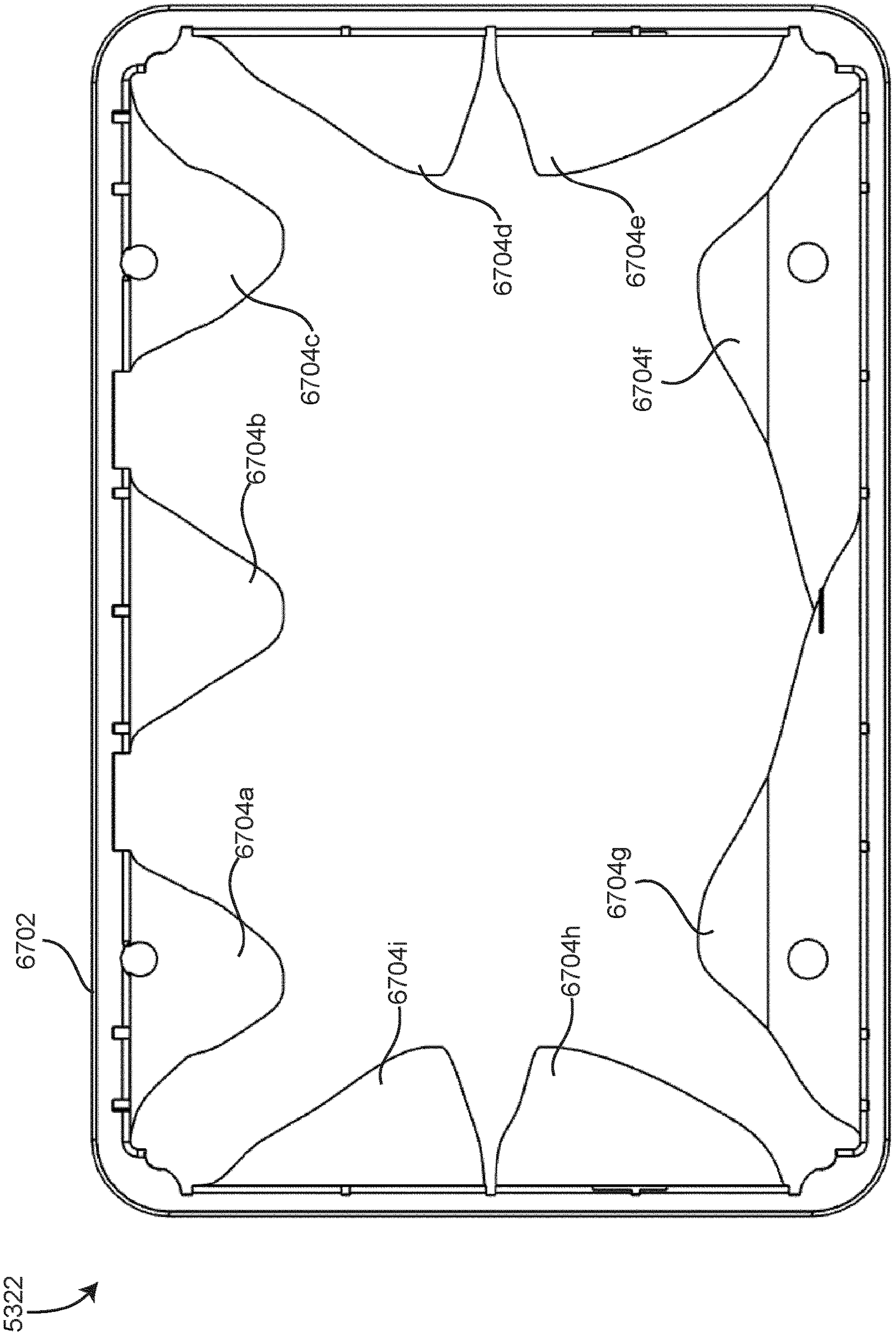
FIG. 67 is a front view of the halo of FIG. 66, according to some embodiments.
Figure 68:
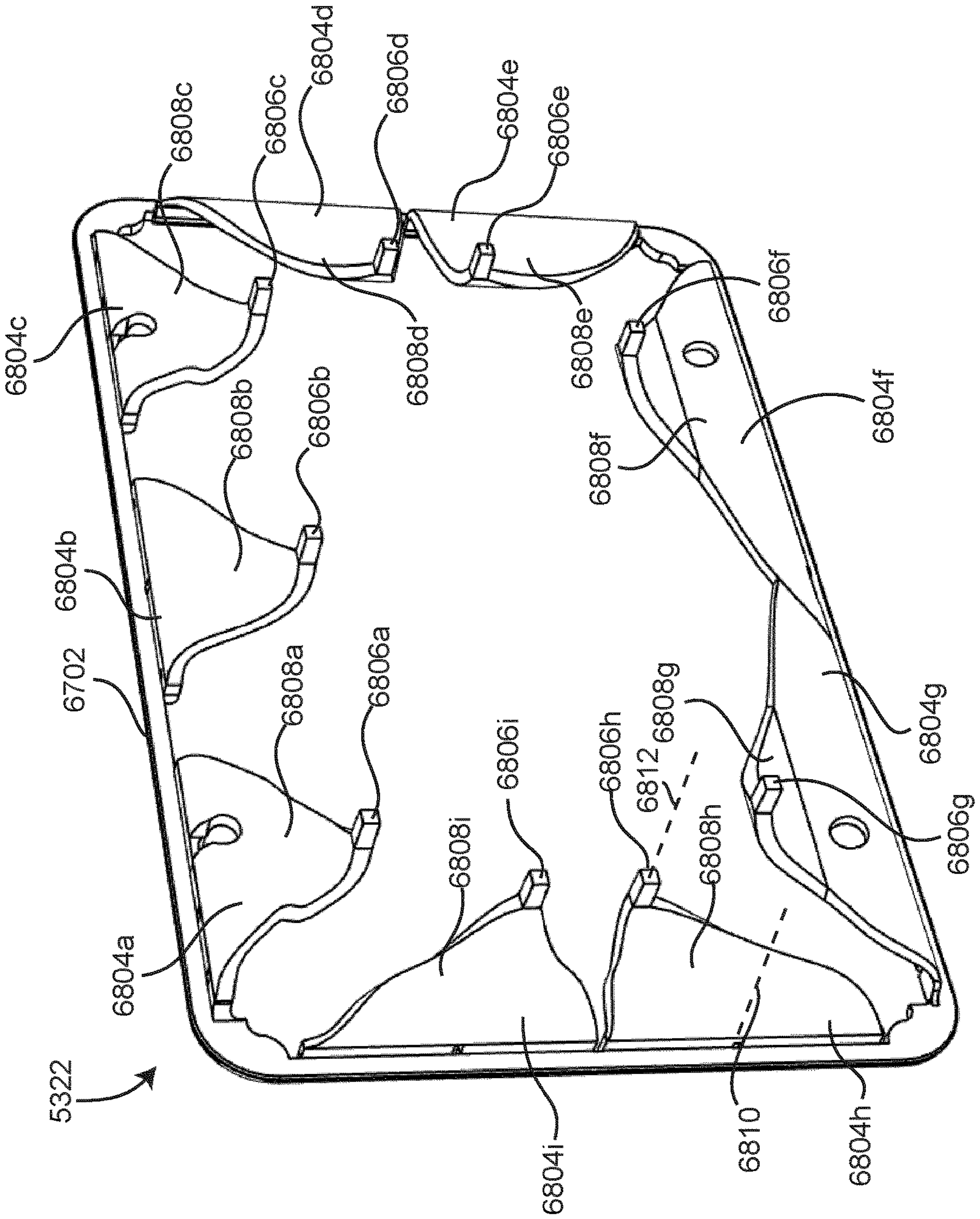
FIG. 68 is a rear elevated view of the halo of FIG. 66, shown to include light guiding elements, according to some embodiments.

Referring now to FIGS. 67 and 68, halo 5322 is shown in greater detail, according to some embodiments. FIG. 67 shows a front view of halo 5322, according to some embodiments. FIG. 68 shows a perspective view of halo 5322, according to some embodiments. Halo 5322 is shown to include light directing elements, shown as wave guides 6704, according to some embodiments. In some embodiments, wave guides 6704 are configured to at least one of direct, diffuse, guide, etc., light emitted by one or more of LEDs 6400. In some embodiments, wave guides 6704 are configured to at least one of direct, diffuse, guide, etc., light emitted by a corresponding LED 6400. For example, wave guide 6704 is configured to at least one of direct, guide, diffuse, etc., light emitted by LED 6400, according to some embodiments. In some embodiments, each of wave guides 6704 include a corresponding LED 6400.

In some embodiments, wave guides 6704 are a substantially translucent and/or transparent material. In some embodiments, wave guides 6704 are cladded with an opaque material. In some embodiments, exterior surfaces of wave guide 6704 which do not either facilitate an entry or an egress of light into/out of wave guides 6704 is cladded with the opaque material. In some embodiments, the opaque material is painted onto exterior surfaces of wave guides 6704.

In some embodiments, wave guides 6704 include a sweep portion 6808 and a receiving post 6806. In some embodiments, sweep portions 6808 of wave guides 6704 protrude from a rim 6702 (e.g., bezel, surrounding edge, etc.) of halo 5322. In some embodiments, wave guides 6704 protrude from rim 6702 along a curved path. In some embodiments, a width of sweep portion 6808 of wave guides 6704 varies (e.g., decreases) along the curved path. In some embodiments, wave guides 6704 include a receiving post (e.g., a square receiving post, a rectangular receiving post, a square receiving post, etc.) which protrudes from an end point of sweep portion 6808. In some embodiments, any or all of rim 6702, sweep portions 6808 and receiving posts 6806 are integrally formed.

In some embodiments, receiving posts 6806 are configured to facilitate entry of light into wave guides 6704. In some embodiments, receiving posts 6806 include a surface which is not covered with an opaque material (e.g., not cladded) configured to facilitate entry of light emitted by one or more of LEDs 6400 into wave guide 6704. In some embodiments, receiving posts 6806 protrude such that an end of receiving posts 6806 is substantially adjacent to the corresponding LED 6400. In some embodiments, the end of receiving posts 6806 contacts an exterior surface of a corresponding LED 6400.

Figure 69:
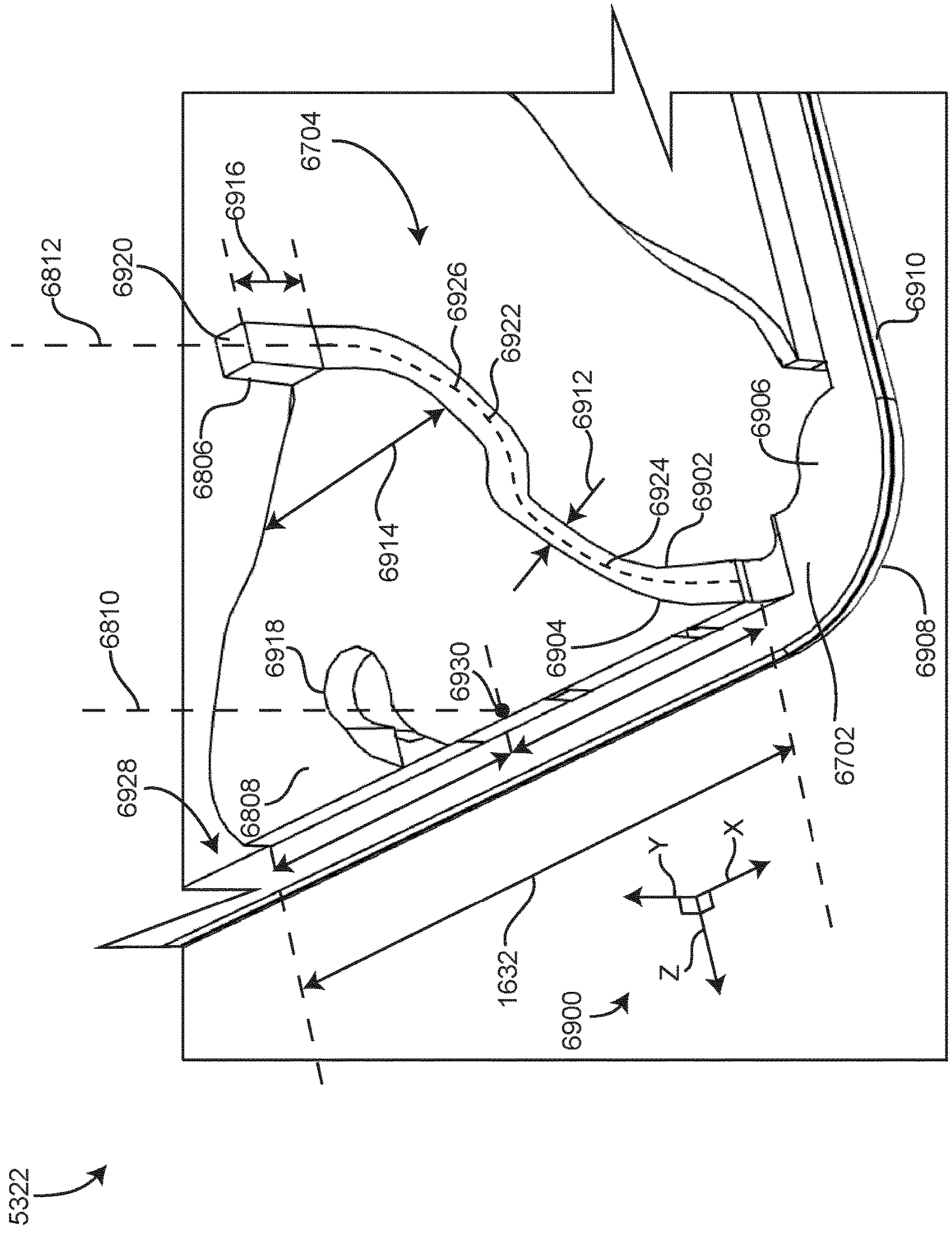
FIG. 69 is an elevated view of one of the light guiding elements of FIG. 68, according to some embodiments.
Figure 70:
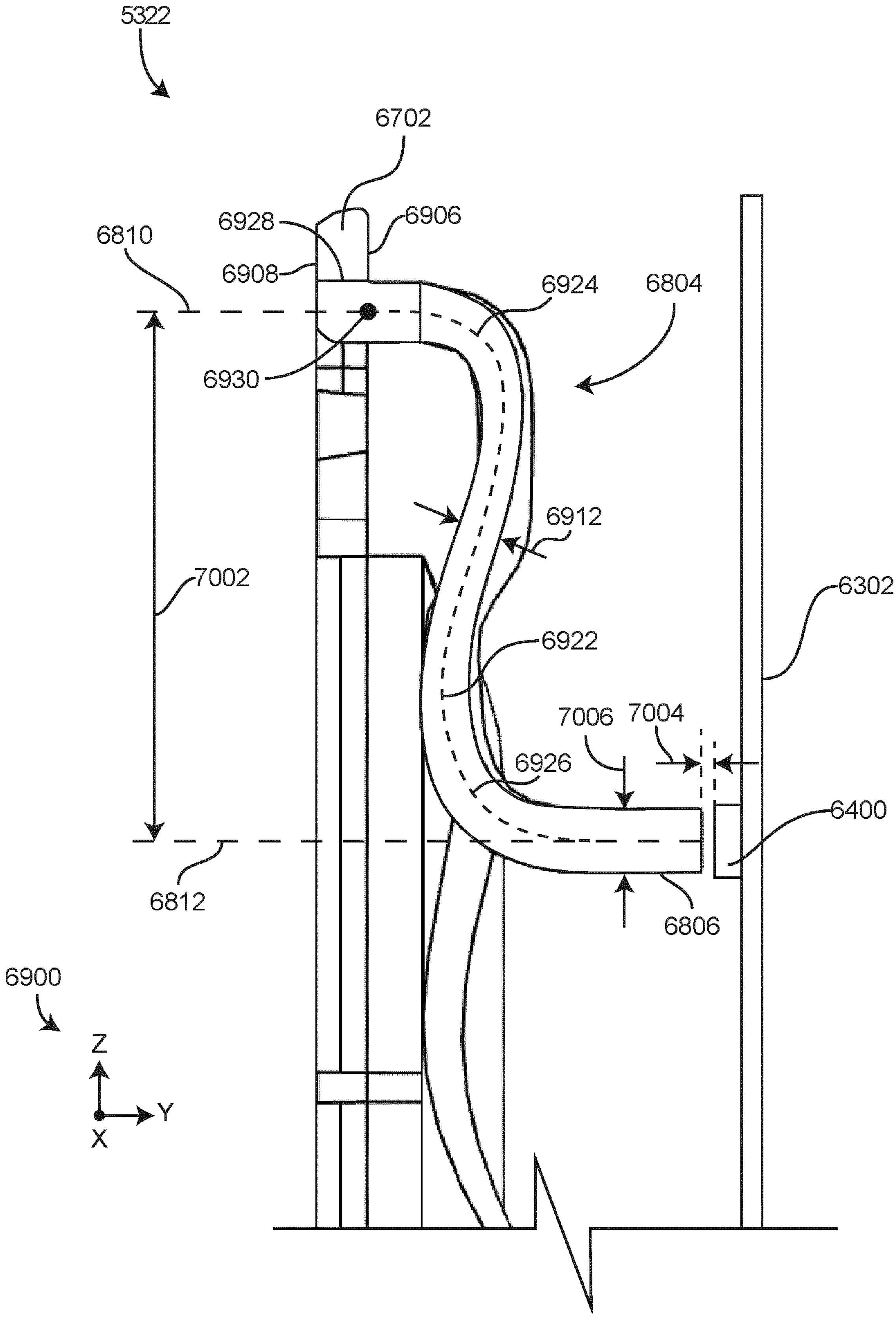
FIG. 70 is a side view of one of the light guiding elements of FIG. 68, shown receiving light from an LED, according to some embodiments.

Referring now to FIGS. 69 and 70, one of wave guides 6704 is shown in greater detail, according to some embodiments. In some embodiments, wave guides 6704 are generally S-shaped. Wave guide 6704 includes sweep portion 6808 and receiving post 6806, according to some embodiments. In some embodiments, sweep portion 6808 protrudes from rim 6702 of halo 5322. Sweep portion 6808 is shown following path 6922 and having thickness 6912, according to some embodiments. In some embodiments, path 6922 is a centerline of sweep portion 6808. In some embodiments, path 6922 is a curved path, having a non-constant radius. In some embodiments, path 6922 is generally S-shaped. In some embodiments, path 6922 includes a convex portion 6924 and a concave portion 6926. In some embodiments, sweep portion 6808 protrudes from a first surface 6906 of rim 6702. In some embodiments, sweep portion 6808 protrudes from a second surface 6908 of rim 6702. In some embodiments, first surface 6902 and second surface 6908 of rim 6702 are opposite each other and define a thickness of rim 6702. In some embodiments, sweep portion 6808 protrudes from an interior surface 6928 of rim 6702. FIGS. 17 and 18 are shown to include a coordinate system 6900, according to some embodiments. In some embodiments, coordinate system includes an x-axis, a y-axis, and a z-axis. Any of wave guides 6704 includes a corresponding coordinate system 6900, according to some embodiments. In some embodiments, wave guides 6704 are generally S-shaped and have non-constant width. In some embodiments, wave guides 6704 are generally S-shaped from a side view. In some embodiments, wave guides 6704 are generally S-shaped and have a first end and a second end. In some embodiments, the second end is configured to receive light emitted by light emitting devices (e.g., LEDs 6400).

In some embodiments, rim 6702 is coated with the opaque material. In some embodiments, first surface 6906, second surface 6908 and interior surface 6928 are coated with the opaque material. In some embodiments, if sweep portion 6808 protrudes from interior surface 6928, at least part of an area of interior surface 6928 which sweep portion 6808 protrudes from is configured to allow light to pass through. In some embodiments, exterior surface 6910 is configured to facilitate egress of light from wave guide 6704. In some embodiments, exterior surface 6910 is configured to diffuse light which passes through wave guide 6704 along at least part of exterior surface 6910.

In some embodiments, sweep portion 6808 includes one or more exterior surfaces which are coated (e.g., cladded) with an opaque material configured to restrict the exit of light from wave guide 6704. In some embodiments, sweep portion 6808 includes first surface 6902 and second surface 6904. In some embodiments, first surface 6902 and second surface 6904 are opposite each other and are each offset an equal distance from path 6922 in opposite directions. In some embodiments, first surface 6902 and second surface 6904 substantially follow path 6922 at an offset distance. In some embodiments, first surface 6902 and second surface 6904 are coated (e.g., cladded) with the opaque material.

In some embodiments, an axis 6810 extends tangent to a starting point 6930 of path 6922. In some embodiments, an axis 6812 extends tangent to an end point of path 6922. In some embodiments, axis 6812 is a central axis of receiving post 6806. In some embodiments, axis 6812 extends tangent to the end point of path 6922 and is the central axis of receiving post 6806. In some embodiments, axis 6810 and axis 6812 are substantially parallel to each other. In some embodiments, axis 6810 and axis 6812 are substantially parallel to each other and are offset a distance 7002 from each other. In some embodiments, distance 7002 is a distance which is perpendicular to both axis 6810 and axis 6812. In some embodiments, distance 6926 is parallel to the Z-axis of coordinate system 6900. In some embodiments, axis 6810 extends tangentially outwards from starting point 6930 of path 6922 and starting point 6930 of path 6922 is disposed at a center point of initial width 1632 of sweep portion 6808. In some embodiments, axis 6810 and axis 6812 are offset relative to each other along the X-axis of coordinate system 6900 (e.g., laterally).

In some embodiments, sweep portion 6808 has a width 6914 and/or an opening 6918 for fasting to another component and/or enclosure piece. Width 6914 varies (e.g., decreases) along path 6922, according to some embodiments. In some embodiments, width 6914 decreases along path 6922 until it is substantially equal to thickness 7006 of receiving post 6806. In some embodiments, width 6914 decreases non-linearly. In some embodiments, sweep portion 6808 has initial width 1632 proximate the interface (e.g., connection) between rim 6702 and sweep portion 6808. In some embodiments, width 6914 decreases linearly. In some embodiments, width 6914 decreases (e.g., either linearly or non-linearly) along part of path 6922 and increases (e.g., either linearly or non-linearly) along another part of path 6922.

In some embodiments, receiving post 6806 protrudes from an end of sweep portion 6808. In some embodiments, receiving post 6806 protrudes tangentially outwards from an endpoint of path 6922. In some embodiments, receiving post 6806 extends in a direction substantially parallel to the Y-axis. In some embodiments, receiving post 6806 includes a receiving surface 1720, configured to facilitate entry of light emitted by one of LEDs 6400. In some embodiments, all other surfaces of receiving post 6806 are coated (e.g., cladded) with the opaque material to prevent light from exiting through the other surfaces.

In some embodiments, sweep portion 6808 has a constant thickness 6912 along an entire length of path 6922. In some embodiments, sweep portion 6808 has a variable thickness 6912 with respect to path 6922. For example, in some embodiments thickness 6912 increases, decreases, or a combination of both, along path 6922. In some embodiments, thickness 6912 is substantially equal to thickness 6906 of receiving post 6806. In some embodiments, thickness 6912 changes (e.g., increases, decreases, or a combination of both) along path 6922 and is substantially equal to thickness 6906 of receiving post 6806 at an end of path 6922 which receiving post 6806 protrudes from.

In some embodiments, receiving post 6806 has a height 6916. In some embodiments, receiving post 6806 protrudes from the end of sweep portion 6808 such that surface 6920 of receiving post is adjacent LED 6400. In some embodiments, receiving post 6806 protrudes from the end of sweep portion 6808 such that surface 6920 is distance 7004 from LED 6400. In some embodiments, distance 7004 is negligible.

Figure 71:
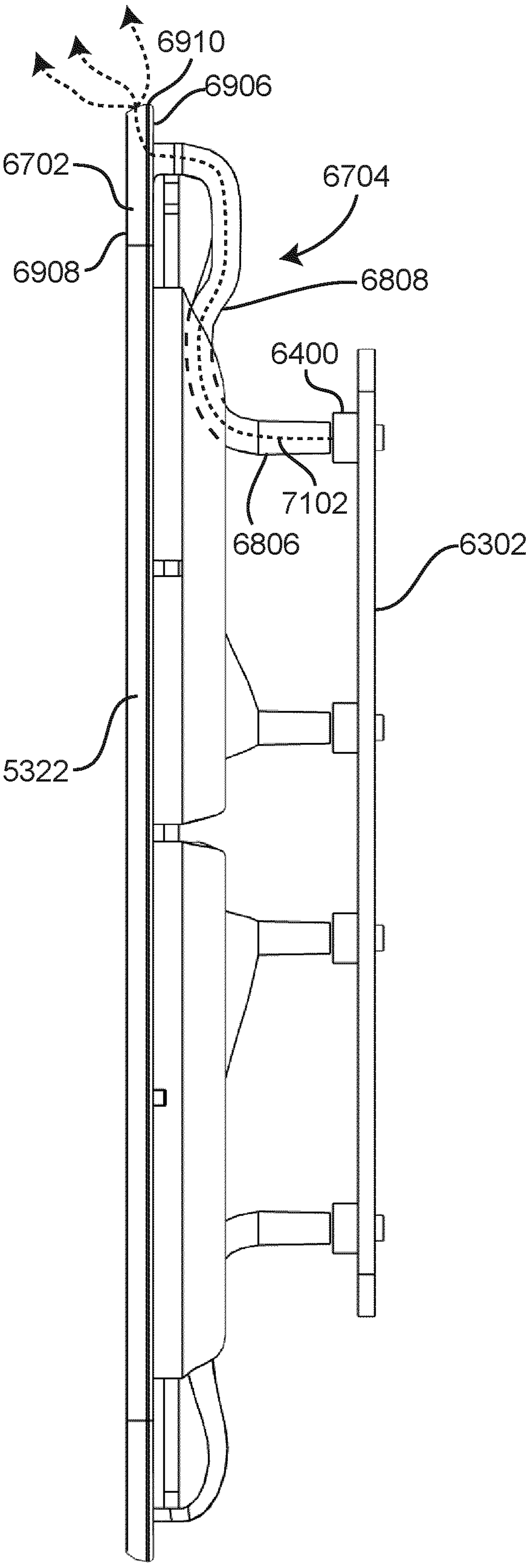
FIG. 71 is a side view of the halo of FIG. 66, shown to include light guiding elements receiving light emitted by LEDs and guiding the emitted light, according to some embodiments.

Referring now to FIG. 71, a side view of LED board 6302 and halo 5322 is shown, according to some embodiments. In some embodiments, light emitted by LED 6400 is received by wave guide 6704 (e.g., through receiving post 6806), travels through sweep portion 6808, and exits halo 5322 through exterior surface 6910 of rim 6702. In some embodiments, light emitted by LED 6400 follows path 7102, generally. In some embodiments, path 7102 is path 6922. In some embodiments, if exterior surfaces of wave guide 6704 are coated (e.g., cladded) with an opaque material, light emitted by LED 6400 travels through wave guide 6704 and reflects off the opaque material. In some embodiments, halo 5322 facilitates a glow of emitted light along exterior surface 6910 of halo 5322. In some embodiments, halo 5322 diffuses light along sides 5308 of display device 5300. In some embodiments, halo 5322 is manufactured from or includes (e.g., at exterior surface 6910) a light diffusing material. In some embodiments, halo 5322 is translucent. In some embodiments, halo 5322 is transparent. In some embodiments, halo 5322 acts as a lens and focuses light emitted by LED 6400 along sides 5308. In some embodiments, light emitted by LED 6400 which enters wave guide 6704 is substantially bounded by exterior surfaces of wave guide 6704 and only enters wave guide 6704 through receiving post 6806 and only exits wave guide 6704 at rim 6702.

Halo 5322 facilitates a wider off-axis viewing angle of light emitted by LED 6400, according to some embodiments. In some embodiments, halo 5322 facilitates notifying a user regarding information received by or determined by display device 5300. In some embodiments, halo 5322 enables the notification to be visible by an observer generally facing any of sides 5308. In some embodiments, halo 5322 enables notifications to an observer when the observer cannot view user interface 5306.

LED Controller

Figure 72:
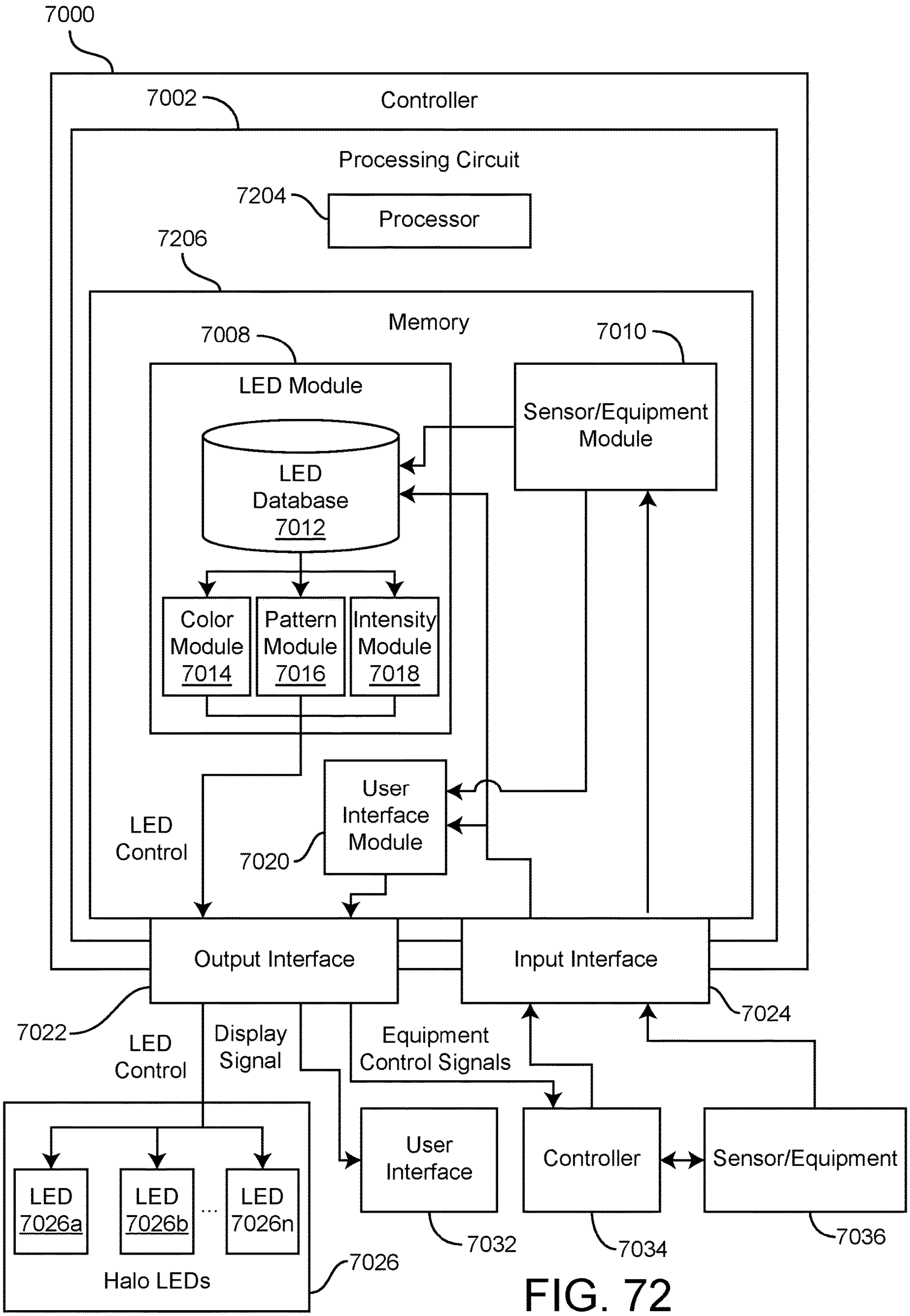
FIG. 72 is a block diagram of an LED controller, according to some embodiments.

Referring now to FIG. 72, a controller 7000 is shown, according to some embodiments. In some embodiments, controller 7000 is or is included in LED board 6302. In some embodiments, controller 7000 is or is included in controller 6002. In some embodiments, any of the functionality of controller 7000 is included in any of controller 6002 and LED board 6302. In some embodiments, controller 7000 is disposed within display device 5300 and is communicably connected to at least one of controller 6002 and LED board 6302. In some embodiments, controller 7000 is positioned outside display device 5300 and is communicably connected to any controllers (e.g., controller 6002, LED board 6302, etc.) of display device 5300.

Still referring to FIG. 72, controller 7000 is shown to include communications interfaces shown as input interface 7024, and output interface 7022. Interfaces 7024 and 7022 can include any number of jacks, wire terminals, wire ports, wireless antennas, or other communications interfaces for communicating information and/or control signals. Interfaces 7024 and 7022 can be the same type of devices or different types of devices. For example, input interface 7024 can be configured to receive an analog feedback signal (e.g., an output variable, a measured signal, a sensor output, a controlled variable) from sensor/equipment 7036 or a digital signal from controller 7034. Output interface 7022 can be a digital output (e.g., an optical digital interface) configured to provide a digital control signal (e.g., a manipulated variable, a control input) to user interface 7032 and/or LEDs 7026. In some embodiments, output interface 7022 is configured to provide an analog output signal. In some embodiments, output interface 7022 is configured to provide an analog output signal and a digital output signal.

In some embodiments interfaces 7024 and 7022 can be joined as one interface rather than two separate interfaces. For example, output interface 7022 and input interface 7024 can be combined as one Ethernet interface configured to receive network communications from controller 7034 or a network. In some embodiments, controller 7034 provides both a setpoint and feedback via an Ethernet network. In some embodiments, output interface 7022 can be another standardized communications interface for communicating data or control signals (e.g., analog or digital). Interfaces 7022 and 7024 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 72, controller 7000 is shown to include a processing circuit 7002 having a processor 7204 and memory 7206. Processor 7204 can be a general purpose or specific purpose processor, an application specific integrated circuit (ASIC), one or more field programmable gate arrays (FPGAs), a group of processing components, or other suitable processing components. Processor 7204 is configured to execute computer code or instructions stored in memory 7206 or received from other computer readable media (e.g., CDROM, network storage, a remote server, etc.).

Memory 7206 can include one or more devices (e.g., memory units, memory devices, storage devices, etc.) for storing data and/or computer code for completing and/or facilitating the various processes described in the present disclosure. Memory 7206 can include random access memory (RAM), read-only memory (ROM), hard drive storage, temporary storage, non-volatile memory, flash memory, optical memory, or any other suitable memory for storing software objects and/or computer instructions. Memory 542 can include database components, object code components, script components, or any other type of information structure for supporting the various activities and information structures described in the present disclosure. Memory 542 can be communicably connected to processor 540 via processing circuit 538 and can include computer code for executing (e.g., by processor 540) one or more processes described herein.

Referring still to FIG. 72, controller 7000 is shown receiving information from at least one of sensor/equipment 7036 and controller 7034, according to some embodiments. In some embodiments, controller 7000 receives information from sensor/equipment 7036 and determines an operation of LEDs 7026 corresponding to the information received. In some embodiments, LEDs 7026 are LEDs 6400. In some embodiments, LEDs 7026 are LED board 6302. In some embodiments, controller 7000 is configured to determine an event (e.g., temperature exceeding a threshold value, emergency event, etc.) and is configured to adjust an operation of LEDs 7026 for the event. In some embodiments, controller 7000 receives information regarding an event from controller 7034 and adjusts an operation of at least one of user interface 7032 and LEDs 7026 for the event. In some embodiments, sensor/equipment 7036 is any of a temperature sensor, an air quality detector, building equipment, etc., or any other sensor or equipment. In some embodiments, sensor/equipment 7036 is more than one sensor and/or more than one equipment. For example, controller 7000 receives information from multiple temperature sensors, according to some embodiments.

Controller 7000 is shown receiving information from sensor/equipment 7036 through input interface 7024. In some embodiments, sensor/equipment module 7010 receives the information from sensor/equipment 7036. In some embodiments, sensor/equipment module 7010 receives the information from sensor/equipment 7036 and determines an event based on the received information. For example, in some embodiments, sensor/equipment module 7010 periodically receives temperature information from a temperature sensor and determines if the received temperature exceeds a predetermined threshold value. In another example, sensor/equipment 7036 receives information from an indoor air quality sensor (e.g., a carbon monoxide detector) and determines if the received indoor air quality information is less than a predetermined threshold value. In some embodiments, controller 7000 receives information from any of one or more controller, one or more equipment devices, one or more sensors, a network, etc., and determines an operation of user interface 7032 and/or LEDs 7026 based on the received information. Controller 7000 may receive information through a wired connection at input interface 7024, a wireless connection at input interface 7024, or a combination of both.

In some embodiments, sensor/equipment module 7010 determines an event based on the received information and provides the event to LED module 7008. For example, if sensor/equipment module 7010 determines that the indoor air quality has dropped below a predetermined value, sensor/equipment module 7010 provides the determined event to LED module 7008. In some embodiments, sensor/equipment module 7010 provides the information received from sensor/equipment 7036 to user interface module 7020. For example, in some embodiments, if sensor/equipment module 7010 receives temperature information from sensor/equipment 7036, sensor/equipment module 7010 provides the temperature information to user interface module 7020. In some embodiments, user interface module 7020 is configured to determine control signals for user interface 7032 to display the information received from sensor/equipment module 7010 to a user. In some embodiments, sensor/equipment module 7010 is configured to provide LED module 7008 with at least one of information received through input interface (from at least one of controller 7034 and sensor/equipment 7036) and the determined or received event.

In some embodiments, user interface module 7020 is configured to determine control signals for user interface 7024. In some embodiments, user interface 7032 is user interface 5306. In some embodiments, user interface module 7020 is configured to determine control signals for user interface 7032 to display messages, information, graphical representations of information, data, etc. In some embodiments, user interface module 7020 also receives information from user interface 7032 through input interface 7024. In some embodiments, user interface module 7020 receives commands, directives, requests, etc., from user interface 7032 and adjusts an operation (e.g., a displayed message) of user interface 7032 based on the command, request, etc., received from user interface 7032. In some embodiments, user interface module 7020 receives a request from user interface 7032 to display certain data, and user interface module 7020 adjusts an operation of user interface 7032 to display the requested data.

In some embodiments, controller 7000 receives any of information and an event from controller 7034. For example, in some embodiments, controller 7034 is communicably connected with sensor/equipment 7036 and is configured to analyze, process, group, etc., information form sensor/equipment 7036 and determine if an event has occurred. In some embodiments, controller 7034 provides the information and/or event data to at least one of user interface module 7020 and LED module 7008.

Referring still to FIG. 72, memory 7206 is shown to include LED module 7008, according to some embodiments. In some embodiments, LED module 7008 is configured to determine an operation of one or more LEDs (e.g., LEDs 7026, LEDs 6400) based on information received from any of sensor/equipment module 7010, user interface module 7020, user interface 7032, controller 7034, and sensor/equipment 7036. LED module 7008 determines any of a color, a pattern, an intensity, etc., of the one or more LEDs based on the received information and determines signals to adjust an operation of one or more LEDs based on the received information.

LED module 7008 is shown to include an LED database 7012, a color module 7014, a pattern module 7016, and an intensity module 7018. In some embodiments, LED database 7012 stores information regarding a patterned operation of one or more LEDs based on a received event and/or received information. For example, if LED module 7008 receives an event from sensor/equipment module 7010, controller 7034, sensor/equipment 7036, etc., indicating that the indoor air quality has dropped below a predetermined value, LED module 7008 may retrieve a set of instructions from LED database 7012 regarding an operation of LEDs based on the event. In some embodiments, LED database 7012 includes information regarding an operation of LEDs for a variety of events, including but not limited to, an increased temperature event, a decreased temperature event, a low indoor air quality event, an emergency event, a fire detection event, an equipment failure event, a calendar date event, a time of day, etc. In some embodiments, LED database 7012 includes a set of predetermined instructions regarding an operation of LEDs for each of these events.

In some embodiments, LED database 7012 includes a set of predetermined instructions for each of a set of predefined events. In some embodiments, LED database 7012 can be updated and/or customized. For example, in some embodiments, LED database 7012 can receive directives from user interface 7032 to change an operation of one or more of the LEDs (e.g., color, on-off pattern, intensity, timing, etc.) to modify the predetermined instructions for one or more of the predefined events. In some embodiments, additional events can be added to LED database 7012 along with corresponding LED operation instructions for the additional events. In some embodiments, for example, controller 7000 includes a wireless radio (e.g., a Bluetooth wireless radio) configured to interface with a user device (e.g., a smartphone). The LED database 7012 is configured to be updated or modified based on directives received from the user device. For example, if a user wants to be notified/reminded of an event on a certain date at a specific time, the user may add an event to LED database 7012 to adjust an operation of one or more LEDs according to a predetermined pattern, set of rules, etc., on the certain date at the specific time.

In some embodiments, upon receiving an event and/or information, LED database 7012 provides the instructions to color module 2014, pattern module 7016, and intensity module 7018. For example, if LED database 7012 receives a night-time event (e.g., from a clock or from a light detector), LED database 7012 may retrieve a specific set of instructions (e.g., dim all LEDs by 50%, turn off several LEDs, adjust a color of one or more LEDs to blue, etc.) for the LEDs (e.g., LEDs 7026, LEDs 6400, etc.) corresponding to the night-time event.

In some embodiments, LED database 7012 includes instructions for various events to adjust a color of one or more of the LEDs (e.g., red, blue, green, etc.), adjust an intensity of one or more of the LEDs, turn one or more of the LEDs on or off, patterningly adjust a color of one or more of the LEDs, patterningly adjust an intensity of one or more of the LEDs, patterningly turn one or more of the LEDs on or off, etc. In some embodiments, any of the color, intensity, on/off state, etc., of the one or more LEDs is patterned over time (e.g., all LEDs are turned on for 5 seconds, then turned off for 5 seconds, and this is repeated), or patterned based on a predetermined position of the one or more LEDs (e.g., turn a first LED on, then turn a second LED on, then turn a third LED on and turn the first LED off, then turn a fourth LED on and turn the second LED off, then turn a fifth LED on and turn the third LED off, etc.), or patterned based on both time and position of the one or more LEDs.

In some embodiments, one or more of the set of instructions stored in LED database 7012 extend for a time duration, and are repeated. For example, some of the sets of instructions may last for five seconds (e.g., a patterned operation of the LEDs for five seconds) and be repeated a predetermined number of times, while other sets of instruction may last only two seconds (e.g., increase intensity from 0% to 5300% for all LEDs over a 1 second time duration, then decrease intensity from 5300% to 0% for all LEDs over a 1 second time duration), and repeated.

In some embodiments, sets of instructions are combined. For example, in some embodiments, all events which indicate an increase in temperature include a same patterned intensity operation of LEDs (e.g., linearly increase intensity of all LEDs from 0% to 5300% over a five second time window). However, within the set of all events which indicate an increase in temperature, other operations of the LEDs (e.g., color) may vary based on other factors (e.g., which temperature from a set of temperatures is increasing, how fast the temperature increases, etc.).

Any of the color, pattern, intensity, etc., of the one or more LEDs may be adjusted over a time window linearly (e.g., increase intensity from 0% to 5300% linearly over a 5 second time window) or may be adjusted over a time window non-linearly (e.g., increase intensity from 0% to 5300% according to an exponential function, a polynomial, etc.).

In some embodiments, the instructions stored in LED database 7012 depend on the particular types of LEDs used. For example, some LEDs may not be multi-color LEDs and may only actuate between an on state and an off state, according to some embodiments. In some embodiments, LED database 7012 stores a map of positions of the LEDs and abilities of each of the LEDs (e.g., dimming abilities, maximum light intensity, etc.).

In some embodiments, controller 7000 does not include LED database 2012, and receives instructions from any of controller 7034 and/or a network to adjust an operation of any of a color, a pattern, an intensity (e.g., dimming), etc., of any of the LEDs.

Referring still to FIG. 72, LED module 7008 is shown including color module 2014, pattern module 7016 and intensity module 7018. In some embodiments, color module 2014, pattern module 2016, and intensity module 7018 are configured to determine any of voltage, current, digital signals, analog signals, etc., to adjust an operation of one or more LEDs according to the determined operation received from any of LED database 7012, controller 7034, etc. LED module 7008 may include any predefined script objects, functions, or electrical components (e.g., resistors, capacitors, inductors, transformers, etc.) necessary to determine voltage, current, etc., required to operate the LEDs to produce the desired operation. In some embodiments, LED module 7008 uses Pulse Width Modulation and adjusts a duty cycle to change a brightness of one or more of the LEDs.

In some embodiments, LED module 7008 is connected to one or more LEDs (e.g., LEDs 7026, LEDs 6400, etc.). In some embodiments, LED module 7008 adjusts an operation of the one or more LEDs to produce the desired effect (e.g., dimming, changing color, patterned dimming, patterned change in color, etc.). In some embodiments, the one or more LEDs each correspond to one or more wave guide 6704 to any of diffuse, direct, scatter, focus, etc., light emitted by the one or more LEDs along sides 5308 of display device 5300.

Thermostat with Halo Light System and Emergency Features

Referring now generally to FIGS. 73-77, the control device 214 is shown and described with a halo LED interface system for providing a user with emergency indications and/or directions, according to various exemplary embodiments. The control device 214 as described with reference to FIGS. 73-77 can include some and/or all of the operations as described with FIGS. 2-39 and can interface with, receive data from, and/or control any of the systems and/or devices as described with reference to FIGS. 2-39. More particularly, the emergency and direction based features as described with reference to FIGS. 2-39 can be implemented in the control device 214 and used to operate the halo LED interface. Similarly, the control device 214 can include some and/or all of the operations as described with FIGS. 40-52 and can interface with, receive data from, and/or control any of the systems and/or devices as described with reference to FIGS. 40-52. More particularly, the emergency and direction based features as described with reference to FIGS. 40-52 can be implemented in the control device 214 and used to operate the halo LED interface.

The halo LED interface as described in FIGS. 73-77 can be the same as and/or similar to the halo system as described with reference to FIGS. 53-72. Specifically, the mechanical structural components, LEDs, and/or processing logic as described with reference to FIGS. 73-77 can be impalement in the control device 214 to allow the control device 214 to provide emergency indications, directions, emergency directions, and/or communicate any other kind of information to a user via the halo interface. Furthermore, halo systems and devices are further described in U.S. patent application Ser. No. 14/104,669 filed Dec. 12, 2013 (now U.S. Pat. No. 9,824,549), the entirety of which is incorporated by reference herein. In some embodiments, the display device 5300 as described with reference to FIGS. 53-72 includes some and/or all of the components and/or is configured to perform some and/or all of the operations of the of any of the thermostats, user devices, display devices, etc., specifically, the components and/or the operations of the control device 214 as described with reference to FIGS. 73-77.

Figure 73:
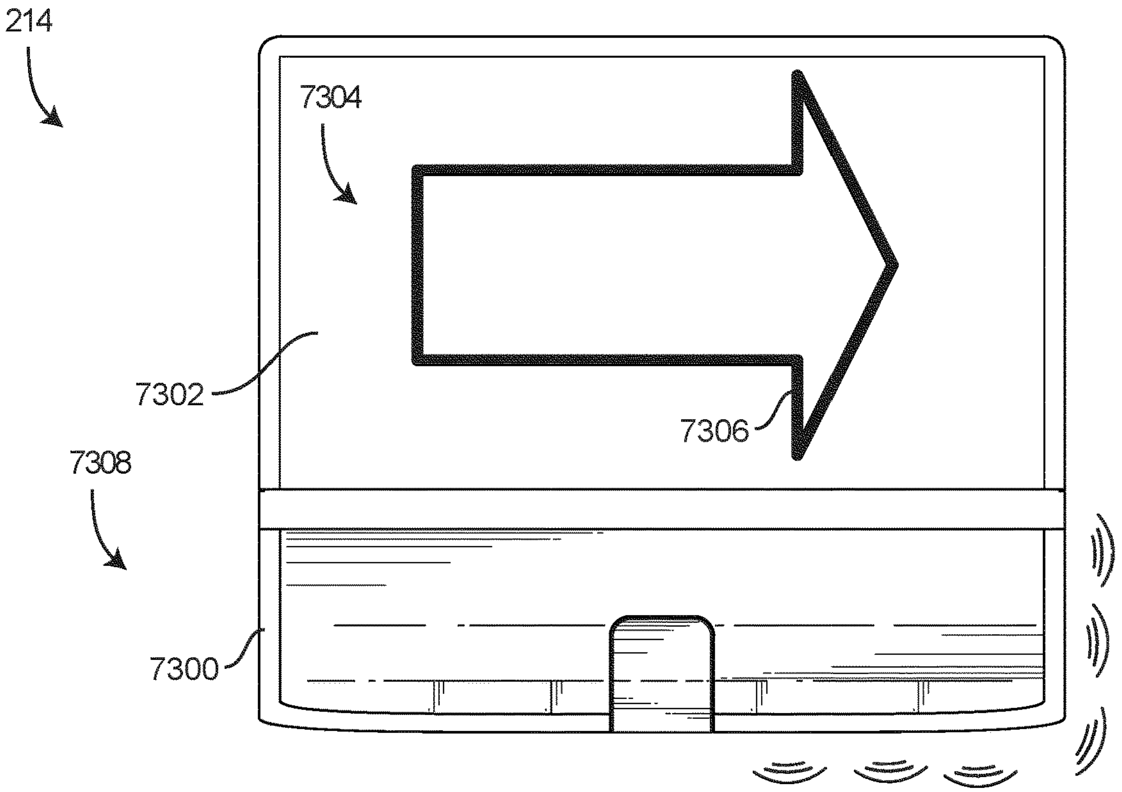
FIG. 73 is a schematic drawing of the control device of FIG. 2 including a halo diffusing light around a base portion of the control device, according to an exemplary embodiment.

Referring now to FIG. 73, control device 214 is shown including a halo 7300 for providing directions to a user, according to an exemplary embodiment. Halo 7300 can be configured to diffuse light generated by one or multiple LEDs. Halo 7300 can be the same and/or similar to the halo 5322 as described with reference to FIGS. 53-72. Control device 214 can include any of the mechanical and/or electronic components described with reference to FIGS. 53-72 to operate the halo 7300 (e.g., the LED board 6302, the LEDs 6400, the wave guides 6704, etc.). In FIG. 73, the halo 7300 is shown to surround a base portion 7308 of the control device 214. The base portion can be configured to be mounted to a wall to couple the control device 214 to a wall or other surface.

The control device 214 includes a user interface 7302 in some embodiments. The user interface 7302 may be a transparent touch screen interface displaying information configured to display information to a user and receive input from the user. The user interface 7302 may be the same as, similar to, and/or a combination of touch-sensitive panel 704, the electronic display 706, and/or the ambient lighting 708 as described with reference to FIG. 7 and/or the user interface 5306 as described with reference to FIG. 53.

The user interface 7302 may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The user interface 7302 can be a touchscreen or other type of electronic display configured to present information to a user in a visual format (e.g., as text, graphics, etc.) and receive input from a user (e.g., via a touch-sensitive panel). For example, the user interface 7302 may include a touch-sensitive panel layered on top of an electronic visual display. A user can provide inputs through simple or multi-touch gestures by touching the user interface 7302 with one or more fingers and/or with a stylus or pen. The user interface 7302 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of user interface 7302 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the user interface 7302 is configured to present visual media (e.g., text, graphics, etc.) without requiring a backlight.

The user interface 7302 is configured to display an arrow 7304 in some embodiments. The arrow 7304 can aid a user in navigating a building. For example, the arrow 7304 can be a direction (e.g., emergency direction, navigation direction, etc.) as described with reference to FIGS. 40-52. The arrow 7304 can aid a user in navigating a building to find a particular conference room, office, etc. Furthermore, the arrow 7304 can be an emergency response direction. For example, the arrow 7304 can aid a user to navigate out of a building in an active shooter situation, navigate to a safe zone within a building, etc. The arrow 7304 can be a particular color, e.g., black, red, yellow, green, etc. In some embodiments, where the user interface 7302 is transparent, the arrow 7304 can include a border 7306 to help the arrow 7304 be distinguishable from a wall which may have a similar color as the arrow 7304.

For example, an emergency evacuation arrow may be colored red. However, if the control device 214 is installed on a red colored wall, the arrow 7304 may be difficult to see for a user. In this regard, the control device 214 can be configured to cause the user interface 6902 to display the arrow 7304 with the border 7306. The border 7306 may be black, red, yellow, orange, green, blue etc. and/or any other color which helps the arrow 7304 stand out and be visible to a user. In some embodiments, a user programs, via the user interface 7302, a wall color and/or a border color 7304 in order for the control device 214 to appropriately generate the arrow 7304. In some embodiments, the control device 214 includes color sensors configured to determine a color of a wall that the control device 214 is installed in an automatically select the color for the border 7306 and generate the arrow 7304 with the selected border color. For example, if the wall which the control device 214 is located by is red, the arrow 7304 may be generated to be a red color with a blue colored border 7306 to help the arrow 7304 stand out to a user.

In addition to, or in place of, the navigation direction (e.g., the arrow 7304) displayed by the control device 214 on the user interface 7302, the user device can operate the halo 7300 to cause the control device 214 to communicate navigation directions and/or indications to a user. In some embodiments, in the event of an emergency, the halo, in part and/or in its entirety (e.g., one, multiple, or all of the LEDS lighting the halo 7300) can turn on causing the control device 214 to have an ambient halo light (e.g., a red light for an emergency). In some embodiments, the halo 7300 is operated by the control device 214 to communicate a navigation and/or emergency response direction to a user.

For example, if a user needs to make a right turn, the halo 7300 may operate such that the right side of the halo 7300 (e.g., as shown in FIG. 73) is illuminated. In some embodiments, the halo 7300 is activated in a pattern. For example, to communicate to a user to make a right turn, the halo 7300 can activate from left to right (e.g., turn on for a predefined period of time to cause a trail of light to move from left to right). In some embodiments, the pattern moves across the halo 7300 from left to right while in some embodiments, the halo LEDs of the halo 7300 are activated and held on one at a time from left to right until all the LEDS are activated. In some embodiments, the direction displayed on the user interface 7302 and the direction communicated by the halo 7300 are related, i.e., if the user should make a left turn, both the user interface 7302 and the halo 7300 communicate the left turn indication to the user.

Figure 74:
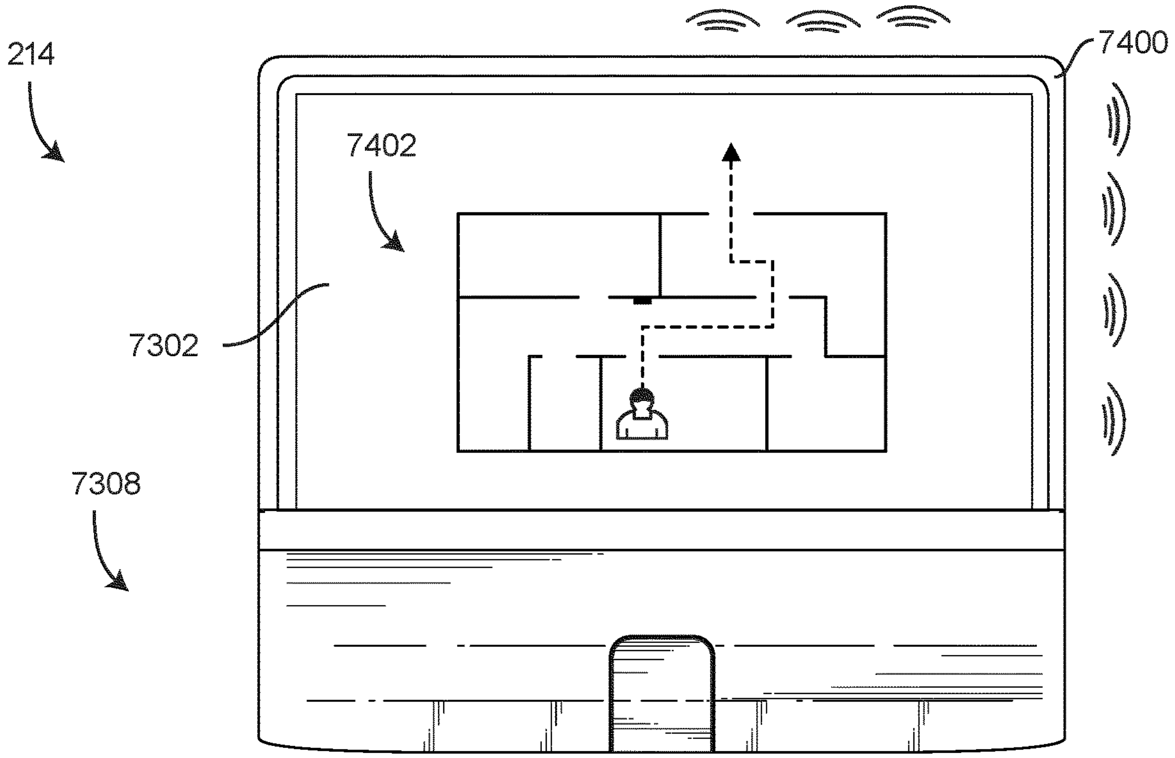
FIG. 74 is a schematic drawing of the control device of FIG. 2 including a halo diffusing light around a display screen of the control device, according to an exemplary embodiment.

Referring now to FIG. 74, the control device 214 is shown including a halo 7400 surrounding, in part, the user interface 7302. While the halo 7400 is shown to surround the user interface 7302 and not the base portion 7304, in some embodiments, the control device 214 includes both the halo 7300 and the halo 7400, i.e., the control device 214 includes a single halo (or multiple halos) surrounding, in whole or in part, the control device 214. The halo 7400 can be the same as and/or similar to the halo 7300 as described with reference to FIG. 73.

The control device 214 is configured to cause the user interface 7302 to display a map 7402, in some embodiments. The map 7402 may be multiple emergency response directions, e.g., directions helping a user navigate through and/or out of a building in the event of an emergency (e.g., an active shooter situation, a fire, etc.). The map 7402 can indicate the current location of a user, an indication of the control device 214 on the map, and a navigation path including one or multiple turns to evacuate a building. In some embodiments, the control device 214 causes the halo 7400 to operate to display a complementary indication to a user. For example, if the next turn on the map 7402 is a right turn, the halo 7400 can be operated to communicate a right turn to the user.

For example, the control device 214 is configured to cause LEDs illuminating the halo 7400 to operate in a pattern, e.g., a sweeping pattern from left to right. In some embodiments, rather than a sweep from left to right, the LEDs can be activated and held on one at a time at predefined intervals from left to right. In some embodiments, a particular set of LEDs can be operated as a blinker. For example, LEDs on a left side of the halo 7400 can be operated in a blinking mode to indicate a left turn while LEDs on the right side of the halo 7400 can be operated in a blinking mode to indicate a right turn.

Although the control device 214 described with reference to FIGS. 73-74 uses the halos 7300 and/or 7400 to communicate the existence of an emergency and/or emergency response directions, the control device 214 can operate a halo LED system to cause the halos 7300 and/or 7400 to display non-emergency information. For example, if the control device 214 determines that there is a condition that requires user input, the control device 214 can activate LEDs of a halo LED system (e.g., turn the LEDs on constantly, blink the LEDs at a particular frequency, cause the LEDs to emit light of a particular color, etc.) to indicate to the user that they should approach the control device 214 and provide input to the control device 214 via the user interface 7302.

In some embodiments, the control device 214 is located in a hotel room. When a user first enters the hotel room, the control device 214 may detect the presence of the user and activate the halo LEDs, illuminating the halos 7300 and/or 7400 to indicate that the user should approach the control device 214 to provide the control device 214 input. The control device 214 can present information e.g., check-in and check-out information, facilitate a booking payment, request a wakeup time (and sound an alarm once the wakeup time occurs), prompt a user for preferred environmental settings (e.g., temperature setpoint), etc.

The control device 214 can activate halo LEDs to illuminate the halos 7300 and/or 7400 to provide alarm functionality. For example, a user may set an alarm time and/or date on the control device 214 via the user interface 7302. The control device 214 is configured to sound an alarm when the alarm time and/or date occurs. The alarm may be an audio based alarm sounded via the speakers 710. Furthermore, the control device 214 can activate the halo LEDs to illuminate the halos 7300 and/or 7400 to awaken the user. The LEDs can be pulsed on and off at particular frequencies and/or ramp a light intensity of the LEDs up and/or down.

Furthermore, the control device 214 can be configured to integrate, via the network 602, with a television. The television may be a smart television configured to receive control input via the network 602. For example, the television may be connected to the Internet. An Internet server may store settings for the television and push settings to the television causing the television to implement the settings. Examples of settings may be volume, television channel, powering on or off (e.g., going from a low power state to a fully operational power state), etc.

In some embodiments, the control device 214 receives, via the microphone 726 audio commands (e.g., to turn volume up or down, change a channel up or down, pause a video being played on the television, play the video, fast forward the video, rewind the video, etc.). The control device 214 can process the audio data recorded, determine the command, and push the command to the Internet television server which can in turn cause the television to implement the command. In some embodiments, whenever the control device 214 is processing audio data and/or causing the television to implement a command based on the processed audio data, the control device 214 can operate LEDs of the halos 7300 and/or 7400. For example, when the control device 214 is listening to a user, the LEDs may be operated in a first pattern or in a first color. When the control device 214 is processing the audio data, the control device 214 can operate the LEDs in a second pattern and/or at a second color.

Figure 75:
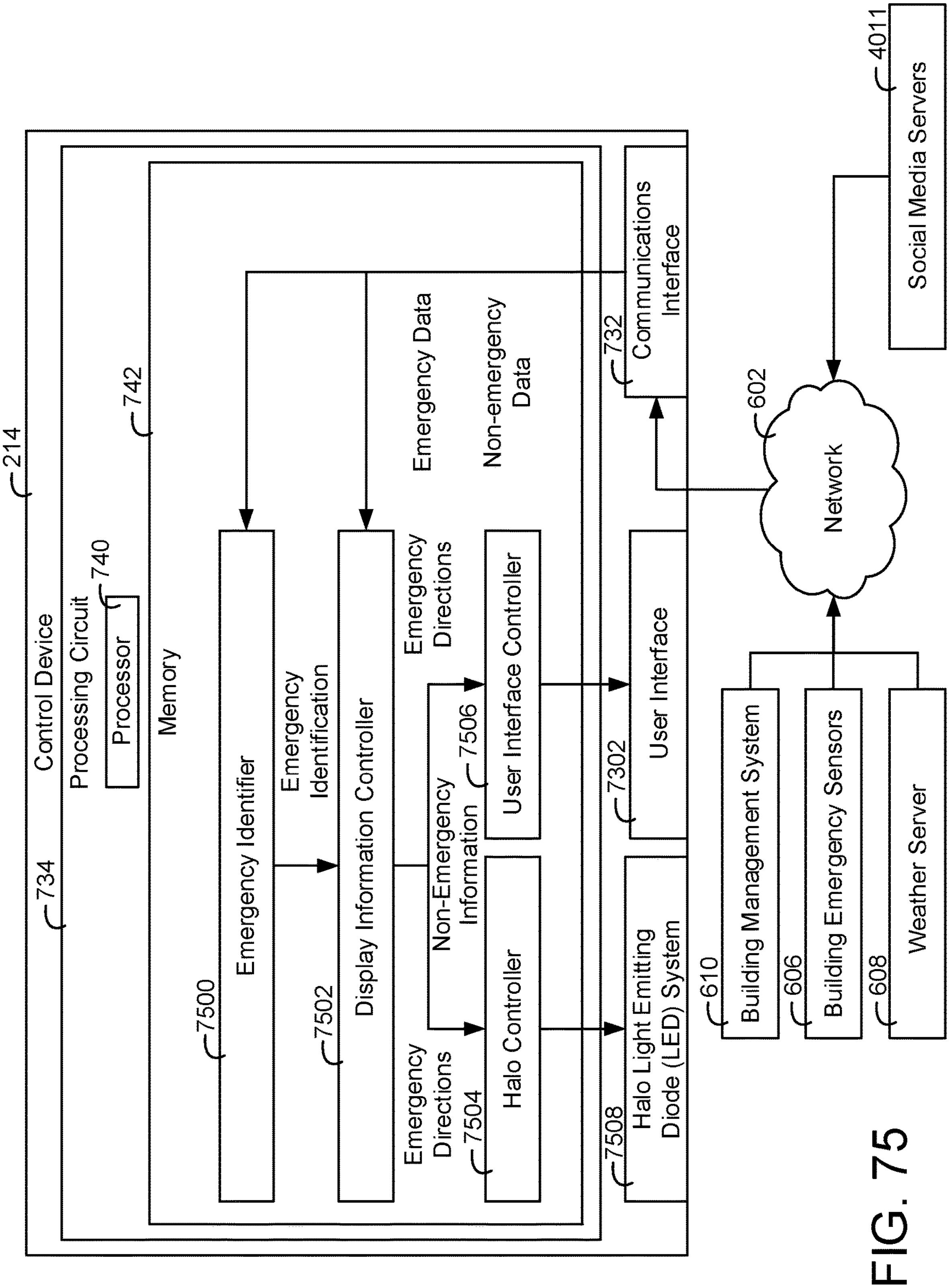
FIG. 75 is a block diagram illustrating the control device of FIGS. 73-74 in greater detail for operating the halos of FIGS. 73-74 to indicate emergency conditions, according to an exemplary embodiment.

Referring now to FIG. 75, the control device 214 is shown in greater detail to include the processing circuit 734, the processor 740, and the memory 742 as describe with reference to FIG. 7. Furthermore, the control device 214 is shown to include the communications interface 732 as described with reference to FIG. 7. The processing circuit 734 is configured to receive emergency and/or non-emergency information from the communications interface 732 via a network 602 and is configured to operate the user interface 7302 and/or a halo light emitting diode (LED) system 7508 which is included by the control device 214. The processing circuit 734 is configured to operate the halo LED system 7508 and the user interface 7302, in some embodiments, to communicate messages (e.g., emergency response directions), to a user in response to a particular event occurring (e.g., an emergency situation e.g., a fire, a flood, a hurricane, a tornado, an active shooter, etc.).

The halo LED system 7508 can be the same as and/or similar to the components of FIGS. 53-72 and can be configured to cause light to be diffused through a halo (e.g., the halo 7300 and/or the halo 7400). The halo LED system 7508 can include one or multiple LEDs (e.g., single color LEDS, multi-color LEDS, etc.) which may be the same as and/or similar to the LEDs 6304, the halo LEDs 7026, and/or the LEDs 6400 as described with reference to FIGS. 53-72. The halo LED system 7508 can include an LED board, e.g., the LED board 6302, wave guide, e.g., the wave guides 6704, and/or any other mechanical, computing, or logic component configured to operate the halo LED system 7508.

The control device 214 is shown to receive both emergency and non-emergency data from one or multiple data streams via the network 602. The emergency and non-emergency data can be received from the building management system 610, the building emergency sensors 606, and/or the weather server 608 as described with reference to FIG. 6 and elsewhere herein. Furthermore, the control device 214 is configured to receive the emergency and/or non-emergency information from the social media servers 4011 as described with reference to FIG. 40 and elsewhere herein. In some embodiments, the emergency data indicates one or more emergency conditions, e.g., a hurricane, an active shooter, a fire, etc. and can be measured, sensed, recorded, and/or generated by the building management system 610, the building emergency sensors 606, the weather server 608, and/or the social media servers 4011. For example, if a user posts on a social media platform operated by the social media servers 4011 that there is an active shooter in the building, the emergency data stream may indicate that there is an active shooter and may be received from the social media servers 4011. Similarly, the weather server 608 can provide an indication of a storm warner, a blizzard, etc.

The memory 742 is shown to include an emergency identifier 7500. The emergency identifier 7500 is configured, in some embodiments, to analyze data streams receive from the network 602 to determine whether the data of one or more of the data streams indicates an emergency. For example, in some embodiments, the data of a particular data stream may be indicative of an emergency occurring, a type of emergency occurring, etc. In some embodiments, the data received via the network 602 is labeled as an emergency and the emergency identifier 7500 can identify that data as representing an emergency by identifying whether the label is present. In some embodiments, the emergency identifier 7500 itself analyzes values within the data to determine whether an emergency is present.

For example, if the data received from the network 602 is indicative of a particular ambient temperature, the emergency identifier 7500 can identify whether the particular temperature is indicative of a dangerously cold temperature (e.g., by comparing the temperature to a threshold value, e.g., by determining whether the temperature is less than the threshold value). Similarly, the emergency identifier 7500 is configured, in some embodiments, to determine whether wind speed data receive from the weather server 608 indicates hurricane level winds (e.g., wind speed above a predefined amount).

The memory 742 includes display information controller 7502. The display information controller 7502 is configured to generate information for the halo controller 7504 and/or the user interface controller 7506 to display. For example, in some embodiments, the information may be indicative of the emergency and/or non-emergency data receive from the network 602. For example, in some embodiments, if an outdoor ambient temperature is received from the network 602, the display information controller 7502 can communicate a value of the outdoor ambient temperature to the halo controller 7504 and/or the user interface controller 7506. The user interface controller 7506 can cause the user interface 7302 to display a numeric value (or other interface element) representing the ambient temperature. The halo controller 7504 is configured to cause the halo LED system 7508 to display an indication of the current temperature (e.g., illuminate in a particular color and/or with a particular temperature that is based on (e.g., is a function of) the temperature value. For example, the colors displayed by the halo LED system 7508 may be blue and red. The color displayed by the halo LED system 7508 may scale from blue to red as the temperature increases.

The display information controller 7502 is configured, in some embodiments, to generate emergency response directions and cause the halo controller 7504 and/or the user interface controller 7506 to communicate the emergency response directions to a user. In some embodiments, the display information controller 7502 includes some and/or all of the operations of the display device 4300 for generating and displaying directions as described with reference to FIGS. 40-52. In some embodiments, the display information controller 7502 includes some and/or all of the operations of the emergency module 756, the occupancy module 754, the healthcare module 752, the hotel module 750, and/or any other module as described with reference to FIG. 7 and elsewhere herein.

In some embodiments, the emergency response directions are one or multiple instructions to navigate a building (e.g., evacuate a building), respond to an active shooter (e.g., fortify a room, turn lights off, hide under a desk, etc.), respond to a hurricane or tornado (e.g., close windows, close shutters, move away from windows, hide under desks or tables, etc.). The display information controller 7502 is configured to communicate the emergency response directions to the halo controller 7504 and/or the user interface controller 7506.

Furthermore, the display information controller 7502 is configured, in some embodiments, to override the current operate (e.g., display) of the halo LED system 7508 and/or the user interface 7302. For example, if the halo LED system 7508 and the user interface 7302 are currently displaying non-emergency information (e.g., information pertaining to normal weather, non-emergency building events, etc.) the display information controller 7502 can cause the halo controller 7504 and/or the user interface controller 7506 to override the display of information by the halo LED system 7508 and/or the user interface 7302 with the emergency response directions.

In some embodiments, in response to receiving emergency response directions, the halo controller 7504 can override a current operation of the halo LED system 7508. For example, the halo LED system 7508 may slowly blink (or linearly, exponentially, etc. vary intensity) at a particular color (e.g., green, blue, etc.) and/or turn on constantly at the particular color to indicate that a user has a message, notification, or otherwise that the control device 214 requires their input. However, if the display information controller 7502 provides emergency response directions to the halo controller 7504. The halo controller 7504 can override the operation of the halo LED system 7508 with the emergency response directions and/or an indication of an emergency. For example, the halo controller 7504 can cause the color of the LED system 7508 to change color to another color indicative of an emergency (e.g., red, orange, etc.) and/or change from being constantly on (or off) to blinking at a particular frequency (e.g., every half second) to gain the attention of a user.

The user interface controller 7506 can be configured to cause the user interface 7302 to display the emergency response directions and/or can be configured to override any other information displayed on the user interface 7302 in response to receiving an indication of an emergency from the display information controller 7502. For example, the user interface 7302 could display navigation instructions for a user to navigate to a particular conference room. The navigation instructions and/or request for the instructions can be receive via the network 602 via a data stream. However, in response to determining that there is a weather emergency (e.g., tornado, flooding, earthquake, etc.) the user interface controller 7506 can override the display of the normal non-emergency y building navigation directions and cause the user interface 7302 to display emergency response directions (e.g., a navigation arrow for evacuation, shooter response directions, etc.).

Figure 76:
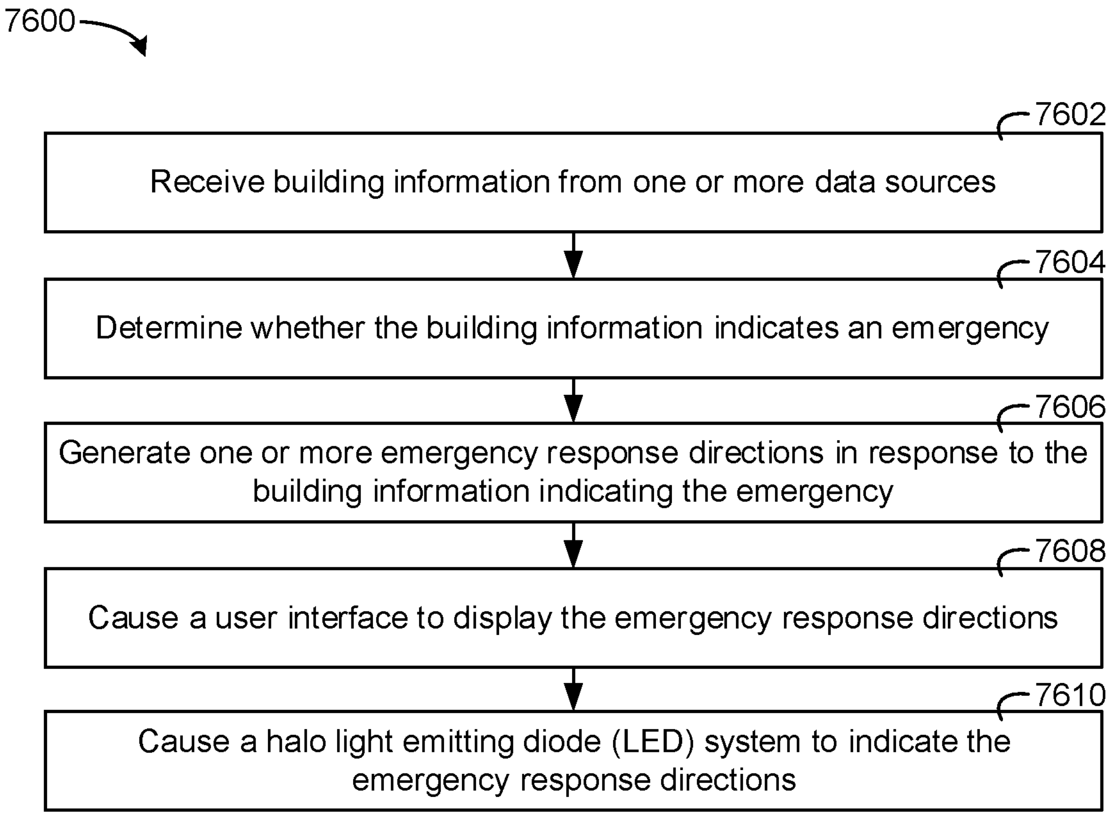
FIG. 76 is a flow diagram of a process of operating the halos of FIGS. 73-74 to indicate emergency conditions by the control device of FIGS. 73-74, according to an exemplary embodiment.

Referring now to FIG. 76, a process 7600 is shown for operating the halo LED system 7508 and/or the user interface 7302 to display emergency response directions, according to an exemplary embodiment. The control device 214 is configured to perform the process 7600 in some embodiments. Furthermore, any computing device, e.g., the display device 4002, the user device 4012, the display device 5300 can include some and/or all of the components required to perform the process 7600 and can be configured to perform the process 7600.

In step 7602, the control device 214 receives building information from one or more data sources. The data sources can be weather related data sources indicating weather conditions of cities, towns, states, countries, etc. and can be received from the weather server 608 via the network 602. In some embodiments, the data is social media data, e.g., trending posts, videos, etc. receive from the social media servers 4011 via the network 602. Furthermore, the data can be indications of indoor temperatures, indoor air quality values (e.g., carbon monoxide), etc. receive from the building emergency sensors 606.

In step 7604, the control device 214 can determine whether the building information receive in the step 7602 is indicative of an emergency. For example, in some embodiments, the data received in the step 7602 is tagged as an emergency and/or a particular type of emergency. For example, weather data received via a weather data stream from the weather server 608 can indicate that a hurricane is present. Furthermore, an emergency pull handle (e.g., a building emergency sensor 606) can be triggered causing an indication of a fire or active shooter within a building to the control device 214.

In step 7606, in response to determining that a building emergency is occurring as determined in the step 7604, the control device 214 is configured to generate one or more emergency response directions. For example, the control device 214 can generate one or more directions for responding to an emergency, e.g., directions for navigating a building, directions for responding to an active shooter, a fire, etc. In step 7608, the control device 214 can display the emergency directions on the user interface 7302. In some embodiments, the directions are text based instructions "Close Windows," "Hide Under Desk", or are visual indications, e.g., arrows, maps, etc.

In step 7610, the control device 214 cause the halo LED system 7508 to operate to provide an indication of the emergency determine din the step 7604 to a user and/or provide an indication of the emergency response directions to a user. For example, the control device 214 could cause the halo LED system 7508 to illuminate (e.g., turn on constantly, blink at a particular frequency, etc.) a particular color (e.g., red) to indicate that there is an emergency. In various embodiments, the halo LED system 7508 operates LEDs of the halo LED system 7508 to provide emergency navigation directions. For example, the halo LED system 7508 could be operated that LEDs on a left side of the control device 214 blink to indicate to make a left turn down a hallway. Furthermore, the lights could turn on in a pattern from left to right to indicate the left turn.

Figure 77:
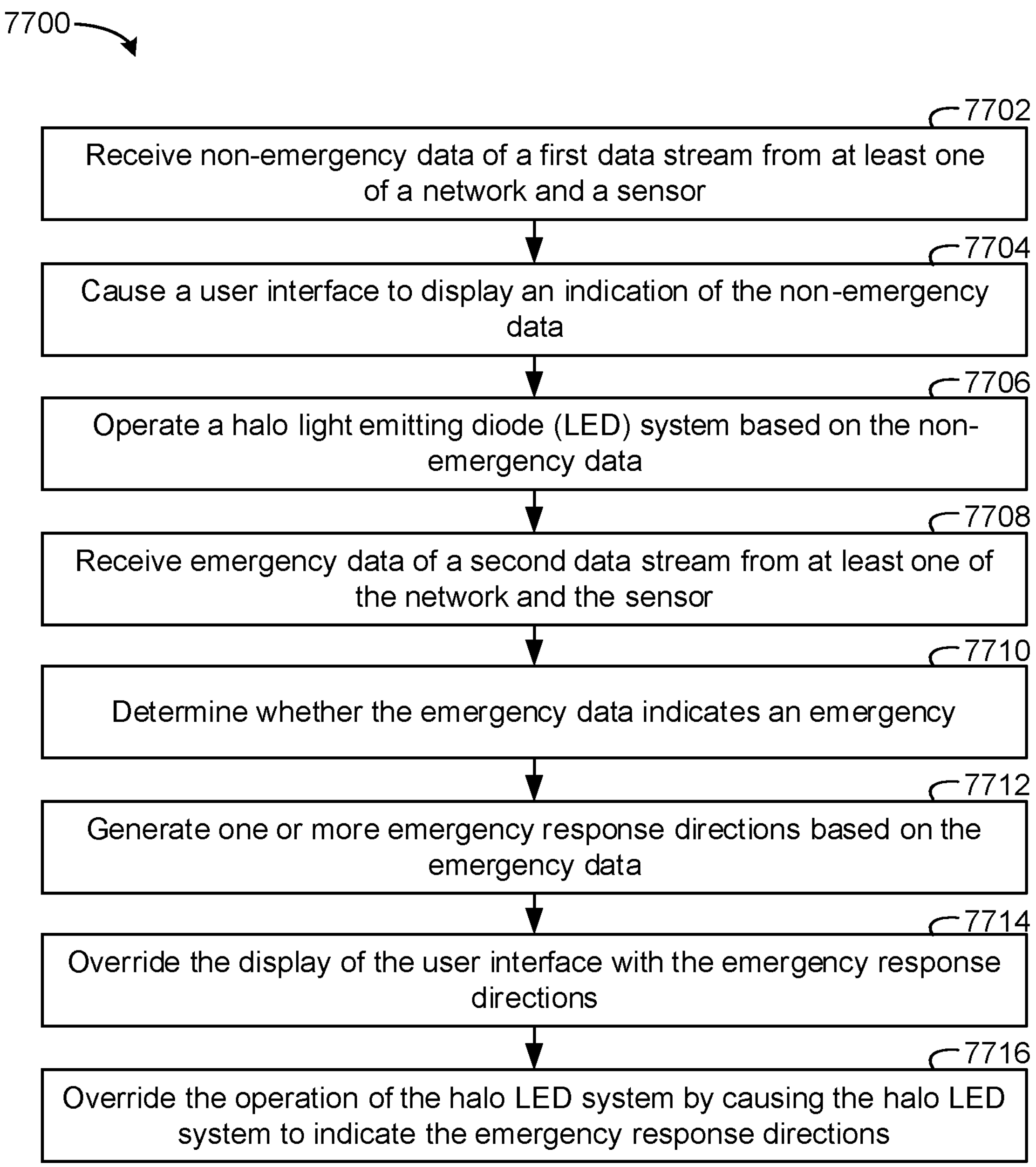
FIG. 77 is a flow diagram of a process of displaying non-emergency information on the control device of FIGS. 73-74 and/or the halos of FIGS. 73-74.

Referring now to FIG. 77, a process 7700 is shown for displaying non-emergency information on the user interface 7302 and/or the halo LED system 7508 and overriding the display of non-emergency information with emergency information in response to receiving an emergency from a data stream, according to an exemplary embodiment. The control device 214 is configured to perform the process 7700 in some embodiments. Furthermore, any computing device, e.g., the display device 4002, the display device 5300, the user device 4012 can include some and/or all of the components required to perform the process 7700 and can be configured to perform the process 7700.

In step 7702, the control device 214 can receive non-emergency data from a first data stream from at least one of the network or a sensor. The control device 214 can receive the non-emergency data from the network 602, e.g., from the building management system 610, from the building emergency sensor 606, from the weather server 608, and/or from the social media servers 4011. Furthermore, the non-emergency data can be received from a sensor of the control device 214 (e.g., a temperature sensor, a pressure sensor, a humidity sensor, etc.). In step 7704, based on the non-emergency data, the control device 214 can cause the user interface 7302 to display non-emergency information.

For example, the user interface 7302 could display temperatures, humilities, weather reports, social media events, scheduled building events, building notifications, news stories, etc. In step 7706, the control device 214 operates the halo LED system 7508 to display an indication of the non-emergency data. For example, if the data is new, the halo LED system 7508 may illuminate to notify a user that new information is received. If the non-emergency data indicates ambient outdoor temperature, the color of the halo LED system 7508 may illuminate to a color that is a function of the temperature (e.g., between blue and red to indicate hot or cold.)

In step 7708, the control device 214 receives emergency data from a second data stream from at least one of the network and the sensor. The emergency data can be received from a second data stream and/or from the first data stream and can be used to override the display of information based on the non-emergency information. For example, the non-emergency information could be received from the building management system 610 via a data stream of the building management system 610 however based on receiving emergency data from a data stream of the weather server 608, the control device 214 can override display of the information on the user interface 7302 and/or the halo LED system 7508.

In step 7710, the control device 214 can determine whether the emergency data received in the step 7708 is indicative of an emergency. For example, the data received from the second data stream may be labeled as emergency and non-emergency data and the control device 214 can identify whether the data of the second data stream is the emergency data based on the label. In some embodiments, the control device 214 itself identifies whether the data of the second data stream is emergency data, e.g., determine whether a wind speed is greater than a predefined amount, determine whether an outdoor temperature is lower than a predefined amount, determine whether a snowfall amount is greater than a predefined amount, etc.

In step 7712, the control device 214 determines emergency response based on the emergency data. For example, if the emergency data indicates that there is a tornado, the control device 214 can generate route directions for navigating to a tornado shelter or safe area of a building. Furthermore, if there is an active shooter in the building, the control device 214 can generate emergency response directions which provide navigation to an area where the shooter is not present.

In step 7714, the control device 214 can override the display of the non-emergency information on the user interface 7302. For example, the control device 214 can cause the user interface 7302 to stop displaying the non-emergency information and begin displaying the emergency response directions. Similarly, the control device 214, in step 7716, can override the operation of the halo LED system 7508 to display the emergency response directions. The step of overriding and displaying the emergency response directions on the user interface 7302 and/or the halo LED system

7508 can be the same and/or similar to the steps 7608 and/or 7610 as described with reference to FIG. 76.

Referring generally to FIGS. 78-81, a building sensor, such as a thermostat 8000 device, is shown, according to various exemplary embodiments. The thermostat 8000 described herein may be used in any HVAC system, room, environment, or system within which it is desired to control and/or observe environmental conditions (e.g., temperature, humidity, etc.). The thermostat 8000 may be adjusted by a user to control the temperature of a system via a user interface or remotely (e.g., via a smart phone). The thermostat 8000 includes a processing circuit 7800 comprised of a processor module 7801, a memory module 7802, an LED module 7803, an occupancy sensor module 7804, an output interface 7805, an input interface 7807, one or more LEDs 7901*a*-7901*i*, an occupancy sensor 7808, and a user 7809. In some embodiments, thermostat 8000 may be a control device 214 as described with reference to FIGS. 2-39 and/or the display device 4002 as described with reference to FIGS. 40-52 and/or the display device 5300 as described with reference to FIGS. 53-59 and can include any and/or all of the components and/or be configured to perform any of the operations of control device 214 and/or the display device 4002 or 5300.

Figure 78:
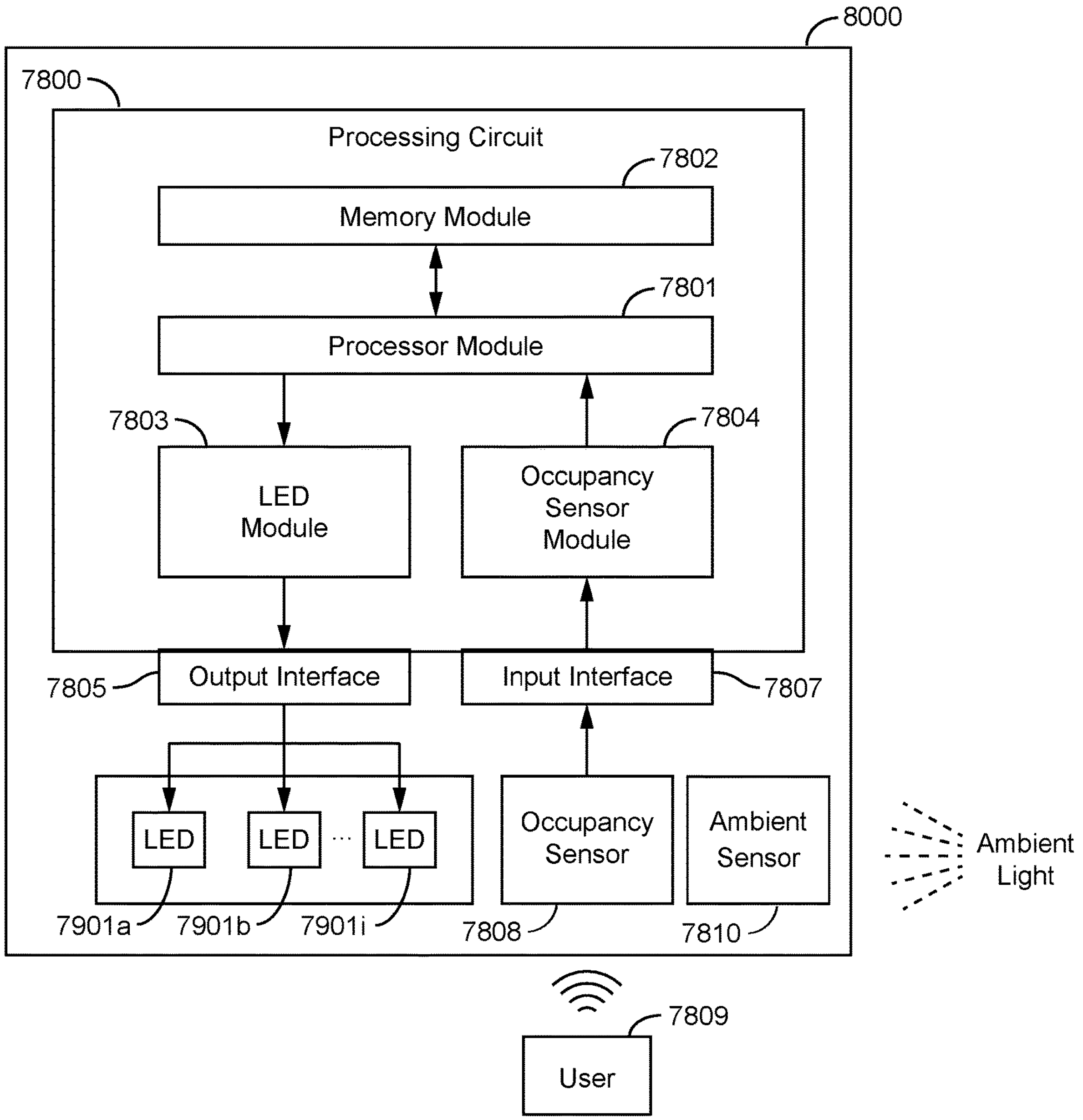
FIG. 78 is a block diagram of an LED controller for the thermostat with area illumination and occupancy sensor, according to some embodiments.
Figure 79:
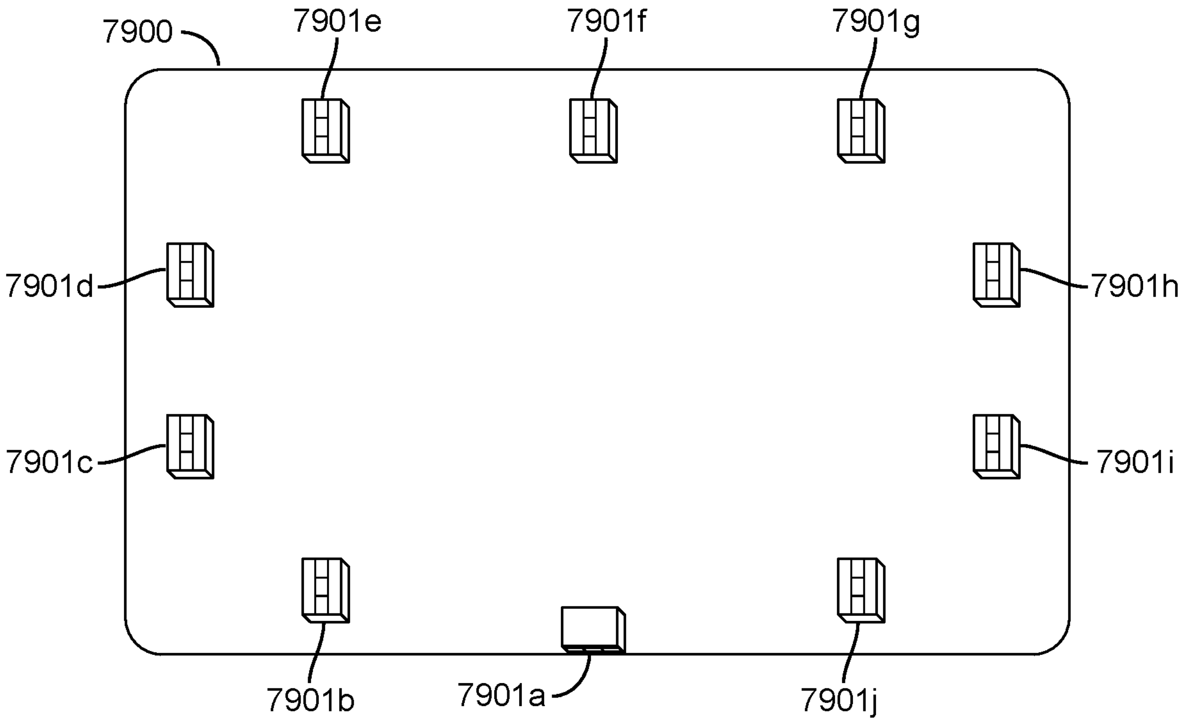
FIG. 79 is a front view of the LED array of the thermostat with area illumination and occupancy sensor, according to some embodiments.
Figure 80:
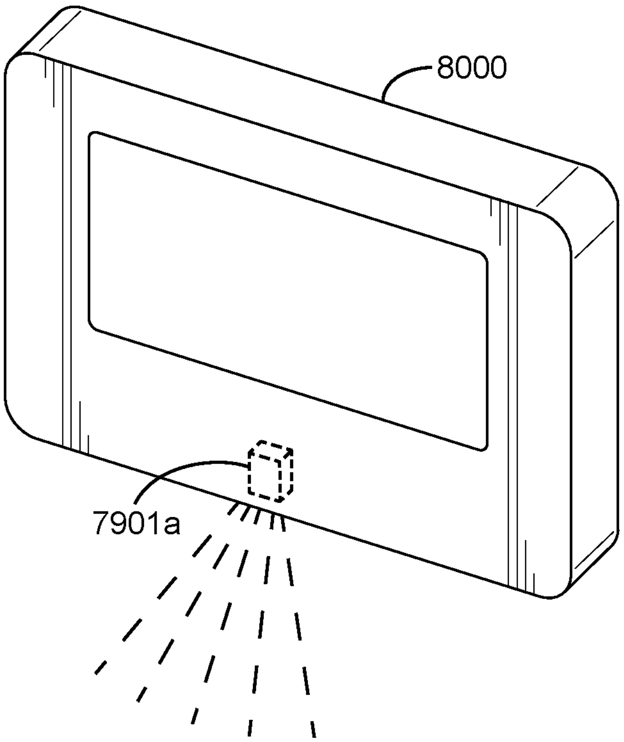
FIG. 80 is an isometric view of a front portion of the thermostat with area illumination and occupancy sensor, according to some embodiments.
Figure 81:
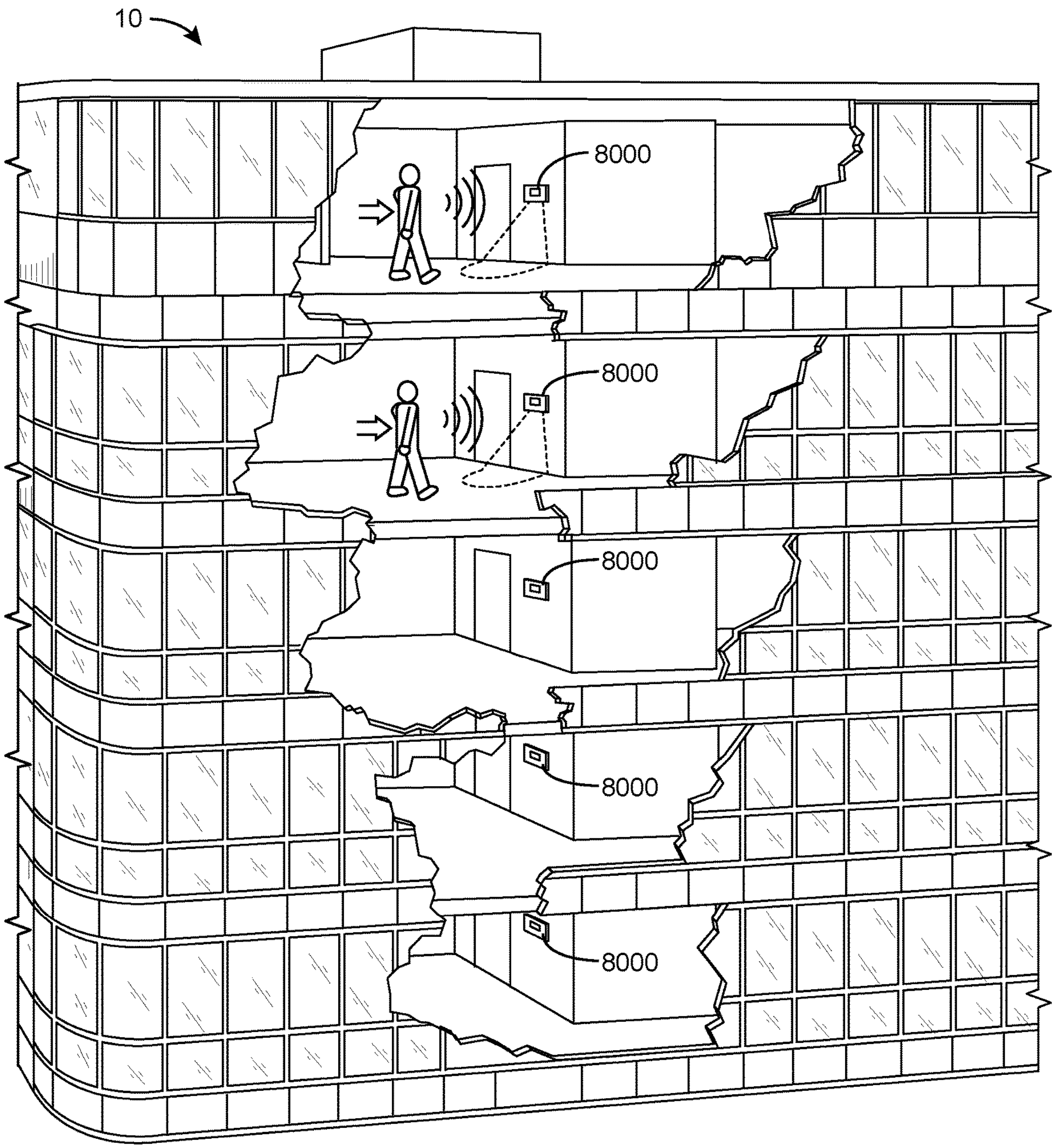
FIG. 81 is a drawing of a building equipped the thermostat with area illumination and occupancy sensor, according to some embodiments.

Referring to FIGS. 78-80, in some embodiments, the thermostat 8000 may be configured with a processing circuit 7800 comprised of a processor module 7801, a memory module 7802, an LED module 7803, an occupancy sensor module 7804, an output interface 7805, an input interface 7807, one or more LEDs 7901*a*-7901*i*, an occupancy sensor 7808, and a user 7809, a housing 7900, an occupancy sensor 7808, and one or more LEDs configured 7901*a*-7901*j* to emit light in a direction toward a floor below the thermostat. The housing 7900 may be configured to be removably attached to a wall mounted control device 214 or display 4002 or 5300.

In further embodiments, the floor illumination module of FIG. 79 may be configured to be integrated with control device 214 as described with reference to FIGS. 2-39 and/or the display device 4002 as described with reference to FIGS. 40-52 and/or the display device 5300 as described with reference to FIGS. 53-59 and can include any and/or all of the components and/or be configured to perform any of the operations of control device 214 and/or the display device 4002 or 5300.

Processing circuit 7800 may be configured to correlate occupancy sensor data from the occupancy sensor 7808 based on detection of presence of one of more of motion, heat, sound, or light conditions in proximity to the thermostat 8000 to detect the approach of a user 7809 and provide occupancy detection data as outputs to the processing circuit 7800. Processing circuit 7800 may be further configured to determine the existence of an occupancy condition based on change detection data inputs from occupancy sensor 7808. Processing circuit 7800 may be configured to determine current time, times of one or more LED 7901*a*-7901*j* activations and deactivations, elapsed time of one or more LED 7901*a*-7901*j* activation periods, and elapsed time between one or more LED deactivations and subsequent activations.

Occupancy sensor 7808 may be configured to detect the approach of a user 7809 to the thermostat 8000 and/or a presence of the user within an area of the thermostat 8000 and provide occupancy data to the processing circuit 7800. In some embodiments, the processing circuit 78000 determines the approach of the user 7809 to the thermostat 8000 and/or a presence of the user within an area of the thermostat 8000 based upon the occupancy data provided by the occupancy sensor 7808. In some embodiments, the processing circuit 78000 determines the approach of the user 7809 to the thermostat 8000 and/or a presence of the user within an area of the thermostat 8000 based upon the data provided aby another device (e.g., smart phone) without using occupancy data provided by the occupancy sensor 7808 or in combination with occupancy data provided by the occupancy sensor 7808.

Occupancy sensor 7808 may comprise one or more detectors of changes in one of more of motion, heat, sound, or light conditions in proximity to the thermostat 8000. Occupancy sensor 7808 and/or the processing circuit 7800 may be further configured to detect changes in one of more of motion, heat, sound, or light conditions in proximity to the thermostat 8000 that result from the approach of user 7809. Occupancy sensor 7808 may be further configured to transmit data to the processing circuit 7800 via an input interface 7807. The processing circuit 7800 can use historical data associated with levels or changes in one of more of motion, heat, sound, or light conditions in proximity to the thermostat 8000 to determine if the user is approaching or leaving the area associated with the thermostat 8000. The processing circuit 7800 can utilize other data to confirm occupancy. For example, the lighting can be disabled if geofencing data or a vacation mode for the thermostat 8000 indicates that a user is not on the premises.

The thermostat 8000 includes an ambient light sensor 7809 configured to detect ambient light levels in proximity to the thermostat 8000 and provide an output of ambient light level data to the processing circuit 7800. The processing circuit 7800 only provides the light to the floor when the ambient light level is below a threshold when the user 7809 is in proximity of the thermostat 7808 in some embodiments. In some embodiments, the processing circuit 7800 only provides the light to the floor when clock data indicates non-daylight hours. One or more of LEDs 7901*a*-7901*j* may be configured to emit light in one or more of a direction toward a floor of a building 10 beneath a thermostat 8000 or area in proximity to the thermostat (e.g. the wall of a building 10). The light is emitted in response to a signal form the processing circuit 7800 via the output interface 7805. In some embodiments, an LED 7901*a* is disposed at a bottom edge of the housing 7900 to emit the light toward the floor in response to the occupant being in proximity of the thermostat 8000 or approaching the thermostat 8000.

In some embodiments, LEDs 7901*a*-7901*j* may be configured to emit light in an area in proximity to the thermostat using the LED halo of display device 5300. In addition a display associated with the thermostat 800 may also illuminate and message be provided to the user 7809 in response to the user being in the proximity of or approaching the thermostat 8000.

In further embodiments, LEDs 7901*a*-7901*j* may be configured to emit light in the ultraviolet light spectrum at wavelengths know to kill or inactivate microorganisms on surface areas, wherein the processing circuit 7800 may determine conditions and periods for which LEDs 7901*a*-7901*j* are activated to kill or inactivate microorganisms on surface areas. Processing circuit 7800 may be further configured to LEDs 7901*a*-7901*j* to kill or inactivate microorganisms on surface areas during periods when occupancy conditions are not sensed by the occupancy sensor 7808. Processing circuit 7800 may be further configured to LEDs 7901*a*-7901*j* to kill or inactivate microorganisms on surface areas during periods of time determined by the processing circuit 7800. In further embodiments, LEDs 7901*a*-7901*j* may be configured to emit light in one or more light spectra comprising visible, infrared, or ultraviolet.

Processing circuit 7800 may be further configured to cause the one or more LEDs 7901*a*-7901*e* to emit the light towards the floor of a building 10 in response to the existence of an occupancy condition. Processing circuit 7800 may be configured to transmit activation signals to LEDs 7901*a*-7901*i* via output interface 7805. Processing circuit 7800 may be further configured to receive an ambient light level input from the occupancy sensor 7808 and inhibit activation of the one or more LEDs 7901*a*-7901*j* in response to the existence of an occupancy condition if the ambient light level exceeds an activation threshold. The processing circuit 7800 may be further configured to activate or inhibit activation of the one or more LEDs 7901*a*-7901*j* based on a determination that conditions in proximity to the thermostat 7800 satisfy or fail to satisfy parameters based on historic LED activation and inhibition data stored in memory module 7802.

Processing circuit 7800 may be further configured to deactivate of one or more LEDs 7901*a*-7901*j* in response to the absence of one or more of occupancy conditions. Processing circuit 7800 may be further configured to activate and deactivate one or more LEDs 7901*a*-7901*j* based on a determination of the existence or absence of one or more activation or deactivation conditions. Processing circuit 7800 may be further configured to activate and deactivate one or more LEDs 7901*a*-7901*j* based on determination the existence or absence of one or more activation or deactivation conditions based on current or elapsed time.

Memory module 7802 may be configured to receive data from and provide data to processing module 7801. Memory module 7802 may be further configured to record and store one or more LED 7901*a*-7901*j* activations and deactivations as historic data. Memory module 7802 may be further configured to store occupancy condition data.

In some embodiments, the thermostat 8000 may be configured as a thermostat with an area light system and an occupancy sensor. The thermostat 8000 includes one or more LEDs 7901*a*-7901*j* configured to emit light in a direction toward a floor area beneath the thermostat. The thermostat 8000 is configured with a processing circuit 7800 configured to cause the one or more LEDs 7901*a*-7901*j* to emit the light towards one of more of the floor or areas proximate to the thermostat 8000 in response to an indication using data from an occupancy sensor 7808 that a user has approached the thermostat 8000. In some embodiments, the thermostat 8000 is another type of building sensor, such as a room pressure sensor with a differential pressure environment sensor, a humidity sensor, or other environmental sensor with or without a display. The input interface 7807 can also include a network interface for receiving data from other equipment or data sources. Similar to the control device 214, the thermostat 8000 can receive emergency or alarm data and provide light in response to such data (e.g., follow processes 7600 and 7700 or other procedures discussed above). In some embodiments, the thermostat 8000 provides white light when an occupant is in the area of the thermostat and provides red light in response to an alarm condition Configuration of Exemplary Embodiments The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data that cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for a building, the thermostat comprising:

an occupancy sensor;

one or more LEDs configured to emit light in a direction toward a floor beneath the thermostat to illuminate the floor beneath the thermostat; and a processing circuit configured to cause the one or more LEDs to emit the light towards the floor in response to data from the occupancy sensor, whereby the thermostat aids walking safety by emitting the light towards the floor;

wherein the processing circuit causes the one or more LEDs to emit the light towards the floor at least in part in response to an ambient light level being less than a threshold.

2. The thermostat of claim 1, wherein the processing circuit causes the one or more LEDs to emit the light towards the floor in response to a determination that a user has approached the thermostat determined at least in part using the data from the occupancy sensor.

3. The thermostat of claim 1, wherein the processing circuit comprises one or more of a processor module, a memory module, an occupancy sensor module, an LED module, an input interface, and an output interface.

4. The thermostat of claim 1, wherein the processing circuit is configured to receive the data from the occupancy sensor and determine an occupancy condition based on correlation of the data and to one or more occupancy conditions stored in the processing circuit.

5. The thermostat of claim 1, wherein the processing circuit is further configured to deactivate of the one or more LEDs in response to a determination that a user is not within an of the thermostat.

6. The thermostat of claim 1, wherein the processing circuit is further configured to continue to causes the one or more LEDs to emit the light towards the floor in response to a determination that a user is within an area proximate the thermostat.

7. The thermostat of claim 1, wherein the one or more LEDs is configured to emit the light in the direction toward the floor beneath the thermostat are arrayed on at least a portion of an outer bottom edge of the thermostat.

8. The thermostat of claim 1 wherein the one or more LEDs is configured to illuminate one or more surfaces in proximity to the thermostat.

9. The thermostat of claim 1, wherein the housing provides a mount removably connected to the building sensor system and wherein the housing provides for mounting of a power source connection, the occupancy sensor, the one or more LEDs, and the processing circuit.

10. A thermostat for a building, the thermostat comprising:

an occupancy sensor;

one or more LEDs configured to emit light in a direction toward a floor beneath the thermostat;

a processing circuit configured to cause the one or more LEDs to emit the light towards the floor in response to data from the occupancy sensor; and an ambient light sensor configured to detect an ambient light level in proximity to the thermostat and provide an output of ambient light level data to the processing circuit, wherein the processing circuit causes the one or more LEDs to emit the light towards the floor in response to a determination that a user has approached the thermostat determined at least in part using the data from the occupancy sensor and in response to the ambient light level being less than a threshold.

11. A thermostat for a building, the thermostat comprising:

an occupancy sensor;

one or more LEDs configured to emit light in a direction toward a floor beneath the thermostat; and a processing circuit configured to cause the one or more LEDs to emit the light towards the floor in response to data from the occupancy sensor, wherein the processing circuit causes the one or more LEDs to emit the light towards the floor in response to a determination that a user has approached the thermostat determined at least in part using a history of the data from the occupancy sensor.

12. A thermostat for a building, the thermostat comprising:

an occupancy sensor;

one or more LEDs configured to emit light in a direction toward a floor beneath the thermostat; and a processing circuit configured to cause the one or more LEDs to emit the light towards the floor in response to data from the occupancy sensor, wherein the one or more LEDs is configured to emit the light in the direction toward the floor beneath the thermostat are arrayed as a halo light emitting diode (LED) system comprising the one or more LEDs configured to emit the light in the direction toward the floor beneath the thermostat and a halo diffuser structured around at least a portion of an outer edge of the thermostat, wherein the halo diffuser is configured to diffuse the light from the one or more LEDs around at least the portion of the outer edge of the thermostat.

13. A building sensor system, the building sensor system comprising:

a housing;

an environment sensor;

an occupancy sensor;

one or more LEDs configured to emit light in a direction toward a floor below the housing, wherein the one or more LEDS directly emit the light to the floor; and a processing circuit configured to cause the one or more LEDs to emit the light towards the floor in response to a user being within an area of the occupancy sensor, the processing circuit determining that the user is within the area of the building sensor system using at least one signal from the occupancy sensor, wherein the housing provides a mount removably connected to the building sensor system and wherein the housing provides for mounting of a power source connection, the occupancy sensor, the one or more LEDs, and the processing circuit.

14. The thermostat of claim 13, wherein the housing provides a mount removably connected to the building sensor system and wherein the housing provides for mounting of a power source connection, the occupancy sensor, the one or more LEDs, and the processing circuit.

15. The building sensor system of claim 13, wherein the building sensor system is a thermostat and the environment sensor is a temperature sensor.

16. The building sensor system of claim 9, wherein the occupancy sensor is configured to detect changes in one of more of motion, heat, sound, or light conditions in proximity to the building sensor system.

17. A building sensor system, the building sensor system comprising:

a housing;

an environment sensor;

an occupancy sensor;

one or more LEDs configured to emit light in a direction toward a floor below the housing; and a processing circuit configured to cause the one or more LEDs to emit the light towards the floor in response to a user being within an area of the occupancy sensor, the processing circuit determining that the user is within the area of the occupancy sensor using at least one signal from the occupancy sensor, wherein the building sensor system is pressure monitoring device and the environment sensor is a differential pressure sensor.

18. The building sensor system of claim 17, further comprising a network interface for receiving alarm data, wherein the processing circuit is configured to cause the one or more LEDs to emit the light towards the floor in response to the alarm data, wherein the one or more LEDs provide the light in a first color for an alarm condition and in a second color for a non-alarm condition.

19. The building sensor system of claim 17, further comprising a halo diffuser.

20. The building sensor system of claim 17, wherein the processing circuit causes the one or more LEDs to emit the light towards the floor at least in part in response to an ambient light level being less than a threshold.

21. A building sensor system, comprising:

a display;

an occupancy sensor;

one or more LEDs configured to emit light in a direction toward a floor, wherein the one or more LEDS directly emit the light to the floor; and a processing circuit configured to cause the one or more LEDs to emit the light towards the floor in response to a user being within an area near the display, the processing circuit determining that the user is within the area near the display using at least one signal from the occupancy sensor, wherein the processing circuit is configured to cause the one or more LEDs to emit the light towards the floor in response to alarm data, wherein the one or more LEDs provide the light in a first color for an alarm condition and in a second color for a non-alarm condition.

22. The building sensor system of claim 21, wherein the building sensor system is pressure monitor and further comprises a differential pressure sensor.

* * * * *